(12) United States Patent
Divvi et al.

(10) Patent No.: US 12,445,844 B2
(45) Date of Patent: Oct. 14, 2025

(54) METHODS AND APPARATUS FOR IMPLEMENTING VLAN STACKING FOR SEAMLESS ROAMING IN HIGH DENSITY WIRELESS NETWORKS

(71) Applicant: Charter Communications Operating, LLC, St. Louis, MO (US)

(72) Inventors: Venkata Divvi, Centennial, CO (US); Christopher Teague, Castle Pines, CO (US); Cheryl Warne, Lone Tree, CO (US); Timothy Bleidorn, Colorado Springs, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 278 days.

(21) Appl. No.: 18/115,919

(22) Filed: Mar. 1, 2023

(65) Prior Publication Data
US 2024/0298176 A1    Sep. 5, 2024

(51) Int. Cl.
*H04W 12/069* (2021.01)
*H04W 12/69* (2021.01)

(52) U.S. Cl.
CPC ......... *H04W 12/069* (2021.01); *H04W 12/69* (2021.01)

(58) Field of Classification Search
CPC .............................. H04W 12/069; H04L 12/28
USPC ................................. 370/329, 401, 402, 403
See application file for complete search history.

(56) References Cited

U.S. PATENT DOCUMENTS

2022/0353197 A1*  11/2022  Singh ................... H04L 47/625
2023/0262281 A1*   8/2023  Kasichainula ..... H04N 21/8547
                                                                  386/207

OTHER PUBLICATIONS

Wikipedia The Free Encyclopedia IEEE 802.1ad, downloaded Feb. 17, 2023, 4 pages, Wikipedia, https://en.wikipedia.org/wiki/IEEE_802.1ad.
Wikipedia The Free Encyclopedia IEEE 802.1Q, downloaded Feb. 17, 2023, 5 pages, Wikipedia, https://en.wikipedia.org/wiki/IEEE_802.1Q.

(Continued)

*Primary Examiner* — Dang T Ton
(74) *Attorney, Agent, or Firm* — Straub & Straub; Stephen T. Straub; Michael P. Straub

(57) ABSTRACT

The present invention relates to methods and apparatus for providing services in high density deployments using dynamic assignment Virtual Local Area Network (VLAN) stacking during client device authentication. An exemplary method includes the steps of: receiving wirelessly, by a first Access Point (AP), a first authentication request message including first user equipment device identification information from a first user equipment device; generating, by the first AP, a second message based on the first authentication request message, the second message including the first user equipment device identification information and location information for the first AP; transmitting, by first AP, the second message to a first server; and receiving in response to the second message, by the first AP, a third message, said third message including dynamically assigned stacked VLAN information including a first Service-VLAN Identifier and a first Customer-VLAN Identifier dynamically assigned to the first user equipment device.

20 Claims, 30 Drawing Sheets

(56) References Cited

OTHER PUBLICATIONS

IEEE Computer Society Sponsored by the LAN/MAN Standards Committee, IEEE Standard for Local and metropolitan area networks Virtual Bridged Local Area Networks Amendment 4: Provider Bridges, IEEE Std 802.1ad™-2005 (Amendment to IEEE Std 802.1Q™-2005), May 26, 2006, 74 pages, The Institute of Electrical and Electronics Engineers, Inc., NY, NY.
Ruckus FastIron Security Configuration Guide, 08.0.40a Supporting FastIron Software Release 08.0.40a, Apr. 27, 2018, 308 pages, Ruckus an Arris Company.
Lisa Phifer, Combining 802.1X and VLANs for WLAN authorization, Apr. 2006, 6 pages, https://www.techtarget.com/searchnetworking/feature/Combining-8021X-and-VLANs-for-WLAN-authorization.
Rashmi Bhardwaj, Dynamic VLAN Assignment: Wireless, downloaded Oct. 3, 2022, 10 pages, https://ipwithease.com/dynamic-vlan-assignment-wireless/.
The Writers and Editors of the Juniper Networks Techlibrary, Understanding Subscriber Management and BNG, Jun. 2017, 114 pages, Juniper Networks, Network Design and Architecture Center Books.
Mark Chen, Using static and dynamic VLANs with AP's, Aug. 17, 2020, 9 pages, https://support.edge-core.com/hc/en-us/articles/900002170963-Using-static-and-dynamic-VLANs-with-AP-s, Edgecore Networks Corporation.
Congdon, et al., IEEE 802.1X Remote Authentication Dial in User Service (RADIUS) Usage Guidelines, Network Working Group, Request for Comments: 3580, Sep. 2003, 30 pages.
Tschofenig, et al., Carrying Location Objects in RADIUS and Diameter, Network Working Group, Request for Comments: 5580, Aug. 2009, 53 pages.

* cited by examiner

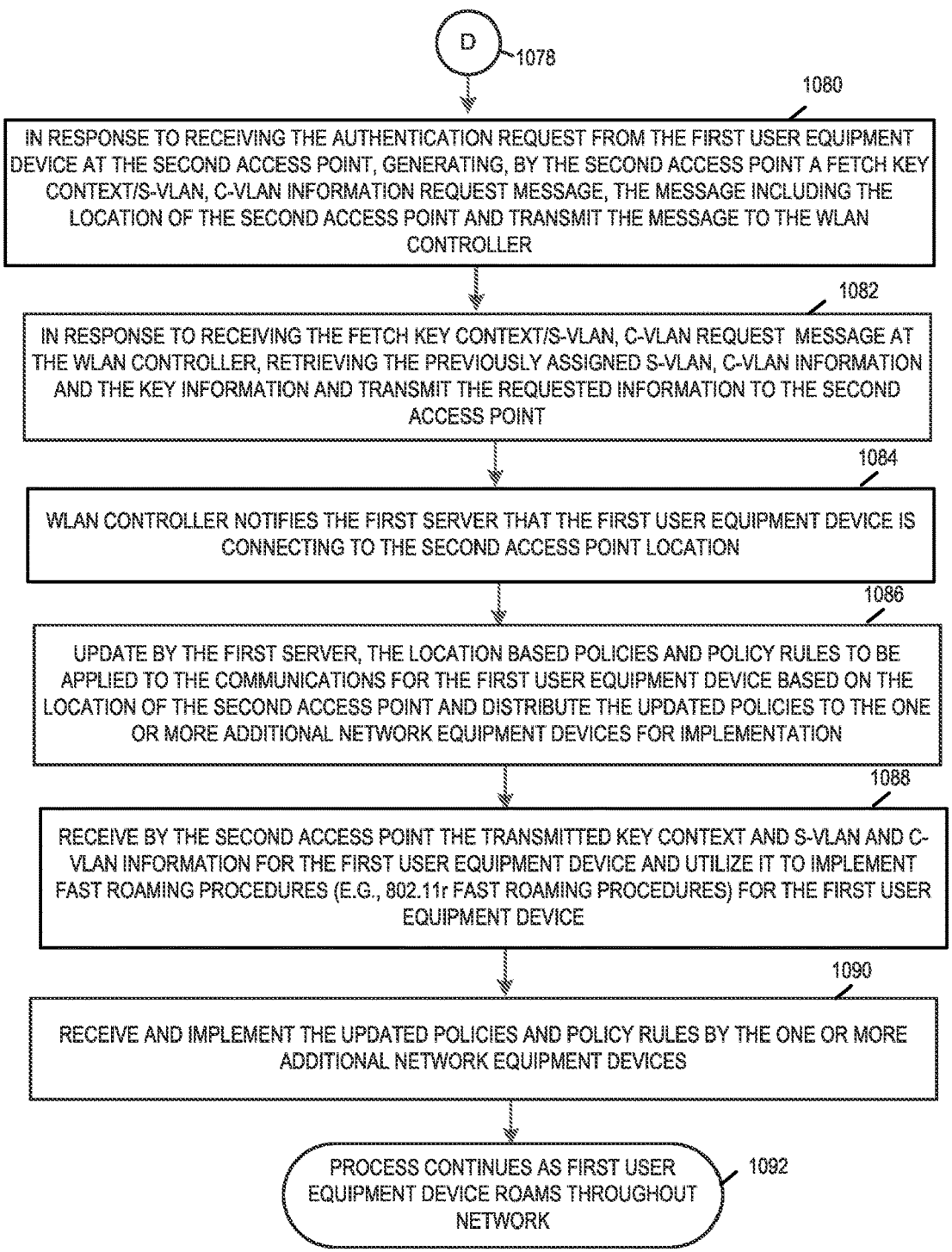

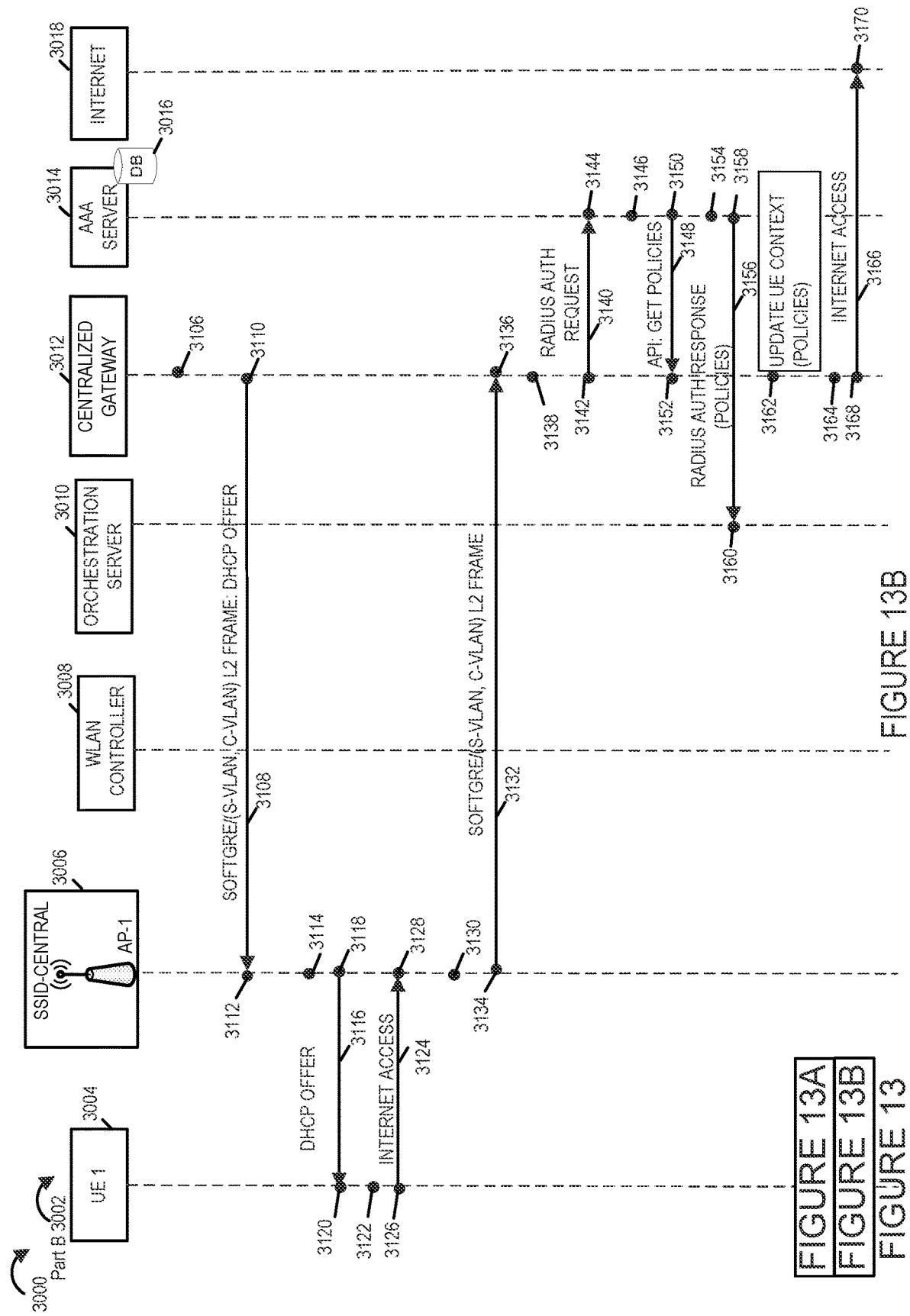

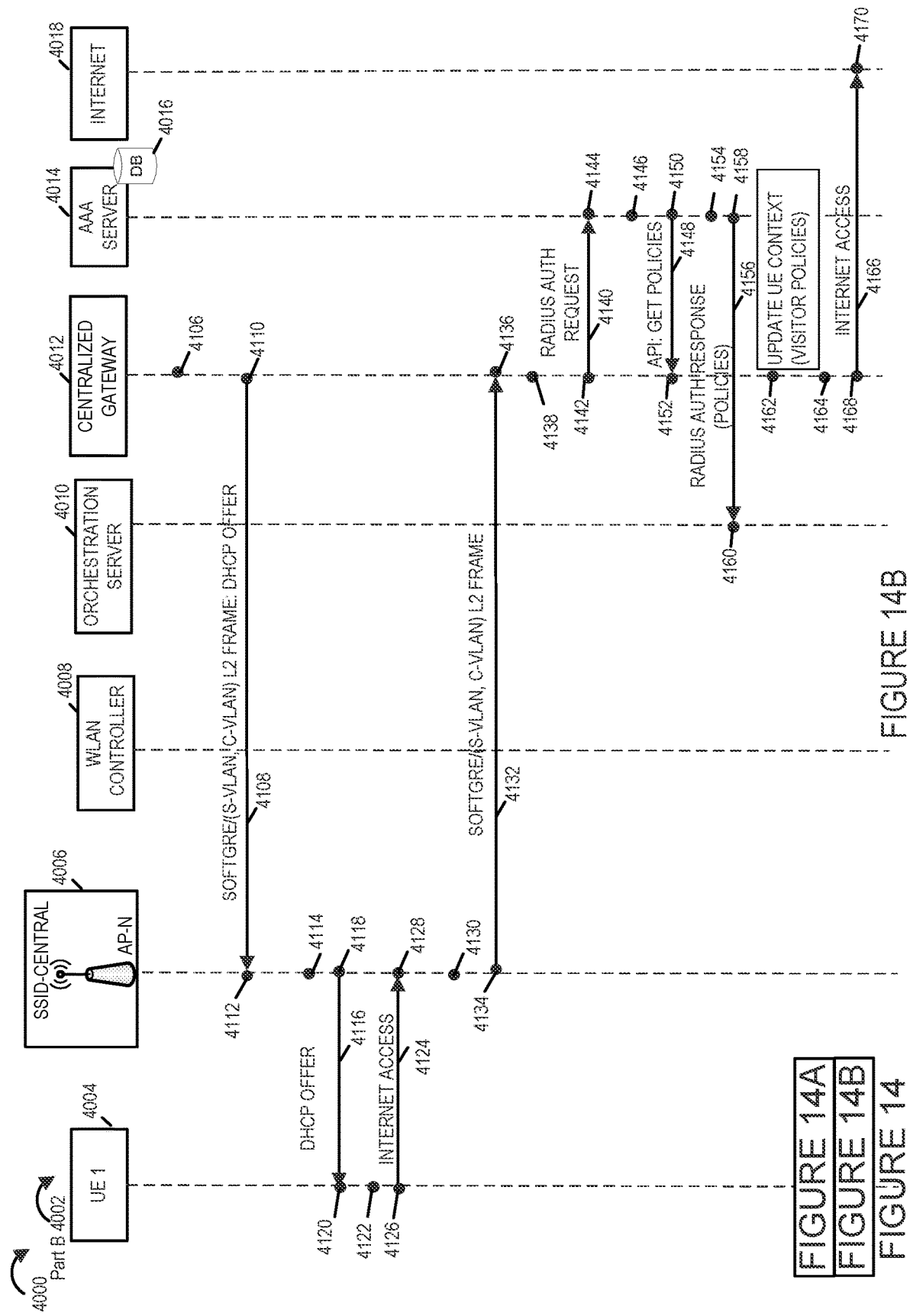

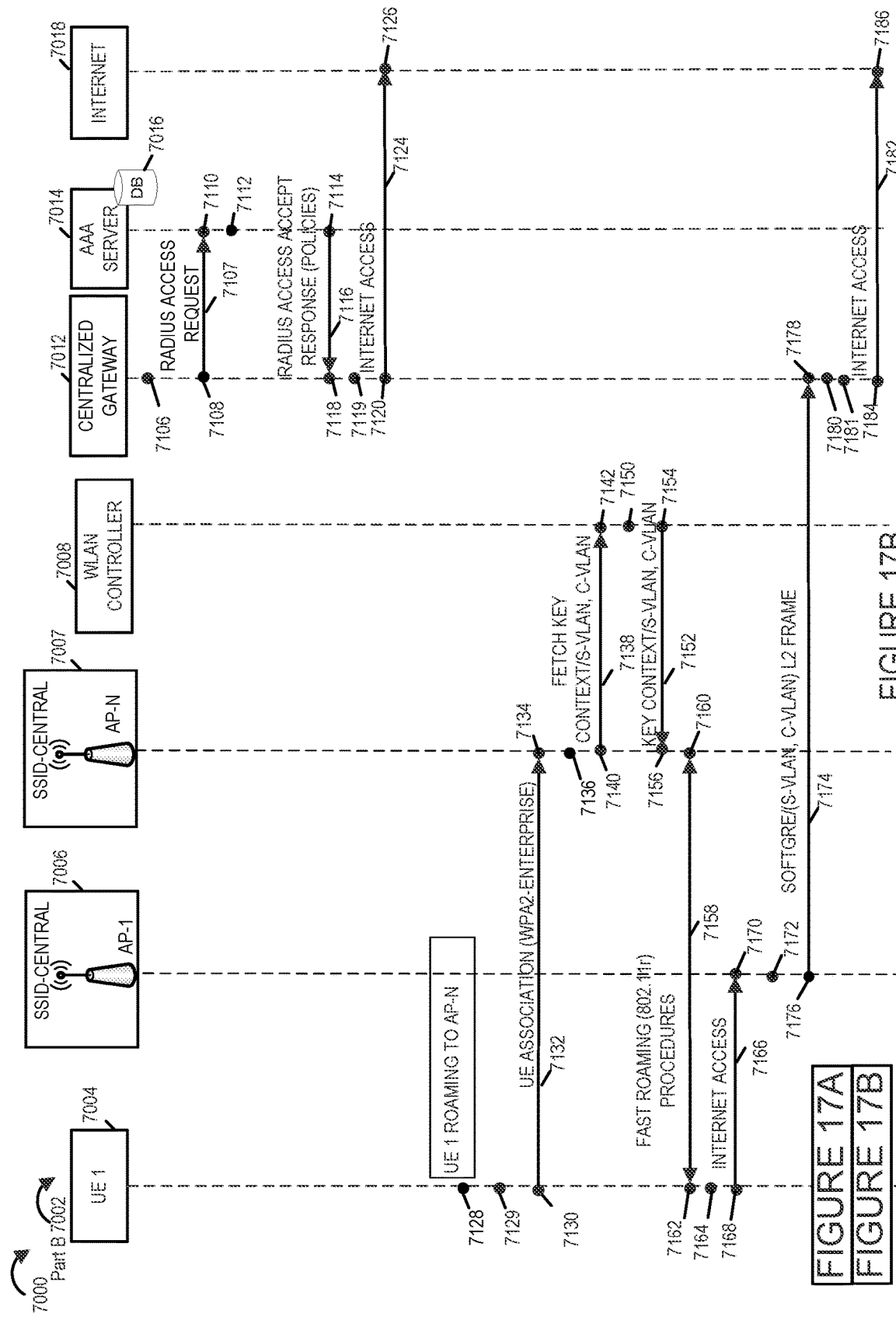

2000

2100

```
MULTI OCCURRENCE OF TUNNEL ATTRIBUTES IN
ACCESS ACCEPT MESSAGE TO PROVIDE STACKED
VLAN ASSIGNMENT

+Tunnel-Type=VLAN (13)
+Tunnel-Medium-Type=802
+Tunnel-Private-Group-ID=VLANID (S-VLAN ID)
++Tunnel-Type=VLAN (13)
++Tunnel-Medium-Type=802
++Tunne-Private-Group-ID=VLANID (C-VLAN ID)
```

METHODS AND APPARATUS FOR IMPLEMENTING VLAN STACKING FOR SEAMLESS ROAMING IN HIGH DENSITY WIRELESS NETWORKS

FIELD OF INVENTION

The present invention relates to methods and apparatus for providing services in high density deployments using dynamic assignment Virtual Local Area Network (VLAN) stacking during client device authentication. The present invention further relates to using VLAN stacking to provide seamless roaming in wireless networks. The present invention also relates to methods and apparatus for providing seamless roaming in high density managed Wi-Fi and private area networks.

BACKGROUND OF THE INVENTION

Large scale venue and high-density Wi-Fi deployments such as for example educational institutions, venues and stadiums are not scalable due to limitations with virtual local area networks (VLANs). Some of the key features such as seamless roaming, layer 2 traffic segmentation and private area networks are impacted by VLAN limitations. Managed Wi-Fi operators and service providers in various instances have attempted to mitigate these VLAN limitations by using proprietary techniques such as segmenting the service areas and operating the site as multiple networks. However, these workarounds create increasing operational expenses as well as end user experience issues impacting negatively on the end users' experience.

As per IEEE 802.1Q, only 12 bits are allocated for VLANs in the IEEE 802.1Q standard. The maximum number of VLANs possible on a given Ethernet network is 4,096 (1-4,094 VLAN ID values are usable range, the VLAN IDs 0 and 4.095 are reserved values).

FIG. 1 illustrates an exemplary large-scale enterprise Wi-Fi deployment 100 for students and staff in a large university campus setting.

The university campus 102 includes Service Area: 01 104, Service Area 02: 106, and Service Area 03 108, WLAN controllers 110, AAA server 112 and AD database 114. With the WLAN controllers 110 and AAA server 112 being coupled to captive portal 116 for the university. The Service Area: 01 which is an area dedicated to the electronics department: Wi-Fi Access Point 140, 142, 144, 146, and 148, switches 150, 154, 158, 162, and 166; primary data gateway 149. The Service Area: 02 which is an area dedicated to Administration Offices for the university includes switch 172 for admissions 170, switch 176 for finance 174, switch 180 for HR & Placement 178, switch 184 for Exam Comptroller 182, switch 184 for SM 186, data gateway 167, Wi-Fi Access Point 168. Service Area: 03 108 includes an Wi-Fi Access Point 190, switch 194 for the structural engineering 192 and switch 198 for public works department engineering equipment 196. Each of the three service areas supports a total of concurrent clients which is less than 4,000.

User equipment device UE A 120 is shown as being in Service Area: 01 104 connected wireless to Access Point 140. User equipment device UE B 122 is shown as being in Service Area: 01 104 connected wireless to Access Point 140 and then moving along the dotted line to Service Area: 02 106 where it associates with Access Point 168. User equipment device C 124 is shown as being in Service Area: 02 106 and moving along the dotted line to Service Area: 03. Line 132 illustrates the wired connection path from the Access Points 140, 142, 144, and 146 via switch 150 and data gateway 149 to the WLAN controllers 110. Line 132 illustrates the wired connection from Access Point 168 to switch 180 to data gateway 167 to WLAN controllers 110. Line 134 illustrates the wired connection path from Access Point 190 via switch 194 to Data Gateway 189 to WLAN controllers 110.

The capacity requirement for large universities is above 4,000 (i.e., 4K) concurrent client devices with L2 segmentation and is required to operate mostly with a single network name with private area networks supported. L2 referring to the data link layer of the 7 layer Open Systems Intercommunication (OSI) model. Due to the lack of available VLAN IDs for scaling, operators segmented the area of the university campus 102 into several discrete networks (i.e., service area: 01 104, service area 02 106, service area 108) in such a way that each of the discrete networks supports less than 4K concurrent clients and then deployed the services. Existing solutions of this type are not very efficient and result in a bad user experience. During roaming/mobility scenarios, when a user cross from one service area into another service area this results in the user's device needing to re-associate and re-authenticate with the new service domain. This re-association and re-authentication interrupts the user's active internet access resulting in a bad or poor user experience. Also as the network is segmented into different discrete service areas, private area network features will not be available across domains with roaming.

From the foregoing, it should be understood that there is a need for new and/or improved methods and apparatus for providing services in high density wireless network deployments. From the foregoing, it should be understood that there is also a need for a solution to the technological problem of how to implement an efficient and effective wireless system that is scalable with features including seamless roaming, layer 2 traffic segmentation and private area network support in view of the VLAN limitations discussed above. There is a further need for new and/or improved methods and apparatus for operating an entire site as one network that provides seamless roaming, per user location based polices and/or private area networking without VLAN scaling limitations. There is a further need for new and/or improved methods and apparatus for communicating stacked VLAN information and/or stacked VLAN headers among network components such as for example a server which assigns stacked VLAN information or stacked VLAN headers to a user equipment device or a client device and an network edge device (e.g., an Access Point) which will utilize the stacked VLAN information or stacked VLAN headers. There is a further need for new and/or improved methods and apparatus for implementing per user policies (e.g., access control and/or bandwidth policies) in systems with wireless networks servicing more than 4096 (or 4K) concurrent client devices.

SUMMARY OF THE INVENTION

The present invention provides new and/or improved methods and apparatus for providing services (e.g., wireless services such as Wi-Fi services) in high density (e.g., greater than 4K (4096) concurrent users or client devices) wireless network environments. Various embodiments of the present invention are particularly useful in large scale environments, customer premises, or venues such as for example university campuses, stadiums, arenas, business sites, airports, etc. as they address issues and problems related to scaling of wireless systems. Various embodiments of the present invention provide new and/or improved methods which are more efficient and cost effective for scaling wireless systems (e.g., Wi-Fi systems) while mitigating and/or eliminating issues and/or limitations resulting from using proprietary techniques such as segmenting the site or area into multiple service areas and operating the site as multiple work arounds which increase cost and negatively impact users' experience. Various embodiments of the present invention solve one or more of the problems discussed above.

Various embodiments of the present invention provide new and/or improved methods and apparatus for using dynamic assignment Virtual Local Area Network (VLAN) stacking during client device authentication. Various embodiments of the present invention provide new and/or improved methods and apparatus for providing for providing services (e.g., wireless services with features including seamless roaming, layer 2 traffic segmentation and private area networks) in high density (e.g., greater than 4K concurrent user) deployments using Virtual Local Area Network (VLAN) stacking applied to client devices with VLAN stacking information being dynamically assigned during client device authentication (e.g., L2 authentication) procedures. Various embodiments of the present invention provide new and/or improved methods and apparatus for implementing and using dynamically assigned VLAN stacking to provide seamless roaming for client/user devices in wireless networks (e.g., Wi-Fi networks) with a large number of concurrent users (e.g., greater than 4K). The present invention also provides new and/or improved methods and apparatus for apply per methods and apparatus for providing seamless roaming in high density managed Wi-Fi and private area networks. Various embodiments of the present invention also provide new and/or improved methods and apparatus for implementing location based user policies (e.g., access control and bandwidth policies) on a per user basis. Various embodiments of the present invention provide and/or approved methods for implementing orchestration servers that implement dynamic VLAN stacking for users in response to authentication request and determine and distribute policies and/or policy rules on a per user basis for implementing traffic shaping policies with respect to communications for the user. Various embodiments of the present invention also provide new and/or improved methods and apparatus for communicating stacked VLAN information and/or stacked VLAN headers among network components such as for example a server which assigns stacked VLAN information or stacked VLAN headers to a user equipment device or a client device and an network edge device (e.g., an Access Point) which will utilize the stacked VLAN information or stacked VLAN headers Various embodiments of the present invention also provide new and/or improved methods and apparatus for implementing per user policies (e.g., access control and/or bandwidth policies) in systems with wireless networks servicing more than 4095 concurrent client devices.

An exemplary method in accordance with one embodiment of the present invention includes the steps of: receiving wirelessly, by a first network edge device (e.g., a first Access Point or a first Wireless Router) of a wireless network, a first message (e.g., a first L2 authentication request message such as a P-PSK authentication request or 802.1X authentication request message) including first user equipment device identification information (e.g., MAC address for the first user equipment device) from a first user equipment device; generating, by the first network edge device, a second message (e.g., an Access-Request) based on said first authentication request message, said second message including the first user equipment device identification information received in the first authentication request message and location information for the first network edge device; transmitting, by the first network edge device, the second message to a first server (e.g., a first Remote Authentication Dial-In User Service (RADIUS) server), and receiving in response to said second message, by the first network edge device, a third message (e.g., an Access Accept Response), said third message including dynamically assigned stacked Virtual Local Area Network (VLAN) information including a first Service-VLAN Identifier (S-VLAN ID) and a first Customer-VLAN Identifier (C-VLAN ID) dynamically assigned to the first user equipment device.

In some embodiments, the first network edge device is a first Access Point. In some embodiments, first server is a first Remote Authentication Dial-In User Service (RADIUS) server. In some embodiments, the first message includes first authentication information (e.g., user or subscriber credentials included in a subscriber identification module (SIM) or e-SIM (electronic-subscriber identification module)). In some embodiments, the second message includes the first authentication information received in the first message.

In various embodiments, the first server is an orchestration server or an Authentication, Authorization, and Accounting (AAA) server. In some embodiments the first server is a first RADIUS server. In some embodiments, the first RADIUS server dynamically assigns the stacked Virtual Local Area Network (VLAN) information, which includes the first Service-VLAN Identifier (S-VLAN ID) and the first Customer-VLAN Identifier (C-VLAN ID), to the first user equipment device. In at least some embodiments, the orchestration server handles/performs the dynamic assignment of VLAN stacking information to user equipment devices while the AAA server fetches the policies (e.g., location based policies) to be applied to the user equipment devices and stacking details.

In various embodiments, the wireless network is a Wi-Fi network that includes a plurality of user equipment devices. The plurality of user equipment devices including more than 4095 mobile user equipment devices. The first user equipment device being one of said plurality of user equipment devices and each of said plurality of user equipment devices being dynamically assigned different stacked VLAN information including a S-VLAN ID and a C-VLAN ID.

In some embodiments, the plurality of user equipment devices include one or more devices connected to one or more physical ports on the first Access Point (e.g., via Ethernet cable(s) and/or switch(es)). In some embodiments, the one or more devices (e.g., desktop computer, IPTV, printer) connected to said one or more physical ports on the first Access Point (e.g., via Ethernet cable(s) and/or switch (es)) are part of a first Person Area Network.

In some embodiments the communications method further includes the step of: restricting access to the one or more devices which are part of the first Personal Area Network using dynamically assigned stacked VLAN information assigned to the plurality of user equipment devices. In some embodiments, the step of restricting access to the one or more devices which are part of the first Personal Area Network using the dynamically assigned stacked VLAN information assigned to the plurality of user equipment devices includes: allowing the first user equipment device to access the one or more devices which are part of the first Personal Area Network based on the dynamically assigned stacked VLAN information assigned to the first user equipment device, said first Personal Area Network having been established by or for the first user of the first user equipment device; and not allowing other user equipment devices different from the first user equipment device to access the one or more devices which are part of the first Personal Area Network based on the dynamically assigned stacked VLAN information assigned to the other user equipment devices.

In some embodiments, the method is implemented by a system including a centralized gateway that controls the data plane of a core system of the wireless network, said core system including: a plurality of network edge devices (e.g., Access Points or Routers), said plurality of network edge devices including a first plurality of Wi-Fi Access Points, said first Access Point being one of said plurality of Wi-Fi Access Points: the first server which is configured, provisioned, or pre-provisioned with wireless network site wide location information for each of the network edge devices and location based policies for each of the subscribers, subscriber devices and/or user equipment devices of the first wireless network (e.g., location based policies associated with each subscriber's authentication credentials); and a WLAN controller that manages wireless network equipment devices including the plurality of Wi-Fi Access Points.

In some embodiments, in which the wireless network is a Wi-Fi network, the first message is a first authentication message including Private-Pre-Shared Key (P-PSK) information for the first user equipment device and the third message is an authentication response message indicating the first user equipment device was successfully authenticated.

In some method embodiments, prior to receiving said first message by said first network edge device (e.g., first Access Point) the following steps are performed: (i) receiving wirelessly by the first network edge device (e.g., first Access Point) a first association request message from the first user equipment device; and (ii) transmitting, by the first network edge device (e.g., first Access Point), a first Association Identifier (AID) to the first user equipment device in response to the first association request message from the first user equipment device. In some embodiments, the first server is an orchestration server that dynamically assigned said stacked Virtual Local Area Network (VLAN) information including the first Service-VLAN Identifier (S-VLAN ID) and the first Customer-VLAN Identifier (C-VLAN ID) assigned to the first user equipment device.

In some embodiments, the first server is a first Remote Authentication Dial-In User Service (RADIUS) server: the second message is a Remote Authentication Dial-In User Service (RADIUS) protocol Access-Request message; and the third message is a Remote Authentication Dial-In User Service (RADIUS) protocol Access-Accept message, said dynamically assigned stacked VLAN information being included in RADIUS protocol vendor specific attributes of said RADIUS Access-Accept message.

In various embodiments, the first server is a first Remote Authentication Dial-In User Service (RADIUS) server: the second message is a Remote Authentication Dial-In User Service (RADIUS) protocol Access-Request message; and the third message is a Remote Authentication Dial-In User Service (RADIUS) protocol Access-Accept message, said dynamically assigned stacked VLAN information being included in RADIUS protocol multi-occurrence tunnel attributes in which the first S-VLAN ID is included in a first Tunnel-Private-Group-ID attribute and the first C-VLAN ID is included in a second Tunnel-Private-Group-ID attribute.

In various method embodiments, the method further includes the following steps: extracting, by the first network edge device (e.g., first Access Point), the first S-VLAN ID from the first Tunnel-Private-Group-ID attribute of the third message: extracting, by the first network edge device (e.g., first Access Point), the first C-VLAN ID from the second Tunnel-Private-Group-ID attribute of the third message; and forming, by the first network edge device (e.g., first Access Point), the dynamically assigned stacked VLAN information for the first user equipment device from the extracted first S-VLAN ID and the extracted first C-VLAN ID.

In some method embodiments, subsequent to the step of receiving said third message including said stacked VLAN information for the first user equipment device, the method includes the steps of: receiving wirelessly by the first network edge device (e.g., first Access Point) from the first user equipment device a fourth message (e.g., first internet access message) including one or more data packets for transmission to an Internet destination (e.g., a device connected to the Internet); generating, by the first network edge device (e.g., first Access Point), a fifth message based on said fourth message, said fifth message including: said one or more data packets included in said fourth message, said stacked VLAN information for the first user equipment device, and a Media Access Control (MAC) address for the first user equipment device; and transmitting, by the first network edge device (e.g., first Access Point), via a wired network path the fifth message to a gateway for transmission to the Internet destination, said gateway being connected to the Internet.

In some embodiments, the method further includes the steps of: establishing, by the first network edge device, a Soft-GRE tunnel between the first network edge device and the gateway for transmitting the fifth message to the gateway; and utilizing, by the first network edge device, the established Soft-GRE tunnel to transmit the fifth message to the gateway.

In various embodiments, the method includes the additional steps of: (i) determining, by the first server (e.g., first RADIUS server), location based access and bandwidth policies for the first user equipment device based on the location information for the first network edge device (e.g., first Access Point) included in the second message: (ii) communicating, by the first server (e.g., first RADIUS server), the determined location based access and bandwidth policies for the first user equipment device to the gateway; and (iii) applying, by the gateway, the determined location based access and bandwidth policies to the fifth message.

In some embodiments, the method further includes the steps of: receiving wirelessly, by a second Access Point of the wireless network, a fourth message including authentication information from the first user equipment device, said second Access Point being located in a visitor service area for the first user equipment device: generating, by the second Access Point, a fifth message based on said fourth message, said fifth message including authentication information received in the fourth message and location information for the second Access Point: transmitting, by the second Access Point, the fifth message to the first RADIUS server, said first RADIUS server being an orchestration server or an Authentication, Authorization, and Accounting (AAA) server; and receiving in response to said fifth message, by the second Access Point, a sixth message including the previously dynamically assigned stacked Virtual Local Area Network (VLAN) information including the first Service-VLAN Identifier (S-VLAN ID) and the first Customer-VLAN Identifier (C-VLAN ID) previously assigned to the first user equipment device.

In some embodiments, the method further includes the steps of: determining, by the first RADIUS server, updated location based access and bandwidth policies for the first user equipment device based on the location information for the second Access Point included in the fifth message: communicating, by the first RADIUS server), the updated location based access and bandwidth policies for the first user equipment device to the gateway; and applying, by the gateway, the updated location based access and bandwidth policies to subsequent messages received from the first user equipment device.

In some embodiments, prior to receiving the third message by the first network edge device, the method includes performing by the first server the following operations: performing a successful authentication check (e.g., L2 authentication check such as P-PSK authentication check or an 802.1X authentication check) with respect to the first user equipment device in response to the second message: dynamically assigning said dynamically stacked VLAN information to the first user equipment device after completion of the successful authentication check with respect to the first user equipment device: determining one or more policies to be applied to communications for the first user equipment device (e.g., to or from the first user equipment device) based on the first network edge device location information included in the second message and authentication information (e.g., subscriber identity, first user equipment identification information and/or credentials) provided by the first user equipment device: generating a first user equipment device context or record, said first user equipment device context or record including the first user equipment device identification information, the dynamically assigned stacked VLAN information for the first user equipment device, and the determined policies to be applied to communications for the first user equipment device: generating the third message; and transmitting the third message to the first network edge device.

In various embodiments, the policies to be applied to communications for the first user equipment device include one or more of the following: (i) location based access policies to be applied to communications from the first user equipment device based on the first network edge device location information included in the second message and authentication information (e.g., subscriber identity and/or credentials) provided by the first user equipment device (e.g., different access policies for home service area vs visitor service area(s) can have different access policies to be applied to the first user equipment device for the location of each network edge device in the network/system): (ii) location based bandwidth policies to be applied to communications for the first user equipment device based on the first network edge device location information included in the second message and authentication information (e.g., subscriber identity and/or credentials) provided by the first user equipment device (e.g., different bandwidth policies for home service area vs visitor service area(s) can have different bandwidth policies to be applied to the first user equipment device for the location of each network edge device in the network/system); and (iii) location based quality of service (QOS) polices (priority or PCP codes in stacked VLAN information (stacked VLAN header) can be different based on first network edge device location information.

In some embodiments, the method further includes the steps of: generating, by the first server, policy rules to be applied to communications for the first user equipment device (e.g., upstream communications from the first user equipment device or downstream communications to the first user equipment device), said policy rules being based on the determined one or more policies to be applied to communications for the first user equipment device; and communicating the generated policy rules to be applied to communications for the first user equipment device to one or more additional network equipment devices for implementation along with the dynamically assigned stacked VLAN information for the first user equipment device.

In some embodiments. the one or more additional network equipment devices include one or more of the following: a centralized gateway connected to the Internet that controls the data plane of the network (Ethernet LAN) to which the first network edge device is connected: an AAA server that provides Authentication, Authorization and Accounting services; and a WLAN controller that manages Access Points in the first wireless network.

In some embodiments, the method further includes the step of: implementing, by the WLAN controller, fast roaming procedures (e.g., 802.11r fast roaming procedures) in response to receiving an authentication (or an access) request from the first user equipment device via a second network edge device after receiving the generated policy rules to be applied to communications for the first user equipment device along with the dynamically assigned stacked VLAN information for the first user equipment device from the first server, said implementing fast roaming procedures in response to an authentication request received from first user equipment device including generating a authentication success message to send to the second network edge device (e.g., second Access Point), said generated authentication success message including the stacked VLAN information received from the first server.

In some embodiments, the method further includes the step of: receiving, by the centralized gateway from the first server, the generated policy rules to be applied to communications for the first user equipment device along with the dynamically assigned stacking VLAN information for the first user equipment device; receiving, by the centralized gateway, communications (e.g., messages with Ethernet frames including the stacked VLAN information (S-VLAN ID and C-VLAN ID) included in the Ethernet frame VLAN headers) from the first user equipment device, said communications including the dynamically assigned stacked VLAN information for the first user equipment device: determining, by the centralized gateway, what policy rules (e.g., access and/or bandwidth policies) to apply to communications received from the first user equipment device based on VLAN stacking information extracted from the communications and the VLAN stacking and policy rules received from the first server for the first user equipment device: applying the determined policy rules to the communications received from the first user equipment device (e.g., limiting bandwidth and/or restricting access such as for example to devices on the network (e.g., printers, computers, media servers), the Internet, and/or personal area networks).

In some embodiments, the method includes the additional steps of: receiving, by the AAA server from the first server, the generated policy rules to be applied to communications for the first user equipment device along with the dynamically assigned stacked VLAN information for the first user equipment device; receiving, by the AAA server, an Access Request on behalf of the first user equipment device including the stacked VLAN information for the first user equipment device from a centralized gateway: determining, by the AAA server, what policy rules (e.g., access and/or bandwidth policies) to apply to communications received from the first user equipment device based on stacked VLAN information extracted from the Access Request received on behalf of the first user equipment from the centralized gateway and the stacked VLAN information and policy rules received from the first server for the first user equipment device: generating, by the AAA server, a response message to the Access Request received from the centralized gateway including the determined policy rules to be applied: transmitting the response message to the centralized gateway; applying received policy rules by the centralized gateway to communications received from or for the first user equipment device; and wherein the first server is an orchestration server.

In some embodiments, the method further includes the steps of: receiving, by a WLAN controller of the wireless network, from the first server information for implementing fast roaming procedures for the first user equipment device, said information for implementing fast roaming procedures for the first user equipment device including the dynamically assigned stacked VLAN information for the first user equipment device; and implementing, by the WLAN controller, fast roaming procedures (e.g., 802.11r fast roaming procedures) in response to receiving an authentication request from the first user equipment device via a second network edge device (e.g., second Access Point) after, said implementing fast roaming procedures in response to an authentication request received from first user equipment device including generating a authentication success message to send to the second network edge device, said generated authentication success message including the stacked VLAN information for the first user equipment device received from the first server.

Another method embodiment in accordance with the present invention includes the steps of: receiving wirelessly, by a first Access Point of a wireless network, a first message including first authentication information from a first user equipment device: generating, by the first Access Point, a second message based on said first message, said second message including the first authentication information received in the first message and location information for the first Access Point; transmitting, by the first Access Point, the second message to a first Remote Authentication Dial-In User Service (RADIUS) server, and receiving in response to said second message, by the first Access Point, a third message including dynamically assigned stacked Virtual Local Area Network (VLAN) information including a first Service-VLAN Identifier (S-VLAN ID) and a first Customer-VLAN Identifier (C-VLAN ID) assigned to the first user equipment device.

Another exemplary method embodiment includes the steps of: receiving, by a first Remote Authentication Dial-In User Service (RADIUS) server, over a wired Ethernet connection a first authentication request message (e.g., L2 authentication request message such as an P-PSK authentication request or 802.1X authentication request message in the form of an Access Request message) from a first Access Point, said first authentication request message including first user equipment device identification information (e.g., MAC address for a first user equipment device) and location information for the first Access Point: performing, by the first RADIUS server, a successful authentication check (e.g., L2 authentication check such as P-PSK authentication check or an 802.1X EAP authentication check) with respect to the first user equipment device in response to the first authentication message: dynamically assigning, by the first RADIUS server, stacked VLAN information to the first user equipment device after completion of the successful authentication check with respect to the first user equipment device, said stacked VLAN information including a S-VLAN ID and a C-VLAN ID: determining, by the first RADIUS server, one or more policies to be applied to communications for (e.g., to or from) the first user equipment based on the first Access Point location information included in the first authentication request message and authentication information (e.g., subscriber identity, first user equipment identification information and/or credentials) provided by the first user equipment device: generating, by the first RADIUS server, a first user equipment device context or record, said first user equipment context record including first user equipment identification information, the dynamically assigned stacked VLAN information for the first user equipment device, determined policies to be applied to communications from the first user equipment device: generating an authentication response message (e.g., an Access Accept message) indicating the authentication was successful, said authentication response message including the dynamically assigned stacked VLAN information for the first user equipment device; and transmitting the generated authentication response message to the first Access Point in response to the first authentication request message.

The present invention is also applicable to apparatus and system embodiments wherein one or more devices implement the steps of the method embodiments. In some apparatus embodiments each of the servers, client devices, Access Points, network edge devices, user equipment devices, mobile terminals, WLAN controllers, Gateways, AAA servers, Remote Authentication Dial-In User Service servers, orchestrators, orchestration servers, switches and each of the other apparatus/devices/nodes of the system include one or more processors and/or hardware circuitry, input/output interfaces including receivers and transmitters, and a memory. The memory including instructions when executed by one or more of the processors control the apparatus/device/node of the system to operate to perform the steps and/or functions of various method embodiments of the invention.

The present invention as discussed above is also applicable to and includes apparatus and systems such as for example, apparatus and systems that implement the steps and/or functions of the method embodiments. For example, a communication system in accordance with one embodiment of the present invention includes: a first network equipment device (e.g., an Access Point or Router), said first network equipment device belong to a wireless network, said first network edge device including: a memory; and a first processor that controls the first network edge device to perform the following operations: receiving wirelessly, by a first network edge device (e.g., a first Access Point or a first Wireless Router) of a wireless network, a first authentication request message (e.g., L2 authentication request message such as a P-PSK authentication request or 802.1X authentication request message) including first user equipment device identification information (e.g., MAC address for the first user equipment device) from a first user equipment device: generating, by the first network edge device, a second message (e.g., an Access-Request) based on said first authentication request message, said second message including the first user equipment device identification information received in the first authentication request message and location information for the first network edge device: transmitting, by the first network edge device, the second message to a first server (e.g., a first Remote Authentication Dial-In User Service (RADIUS) server), and receiving in response to said second message, by the first network edge device, a third message (e.g., an Access Accept Response), said third message including dynamically assigned stacked Virtual Local Area Network (VLAN) information including a first Service-VLAN Identifier (S-VLAN ID) and a first Customer-VLAN Identifier (C-VLAN ID) dynamically assigned to the first user equipment device.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 illustrates the combination of FIGS. 10A, 10B, 10C, 10D, and 10E.

FIG. 10E illustrates the steps of the fifth part of an exemplary method in accordance with an embodiment of the present invention.

FIG. 13 illustrates the combination of FIG. 13A and FIG. 13B.

FIG. 13B is the second part of a signaling diagram which illustrates the steps and signaling of an exemplary method in accordance with an embodiment of the present invention.

FIG. 14 illustrates the combination of FIG. 14A and FIG. 14B.

FIG. 14B is the second part of a signaling diagram which illustrates the steps and signaling of an exemplary method in accordance with an embodiment of the present invention.

FIG. 17 illustrates the combination of FIG. 17A and FIG. 17B.

FIG. 17B is the second part of a signaling diagram which illustrates the steps and signaling of an exemplary method in accordance with an embodiment of the present invention.

DETAILED DESCRIPTION

The present invention relates to new and/or improved methods and apparatus for seamless roaming in wireless networks. For example, the present invention is particularly useful for providing seamless roaming in high density managed Wi-Fi and private area networks.

Various embodiments of the present inventions provide new and/or improved methods and apparatus for incorporating location based dynamic VLAN stacking during client devices layer 2 authentication. In various embodiments, network edge elements (e.g., access points, wireless routers, and/or switches) of a wireless network (e.g., a Wi-Fi network) are used to implement the VLAN stack which is dynamically assigned to each client device (e.g., user equipment device (UE), wireless device, computer, laptop, smartphone, mobile device, printer, Internet Protocol (IP) TV, etc.) during authentication and then tunnel the client traffic to a centralized gateway. The centralized gateway performs the traffic processing and per user bandwidth policy based on rules provided by an orchestrator and/or authentication server (e.g., an Authentication, Authorization, and Accounting (AAA) server). An entire site with more than four thousand concurrent clients or client devices can then be operated as one network providing seamless roaming and private area networking without any VLAN scaling limitations while also overcoming operational issues such as those discussed above in connection with segmenting a high density population network into several discrete networks which require re-authentication when moving between the discrete networks.

Figure 2:
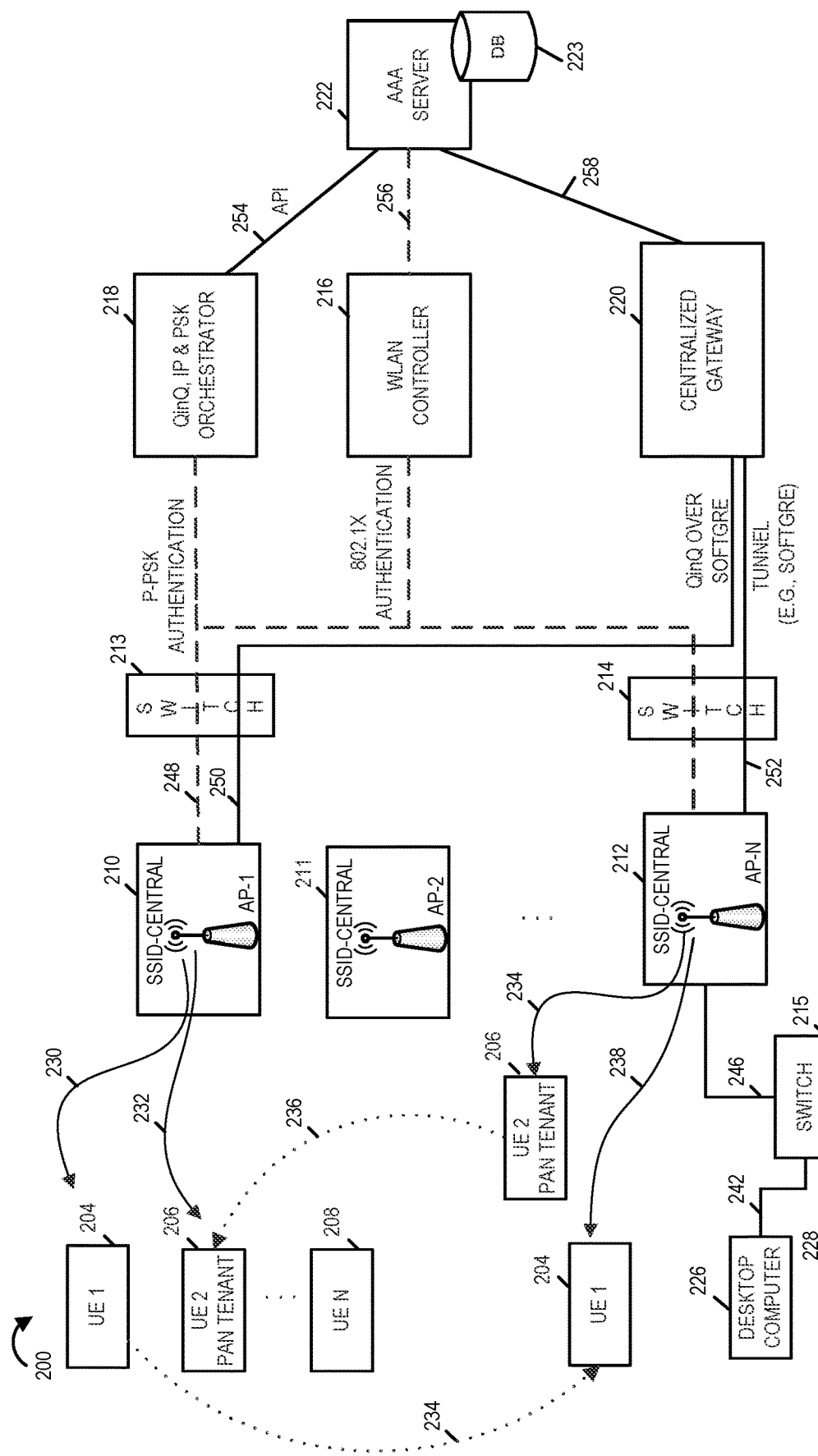
FIG. 2 illustrates an exemplary system in accordance with an embodiment of the present invention.

FIG. 2 illustrates an exemplary communications system 200 in accordance with an embodiment of the present invention. FIG. 2 also illustrates the high level network topology and key network elements of system 200. System 200 includes a plurality of user equipment devices (UE 1 204, UE 2 206, . . . UE N 208), a plurality of Access Points (AP-1 210, AP-2 211 . . . . AP-N 212 (N being positive integer greater than 2)), desktop computer 226, IPTV 228, a plurality of switches (switch 213, switch 214, switch 215), an orchestrator 218, a Wireless Local Area Network (WLAN) controller 216, a centralized gateway 220, a AAA server 222, and a Database 223 coupled via communications links 230, 232, 234, 238, 242, 244, 246, 248, 250, 252, 254, 256, and 258 over which information, data and control signals are exchanged. Communications links 230, 232, 234, and 238 are wireless communications links and communications links 242, 244, 246, 248, 250, 252, 254, 256, and 258 are wired communications links. The user equipment devices are wireless devices including for example, mobile devices, smartphones, laptops, tablets, computers. The desktop computer 2026 and IPTV 2028 are exemplary wired devices connected to switch 2015 which in turn is connected to a hardware port on AP-N 2012. The orchestrator 218 may be, and in some embodiments is, implemented as an orchestration system. The system typically includes and supports serving thousands (greater than >4095) of user equipment devices concurrently.

Each of the Access Points of system 200 provide Wi-Fi based wireless connectivity to the internet. The Access Points bridge the wireless frames (IEEE 802.11) to the wired network and vice-versa. During that bridging process, the Access Point performs operations to provide layer authentication and segmentation. In various embodiments of the present invention, the Access Point's operation and functions are extended to implement dynamic VLAN stacking based on information received from the upstream orchestrator 218 and/or authentication server 222.

The WLAN controller 216 is an optional system element and is mostly used for centralized Radio Resource Management (RRM) based Wi-Fi deployments in which it is used to configure and manage bulk Access Points and for Radio Frequency optimization. The WLAN controller 216 can also act or perform as a Remote Authentication Dial-In User Service (RADIUS) proxy for clients utilizing 802.1X authentication. RADIUS protocol is a network protocol that is typically used to authenticate and authorize users attempting to connect to network devices such as access points, routers, modem servers, software, and wireless applications. IEEE 802.1X is an IEEE Standard for port-based Network Access Control (PNAC). The IEEE 802.1X standard is part of the IEEE 802.1 group of networking protocols. 802.1X provides an authentication mechanism for devices that want to attach to a LAN or WLAN. 802.1X network authentication protocol achieves this by opening ports for network access when an organization authenticates a user's identity and authorizes them for access to the network. In the case of WLAN the port is a virtual port. The user's identity is determined based on their credentials or certificate, which is confirmed by a RADIUS server. IEEE Request for Comment (RFC) 3580 dated September 2003 and entitled, "802.1X Remote Authentication Dial In User Service (RADIUS) Usage Guidelines" is a document that provides suggestions on Remote Authentication Dial In User Service (RADIUS) usage by IEEE 802.1X Authenticators and is hereby incorporated by reference in its entirety.

The orchestrator 218 which may be implemented as an orchestration system. The orchestrator 218 provides the dynamic VLAN stacking details and optionally policies (e.g., bandwidth and/or access control policies) during wireless (and wired) client layer 2 authentication. The orchestrator 218 provides the provisioning interface to configure service zone-based traffic shaping policies and access control rules on a per user basis. The orchestrator 218 in this exemplary system is a QinQ, IP & PSK orchestrator performing QinQ VLAN stacking services (e.g., dynamic assignment of VLAN tags (e.g., S-VLAN ID AND C-VLAN ID) and authentication services (Internet Protocol (IP) & Private Shared Key (PSK authentication services). In the exemplary system 200, the orchestrator 218 receives Private or Per-User-Pre-shared Key (P-PSK) Authentication requests over communications link 248. In various embodiments, as discussed in detail below the authentication requests may, and typically do, include location information identifying the location of the Access Point from which the authentication request was received.

The centralized gateway 220 builds and/or generates the users context per dynamic VLAN stacking. Uniquely identifies the end user using the VLAN combo values (Service-VLAN (S-VLAN) and Customer-VLAN (C-VLAN)) and enforces the bandwidth and/or access control policies received from AAA server 222 and/or the orchestrator 218, upon first data packet detection per user (e.g., from the authenticated user equipment device assigned the VLAN combo values). These policies include location-based peer to peer communication for private area networking. As shown in FIG. 2, the centralized gateway 220 receives data in format of QinQ over SoftGRE on communications link 250 from AP-1 210. The centralized gateway 220 receives data using stacked VLAN tunnel established between AP-N 212 and the Centralized Gateway 220 via communications link 252.

The dotted line 234 illustrates the movement of UE 1 204 from a first location where it is attached to AP-1 210 to a second location where it is attached to AP-N 212.

The dotted line 236 illustrates the movement of UE 2 206 which is a Personal Area Network (PAN) tenant from a location where it is attached to AP-N 212 which is part of the PAN network of UE 2 206 to a different location where it is attached to AP-1 210 which is not part of the PAN network of UE 2 206.

The PAN network including the AP-N 212, desktop computer 226 IPTV 228 and switch 215. The desktop computer and 226, and IPTV 228 being user equipment devices which are connected via a switch and wires to a physical port on AP-N 246.

Various embodiments of the present invention address the following use cases: (1) per user L2 segmentation, (2) seamless mobility with L2 segmentation maintained and location based traffic policies, and (3) tenant users Private Area Network with differentiated traffic policies.

Dynamic VLAN stacking is not incorporated in either the RADIUS protocol or the IEEE 802.1X. Both of these protocols are limited to 4095 VLAN ID values. For example, RFC 3850; IEEE 802.1 Remote Authentication Dial In User Service (RADIUS) Usage Guidelines paragraph 3.31 requires compliance with the IEEE 802.1Q standard thereby limiting the dynamic VLAN ID values available for assignment to VLAN ID values between 1 and 4094.

The RADIUS protocol can be used for Extensible Authentication Protocol (EAP)-based authentication as well as non-EAP-based authentication. In the various embodiments of the present invention, the VLAN stacking details (e.g., S-VLAN and C-VLAN information) are provided in the RADIUS Access-Accept message using vendor-specific attributes for both EAP-based authentication and non-EAP-based authentication depending on the use case. The first use case relates to RADIUS based Non-EAP authentication such as for example Wireless Protected Access-2/Pre-Shared-Key/personal (WPA2-PSK/personal) authentication and can be extended for use with Media Access Control (MAC) authentication in which devices are authenticated based on their physical MAC addresses and Wireless Internet Service Provider roaming (WISPr) authentication which allows a smart client to authenticate on a network when they roam between wireless Internet service providers. The second use case relates to RADIUS based EAP authentication such as for example WPA2-PSK/Enterprise, WPA-3-Simultaneous Authentication of Equals/Enterprise (WAP3-SAE/Enterprise) authentication. Enterprise authentication being organizations. With respect to both the first and second use cases, a RADIUS Access_Accept message will include VLAN stacking information (S-VLAN, C-VLAN) for successfully authenticated users.

Figure 1:
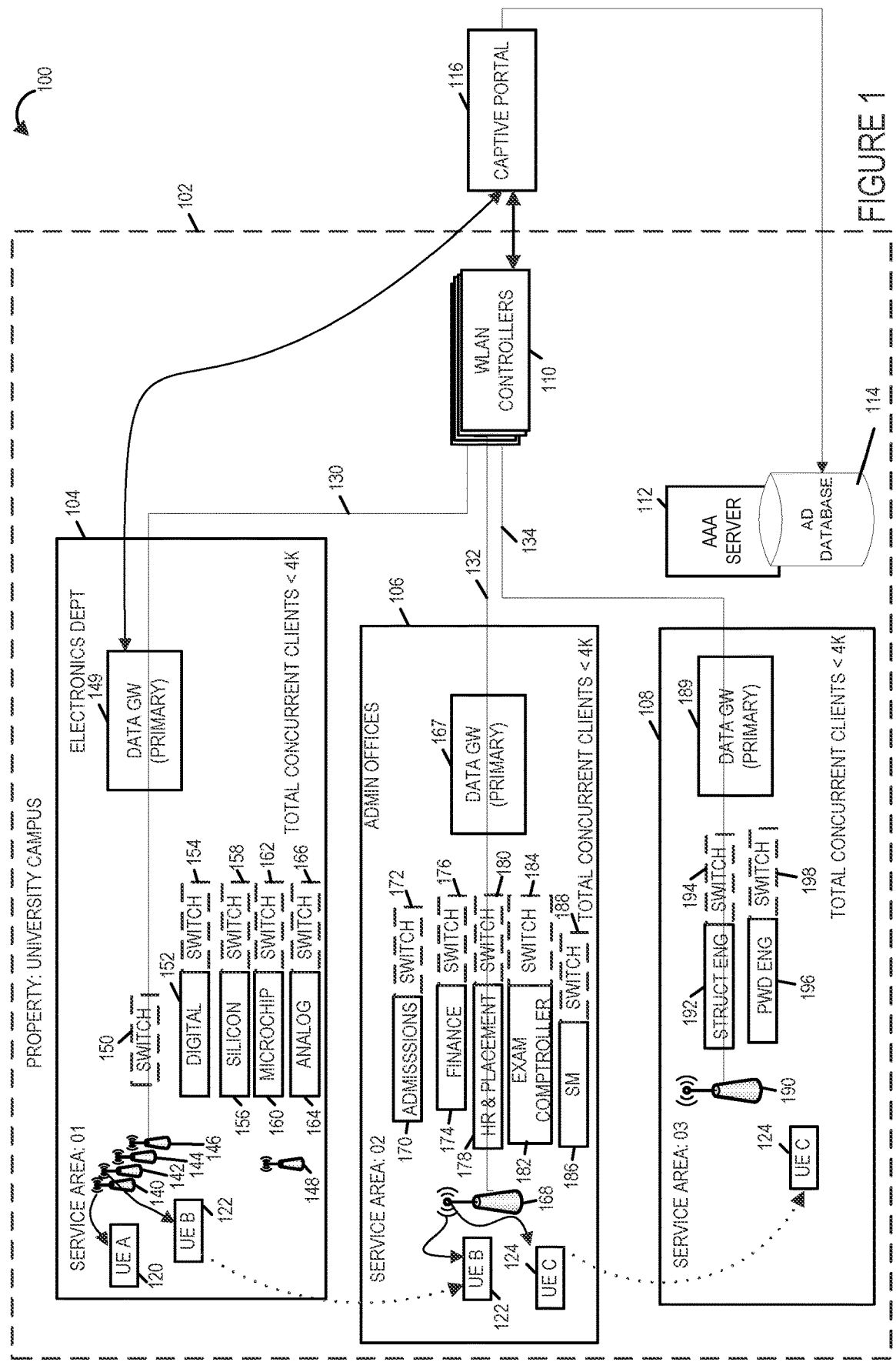
FIG. 1 illustrates a system with separate WLANs.
Figure 3:
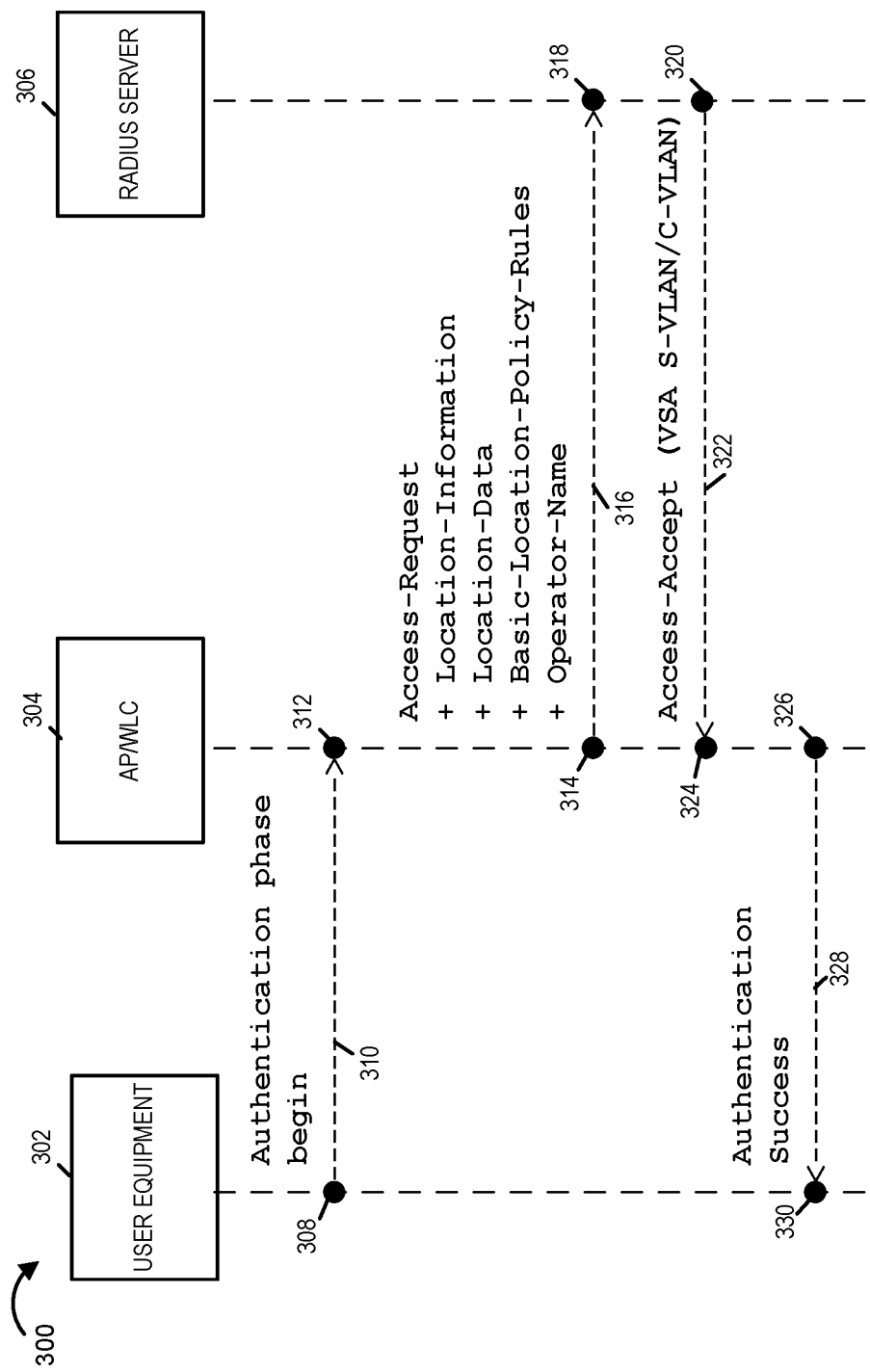
FIG. 3 illustrates an exemplary system, method and signaling diagram which illustrates the steps and signaling of an exemplary method in accordance with an embodiment of the present invention.

FIG. 3 shows a signaling diagram which illustrates the steps and signaling of an exemplary method 300 in accordance with an embodiment of the present invention. The signaling diagram 300 is based on FIG. 1 diagram "FIG. 1: Location Delivery Based on Out-of-Band Agreements" of IEEE Request For Comment (RFC) 5580 entitled "Carrying Location Objects in RADIUS and Diameter" dated August 2009 which is hereby incorporated by reference in its entirety. The method 300 illustrates an exemplary P-PSK authentication request including AP location information and a P-PSK authentication response including the dynamic VLAN stacked assignment fields.

The method 300 starts in step 308 where an authentication phase of operation begins with user equipment device 302 generating and transmitting a request 310 (e.g., a request with P-PSK information for the UE) to Access Point/Wireless LAN Controller 304. For example, a network authentication/security mechanism PSK authentication request being sent following the UE 302 association with the Access Point/WLAN 304. The Access Point/WLAN Controller 304 may be, and, in some embodiments is, comprised of separate devices in which the Access Point sends frames/requests/messages to the WLAN controller which then transmits them to the Radius Server. The request 310 includes identifying information. e.g., the MAC address and/or P-PSK information for the user equipment device 302.

Operation proceeds from step 308 to step 312. In step 312, the Access Point/WLAN Controller 304 receives and processes the request 310. Operation proceeds from step 312 to step 314.

Figure 12:
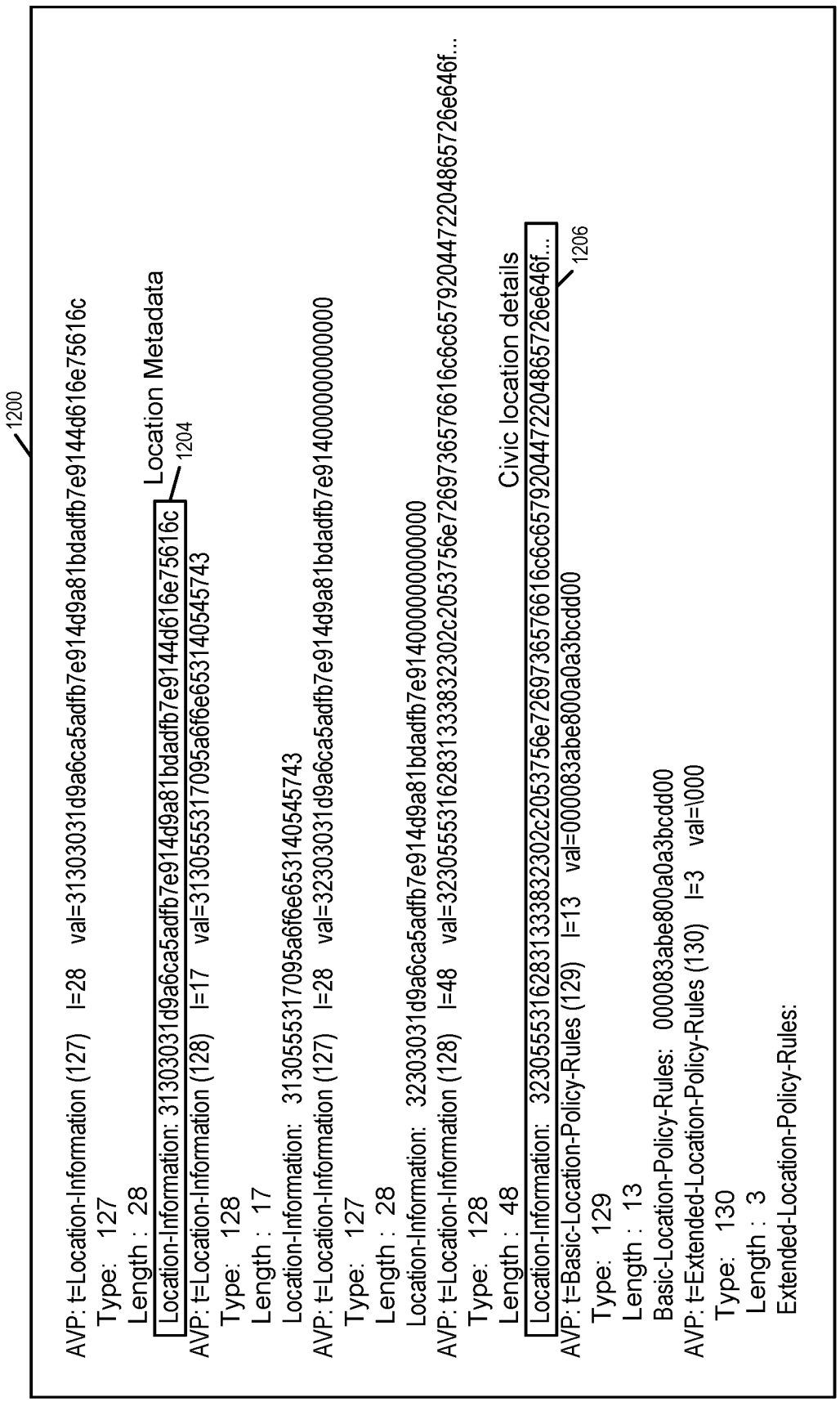
FIG. 12 illustrates the pertinent fields for conveying location based information in an authentication Access Request such as an P-PSK authentication access request message or an 802.1X authentication access request message.

In step 314 the AP/WLAN Controller generates an Access-Request message 316 and transmits the generated Access-Request message 316 to Radius Server 306. The Access-Request message includes: Location-Information, Location-Data, Basic-Location-Policy-Rules and Operator-Name. The Location-Information includes information identifying the location of the Access Point which received the authentication request from the user equipment device 302. The Access-Request message also includes the user equipment device identification information, e.g., MAC address of the user equipment device 302. Operation proceeds from step 314 to step 318. Diagram 1200 of FIG. 12 illustrates the pertinent fields for conveying location based information in a P-PSK authorization request pursuant to IEEE Request For Comment (RFC) 5580 entitled "Carrying Location Objects in RADIUS and Diameter" dated August 2009. The location-information field 1204 and location-data field 1206 are illustrated in diagram 1200. The location-information field 1204 provides location metadata for the Access Point. The location-data details provides civic location details on location of the AP and/or the user equipment device from which the authorization request was received.

In step 318, the Radius Server 306 receives and processes the Access-Request message from the Access Point/WLAN controller 304. The Radius Server 306 is an authentication server and authenticates the user equipment device. Operation proceeds from step 318 to step 320.

Figure 11:
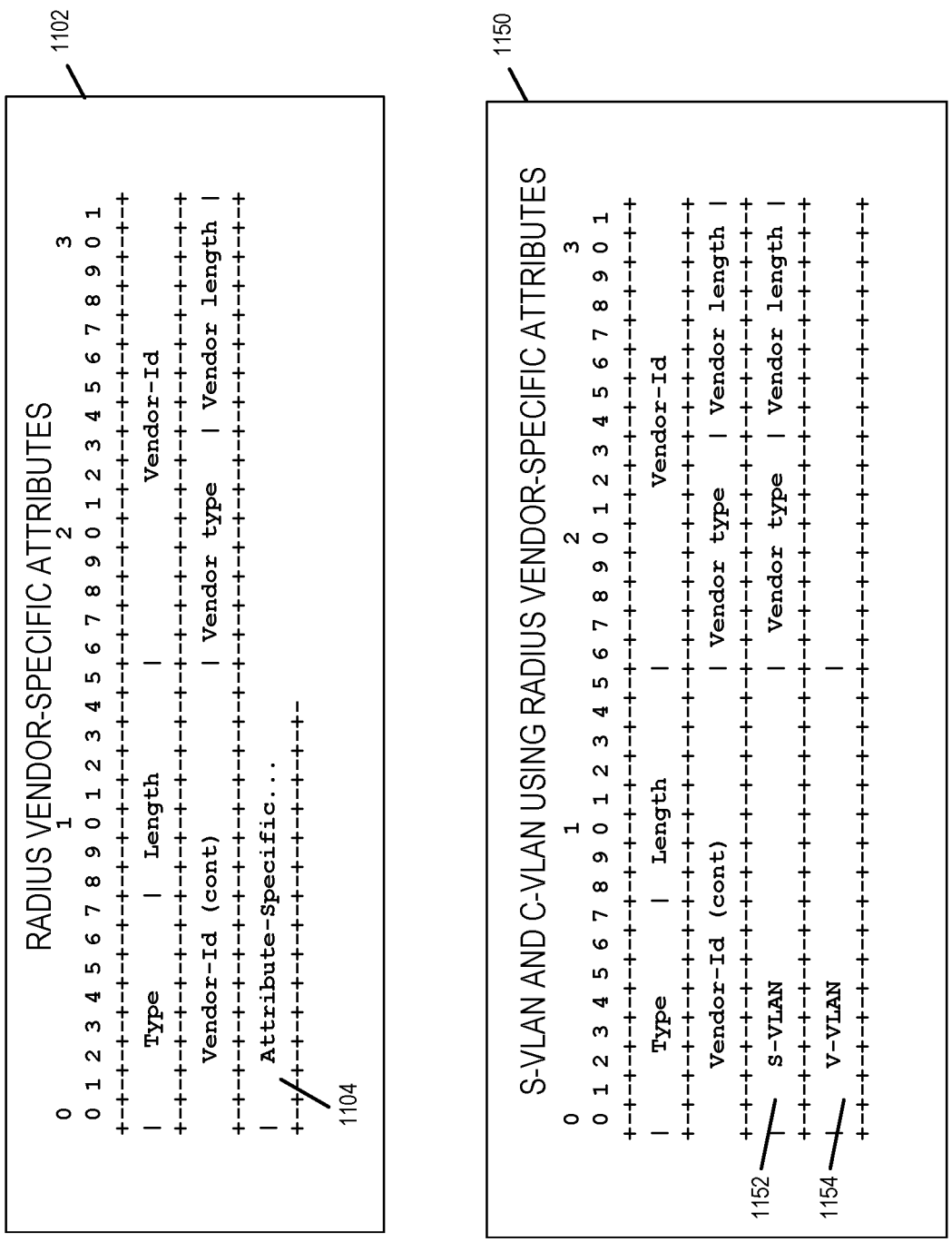
FIG. 11 illustrates RADIUS vendor specific attributes in a RADIUS Access-Accept Message and the placement of VLAN stacking information (e.g., S-VLAN information and C-VLAN information) in the vendor specific attributes of a RADIUS Access-Accept message.

In step 320, the Radius Server 306 upon successfully authenticating the user equipment device 302 dynamically assigns a S-VLAN ID and a C-VLAN ID to the user equipment device 302, generates a context for the user equipment device 302 which includes the S-VLAN ID/C-VLAN ID assigned to the user equipment device 302, and generates and transmits an Access-Accept message 322 to the Access Point/WLAN Controller 304. The Access-Accept message includes dynamically assigned stacked VLAN IDs which in this example are the S-VLAN ID and the C-VLAN ID assigned to the user equipment device 302. This stacked VLAN information is included in the vendor specific attributes (VSA) of the Access-Accept message 322. FIG. 11 includes diagrams 1102 and 1150. Diagram 1102 illustrates fields for RADIUS vendor-specific attributes in a RADIUS Access-Accept message. In particular Attribute-Specific field 1104 is shown. Diagram 1150 of FIG. 11 illustrates the format of an exemplary Access-Accept message in which the vendor-specific attributes fields are utilized for transmitting stacked VLAN information which are the S-VLAN ID 1152 and C-VLAN ID 1154. In some embodiments, the information included in the context generated for the user equipment device 302 is based on information in the Access-Request message 316, e.g., the user equipment device 302 identification information and/or the location-information. In some embodiments, the context generated for the user equipment device 302 includes the user equipment device 302 identification information such as for example, the MAC address of the user equipment device 302. Operation proceeds from strep 320 to step 324.

In step 324, the Access Point/WLAN Controller 304 receives and processes the Access-Accept message with the S-VLAN and C-VLAN IDs included in the vendor specific attribute fields of the message. The Access Point/WLAN Controller 304 extracts the S-VLAN ID and C-VLAN ID from the vendor specific attribute fields of the message and associates them with the user equipment device 302. Subsequent Ethernet frames generated by the Access Point/ WLAN Controller 304 for information/data from the user equipment device 302 will include the stacked VLAN information (S-VLAN ID, and C-VLAN ID) dynamically assigned by the Radius Server 306 and extracted from the Access-Accept message.

In step 326, the Access Point/WLAN Controller 304 generates and transmits Authentication Success message 328 to user equipment device 302. Operation proceeds from step 326 to step 330.

In step 330, the user equipment device 302 receives and processes the authentication success message 328.

In another embodiment of the present invention instead of using RADIUS Vendor-Specific Attributes to communicate the dynamically assigned VLAN stacking tags (e.g., S-VLAN/C-VLAN information), a multi-occurrence of Tunnel attributes in a Access Accept message (e.g., RADIUS Access Accept message) is used to communicate the dynamically assigned VLAN stacking tags as described in detail below in connection with FIG. 21.

The IEEE 802.11 has authentication and association states that a user equipment device tracks. State 1—initial start state when the user equipment device is unauthenticated and unassociated. State 2—authenticated and unassociated. State 3—authenticated an associated pending security mechanisms. State 4—authenticated and associated-PSK or 802.1X security mechanisms completed. In various exemplary embodiments, the S-VLAN and C-VLAN dynamic assignments are made for user equipment devices by a server, e.g., an orchestration server or AAA server, in response to an authentication request or an ACCESS request received from an AP as part of the security mechanisms performed after a user equipment device has been associated. The S-VLAN and C-VLAN dynamic assignment being made in response to a successful authentication and being included in the authentication response message and/or access accept message. The Access Point after receiving the dynamic S-VLAN and C-VLAN information (including S-VLAN Id and C-VLAN Id) to be used for user equipment device performs dynamic VLAN stacking and creates tunnels using the dynamically assigned S-VLAN and C-VLAN for frames/messages communicated from the user equipment device via the AP to network devices and from network devices to the user equipment device.

Figure 13A:
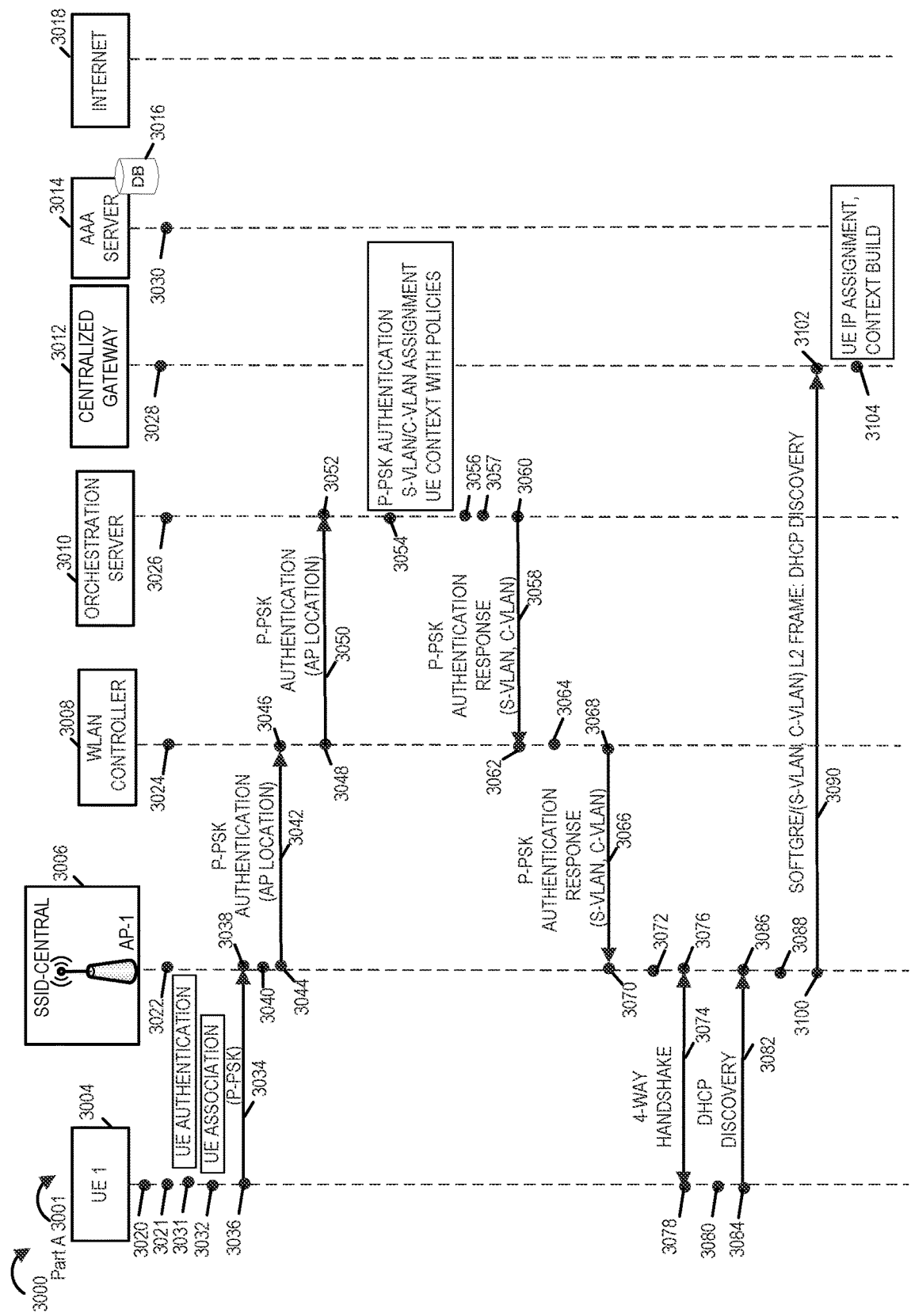
FIG. 13A is the first part of a signaling diagram which illustrates the steps and signaling of an exemplary method in accordance with an embodiment of the present invention.

FIG. 13 comprises FIG. 13A and FIG. 13B. FIG. 13A is the first part (Part A 3001) of a signaling diagram which illustrates the steps and signaling of an exemplary method 3000 in accordance with an embodiment of the present invention. FIG. 13B is the second part (Part B 3002) of a signaling diagram which illustrates the steps and signaling of an exemplary method 3000 in accordance with an embodiment of the present invention. The method 3000 illustrates the steps for a user equipment device (e.g., user equipment device 3004 to associate to service set identifier (SSID) (e.g., SSID-CENTRAL) and receive network access) in a home zone of a wireless network (e.g., Wi-Fi network). While it will be readily understood that additional steps and signaling are performed in connection with communicating information, messages, and packets between devices, the method 3000 focuses on and discusses the steps and signaling for understanding the invention. Elements or steps with the same reference numbers used in different figures are the same or similar and those elements or steps will not be described in detail again. The signaling diagram/method 3000 is implemented by a system coupled to the Internet 3018. The system including a first UE 1 3004, an Access Point 3006, a WLAN controller 3008, an Orchestration Server 3010, a centralized gateway 3012, an AAA server 3014, and a database 3016 with the elements of the system coupled via communications links that allow for the exchange of information, signals and data between the elements. The UE 1 3004 is a wireless device, e.g., a mobile device such as by way of example a mobile phone, smart phone, laptop, tablet. In various embodiments, the UE 1 3004 is implemented in accordance with UE 500 shown in FIG. 5. The Access Point 3006 may be implemented in accordance with the Access Point shown in FIG. 4. The WLAN controller 3008 may be, and in some embodiments is implemented in accordance with network device 600 shown in FIG. 6. The orchestration server 3010 may be, and in some embodiments is implemented in accordance with network device 600 shown in FIG. 6. The centralized gateway 3012 may be, and in some embodiments is, implemented in accordance with network equipment device 600 shown in FIG. 6. The AAA server 3014 is an Authentication, Authorization and Accounting server which may be implemented in accordance with the network equipment device 600 shown in FIG. 6. The AAA server 3014 is coupled to database 3016 which includes user authentication credentials, policies and accounting information. In some embodiments, the database 3016 is incorporated into and is part of the AAA server 3014.

The signaling diagram/method 3000 may be, and in some embodiments is, implemented using exemplary system 200 of FIG. 2. In such embodiments, the UE 1 3004 is UE 1 204 of system 200 before it moves along path 234. The Access Point 1 (AP-1) 3006 is Access Point 1 210 of system 200. The WLAN controller 3008 is WLAN controller 216 of system 200. The orchestration server 3010 is orchestrator 218 of system 200. The centralized gateway 3012 is centralized gateway 220 of system 200. The AAA server 3014 is AAA server 222 of system 200. The database 3016 is database 223 of system 200. However, it should be understood that the method 3000 is not limited to the exemplary system 200 and may be, and is used, on other systems and system configurations. The signaling diagram/method 3000 illustrates the signaling and steps for using VLAN stacking in a high density system to provide wireless services for a user equipment device. The same steps can be used for other user equipment devices. The implementation of VLAN stacking allows for system scaling of user equipment devices which are supported above 4095 user equipment devices.

The signaling diagram and method 3000 illustrate an exemplary call flow for UE 1 3004 association to SSID in home zone using VLAN stacking in accordance with an embodiment of the present invention. As described above in connection with the exemplary system 200, the orchestration server 3010 also referred to herein as an orchestrator 3010 is pre-provisioned with Access Point location inventory for the entire site being served by the site being served by the wireless network. In various embodiments, the Orchestration server 3010 includes memory in which a data structure, e.g., a table or linked list, includes a mapping of the location of each AP in the system and its location within the network site, e.g., campus. In this example, the site is deployed with secured WLAN services (Per user Pre-Shared Key (PSK) client authentication or 802.1X authentication. 802.1X authentication is a network authentication protocol that opens ports (e.g., physical or virtual ports) for network access when an organization authenticates a user's identity and authorizes them for access to the network. The user's identity is determined based on their credentials or certificate, which is confirmed by the RADIUS server. In this example the Orchestration Server 3010 authenticates user devices. The AP location mapping information also includes the details about end users home service area. Home Service Area (HSA) is the area where an end user device is able to associate with the home wireless network and is reachable to the private area network.

The AP-1 3006 is configured with site wide common WLAN supporting per user PSK or 802.1X.

The user equipment device 1 (UE 1 3004) is a mobile device pre-provisioned with the required credentials to connect to the system SSID (SSID-Central in the example) and use Internet Access.

UE 1 3004 is in the coverage area of AP-1 3006 HSA serving SSID: <Site Wide Common SSID>.

UE 1 3004 performs the conventional 802.11 open system authentication with AP 1 3006.

Once the UE 1 3004 receives a response to its Association request to AP 1 3006 and receives an association ID, then network authentication using Per user PSK (e.g., Private-Pre-Shared Key) followed by 4-way exchange for encryption keys is performed. While the example, illustrates network authentication using P-PSK other authentication protocols such as EAP (Extensible Authentication Protocol) may be, and in some embodiments are utilized.

During this network authentication procedure, the AP 1 3006 inserts the AP location information for AP-1 3006 into an Authentication Request message which may be, and in some embodiments is implemented as an Access Request message which is then sent to an authentication network entity (e.g., the orchestration server 3010 or the AAA server 3014. Upon successful authentication by the network authentication entity (e.g., the orchestration server 3010 or AAA server 3014) assigns VLAN stacking information such as for example outer VLAN ID (also referred to as S-VLAN: Service Provider VLAN) and inner VLAN ID (also referred to as C-VLAN: Customer VLAN). The authentication entity which in this example is the orchestration server 3010 also pre-compiles the polices for the user equipment device based on location information and pre-provisioned details (e.g., access policies based on location in the network). In this example, policies may, and in some embodiments do, enforce restricted access rules and lower bandwidth as the UE 1 3004 is in a visited zone.

When the authentication is successful and has been completed, AP-1 3006 bridges the wireless frames (e.g., IEEE 802.11 frames) to wired network and vice-versa and implements the VLAN stacking. For upstream traffic received from the user equipment device 1 3004, the AP-1 3006 encapsulates the L2 frame with C-VLAN and S-VLAN assigned for user equipment 1 3004. The modified frame is then encapsulated in tunneling protocols such as, for example Soft Generic Routing Encapsulation (Soft-GRE) (Layer 2 Ethernet over GRE).

The centralized gateway 3012 during the Dynamic Host Configuration Protocol (DHCP) discovery procedures builds a user context or record with client MAC (for the UE 1 3004), dynamically assigned S-VLAN and C-VLAN values (e.g., IDs) and assigns an IP address to the UE 1 3004 from the respective IP address assignment pool (e.g., IPv4 or IPv6 assignment pools).

Upon detection of the first packet from the client (UE 1 3006), the centralized gateway 3012 performs an authentication procedure and retrieves the user specific policies such as, for example, location specific access control and bandwidth policies which include the peer-to-peer communication policies rendered by the orchestration server 3010 through the AAA server 3014. The user authentication information and policies being stored in and retrieved from the database 3016. For example, when the retrieved policies indicate the user equipment device is authorized to access the internet, the first packet is sent out over the Internet.

A description of the steps and signaling of method 3000 will now be described. The method begins in step start step 3020 Part A 3001 of method 3000 shown on FIG. 13A. Operation proceeds from start step 3020 to step 3021. In step 3021, UE 1 3004 is pre-provisioned with credentials for connecting to wireless network SSID-Central and obtaining internet access, is initialized and begins operating. In step 3022, Access Point-1 (AP-1) 3006 is provisioned, initialized and begins operating. The AP-1 is configured with site wide common WLAN supporting Per user PSK (or Private-PSK) and/or 802.1X. This includes the AP-1 3006 broadcasting the SSID name. In step 3024, WLAN controller 3008 is initialized and begins operating. In step 3026, the orchestration server 3010 is pre-provisioned, initialized and begins operating. The orchestration server 3010 is pre-provisioned to include information on each of the Access Points in the network including the location of all Access Points in the wireless network as well as with authentication information (e.g., credential information) for subscribers including user 1 which is operating the UE 1 3004. The orchestration server 3010 is also pre-provisioned with policies to be implemented in connection with each of the subscribers (e.g., location based policies regarding access such as ability to access home service area network and reachability to private area network). In step 3028, the centralized gateway 3012 is initialized and begins operating. In step 3030, the AAA server 3014 is pre-provisioned with the credential information for subscribers and policies for subscribers (e.g., location based access policies). In some embodiments, the credential information and policy information is stored in database 3016.

In step 3031, the UE 1 3004 is in the coverage area of AP-1 3006 in its Home Service Area and receives the broadcast SSID name and performs open system authentication. This includes an exchange of messages with AP-1 3006. Operation proceeds from step 3031 to step 3032.

In step 3032, the UE 1 3004 associates with AP-1 3006. This includes exchanging association messages with AP-1 3006. The UE 1 3004 receives an Association Id from the AP 3006. The UE 1 3004 is now in an authenticated and associated state pending security mechanisms (e.g., P-PSK authentication). The UE 1 3006 can communicate with AP 3006 but is blocked access to the network and internet. Operation proceeds from step 3032 to step 3036.

In step 3036, UE 1 3004 generates and transmits message 3034 to AP-1 3006. The message 3034 is an authentication message including credentials, P-PSK information for UE-1 3004 as well as the user equipment device identifier such as for example MAC address for UE 1 3004. Operation proceeds from step 3036 to step 3038.

In step 3038, AP-1 3006 receives the message 3034. Operation proceeds from step 3038 to step 3040. In step 3040, the AP-1 3006 processes the message 3034 and generates authentication message 3042. Authentication message 3042 is based on message 3034 and includes the P-PSK information received from UE 1 3004. Authentication message 3042 also includes location information for AP-1 3006. In some embodiments, message 3042 is an Access Request message. Operation proceeds from step 3040 to step 3044.

In step 3044, the AP-1 3006 transmits the authentication message 3042 to WLAN controller 3008. Operation proceeds from step 3044 to step 3046.

In step 3046, WLAN controller 3008 receives and processes authentication message 3042. Operation proceeds from step 3046 to step 3048.

In step 3048, WLAN controller 3008 generates message 3050 based on message 3042 and transmits the message 3050 to orchestration server 3010. The message 3050 includes the authentication information received from UE 1 3004 and the AP location information from AP-1 3006. In some embodiments, the WLAN controller 3008 in step 3048 forwards received message 3042 to the orchestration server 3010 instead of generating message 3050 based on message 3042. Operation proceeds from step 3048 to step 3052.

In step 3052, the orchestration server 3010 receives message 3050 from WLAN controller 3008. Operation proceeds from step 3052 to step 3054.

In step 3054, the orchestration server 3010 processes the received message 3050. Processing the received message including using the authentication information for the user equipment device 1 (i.e., the P-PSK authentication information) to authentic UE 1 3004 by comparing the receive information to the authentication information for the user stored at the orchestration server 3010. In response to successfully authenticating the user equipment device 1 3004, the orchestration server 3010 dynamically assigns VLAN stacking information to the UE 1 3004. In this example an outer VLAN ID (also referred to a S-VLAN ID (Service Provider VLAN ID)) and inner VLAN ID (also referred to as a C-VLAN ID (Customer VLAN ID)) is assigned to the UE 1 3004. The orchestration server 3010 also pre-compiles the policies (e.g., access and bandwidth policies) based on: (i) the AP-1 location information included in the message 3050 and (ii) operator pre-provisioned details and/or information such as policies for the user equipment 1 3004 of allowed access and amount of bandwidth for UE 1 3004 based on UE 1 3004 location (e.g., whether in a home service area or in a visitor service area). The dynamically assigned stacked VLAN information may, and in some embodiments does, include policy information such as for example Quality of Service policy information including access and/or bandwidth policy information. The IEEE 802.1 ad standard explains details of VLAN stacking and Ethernet frames employing VLAN stacking. The IEEE 802.1ad—2005 Standard for Local and metropolitan area networks entitled "Virtual Bridged Local Area Networks Amendment 4: Provider Bridges" dated 2005 also referred to as IEEE Std. 1 ad-2005 (Amendment to IEEE std 802.1Q—2005) is hereby incorporated by reference in its entirety. The orchestration server 3010 also generates a UE context or record that includes UE 1 3006 identifying information (e.g., UE 1 3004 MAC address), the assigned S-VLAN and C-VLAN information (e.g., S-VLAN ID and C-VLAN ID) and the policies to be applied (e.g., access and bandwidth policies, QoS policies) and stores this information at orchestration server 3010. In some embodiments, this UE context information is also communicated to the AAA server 3014 and/or the centralized gateway 3012. In some embodiments, the various operation discussed in connection with step 3054 are performed as sub-steps or separate independent steps. While in this example, UE 1 3004 was successfully authenticated by the orchestration server 3010, when the orchestration server 3010 is not able to authenticate a user equipment device no dynamic VLAN assignment is made but instead a response including an authentication rejection or access denial message or in some instances a challenge is generated and sent to the UE 1 3004. Operation proceeds from step 3054 to step 3056.

In step 3056, the orchestration server 3010 generates authentication response message 3058 which includes an indication that the authentication was successful and the dynamically assigned stacked VLAN information (e.g., S-VLAN ID, C-VLAN ID and in some embodiments policy information). In some embodiments, the authentication response message is an Access-Accept message. In this example the network security mechanism used for securing the network is P-PSK authentication and the authentication response message 3058 is a P-PSK authentication response message. Operation proceeds from step 3056 to step 3057.

In step 3057, the orchestration server 3010 generates and/or determines policy rules (e.g., location based policy rules such as access control and bandwidth usage policies) to be applied to communications for the first user equipment, stores a copy of the policy rules for the user equipment device in generated UE context, and communicates the policy rules and/or policies, user equipment device identification information and assigned stacked VLAN information to one or more additional network equipment devices, e.g., the AAA server 3014, the centralized gateway 3014, WLAN controller 3008) for implementation. The additional network equipment devices, (e.g., AAA server 3014, centralized gateway 3012, and WLAN controller 3008) receives the policy rules and/or policies, stacked VLAN information and user equipment device identification information and implements the policies and/or policy rules in connection with communications for the first user equipment device as necessary. For example, the AAA server 3014 stores the received policy rules, policies, dynamically assigned stacked VLAN information in database 3016 for implementation as discussed below in connection with step 3146. Operation proceeds from step 3057 to step 3060.

In step 3060, the orchestration server 3010 transmits the generated authentication response message 3058 to the WLAN controller 3008. Operation proceeds from step 3060 to step 3062.

In step 3062, the WLAN controller 3008 receives the authentication response message 3058. Operation proceeds from step 3062 to step 3064. In step 3064, the WLAN controller 3008 generates authentication response message 3066 based on authentication response message 3058. Authentication response message 3066 including the indication that that authentication was successful and the dynamically assigned VLAN stacking information. Operation proceeds from step 3064 to step 3068.

In step 3068, the WLAN controller 3008 transmits the authentication response message 3066 to AP-1 3006. In some embodiments, the WLAN controller 3008 instead of generating message 3066 forwards message 3058 to the AP-1 3006. Operation proceeds from step 3068 to step 3070.

In step 3070, the AP-1 3006 receives the authentication response message 3066. Operation proceeds from step 3070 to step 3072.

In step 3072, AP-1 3006 processes the received authentication response message 3066. This includes determining that the authentication was successful based on the information contained in the authentication response message 3066. In response to determining that the authentication was successful, the AP-1 3006 extracts the dynamically assigned VLAN stacking information (e.g., S-VLAN ID, C-VLAN ID, policy information) included in the response message 3066. The AP 1 3006 uses this information to bridge the wireless frames (IEEE 802.11) to wired network and vice-versa and implements the VLAN stacking for L2 frames in connection with the UE 1 3004. For upstream traffic received from the UE 1 3004, AP 1 3006 encapsulates L2 frames with the dynamically assigned S-VLAN and C-VLAN information (e.g., S-VLAN ID and C-VLAN ID and optionally included policy information). The modified frames will then be encapsulated in tunneling protocols such as Soft GRE (Ethernet over GRE). S-VLAN ID and C-VLAN ID will be used by the AP-1 3006 to identify information and/or data communicated to the UE 1 3004 from the wired network. Operation proceeds from step 3072 to step 3076.

In steps 3076 and 3078, AP-1 3006 and UE 1 3004 perform a 4-way handshake procedure. AP-1 3006 initiates the 4-way handshake procedure in step 3076. During the 4-way handshake procedure 4 messages 3074 are exchanged between the AP-1 3006 (authenticator) and the UE 1 3004 client device (supplicant) to generate encryption keys which can be used to encrypt actual data sent over wireless medium also referred to as wireless connection path or wireless link between UE 1 3004 and AP-1 3006. Upon the completion of the 4-way handshake procedure implemented in steps 3076 and 3078, operation proceeds from step 3078 to step 3080. Data/messages/frames communicated between the UE 1 3004 and AP-1 3006 will now be encrypted using the encryption keys resulting from the 4-way handshake procedure.

In step 3080, UE 1 3004 generates Dynamic Host Configuration Protocol (DHCP) discovery message 3082 to obtain an IP address to utilize for IP network communications. DHCP is a network protocol that is used to configure network devices to communicate on an Internet Protocol network. A DHCP client which in this example is the UE 1 3004 uses the DHCP protocol to acquire configuration information, such as for example an IP address, a default route, and one or more Domain Name System (DNS) server addresses from a DHCP server. In this example, the centralized gateway 3012 performs the functions of a DHCP server. The DHCP discovery message 3082 includes the MAC address for UE 1 3004. Operation proceeds from step 3080 to step 3084. In step 3084, UE 1 3004 transmits the DHCP discovery message 3082 to the AP-1 3006 over the wireless communications link between UE 1 3004 and AP-1 3006. Operation proceeds from step 3084 to step 3086.

In step 3086, the DHCP discovery message 3082 is received by AP-1 3006 from UE 1 3004. Operation proceed from step 3086 to step 3088.

Figure 19:
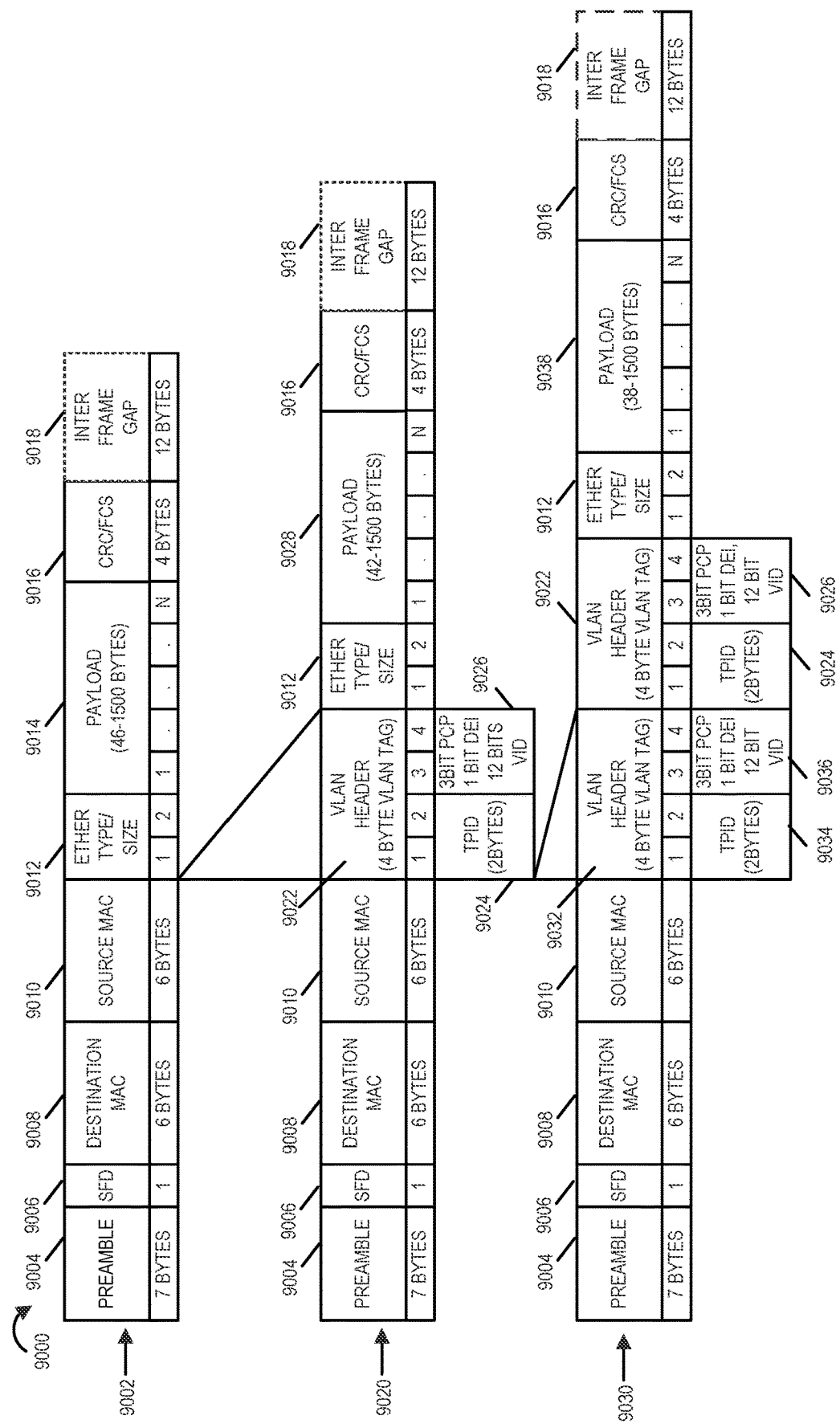
FIG. 19 illustrates exemplary message formats for messages with Ethernet II frames including frames with and without VLAN header(s).

In step 3088, AP-1 3006 encapsulates the discovery message which is an L2 frame format using SOFT GRE and implements VLAN stacking using the dynamically assigned S-VLAN and C-VLAN information (e.g., S-VLAN ID and C-VLAN ID). In step 3088, the SOFT GRE/(S-VLAN, C-VLAN) L2 Frame: DHCP discovery message 3090 is generated in response to receiving DHCP discovery message 3082 and utilizes information from the DHCP discovery message 3082 to generate DHCP discovery message 3090. As described in further detail below FIG. 19 shows an exemplary message 9030 with an Ethernet frame including S-VLAN and C-VLAN stacking information in the form of two VLAN headers. Operation proceeds from step 3088 to step 3100. In step 3100, AP-1 3006 transmits the SOFT GRE/(S-VLAN, C-VLAN) L2 Frame: DHCP discovery to the Centralized Gateway 3012. Operation proceeds from step 3100 to step 3102.

In step 3102, the Centralized Gateway 3012 receives the DHCP discovery message 3090 from AP-1 3006. Operation proceeds from step 3102 to step 3104.

In step 3104, the Centralized Gateway 3012 assigns an Internet Protocol address (e.g., IP-1 address) to UE 1 3004 and builds a UE context with UE 1's MAC address, S-VLAN ID and C-VLAN ID. The IP address is assigned from a pool of IP address (e.g., a pool of IPV4 addresses if the UE 1 3004 is an IPV4 device or a pool of IPv6 addresses if UE 1 3004 is a IPv6 device. UE 1 3004's MAC address being included in the DHCP discovery messages 3082 and 3090. Operation proceeds from step 3104 to step 3106 of Part B 3002 of method 3000 shown on FIG. 13B.

In step 3106, the Centralized Gateway 3012 generates SOFT GRE/S-VLAN ID, C-VLAN ID) L2 frame: DHCP offer message 3108 which includes the stacked VLAN information (the S-VLAN ID and C-VLAN ID) and a DHCP offer including the assigned IP address. Operation proceeds from step 3106 to step 3110.

In step 3110, the Centralized Gateway 3012 transmits the DHCP offer message 3108 to the AP-1 3006 in response to DHCP discovery message 3090. Operation proceeds from step 3110 to step 3112.

In step 3112, the AP-1 3006 receives the DHCP discovery message 3108 from the Centralized Gateway 3012. Operation proceeds from step 3112 to step 3114.

In step 3114, AP-1 3006 de-capsulates the SOFT GRE (S-VLAN, C-VLAN) L2 FRAME: DHCP offer 3108 and determines from the S-VLAN ID and C-VLAN ID that the DHCP offer 3108 is directed to UE 1 3004 based on the stacked VLAN information (i.e., the S-VLAN ID and C-VLAN ID) which uniquely identifies the UE 1 3004. Operation proceeds from step 3114 to step 3118.

In step 3118, AP-1 3006 generates DCHP offer message 3116 and transmits it to the UE 1 3004 over the wireless communications link connecting AP-1 3006 and UE 1 3004. The DCHP offer message 3116 being based on the DHCP offer message 3108 and including IP address assigned by the Centralized Gateway 3012. Operation proceeds from step 3118 to step 3120.

In step 3120, UE 1 3004 receives the DHCP offer message 3116 from AP-1 3006 and processes it determining the IP address assigned by the Centralized Gateway 3012. Operation proceeds from step 3120 to step 3122.

In step 3122, UE 1 3004 generates Internet Access message/frame 3124 in which UE 1 3004 is sending packets of data to a destination device via the Internet. Operation proceeds from 3122 to step 3126.

In step 3126, the UE 1 3004 transmits the Internet Access message 3124 to AP-1 3006. Operation proceeds from step 3126 to step 3128.

In step 3128, AP-1 3006 receives the Internet Access message 3124 from UE 1 3004. Operation proceeds from step 3128 to step 3130.

In step 3130, AP-1 3006 generates SOFT GRE/(S-VLAN, C-VLAN) L2 frame message 3132 based on the received message 3124 and dynamically assigned VLAN stacking information received from the orchestration server 3010 for UE 1 3004. The AP-1 3006 provides a bridging function taking the upstream message/frame 3124 received from the UE 1 3004 over the wireless link and modifying the message/frame 3124 by inserting the dynamically assigned S-VLAN ID and C-VLAN ID for UE 1 3004 into an Ethernet frame for transmission on a wired cable (Ethernet cable). The modified frame being encapsulated in the tunneling protocol Soft GRE. Operation proceeds from step 3130 to step 3134.

In step 3134, the AP-1 3006 completes the bridging operation by transmitting the SoftGRE (S-VLAN, C-VLAN) L2 message/frame 3132 to the Centralized Gateway 3012 over a wired connection. Operation proceeds from step 3134 to step 3136.

In step 3136, the Centralized Gateway 3012 receives the message/frame 3132. Operation proceeds from step 3136 to step 3138.

In step 3138, the Centralized Gateway 3012 determines that the message/frame 3132 is from UE 1 3004 based on the S-VLAN ID and C-VLAN ID included in the message/frame 3132. In some embodiments, the Centralized Gateway 3012 also utilizes the MAC address in determining that message/frame 3132 is from UE 1 3004. In step 3138, the Centralized Gateway 3012 detects the first packet in the message/frame 3132 and initiates an authentication procedure. Operation proceeds from 3138 to step 3142.

In step 3142, the Centralized Gateway 3012 generates and transmits Radius authentication request 3140 to the AAA server 3014. In some embodiments, the Radius authentication request 3140 includes the S-VLAN ID, C-VLAN ID, and in some embodiments the MAC address for UE 1 3004. Operation proceeds from step 3142 to step 3144.

In step 3144, the AAA server 3014 receives the Radius Authentication Request 3140 from the Centralized Gateway 3012. Operation proceeds from step 3144 to step 3146.

In step 3146, the AAA server 3014 retrieves the user specific policies and/or policy rules such as for example location specific access control and bandwidth policies and/or policy rules for the UE 1 3004. This includes peer-peer communication policies and/or policy rules rendered by the orchestration server 3010 through the AAA server 3014 for example by the orchestration server 3010 communicating the policies and/or policy rules to AAA server 3014. In some embodiments, the AAA server 3014 retrieves these policies and/or policy rules from the database 3016 where the policies and/or policy rules are stored. Operation proceeds from step 3146 to steps 3150 and 3154.

In step 3150, the AAA server 3014 generates and transmits the retrieved policies (e.g., location specific access control policies and bandwidth polices) in message 3148 to the centralized gateway 3012. In some embodiments, the policies are obtained by the centralized gateway 3012 using an Application Programming Specific Interface. These policies are provided in response to the Radius Authentication Request 3140. Operation proceeds from step 3150 to step 3152. In step 3152, the Centralized Gateway 3012 receives the message 3148 with the policies (e.g., location specific access control policies and bandwidth policies) to be applied to communications from the UE 1 3004. Operation proceeds from step 3152 to step 3162.

In step 3154, the AAA server 3014 generates message 3156 which is a Radius authentication response message including the retrieved polices for UE 1 3004. Operation proceeds from step 3154 to step 3158. In step 3158, the AAA server 3014 transmits message 3156 to the orchestration server 3010. Operation proceeds from step 3158 to step 3160.

In step 3160, the orchestration server 3010 receives the message 3156, extracts the policies retrieved from the AAA server 3014 for UE 1 3004 and updates policies stored in the UE context and/or record it has for the UE 1 3004.

In step 3162, the centralized gateway 3012 updates the UE context or record it generated or built for UE 1 3004 with the policies received from the AAA server 3014. Operation proceeds from step 3162 to step 3164.

In step 3164, the centralized gateway 3012 applies the policies received from the AAA server 3014 to the communications from the UE 1 3004 with respect to message/frame 3132. In this example, the AP 1 3006 location indicates that the UE 1 3004 is in its home service area and that the UE 1 3004 has Internet access. The Centralized Gateway 3012 generates internet access message 3166 based on message 3132 which includes data transmitted in message 3124. Operation proceeds from step 3164 to step 3168.

In step 3168, the Centralized Gateway 3012 transmits the generated message 3166 out onto Internet 3018 toward its destination. The orchestration server 3010 also implements any bandwidth policies (e.g., bandwidth constraints for UE 1 3004 transmission) provided by the AAA server 3014 in the message 3148. Operation proceeds from step 3168 to step 3170 where the message 3166 is communicated over the Internet 3018.

The operation of method 3000 continues with the AP-1 3006 providing services to UE 1 3004 using VLAN stacking with the dynamically assigned S-VLAN ID and C-VLAN ID provided by the orchestration server 3010 to transmit and receive data packets via the Centralized Gateway 3012.

In this example, it should be noted that the when the AP-1 3006 is transmitting messages received from the UE 1 3004 onto the wired network to various network equipment and/or out onto the Internet, the messages are typically passing through network switches. The VLAN stacking information included in the messages allows for the messages to be identified by the AP-1 and the network equipment device with which it is communicating. For example, when the method 3000 is applied to system 200 the messages/frames are transmitted from AP-1 210 to other network equipment device such as orchestrator 218, WLAN Controller 216, Centralized Gateway 220 via switch 213.

While the exemplary method 3000 has been explained using P-PSK authentication, the method 3000 is also applicable to other types of authentication such as Extensible Authentication Protocol (EAP) and the use of 802.1X protocol.

In various embodiments, the Authentication Request messages 3042 and/or 3050 are implemented as described in Access-Request message 316 of FIG. 3. In some embodiments, the AP-1 location information is provided in the message format and field(s) as shown in FIG. 12. In various embodiments, the Authentication Response messages 3058 and/or 3066 are implemented as described in Access-Accept message 322 of FIG. 3 with the dynamically assigned S-VLAN information and C-VLAN information being included in vendor specific attributes of the Access-Accept message 322 for example as shown fields 1152 and 1154 of S-VLAN and C-VLAN using Radius Vendor Specific Attributes diagram 1150. The S-VLAN and C-VLAN information including a dynamically assigned S-VLAN ID and C-VLAN ID, the combination being uniquely assigned to UE 1 3004.

In another embodiment of the present invention instead of using RADIUS Vendor-Specific Attributes to communicate the dynamically assigned VLAN stacking tags (e.g., S-VLAN/C-VLAN information), a multi-occurrence of Tunnel attributes in a Access Accept message (e.g., RADIUS Access Accept message) is used to communicate the dynamically assigned VLAN stacking tags as described in detail below in connection with FIG. 21.

The method 3000 illustrates an example of VLAN stacking being used for a user equipment device which authenticates and is associated with an Access Point broadcasting an SSID in the UE's home zone or area. The method 4000 illustrated in FIG. 14 describes an example of VLAN stacking being used for a user equipment device which authenticates and is associated with an Access Point broadcasting a network wide service set identifier (SSID) in a visited zone or area. In this example, the user equipment device 4004 has already been dynamically assigned stacked VLAN information (S-VLAN ID and C-VLAN ID) when it previously authenticated and associated with a different Access Point broadcasting the same network wide service set identifier (SSID). For example, the method 4000 may follow the method 3000 when UE 1 roams to an area serviced by AP N 4006. In such an example, UE 1 4004 is UE 1 3004, WLAN controller 4008 is WLAN controller 3008, orchestration server 4010 is orchestration server 3010, centralized gateway 4012 is centralized gateway 3012, AAA server 4014 is AAA server 3014, data base 4016 is data base 3016 and Internet 4018 is Internet 3018. The use of VLAN stacking in method 4000 will now be discussed in detail.

Figure 14A:
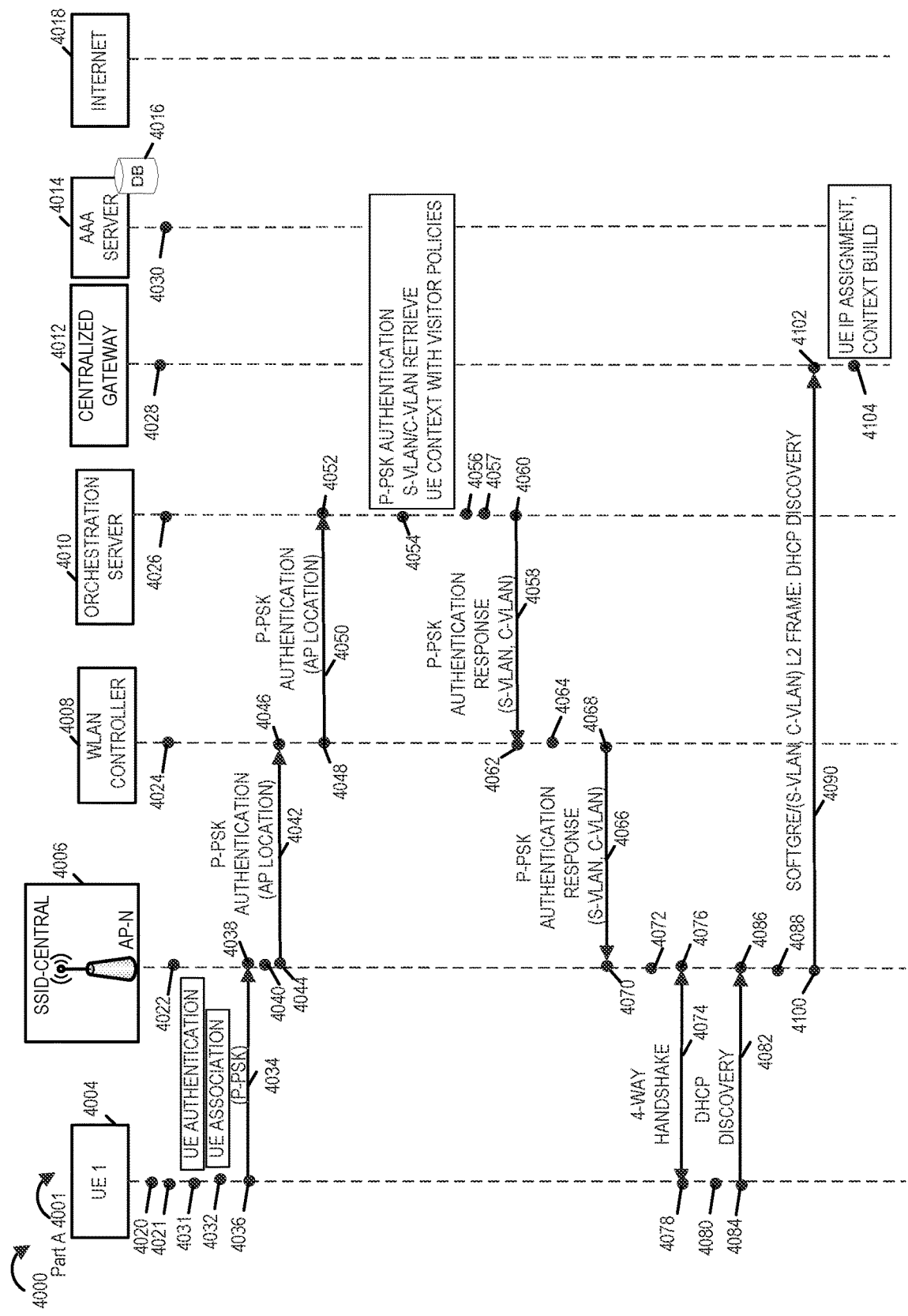
FIG. 14A is the first part of a signaling diagram which illustrates the steps and signaling of an exemplary method in accordance with an embodiment of the present invention.

FIG. 14 comprises FIG. 14A and FIG. 14B. FIG. 14A is the first part (Part A 4001) of a signaling diagram which illustrates the steps and signaling of an exemplary method 4000 in accordance with an embodiment of the present invention. FIG. 14B is the second part (Part B 4002) of a signaling diagram which illustrates the steps and signaling of an exemplary method 4000 in accordance with an embodiment of the present invention. The method 4000 illustrates the steps for a user equipment device (e.g., user equipment device 4004 to associate to service set identifier (SSID) (e.g., SSID-CENTRAL) and receive network access) in a visitor zone of a wireless network (e.g., Wi-Fi network). While it will be readily understood that additional steps and signaling are performed in connection with communicating information, messages, and packets between devices, the method 4000 focuses on and discusses the steps and signaling for understanding the invention. Elements or steps with the same reference numbers used in different figures are the same or similar and those elements or steps will not be described in detail again. The signaling diagram/method 4000 is implemented by a system coupled to the Internet 4018. The system including a first UE 1 4004, an Access Point 4006, a WLAN controller 4008, an Orchestration Server 4010, a centralized gateway 4012, an AAA server 4014, and a database 4016 with the elements of the system coupled via communications links that allow for the exchange of information, signals and data between the elements. The UE 1 4004 is a wireless device, e.g., a mobile device such as by way of example a mobile phone, smart phone, laptop, tablet. In various embodiments, the UE 1 4004 is implemented in accordance with UE 500 shown in FIG. 5. The Access Point 4006 may be implemented in accordance with the Access Point 400 shown in FIG. 4. The WLAN controller 4008 may be, and in some embodiments is implemented in accordance with network device 600 shown in FIG. 6. The orchestration server 4010 may be, and in some embodiments is implemented in accordance with network device 600 shown in FIG. 6. The centralized gateway 4012 may be, and in some embodiments is, implemented in accordance with network equipment device 600 shown in FIG. 6. The AAA server 4014 is an Authentication, Authorization and Accounting server which may be implemented in accordance with the network equipment device 600 shown in FIG. 6. The AAA server 4014 is coupled to database 4016 which includes user authentication credentials, policies and accounting information. In some embodiments, the database 4016 is incorporated into and is part of the AAA server 4014.

The signaling diagram/method 4000 may be, and in some embodiments is, implemented using exemplary system 200 of FIG. 2. In such embodiments, the UE 1 4004 is UE 1 204 of system 200 after it moves along path 234 to a visitor zone area for UE 1 204. The Access Point N (AP-N) 4006 is Access Point N 212 of system 200. The WLAN controller 4008 is WLAN controller 216 of system 200. The orchestration server 4010 is orchestrator 418 of system 200. The centralized gateway 4012 is centralized gateway 220 of system 200. The AAA server 4014 is AAA server 222 of system 200. The database 4016 is database 223 of system 200. However, it should be understood that the method 4000 is not limited to the exemplary system 200 and may be, and is used, on other systems and system configurations. The signaling diagram/method 4000 illustrates the signaling and steps for using VLAN stacking in a high density system to provide wireless services for a user equipment device and in particular roaming a user equipment device to a visitor zone. The same steps can be used for other user equipment devices. The implementation of VLAN stacking allows for system scaling of user equipment devices which are supported above 4095 user equipment devices.

The signaling diagram and method 4000 illustrate an exemplary call flow for UE 1 4004 association to SSID in a visitor zone using VLAN stacking in accordance with an embodiment of the present invention. As described above in connection with the exemplary system 200, the orchestration server 4010 also referred to herein as an orchestrator 4010 is pre-provisioned with Access Point location inventory for the entire site being served by the site being served by the wireless network. In various embodiments, the Orchestration server 4010 includes memory in which a data structure, e.g., a table or linked list, includes a mapping of the location of each AP in the system and its location within the network site, e.g., campus. In this example, the site is deployed with secured WLAN services (Per user Pre-Shared Key (PSK) client authentication or 802.1X authentication. 802.1X authentication is a network authentication protocol that opens ports (e.g., physical or virtual ports) for network access when an organization authenticates a user's identity and authorizes them for access to the network. The user's identity is determined based on their credentials or certificate, which is confirmed by the RADIUS server. In this example the Orchestration Server 4010 authenticates user devices. The AP location mapping information also includes the details about end users home service area and visitor service area. Home Service Area (HSA) is the area where an end user device is able to associate with the home wireless network and is reachable to the private area network. The Visitor Service Area is an area of the site in which the end user device is able to associate with an AP of the network but in which different policies (e.g., access and bandwidth policies) are applied, i.e., visitor policies.

The AP-N 4006 is configured with site wide common WLAN supporting per user PSK (or private PSK) or 802.1X.

The user equipment device 1 (UE 1 4004) is a mobile device pre-provisioned with the required credentials to connect to the system SSID (SSID-Central in the example) and use Internet Access in visitor zones.

UE 1 4004 is in the coverage area of AP-N 4006 VSA (visitor service area) serving SSID: <Site Wide Common SSID>.

UE 1 4004 performs the conventional 802.11 open system authentication with AP N 4006. In this example, UE 1 4004 already has an active communications session and is roaming from its Home Service Area to a Visitor Service Area. The UE 1 4004 has already been dynamically assigned VLAN stacking information including a S-VLAN ID and a C-VLAN ID when it was authenticated and associated with a different AP (e.g., AP-1 210) when the method 4000 is implemented on system 200.

Once the UE 1 4004 receives a response to its Association request to AP N 4006 and receives an association ID, then network authentication using Per user PSK (e.g., Private-Pre-Shared Key) followed by 4-way exchange for encryption keys is performed. While the example illustrates network authentication using P-PSK other authentication protocols such as EAP (Extensible Authentication Protocol) may be, and in some embodiments are utilized.

Figure 22:
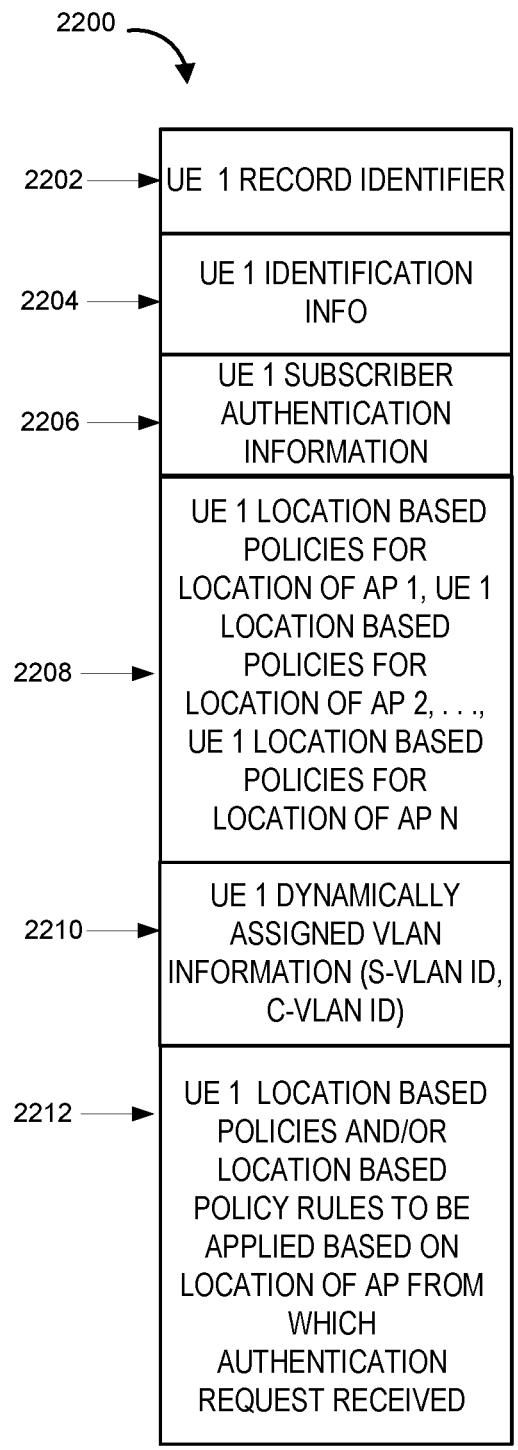
FIG. 22 illustrates an exemplary record of subscriber location based policies in accordance with an embodiment of the present invention.

During this network authentication procedure, the AP N 4006 inserts the AP location information for AP-N 4006 into an Authentication Request message which may be, and in some embodiments is implemented as an Access Request message which is then sent to an authentication network entity (e.g., the orchestration server 4010 or the AAA server 4014. Upon successful authentication by the network authentication entity (e.g., the orchestration server 4010 or AAA server 4014), the authentication entity (e.g., the orchestration server 4010 or AAA server 4014) retrieves the VLAN stacking information previously assigned such as example outer VLAN ID (also referred to as S-VLAN: Service Provider VLAN) and inner VLAN ID (also referred to as C-VLAN: Customer VLAN). The authentication entity which in this example is the orchestration server 4010 also pre-compiles the polices for the user equipment device based on location information and pre-provisioned details (e.g., access policies based on location within the network). Record 2220 of FIG. 22 illustrates an example record in which location based policy information is inputted and stored with subscriber credentials.

When the authentication is successful and has been completed, AP-N 4006 bridges the wireless frames (e.g., IEEE 802.11 frames) to wired network and vice-versa and implements the VLAN stacking. For upstream traffic received from the user equipment device 1 4004, the AP-1 4006 encapsulates the L2 frame with C-VLAN and S-VLAN assigned for user equipment 1 4004. The modified frame is then encapsulated in tunneling protocols such as, for example Soft Generic Routing Encapsulation (Soft-GRE) (Layer 2 Ethernet over GRE).

The centralized gateway 4012 during the Dynamic Host Configuration Protocol (DHCP) discovery procedures builds a user context or record with client MAC (for the UE 1 4004), dynamically assigned S-VLAN and C-VLAN values (e.g., IDs) and assigns an IP address to the UE 1 4004 from the respective IP address assignment pool (e.g., IPv4 or IPv6 assignment pools).

Upon detection of the first packet from the client (UE 1 4004), the centralized gateway 4012 performs an authentication procedure and retrieves the user specific policies such as, for example, location specific access control and bandwidth policies which include the peer-to-peer communication policies rendered by the orchestration server 4010 through the AAA server 4014. The user authentication information and policies being stored in and retrieved from the database 4016. For example, when the retrieved policies indicate the user equipment device is authorized to access the internet, the first packet is sent out over the Internet.

A description of the steps and signaling of method 4000 will now be described. The method begins in step start step 4020 Part A 4001 of method 4000 shown on FIG. 14A. Operation proceeds from start step 4020 to step 4021. In step 4021, UE 1 4004 which has been pre-provisioned with credentials for connecting to wireless network SSID-Central and gaining internet access, roams into the visitor service area of AP-N 4006. For example, when UE 1 4004 is UE 1 204 of system 200 and AP-N 4006 is AP-N 212 of system 200, UE 1 204 roams from its home service area in which is it connected to the SSID network via AP-1 210 and follows the path 234 to an area of the system in which it is in a visitor service area where AP-N 212 is providing wireless services. In this example, UE 1 4004 has an on-going communications session (e.g., data session or Voice Over-IP session) in progress when it roams from its home network to the visitor network. UE 1 4004 does not have a connection established with AP-N 4006 but orchestration server 4010 has previously dynamically assigned VLAN stacking information to UE 1 4004 including an assigned S-VLAN ID and a C-VLAN ID.

In step 4022, Access Point-N (AP-N) 4006 is provisioned, initialized and begins operating. The AP-N 4006 is configured with site wide common WLAN supporting Per user PSK (or Private-PSK) and/or 802.1X. This includes the AP-N 4006 broadcasting the SSID name. In step 4024, WLAN controller 4008 is operating to control the Access Points in the system. In step 4026, the orchestration server 4010 which has been pre-provisioned, initialized and is currently operating has already created a context or record for UE 1 4004 including VLAN stacking information which it previously assigned to UE 1 4004 (e.g., S-VLAN information such as S-VLAN ID, C-VLAN information such as C-VLAN ID and policy information). The orchestration server 4010 was pre-provisioned to include information on each of the Access Points in the network including the location of all Access Points in the wireless network as well as with authentication information (e.g., credential information) for subscribers including user 1 which is operating the UE 1 4004. The orchestration server 4010 is also pre-provisioned with policies to be implemented in connection with each of the subscribers (e.g., location based policies regarding access such as ability to access home service area network and reachability to private area network and policies for visitor service areas). In step 4028, the centralized gateway 4012 is operating and providing connections for devices to the Internet 4018. In step 4030, the AAA server 4014 which has been pre-provisioned with the credential information for subscribers and policies for subscribers (e.g., location based access policies) is currently operating. In some embodiments, the credential information and policy information is stored in database 4016.

In step 4031, the UE 1 4004 is in the coverage area of AP-N 4006 which is located in a Visitor Service Area for UE 1 4004 and receives the SSID name wirelessly broadcast by AP-N 4006. The UE 1 4004 then performs open system authentication during step 4031. This includes an exchange of messages with AP-N 4006. Operation proceeds from step 4031 to step 4032.

In step 4032, the UE 1 4004 associates with AP-N 4006. This includes exchanging association messages with AP-N 4006. The UE 1 4004 receives an Association Id from the AP-N 4006. The UE 1 4004 is now in an authenticated and associated state pending security mechanisms (e.g., P-PSK authentication). The UE 1 4004 can communicate with AP N 4006 but is blocked from access to the network and internet. Operation proceeds from step 4032 to step 4036.

In step 4036, UE 1 4004 generates and transmits message 4034 to AP-N 4006. The message 4034 is an authentication message including credentials, P-PSK information for UE-1 4004 as well as the user equipment device identifier such as for example MAC address for UE 1 4004. Operation proceeds from step 4036 to step 4038.

In step 4038, AP-N 4006 receives the message 4034. Operation proceeds from step 4038 to step 4040. In step 4040, the AP-N 4006 processes the message 3034 and generates authentication message 4042. Authentication message 4042 is based on message 4034 and includes the P-PSK information received from UE 1 4004. Authentication message 4042 also includes location information for AP-N 4006. In some embodiments, message 4042 is an Access Request message. Operation proceeds from step 4040 to step 4044.

In step 4044, the AP-N 4006 transmits the authentication message 4042 to WLAN controller 4008. Operation proceeds from step 4044 to step 4046.

In step 4046, WLAN controller 4008 receives and processes authentication message 4042. Operation proceeds from step 4046 to step 4048.

In step 4048, WLAN controller 4008 generates message 4050 based on message 4042 and transmits the message 4050 to orchestration server 4010. The message 4050 includes the authentication information received from UE 1 4004 and the AP location information from AP-N 4006. In some embodiments, the WLAN controller 4008 in step 4048 forwards received message 4042 to the orchestration server 4010 instead of generating message 4050 based on message 4042. Operation proceeds from step 4048 to step 4052.

In step 4052, the orchestration server 4010 receives message 4050 from WLAN controller 4008. Operation proceeds from step 4052 to step 4054.

In step 4054, the orchestration server 4010 processes the received message 4050. Processing the received message including using the authentication information for the user equipment device 1 (i.e., the P-PSK authentication information) to authentic UE 1 4004 by comparing the received information (e.g., P-PSK information) to information stored at the orchestration server 4010. In this example, the orchestration server 4010 has a UE context already generated and stored at the orchestration server and hence retrieves the UE context and visitor policies. The orchestration server 4010 determines that the visitor policies are to be applied as the AP-N 4006 location information included in the message 4050 is a location area or zone that is a visitor area or zone for UE 1 4004. The retrieved UE context also includes the previously dynamically assigned VLAN stacking information for UE 1 4004. In this example an outer VLAN ID (also referred to a S-VLAN ID (Service Provider VLAN ID)) and inner VLAN ID (also referred to as a C-VLAN ID (Customer VLAN ID)). The orchestration server 4010 also pre-compiles the policies (e.g., access and bandwidth policies) based on: (i) the AP-N location information included in the message 4050 and (ii) operator pre-provisioned details and/or information such as policies for the user equipment 1 4004 regarding allowed access and amount of bandwidth for UE 1 4004 based on UE 1 4004 location (e.g., whether in a home service area or in a visitor service area) derived from the location of AP-N 4006. The stacked VLAN information may, and in some embodiments does, include policy information such as for example Quality of Service policy information including access and/or bandwidth policy information which are visitor policies in this example as UE 1 4004 is in a visitor area or zone.

In some embodiments, this UE context information is also communicated to the AAA server 4014 and/or the centralized gateway 4012. In some embodiments, the various operations discussed in connection with step 4054 are performed as sub-steps or separate independent steps. While in this example, UE 1 4004 was successfully authenticated by the orchestration server 4010, when the orchestration server 4010 is not able to authenticate a user equipment device no dynamic VLAN assignment is made but instead a response including an authentication rejection or access denial message or in some instances a challenge is generated and sent to the UE 1 4004. Operation proceeds from step 4054 to step 4056.

In step 4056, the orchestration server 4010 generates authentication response message 4058 which includes an indication that the authentication was successful and includes the previously dynamically assigned stacked VLAN information (e.g., S-VLAN ID, C-VLAN ID and in some embodiments policy information which in this example is visitor policies). In some embodiments, the authentication response message is an Access-Accept message. In this example the network security mechanism used for securing the network is P-PSK authentication and the authentication response message 4058 is a P-PSK authentication response message. Operation proceeds from step 4056 to step 4057.

In step 4057, the orchestration server 4010 generates and/or determines policy rules (e.g., location based policy rules such as access control and bandwidth usage policies) to be applied to communications for the first user equipment, stores a copy of the policy rules for the user equipment device in generated UE context, and communicates the policy rules and/or policies, user equipment device identification information and assigned stacked VLAN information to one or more additional network equipment devices, e.g., the AAA server 4014, the centralized gateway 4014, WLAN controller 4008) for implementation. The additional network equipment devices, (e.g., AAA server 4014, centralized gateway 4012, and WLAN controller 4008) receives the policy rules and/or policies, stacked VLAN information and user equipment device identification information and implements the policies and/or policy rules in connection with communications for the first user equipment device as necessary. For example, the AAA server 4014 stores the received policy rules, policies, dynamically assigned stacked VLAN information in database 4016 for implementation as discussed below in connection with step 4146. Operation proceeds from step 4057 to step 4060.

In step 4060, the orchestration server 4010 transmits the generated authentication response message 4058 to the WLAN controller 4008. Operation proceeds from step 4060 to step 4062.

In step 4062, the WLAN controller 4008 receives the authentication response message 4058. Operation proceeds from step 4062 to step 4064. In step 4064, the WLAN controller 4008 generates authentication response message 4066 based on authentication response message 4058. Authentication response message 4066 including the indication that that authentication was successful and the previously dynamically assigned VLAN stacking information. Operation proceeds from step 4064 to step 4068.

In step 4068, the WLAN controller 4008 transmits the authentication response message 4066 to AP-N 4006. In some embodiments, the WLAN controller 4008 instead of generating message 4066 forwards message 4058 to the AP-N 4006. Operation proceeds from step 4068 to step 4070.

In step 4070, the AP-N 4006 receives the authentication response message 4066. Operation proceeds from step 4070 to step 4072.

In step 4072, AP-N 4006 processes the received authentication response message 4066. This includes determining that the authentication was successful based on the information contained in the authentication response message 4066. In response to determining that the authentication was successful, the AP-N 4006 extracts the dynamically assigned VLAN stacking information (e.g., S-VLAN ID, C-VLAN ID, policy information) included in the response message 4066. The AP N 4006 uses this information to bridge the wireless frames (IEEE 802.11) to wired network and vice-versa and implements the VLAN stacking for L2 frames in connection with the UE 1 4004. For upstream traffic received from the UE 1 4004, AP N 4006 encapsulates L2 frames with the dynamically assigned S-VLAN and C-VLAN information (e.g., S-VLAN ID and C-VLAN ID and optionally included policy information). The modified frames will then be encapsulated in tunneling protocols such as Soft GRE (Ethernet over GRE). S-VLAN ID and C-VLAN ID will be used by the AP-N 4006 to identify information and/or data communicated to the UE 1 4004 from the wired network. Operation proceeds from step 4072 to step 4076.

In steps 4076 and 4078, AP-N 4006 and UE 1 4004 perform a 4-way handshake procedure. AP-N 4006 initiates the 4-way handshake procedure in step 4076. During the 4-way handshake procedure 4 messages 4074 are exchanged between the AP-N 4006 (authenticator) and the UE 1 4004 client device (supplicant) to generate encryption keys which can be used to encrypt actual data sent over wireless medium also referred to as wireless connection path or wireless link between UE 1 4004 and AP-N 4006. Upon the completion of the 4-way handshake procedure implemented in steps 4076 and 4078, operation proceeds from step 4078 to step 4080. Data/messages/frames communicated between the UE 1 4004 and AP-N 4006 will now be encrypted using the encryption keys resulting from the 4-way handshake procedure.

In step 4080, UE 1 4004 generates Dynamic Host Configuration Protocol (DHCP) discovery message 4082 to obtain an IP address to utilize for IP network communications. DHCP is a network protocol that is used to configure network devices to communicate on an Internet Protocol network. A DHCP client which in this example is the UE 1 4004 uses the DHCP protocol to acquire configuration information, such as for example an IP address, a default route, and one or more Domain Name System (DNS) server addresses from a DHCP server. In this example, the centralized gateway 4012 performs the functions of a DHCP server. The DHCP discovery message 4082 includes the MAC address for UE 1 4004. Operation proceeds from step 4080 to step 4084. In step 4084, UE 1 4004 transmits the DHCP discovery message 4082 to the AP-N 4006 over the wireless communications link between UE 1 4004 and AP-N 4006. Operation proceeds from step 4084 to step 4086.

In step 4086, the DHCP discovery message 4082 is received by AP-N 4006 from UE 1 4004. Operation proceeds from step 4086 to step 4088.

In step 4088, AP-N 4006 encapsulates the discovery message which is an L2 frame format using SOFT GRE and implements VLAN stacking using the dynamically assigned S-VLAN and C-VLAN information (e.g., S-VLAN ID and C-VLAN ID). In step 4088, the SOFT GRE/(S-VLAN, C-VLAN) L2 Frame: DHCP discovery message 4090 is generated in response to receiving DHCP discovery message 4082 and utilizes information from the DHCP discovery message 4082 to generate DHCP discovery message 4090. As described in further detail below FIG. 19 shows an exemplary message 9030 with an Ethernet frame including S-VLAN and C-VLAN stacking information in the form of two VLAN headers. Operation proceeds from step 4088 to step 4100. In step 4100, AP-N 4006 transmits the SOFT GRE/(S-VLAN, C-VLAN) L2 Frame: DHCP discovery to the Centralized Gateway 4012. Operation proceeds from step 4100 to step 4102.

In step 4102, the Centralized Gateway 4012 receives the DHCP discovery message 4090 from AP-N 4006. Operation proceeds from step 4102 to step 4104.

In step 4104, the Centralized Gateway 4012 assigns an Internet Protocol address (e.g., IP-2 address) to UE 1 4004 and builds a UE context with UE 1's MAC address, S-VLAN ID and C-VLAN ID. The IP address is assigned from a pool of IP addresses (e.g., a pool of IPV4 addresses if the UE 1 4004 is an IPV4 device or a pool of IPV6 addresses if UE 1 4004 is a IPv6 device). UE 1 4004's MAC address being included in the DHCP discovery messages 4082 and 4090. Operation proceeds from step 4104 to step 4106 of Part B 4002 of method 4000 shown on FIG. 14B.

In step 4106, the Centralized Gateway 4012 generates SOFT GRE/S-VLAN ID, C-VLAN ID) L2 frame: DHCP offer message 4108 which includes the stacked VLAN information (the S-VLAN ID and C-VLAN ID) and a DHCP offer including the assigned IP address. Operation proceeds from step 4106 to step 4110.

In step 4110, the Centralized Gateway 4012 transmits the DHCP offer message 4108 to the AP-N 4006 in response to DHCP discovery message 4090. Operation proceeds from step 4110 to step 4112.

In step 4112, the AP-N 4006 receives the DHCP discovery message 4108 from the Centralized Gateway 4012. Operation proceeds from step 4112 to step 4114.

In step 4114, AP-N 4006 de-capsulates the SOFT GRE (S-VLAN, C-VLAN) L2 FRAME: DHCP offer 4108 and determines from the S-VLAN ID and C-VLAN ID that the DHCP offer 4108 is directed to UE 1 4004 based on the stacked VLAN information (i.e., the S-VLAN ID and C-VLAN ID) which uniquely identifies the UE 1 4004. Operation proceeds from step 4114 to step 4118.

In step 4118, AP-N 4006 generates DCHP offer message 4116 and transmits it to the UE 1 4004 over the wireless communications link connecting AP-1 4006 and UE 1 4004. The DCHP offer message 4116 being based on the DHCP offer message 4108 and including IP address assigned by the Centralized Gateway 4012. Operation proceeds from step 4118 to step 4120.

In step 4120, UE 1 4004 receives the DHCP offer message 4116 from AP-N 4006 and processes it determining the IP address assigned by the Centralized Gateway 4012. Operation proceeds from step 4120 to step 4122.

In step 4122, UE 1 4004 generates Internet Access message/frame 4124 in which UE 1 4004 is sending packets of data to a destination device via the Internet. Operation proceeds from 4122 to step 4126.

In step 4126, the UE 1 4004 transmits the Internet Access message 4124 to AP-N 4006. Operation proceeds from step 4126 to step 4128.

In step 4128, AP-N 4006 receives the Internet Access message 4124 from UE 1 4004. Operation proceeds from step 4128 to step 4130.

In step 4130, AP-N 4006 generates SOFT GRE/(S-VLAN, C-VLAN) L2 frame message 4132 based on the received message 4124 and dynamically assigned VLAN stacking information received from the orchestration server 4010 for UE 1 4004. The AP-N 4006 provides a bridging function taking the upstream message/frame 4124 received from the UE 1 4004 over the wireless link and modifying the message/frame 4124 by inserting the dynamically assigned S-VLAN ID and C-VLAN ID for UE 1 4004 into an Ethernet frame for transmission on a wired cable (Ethernet cable). The modified frame being encapsulated in the tunneling protocol Soft GRE. Operation proceeds from step 4130 to step 4134.

In step 4134, the AP-N 4006 completes the bridging operation by transmitting the SoftGRE (S-VLAN, C-VLAN) L2 message/frame 4132 to the Centralized Gateway 4012 over a wired connection. Operation proceeds from step 4134 to step 4136.

In step 4136, the Centralized Gateway 4012 receives the message/frame 4132. Operation proceeds from step 4136 to step 4138.

In step 4138, the Centralized Gateway 4012 determines that the message/frame 4132 is from UE 1 4004 based on the S-VLAN ID and C-VLAN ID included in the message/frame 4132. In some embodiments, the Centralized Gateway 4012 also utilizes the MAC address in determining that message/frame 4132 is from UE 1 4004. In step 4138, the Centralized Gateway 4012 detects the first packet in the message/frame 4132 and initiates an authentication procedure. Operation proceeds from 4138 to step 4142.

In step 4142, the Centralized Gateway 4012 generates and transmits Radius authentication request 4140 to the AAA server 4014. In some embodiments, the Radius authentication request 4140 includes the S-VLAN ID, C-VLAN ID, and in some embodiments the MAC address for UE 1 4004. Operation proceeds from step 4142 to step 4144.

In step 4144, the AAA server 4014 receives the Radius Authentication Request 4140 from the Centralized Gateway 4012. Operation proceeds from 4144 to step 4146.

In step 4146, the AAA server 4014 retrieves the user specific policies and/or policy rules such as for example location specific access control and bandwidth policies and/or policy rules for the UE 1 4004. This includes peer-peer communication policies rendered by the orchestration server 4010 through the AAA server 4014 for example by the orchestration server 4010 communicating the policies and/or policy rules to AAA server 4014. In some embodiments, the AAA server 4014 retrieves these policies and/or policy rules from the database 4016 where the policies and/or policy rules are stored. In this example, the policies and policy rules are visitor policies and policy rules as UE 1 4004 is in a visitor service area or zone and not in its home service area or zone. Operation proceeds from step 4146 to steps 4150 and 4154.

In step 4150, the AAA server 4014 generates and transmits the retrieved policies (e.g., location specific access control policies and bandwidth polices) to the centralized gateway 4012 in message 4148. In some embodiments, the policies are obtained by the centralized gateway 4012 using an Application Programming Specific Interface. These policies are provided in response to the Radius Authentication Request 4140. Operation proceeds from step 4150 to step 4152. In step 4152, the Centralized Gateway 4012 receives the message 4148 with the policies (e.g., location specific access control policies and bandwidth policies) to be applied to communications from the UE 1 4004. Operation proceeds from step 4152 to step 4162.

In step 4154, the AAA server 4014 generates message 4156 which is a Radius authentication response message including the retrieved polices for UE 1 4004. Operation proceeds from step 4154 to step 4158. In step 4158, the AAA server 4014 transmits message 4156 to the orchestration server 4010. Operation proceeds from step 4158 to step 4160.

In step 4160, the orchestration server 4010 receives the message 4156, extracts the visitor policies retrieved from the AAA server 4014 for UE 1 4004 and updates policies stored in the UE context and/or record it has for the UE 1 4004.

In step 4162, the centralized gateway 4012 updates the UE context or record it generated or built for UE 1 4004 with the visitor policies received from the AAA server 4014. Operation proceeds from step 4162 to step 4164.

In step 4164, the centralized gateway 4012 applies the policies (i.e., visitor policies) received from the AAA server 4014 to the communications from the UE 1 4004 with respect to message/frame 4132. In this example, the AP N 4006 location indicates that the UE 1 4004 is not in its home service area but is in a visitor service area or zone and that the UE 1 4004 has Internet access but bandwidth is limited/constrained by the retrieved policies. The visitor policies may, and in some embodiments do, limit access to other devices, e.g., printers, computer devices, projectors, IPTVs in the location or area in which UE 1 4004 is located. The Centralized Gateway 4012 generates internet access message 4166 based on message 4132 which includes data transmitted in message 4124. Operation proceeds from step 4164 to step 4168.

In step 4168, the centralized gateway 4012 transmits the generated message 4166 out onto Internet 4018 toward its destination. The centralized gateway 4012 also implements any bandwidth policies (e.g., bandwidth constraints for UE 1 4004 transmission) provided by the AAA server 4014 in the message 4148. Operation proceeds from step 4168 to step 4170 where the message 4166 is communicated over the Internet 4018.

The operation of method 4000 continues with the AP-N 4006 providing services to UE 1 4004 using VLAN stacking with the dynamically assigned S-VLAN ID and C-VLAN ID provided by the orchestration server 4010 to transmit and receive data packets via the centralized gateway 4012.

In this example, it should be noted that the when the AP-N 4006 is transmitting messages received from the UE 1 4004 onto the wired network to various network equipment devices and/or out onto the Internet, the messages are typically passing through network switches. The VLAN stacking information included in the messages allows for the messages to be identified by the AP-N 4006 and the network equipment device(s) with which it is communicating. For example, when the method 4000 is applied to system 200 the messages/frames are transmitted from AP-N 212 to other network equipment device such as orchestrator 218, WLAN Controller 216, Centralized Gateway 220 via switch 214.

While the exemplary method 4000 has been explained using P-PSK authentication, the method 4000 is also applicable to other types of authentication such as Extensible Authentication Protocol (EAP) and the use of 802.1X protocol.

In various embodiments, the Authentication Request messages 4042 and/or 4050 are implemented as described in Access-Request message 316 of FIG. 3. In some embodiments, the AP-N 4006 location information is provided in the message format and field(s) as shown in FIG. 12. In various embodiments, the Authentication Response messages 4058 and/or 4066 are implemented as described in Access-Accept message 322 of FIG. 3 with the previously dynamically assigned S-VLAN information and C-VLAN information being included in vendor specific attributes of the Access-Accept message 322 for example as shown in fields 1152 and 1154 of S-VLAN and C-VLAN using Radius Vendor Specific Attributes diagram 1150 shown in FIG. 11. The S-VLAN and C-VLAN information including a previously dynamically assigned S-VLAN ID and C-VLAN ID, the combination being uniquely assigned to UE 1 4004.

In another embodiment of the present invention instead of using RADIUS Vendor-Specific Attributes to communicate the dynamically assigned VLAN stacking tags (e.g., S-VLAN/C-VLAN information), a multi-occurrence of Tunnel attributes in a Access Accept message (e.g., RADIUS Access Accept message) is used to communicate the dynamically assigned VLAN stacking tags as described in detail below in connection with FIG. 21.

Figure 15A:
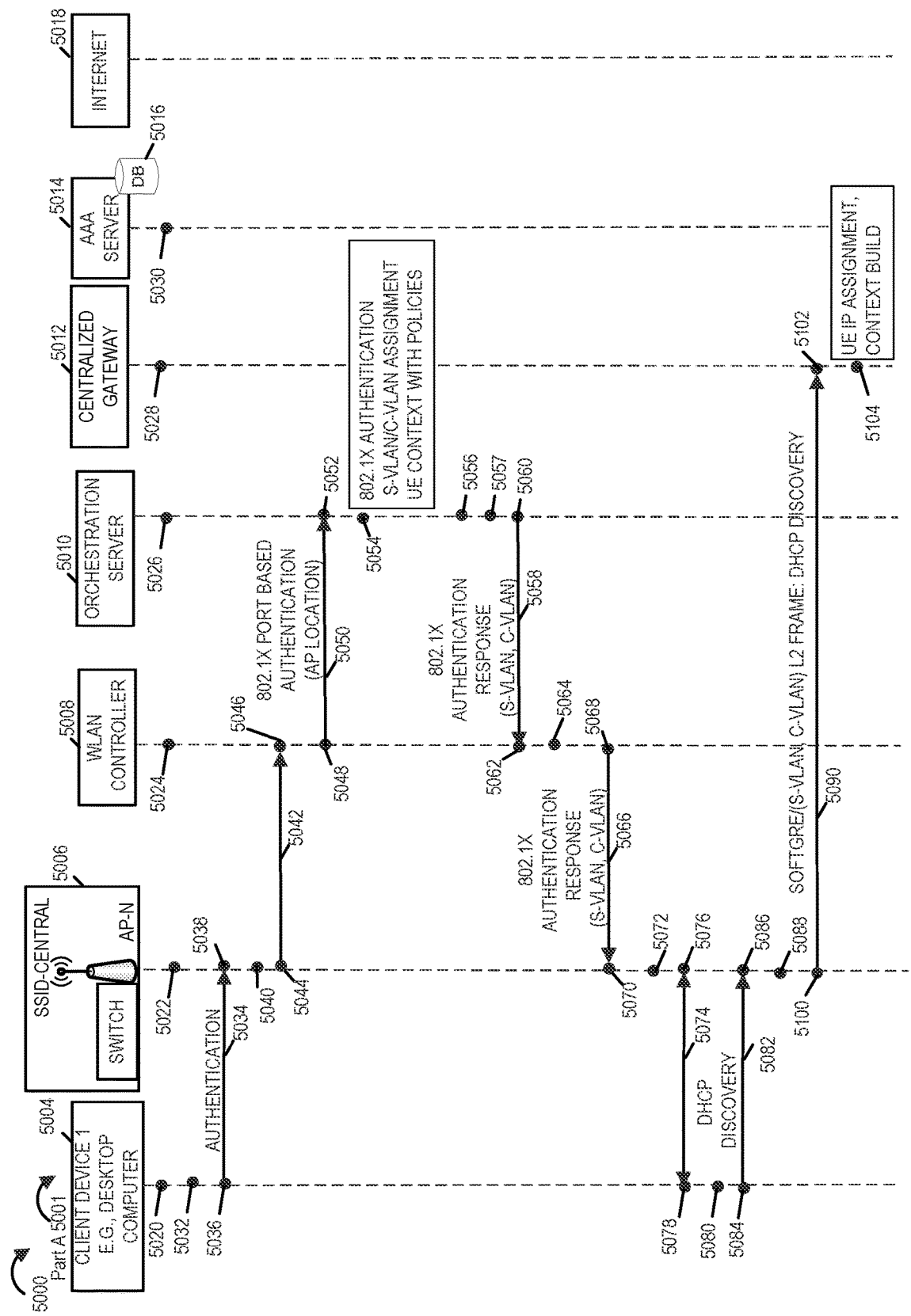
FIG. 15A is the first part of a signaling diagram which illustrates the steps and signaling of an exemplary method in accordance with an embodiment of the present invention.
Figures 15, 15A, 15B:
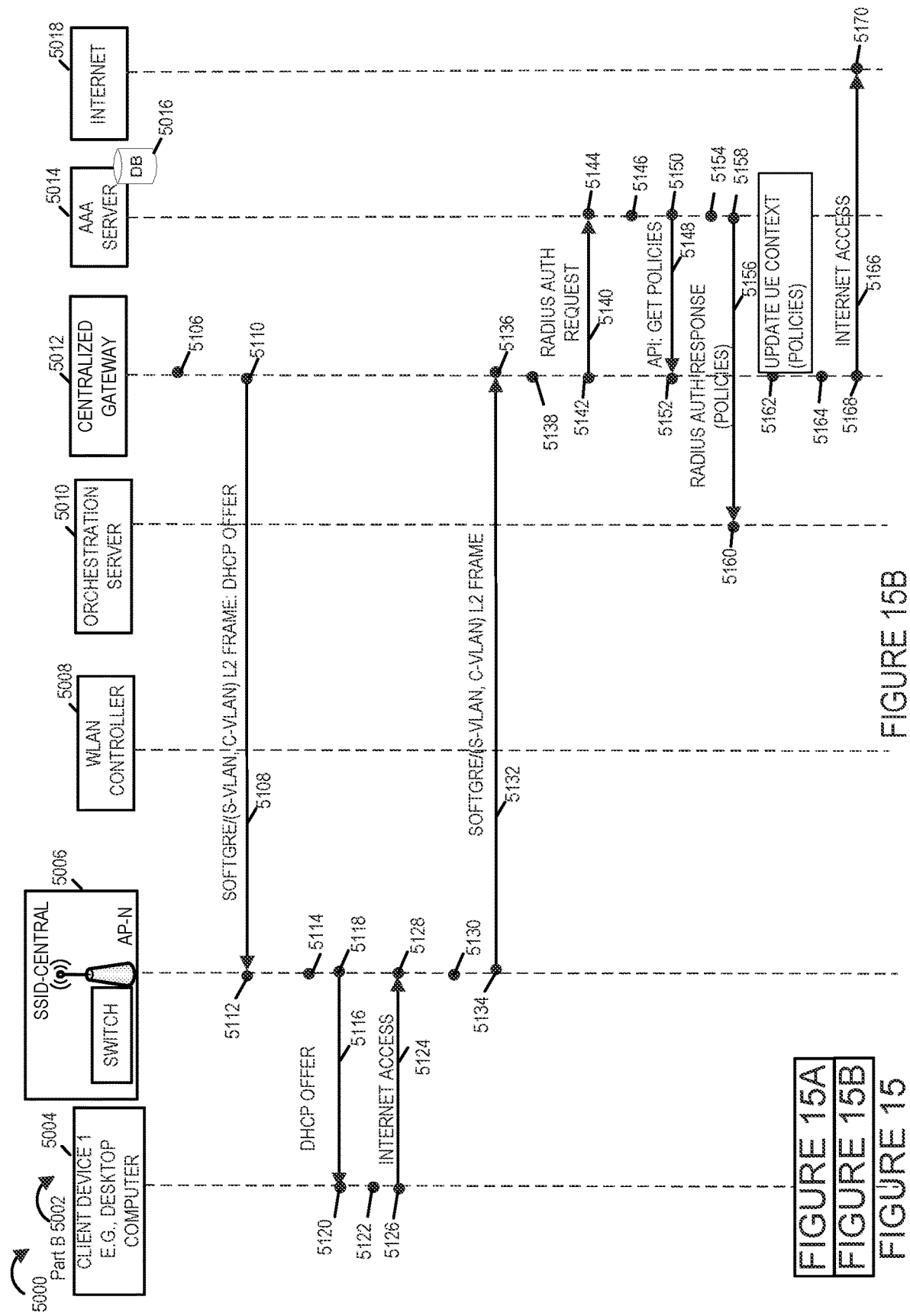
FIG. 15 illustrates the combination of FIG. 15A and FIG. 15B.
FIG. 15B is the second part of a signaling diagram which illustrates the steps and signaling of an exemplary method in accordance with an embodiment of the present invention.

FIG. 15 comprises FIG. 15A and FIG. 15B. FIG. 15A is the first part (Part A 5001) of a signaling diagram which illustrates the steps and signaling of an exemplary method 5000 in accordance with an embodiment of the present invention. FIG. 15B is the second part (Part B 5002) of a signaling diagram which illustrates the steps and signaling of an exemplary method 5000 in accordance with an embodiment of the present invention. The method 5000 illustrates the steps for implementing a tenant private area network within a larger network. In this example, a user equipment device (e.g., user equipment device 5004 which in this example is a desktop computer) is connected via a cable to an Access Point's physical port (AP-N 5006 physical port). While it will be readily understood that additional steps and signaling are performed in connection with communicating information, messages, and packets between devices, the method 5000 focuses on and discusses the steps and signaling for understanding the invention. Elements or steps with the same reference numbers used in different figures are the same or similar and those elements or steps will not be described in detail again. The signaling diagram/method 5000 is implemented by a system coupled to the Internet 5018. The system including a first client device 1 5004 which in this example is a desktop computer, an Access Point 5006, a WLAN controller 5008, an Orchestration Server 5010, a centralized gateway 5012, an AAA server 5014, and a database 5016 with the elements of the system coupled via communications links that allow for the exchange of information, signals and data between the elements. The client device 1 5004 is a wired device which in this example has been illustrated as a desktop computer 5004. In various embodiments, the desktop computer 4004 is implemented in accordance with UE 500 shown in FIG. 5 but is a wired device instead of a wireless device. The Access Point 5006 may be implemented in accordance with the Access Point 400 shown in FIG. 4. The WLAN controller 5008 may be, and in some embodiments is implemented in accordance with network device 600 shown in FIG. 6. The orchestration server 5010 may be, and in some embodiments is implemented in accordance with network device 600 shown in FIG. 6. The centralized gateway 5012 may be, and in some embodiments is, implemented in accordance with network equipment device 600 shown in FIG. 6. The AAA server 5014 is an Authentication, Authorization and Accounting server which may be implemented in accordance with the network equipment device 600 shown in FIG. 6. The AAA server 5014 is coupled to database 5016 which includes user authentication credentials, policies and accounting information. In some embodiments, the database 4016 is incorporated into and is part of the AAA server 5014.

The signaling diagram/method 5000 may be, and in some embodiments is, implemented using exemplary system 200 of FIG. 2. In such embodiments, the desktop computer 5004 is desktop computer 226 of system 200. The Access Point N (AP-N) 5006 is Access Point N 212 of system 200. The WLAN controller 5008 is WLAN controller 216 of system 200. The orchestration server 5010 is orchestrator 218 of system 200. The centralized gateway 5012 is centralized gateway 220 of system 200. The AAA server 5014 is AAA server 222 of system 200. The database 5016 is database 223 of system 200. However, it should be understood that the method 5000 is not limited to the exemplary system 200 and may be, and is used, on other systems and system configurations. The signaling diagram/method 5000 illustrates the signaling and steps for using VLAN stacking in a high density system to provide wireless services for a user who is a Personal Area Network (PAN) tenant. In the system 200, the UE 2 206 is a PAN tenant with its home service area being serviced by Access Point-N (AP-N) 212. The Personal Area Network devices including a desktop computer 226, an IPTV 228, switch 215, and cables 242, 244, and 246. The desktop computer being connected to the switch 215 via cable 242. The IPTV 228 being connected to switch 215 via cable 244. The switch being connected to the AP-N 212 via 246. The same steps of method 5000 can be used for other devices which are part of a personal area network. The implementation of VLAN stacking in this example provides for tenant users Private Area Network with differentiated traffic policies in large scale system with more than 4095 users.

The signaling diagram and method 5000 illustrates an exemplary call flow for a wired port client device plugged into or connected to one of the switch ports (or unused LAN ports) on an Access Point, that performs 802.1X Port based authentication. As described above in connection with the exemplary system 200, the orchestration server 5010 also referred to herein as an orchestrator 5010 is pre-provisioned with Access Point location inventory for the entire site being served by the site being served by the wireless network. In various embodiments, the Orchestration server 5010 includes memory in which a data structure, e.g., a table or linked list, includes a mapping of the location of each AP in the system and its location within the network site, e.g., campus. In this example, the site is deployed with secured WLAN services (Per user Pre-Shared Key (PSK) client authentication and 802.1X authentication. 802.1X authentication is a network authentication protocol that opens ports (e.g., physical or virtual ports) for network access when an organization authenticates a user's identity and authorizes them for access to the network. The user's identity is determined based on their credentials or certificate, which is confirmed by the RADIUS server. In this example the Orchestration Server 5010 authenticates user devices. The AP location mapping information also includes the details about end users home service area and visitor service area. Home Service Area (HSA) is the area where an end user device is able to associate with the home wireless network and is reachable to the private area network. The Visitor Service Area is an area of the site in which the end user device is able to associate with an AP of the network but in which different policies (e.g., access and bandwidth policies) are applied, i.e., visitor policies. In this example, the home service area includes a personal area network.

The AP-N 5006 is configured with site wide common WLAN supporting per user PSK (or private PSK) and 802.1X for supported client devices connected via wired port connections to the AP-N 5006.

The wired client device 5004 is in this example a desktop computer.

During the 802.1X port based authentication procedure, AP-N 5006 inserts the port specific AP location (i.e., AP-N 5006) information and Personal Area Network credentials matching the tenant's account into an Authentication Request message which may be, and in some embodiments is implemented as an Access Request message, which is then sent to an authentication network entity (e.g., the orchestration server 5010 or the AAA server 5014.

Upon successful authentication by the network authentication entity (e.g., the orchestration server 5010 or AAA server 5014), the authentication entity (e.g., the orchestration server 5010 or AAA server 5014) retrieves the VLAN stacking information previously assigned such as for example outer VLAN ID (also referred to as S-VLAN: Service Provider VLAN) and inner VLAN ID (also referred to as C-VLAN: Customer VLAN). The authentication entity which in this example is the orchestration server 5010 also pre-compiles the polices for the client device 5004 based on location information and pre-provisioned details (e.g., access policies based on location within the network). In this case, policies may for example enforce restricted access rules, and/or bandwidth constraints, e.g., lower bandwidth.

When the authentication is successful and has been completed, AP-N 5006 bridges the wired L2 frames received from the client device 1 5004 (e.g., to wired network and vice-versa and implements the VLAN stacking. For upstream traffic received from the client device 1 5004, the AP-N 5006 encapsulates the L2 frame with C-VLAN and S-VLAN assigned for user 1 which is the tenant of the private area network and who is operating client device 1 5004. The modified frame is then encapsulated in tunneling protocols such as, for example Soft Generic Routing Encapsulation (Soft-GRE) (Layer 2 Ethernet over GRE).

The centralized gateway 5012 during the Dynamic Host Configuration Protocol (DHCP) discovery procedures builds a user context or record with client MAC (for the client device 1 5004), dynamically assigned S-VLAN and C-VLAN values (e.g., IDs) and assigns an IP address to the client device 1 5004 from the respective IP address assignment pool (e.g., IPv4 or IPv6 assignment pools).

Upon detection of the first packet from the client device 1 5004, the centralized gateway 5012 performs an authentication procedure and retrieves the user specific policies such as, for example, location specific access control and bandwidth policies which include the peer-to-peer communication policies rendered by the orchestration server 5010 through the AAA server 5014. The user authentication information and policies being stored in and retrieved from the database 5016. For example, when the retrieved policies indicate the client device 1 is authorized to access the internet, the first packet is sent out over the Internet.

A description of the steps and signaling of method 5000 will now be described. The method begins in step start step 5020 Part A 5001 of method 5000 shown on FIG. 15A. Operation proceeds from start step 5020 to step 5032.

In step 5022, Access Point-N (AP-N) 5006 is provisioned, initialized and begins operating. The AP-N 5006 is configured with site wide common WLAN supporting Per user PSK (or Private-PSK) and 802.1X. This includes the AP-N 5006 broadcasting the SSID name. In step 5024, WLAN controller 5008 is operating to control the Access Points in the system. In step 5026, the orchestration server 5010 which has been pre-provisioned, initialized and is currently operating has already created a context or record for user 1 which is the tenant operating the personal area network of which client device 1 is a part. This context or record including VLAN stacking information which it previously assigned to user 1 (e.g., S-VLAN information such as S-VLAN ID, C-VLAN information such as C-VLAN ID and policy information). The orchestration server 5010 was pre-provisioned to include information on each of the Access Points in the network including the location of all Access Points in the wireless network as well as with authentication information (e.g., credential information) for subscribers including user 1 which is operating the client device 1 5004. The orchestration server 5010 is also pre-provisioned with policies to be implemented in connection with each of the subscribers (e.g., location based policies regarding access such as ability to access home service area network and reachability to private area network and policies for visitor service areas). In step 5028, the centralized gateway 5012 is operating and providing connections for devices to the Internet 5018. In step 5030, the AAA server 5014 which has been pre-provisioned with the credential information for subscribers and policies for subscribers (e.g., location based access policies) is currently operating. In some embodiments, the credential information and policy information is stored in database 5016.

In step 5032, the client device 1 5004 which is connected via a cable to a physical switch port or LAN port on AP-N 5006 generates authentication message 5034. AP-N 5006 supports the personal area network of tenant 1 also referred to as user 1.

Operation proceeds from step 5032 to step 5036.

In step 5036, client device 1 5004 generates and transmits message 5034 to AP-N 5006. The message 5034 is an authentication message including personal area network credentials as well as the user equipment device identifier such as for example MAC address for client device 1 5004. Operation proceeds from step 5036 to step 5038.

In step 5038, AP-N 5006 receives the message 5034 via its wired physical switch or LAN port. Operation proceeds from step 5038 to step 5040. In step 5040, the AP-N 5006 processes the message 5034 and generates authentication message 5042. Authentication message 5042 is an 802.1X port based authentication message. Authentication message 5042 is based on message 5034 and includes the authentication information received from client device 1 5004. In some embodiments, the AP-N 5006 is programming with the authentication information for tenant 1 also referred to as user 1 so that the authentication information is included by the AP-N 5006 instead of having to be received from the client device 1. Authentication message 5042 also includes location information for AP-N 5006. In some embodiments, message 5042 is an Access Request message. Operation proceeds from step 5040 to step 5044.

In step 5044, the AP-N 5006 transmits the 802.1X port based authentication message 5042 to WLAN controller 5008. Operation proceeds from step 5044 to step 5046.

In step 5046, WLAN controller 5008 receives and processes authentication message 5042. Operation proceeds from step 5046 to step 5048.

In step 5048, WLAN controller 5008 generates message 5050 based on message 5042 and transmits the message 5050 to orchestration server 5010. The message 5050 includes the authentication information received from client device 1 5004 and the AP location information from AP-N 5006. In some embodiments, the WLAN controller 5008 in step 5048 forwards received message 5042 to the orchestration server 5010 instead of generating message 5050 based on message 5042. Operation proceeds from step 5048 to step 5052.

In step 5052, the orchestration server 5010 receives message 5050 from WLAN controller 5008. Operation proceeds from step 5052 to step 5054.

In step 5054, the orchestration server 5010 processes the received message 5050. Processing the received message includes using the authentication information for the client device 1 (i.e., the personal area network credentials for the tenant's account (i.e., user 1's account) to authentic client device 1 5004 by comparing the received information (e.g., personal area network credentials for the tenant's account) to information stored at the orchestration server 5010. In this example, the orchestration server 5010 has a UE context already generated and stored at the orchestration server 5010 and hence retrieves the UE context and location based policies. The orchestration server 5010 determines the policies to be applied based on the AP-N 5006 location information included in the message 5050. The retrieved UE context also includes the previously dynamically assigned VLAN stacking information for user 1 which is the tenant operating client device 5004. In this example an outer VLAN ID (also referred to as a S-VLAN ID (Service Provider VLAN ID)) and inner VLAN ID (also referred to as a C-VLAN ID (Customer VLAN ID)). The orchestration server 5010 also pre-compiles the policies (e.g., access and bandwidth policies) based on: (i) the AP-N location information included in the message 4050 and (ii) operator pre-provisioned details and/or information such as policies for the client device 1 5004 regarding allowed access and amount of bandwidth for client device 1 5004 based on client device 1 5004 location derived from the location of AP-N 4006. The stacked VLAN information may, and in some embodiments does, include policy information such as for example Quality of Service policy information including access and/or bandwidth policy information which are location based policies in this example.

In some embodiments, this UE context information is also communicated to the AAA server 5014 and/or the centralized gateway 5012. In some embodiments, the various operations discussed in connection with step 5054 are performed as sub-steps or separate independent steps. While in this example, client device 1 5004 was successfully authenticated by the orchestration server 5010, when the orchestration server 5010 is not able to authenticate a user equipment device no dynamic VLAN assignment is made but instead a response including an authentication rejection or access denial message or in some instances a challenge is generated and sent to the client device 1 5004. In cases where a dynamic VLAN stacking assignment has not been previously made the orchestration server 5010 in step 504 generates makes a dynamic VLAN stacking assignment and creates a UE context with the policies to be applied as previously described in connection with step 3054 of method 3000. Operation proceeds from step 5054 to step 5056.

In step 5056, the orchestration server 5010 generates authentication response message 4058 and includes an indication that the authentication was successful and includes the previously dynamically assigned stacked VLAN information (e.g., S-VLAN ID, C-VLAN ID and in some embodiments policy information). In some embodiments, the authentication response message is an Access-Accept message. In this example the network security mechanism used for securing the network is 802.1X authentication and the authentication response message 4058 is an 802.1X authentication response message. Operation proceeds from step 5056 to step 5060.

In step 5057, the orchestration server 5010 generates and/or determines policy rules (e.g., location based policy rules such as access control and bandwidth usage policies) to be applied to communications for the first user equipment, stores a copy of the policy rules for the user equipment device in generated UE context, and communicates the policy rules and/or policies, user equipment device identification information and assigned stacked VLAN information to one or more additional network equipment devices, e.g., the AAA server 5014, the centralized gateway 5014, WLAN controller 5008) for implementation. The additional network equipment devices, (e.g., AAA server 5014, centralized gateway 5012, and WLAN controller 5008) receives the policy rules and/or policies, stacked VLAN information and user equipment device identification information and implements the policies and/or policy rules in connection with communications for the first user equipment device as necessary. For example, the AAA server 5014 stores the received policy rules, policies, dynamically assigned stacked VLAN information in database 5016 for implementation as discussed below in connection with step 4146. Operation proceeds from step 5057 to step 5060.

In step 5060, the orchestration server 5010 transmits the generated authentication response message 5058 to the WLAN controller 5008. Operation proceeds from step 5060 to step 5062.

In step 5062, the WLAN controller 5008 receives the authentication response message 5058. Operation proceeds from step 5062 to step S064. In step 5064, the WLAN controller 5008 generates authentication response message 5066 based on authentication response message 5058. Authentication response message 5066 including the indication that that authentication was successful and the previously dynamically assigned VLAN stacking information. Operation proceeds from step 5064 to step 5068.

In step 5068, the WLAN controller 5008 transmits the authentication response message 5066 to AP-N 5006. In some embodiments, the WLAN controller 5008 instead of generating message 5066 forwards message 5058 to the AP-N 5006. Operation proceeds from step 5068 to step 5070.

In step 5070, the AP-N 5006 receives the authentication response message 4066. Operation proceeds from step 5070 to step 5072.

In step 5072, AP-N 5006 processes the received authentication response message 5066. This includes determining that the authentication was successful based on the information contained in the authentication response message 5066. In response to determining that the authentication was successful, the AP-N 5006 extracts the dynamically assigned VLAN stacking information (e.g., S-VLAN ID, C-VLAN ID, policy information) included in the response message 5066. The AP N 5006 uses this information to bridge the wired frames received at its port from the client device 1 to the wired network and vice-versa and implements the VLAN stacking for L2 frames in connection with the client device 1 5004. For upstream traffic received from the client device 1 5004, AP N 5006 encapsulates L2 frames with the dynamically assigned S-VLAN and C-VLAN information (e.g., S-VLAN ID and C-VLAN ID and optionally included policy information). The modified frames will then be encapsulated in tunneling protocols such as Soft GRE (Ethernet over GRE). S-VLAN ID and C-VLAN ID will be used by the AP-N 5006 to identify information and/or data communicated to the client device 1 5004 from the wired network. Operation proceeds from step 5072 to step 5076.

In steps 5076, AP-N 4006 initiates the 4-way handshake procedure with client device 1 5004. During the 4-way handshake procedure 4 messages 4074 are exchanged between the AP-N 5006 (authenticator) and the client device 1 5004 (supplicant) to generate encryption keys which can be used to encrypt actual data sent over cable and/or wired path between client device 1 5004 and AP-N 5006. Upon the completion of the 4-way handshake procedure implemented in steps 5076 and 5078, operation proceeds from step 5078 to step 5080. Data/messages/frames communicated between the client device 1 5004 and AP-N 5006 will now be encrypted using the encryption keys resulting from the 4-way handshake procedure.

In step 5080, client device 1 5004 generates Dynamic Host Configuration Protocol (DHCP) discovery message 5082 to obtain an IP address to utilize for IP network communications. DHCP is a network protocol that is used to configure network devices to communicate on an Internet Protocol network. A DHCP client which in this example is the client device 1 5004 uses the DHCP protocol to acquire configuration information, such as for example an IP address, a default route, and one or more Domain Name System (DNS) server addresses from a DHCP server. In this example, the centralized gateway 5012 performs the functions of a DHCP server. The DHCP discovery message 5082 includes the MAC address for client device 1 5004. Operation proceeds from step 5080 to step 5084. In step 5084, client device 1 5004 transmits the DHCP discovery message 5082 to the AP-N 5006 over the communications link between client device 1 5004 and AP-N 5006. Operation proceeds from step 5084 to step 5086.

In step 5086, the DHCP discovery message 5082 is received by AP-N 5006 from client device 1 5004. Operation proceeds from step 5086 to step 5088.

In step 5088, AP-N 5006 encapsulates the discovery message which is an L2 frame format using SOFT GRE and implements VLAN stacking using the dynamically assigned S-VLAN and C-VLAN information (e.g., S-VLAN ID and C-VLAN ID). In step 5088, the SOFT GRE/(S-VLAN, C-VLAN) L2 Frame: DHCP discovery message 5090 is generated in response to receiving DHCP discovery message 5082 and utilizes information from the DHCP discovery message 5082 to generate DHCP discovery message 5090. As described in further detail below FIG. 19 shows an exemplary message 9030 with an Ethernet frame including S-VLAN and C-VLAN stacking information in the form of two VLAN headers. Operation proceeds from step 5088 to step 5100. In step 5100, AP-N 5006 transmits the SOFT GRE/(S-VLAN, C-VLAN) L2 Frame: DHCP discovery to the Centralized Gateway 5012. Operation proceeds from step 5100 to step 5102.

In step 5102, the Centralized Gateway 5012 receives the DHCP discovery message 5090 from AP-N 5006. Operation proceeds from step 5102 to step S104.

In step 5104, the Centralized Gateway 5012 assigns an Internet Protocol address (e.g., IP-2 address) to UE 1 5004 and builds a UE context with client device 1's MAC address, S-VLAN ID and C-VLAN ID. The IP address is assigned from a pool of IP addresses (e.g., a pool of IPV4 addresses if the client device 1 5004 is an IPV4 device or a pool of IPV6 addresses if client device 1 5004 is a IPv6 device). client device 1 5004's MAC address being included in the DHCP discovery messages 5082 and 5090. Operation proceeds from step 5104 to step 5106 of Part B 5002 of method 5000 shown on FIG. 15B.

In step 5106, the Centralized Gateway 5012 generates SOFT GRE/S-VLAN ID, C-VLAN ID) L2 frame: DHCP offer message 5108 which includes the stacked VLAN information (the S-VLAN ID and C-VLAN ID) and a DHCP offer including the assigned IP address. Operation proceeds from step 5106 to step 5110.

In step 5110, the Centralized Gateway 5012 transmits the DHCP offer message 5108 to the AP-N 5006 in response to DHCP discovery message 5090. Operation proceeds from step 5110 to step 5112.

In step 5112, the AP-N 5006 receives the DHCP discovery message 5108 from the Centralized Gateway 5012. Operation proceeds from step 4112 to step 5114.

In step 5114, AP-N 5006 de-capsulates the SOFT GRE (S-VLAN, C-VLAN) L2 FRAME: DHCP offer 5108 and determines from the S-VLAN ID and C-VLAN ID that the DHCP offer 5108 is directed to client device 1 5004 based on the stacked VLAN information (i.e., the S-VLAN ID and C-VLAN ID) which uniquely identifies the client device 1 5004. Operation proceeds from step 5114 to step 5118.

In step 5118, AP-N 5006 generates DCHP offer message 5116 and transmits it to the client device 1 5004 via the AP-N 5006 port to which it is connected. The DCHP offer message 5116 being based on the DHCP offer message 5108 and including IP address assigned by the Centralized Gateway 5012. Operation proceeds from step 5118 to step 5120.

In step 5120, client device 1 5004 receives the DHCP offer message 5116 from AP-N 5006 and processes it determining the IP address assigned by the Centralized Gateway 5012. Operation proceeds from step 5120 to step 5122.

In step 5122, client device 1 5004 generates Internet Access message/frame 5124 in which client device 1 5004 is sending packets of data to a destination device via the Internet. Operation proceeds from step 5122 to step 5126.

In step 5126, the client device 1 5004 transmits the Internet Access message 5124 to AP-N 5006. Operation proceeds from step 5126 to step 5128.

In step 5128, AP-N 5006 receives the Internet Access message 5124 from client device 1 5004. Operation proceeds from step 5128 to step 5130.

In step 5130, AP-N 5006 generates SOFT GRE/(S-VLAN, C-VLAN) L2 frame message 5132 based on the received message 5124 and dynamically assigned VLAN stacking information received from the orchestration server 5010 for client device 1 5004. The AP-N 5006 provides a bridging function taking the upstream message/frame 5124 received from the client device 1 5004 on the AP-N 5006 port and modifying the message/frame 5124 by inserting the dynamically assigned S-VLAN ID and C-VLAN ID for client device 1 5004 into an Ethernet frame for transmission on a wired cable (Ethernet cable) on the network. The modified frame being encapsulated in the tunneling protocol Soft GRE. Operation proceeds from step 5130 to step 5134.

In step 5134, the AP-N 5006 completes the bridging operation by transmitting the SoftGRE (S-VLAN, C-VLAN) L2 message/frame 5132 to the Centralized Gateway 5012 over a wired network connection. Operation proceeds from step 5134 to step 5136.

In step 5136, the Centralized Gateway 5012 receives the message/frame 5132. Operation proceeds from step 5136 to step 5138.

In step 5138, the Centralized Gateway 5012 determines that the message/frame 5132 is from client device 1 5004 based on the S-VLAN ID and C-VLAN ID included in the message/frame 5132. In some embodiments, the Centralized Gateway 5012 also utilizes the MAC address in determining that message/frame 5132 is from client device 1 5004. In step 5138, the Centralized Gateway 5012 detects the first packet in the message/frame 5132 and initiates an authentication procedure. Operation proceeds from 5138 to step 5142.

In step 5142, the Centralized Gateway 5012 generates and transmits Radius authentication request 5140 to the AAA server 5014. In some embodiments, the Radius authentication request 5140 includes the S-VLAN ID, C-VLAN ID, and in some embodiments the MAC address for client device 1 5004. Operation proceeds from step 5142 to step 5144.

In step 5144, the AAA server 5014 receives the Radius Authentication Request 5140 from the Centralized Gateway 5012. Operation proceeds from 5144 to step 5146.

In step 5146, the AAA server 5014 retrieves the user specific policies and/or policy rules such as for example location specific access control and bandwidth policies or policy rules for the client device 1 5004. This includes peer-peer communication policies or policy rules rendered by the orchestration server 5010 through the AAA server 5014 for example by the orchestration server 5010 communicating the policies and/or policy rules to AAA server 5014. In some embodiments, the AAA server 5014 retrieves these policies and/or policy rules from the database 5016 where the policies and/or policy rules are stored. In this example, the policies and policy rules are location based polices for client device 1 5004. Operation proceeds from step 5146 to steps 5150 and 5154.

In step 5150, the AAA server 5014 generates and transmits the retrieved policies (e.g., location specific access control policies and bandwidth polices) to the centralized gateway 5012 in message 5148. In some embodiments, the policies are obtained by the centralized gateway 5012 using an Application Programming Specific Interface. These policies are provided in response to the Radius Authentication Request 5140. Operation proceeds from step 5150 to step 5152. In step 5152, the Centralized Gateway 5012 receives the message 5148 with the policies (e.g., location specific access control policies and bandwidth policies) to be applied to communications from the client device 1 5004. Operation proceeds from step 5152 to step 5162.

In step 5154, the AAA server 5014 generates message 5156 which is a Radius authentication response message including the retrieved polices for client device 1 5004. Operation proceeds from step 5154 to step 5158. In step 5158, the AAA server 5014 transmits message 5156 to the orchestration server 5010. Operation proceeds from step 5158 to step 5160.

In step 5160, the orchestration server 5010 receives the message 5156, extracts the visitor policies retrieved from the AAA server 5014 for client device 1 5004 and updates policies stored in the UE context and/or record it has for the client device 1 5004.

In step 5162, the centralized gateway 5012 updates the UE context or record it generated or built for client device 1 5004 with the policies received from the AAA server 5014. Operation proceeds from step 5162 to step 5164.

In step 5164, the centralized gateway 5012 applies the policies received from the AAA server 5014 to the communications from the client device 1 5004 with respect to message/frame 5132. In this example, the client device 1 5004 has Internet access but bandwidth is limited/constrained by the retrieved policies. The Centralized Gateway 5012 generates internet access message 5166 based on message 5132 which includes data transmitted in message 5124. Operation proceeds from step 5164 to step 5168.

In step 5168, the centralized gateway 5012 transmits the generated message 5166 out onto Internet 5018 toward its destination. The centralized gateway 5012 also implements any bandwidth policies (e.g., bandwidth constraints for client device 1 5004 transmission) provided by the AAA server 5014 in the message 5148. Operation proceeds from step 5168 to step 5170 where the message 5166 is communicated over the Internet 5018.

The operation of method 5000 continues with the AP-N 5006 providing services to client device 1 5004 using VLAN stacking with the dynamically assigned S-VLAN ID and C-VLAN ID provided by the orchestration server 5010 to transmit and receive data packets via the centralized gateway 5012.

In this example, it should be noted that the when the AP-N 5006 is transmitting messages received from the client device 1 5004 onto the wired network to various network equipment devices and/or out onto the Internet, the messages are typically passing through network switches. The VLAN stacking information included in the messages allows for the messages to be identified by the AP-N 5006 and the network equipment device(s) with which it is communicating. For example, when the method 5000 is applied to system 200 the messages/frames are transmitted from AP-N 212 to other network equipment device such as orchestrator 218, WLAN Controller 216, Centralized Gateway 220 via switch 214.

While the exemplary method 5000 has been explained using 802.1X port authentication, the method 5000 is also applicable to other types of authentication.

In various embodiments, the Authentication Request messages 5042 and/or 5050 are implemented as described in Access-Request message 316 of FIG. 3. In some embodiments, the AP-N 5006 location information is provided in the message format and field(s) as shown in FIG. 12. In various embodiments, the Authentication Response messages 5058 and/or 5066 are implemented as described in Access-Accept message 322 of FIG. 3 with the previously dynamically assigned S-VLAN information and C-VLAN information being included in vendor specific attributes of the Access-Accept message 322 for example as shown in fields 1152 and 1154 of S-VLAN and C-VLAN using Radius Vendor Specific Attributes diagram 1150 shown in FIG. 11. The S-VLAN and C-VLAN information including a previously dynamically assigned S-VLAN ID and C-VLAN ID, the combination being uniquely assigned to client device 1 5004.

In another embodiment of the present invention instead of using RADIUS Vendor-Specific Attributes to communicate the dynamically assigned VLAN stacking tags (e.g., S-VLAN/C-VLAN information), a multi-occurrence of Tunnel attributes in a Access Accept message (e.g., RADIUS Access Accept message) is used to communicate the dynamically assigned VLAN stacking tags as described in detail below in connection with FIG. 21.

Figure 16A:
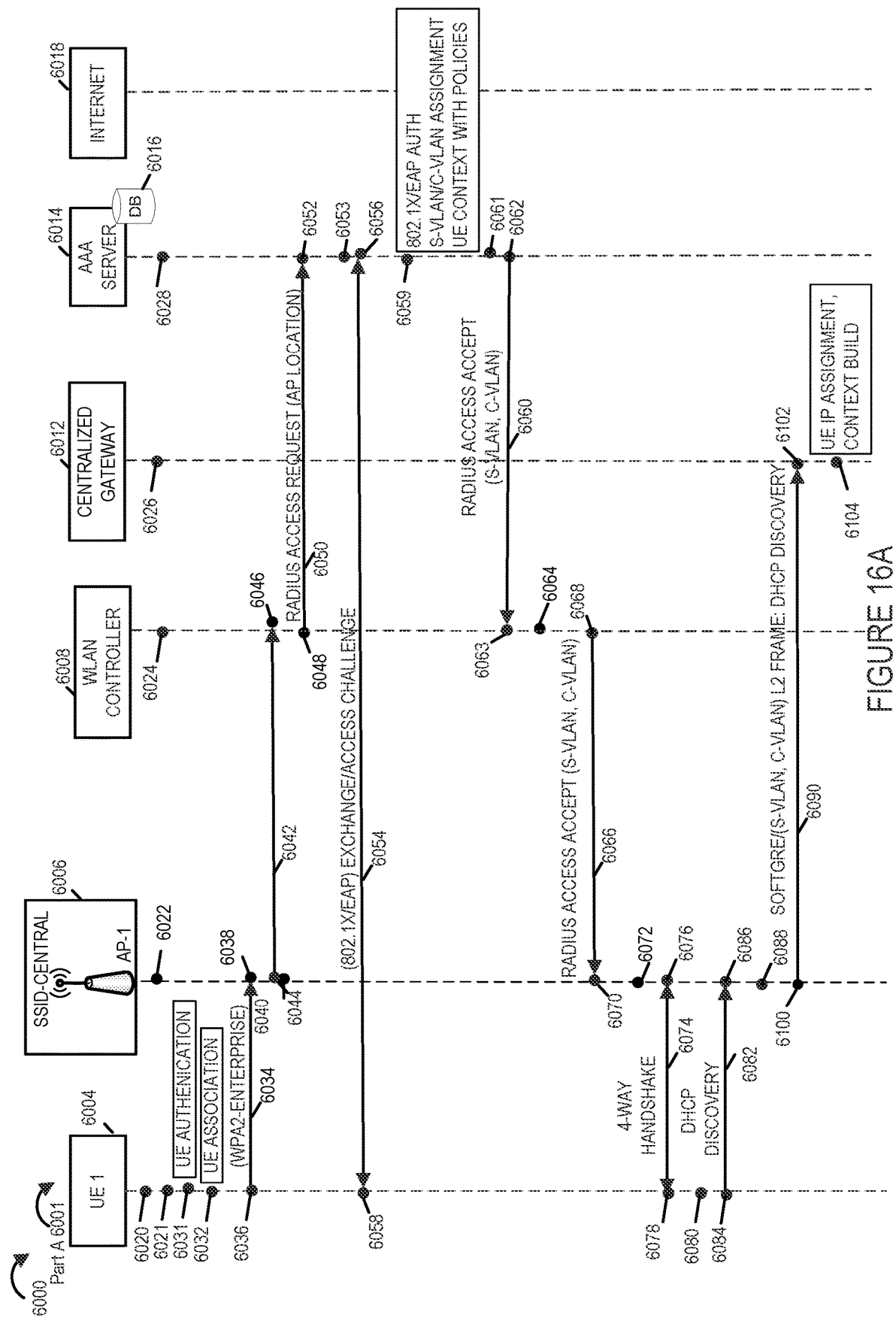
FIG. 16A is the first part of a signaling diagram which illustrates the steps and signaling of an exemplary method in accordance with an embodiment of the present invention.
Figures 16, 16A, 16B:
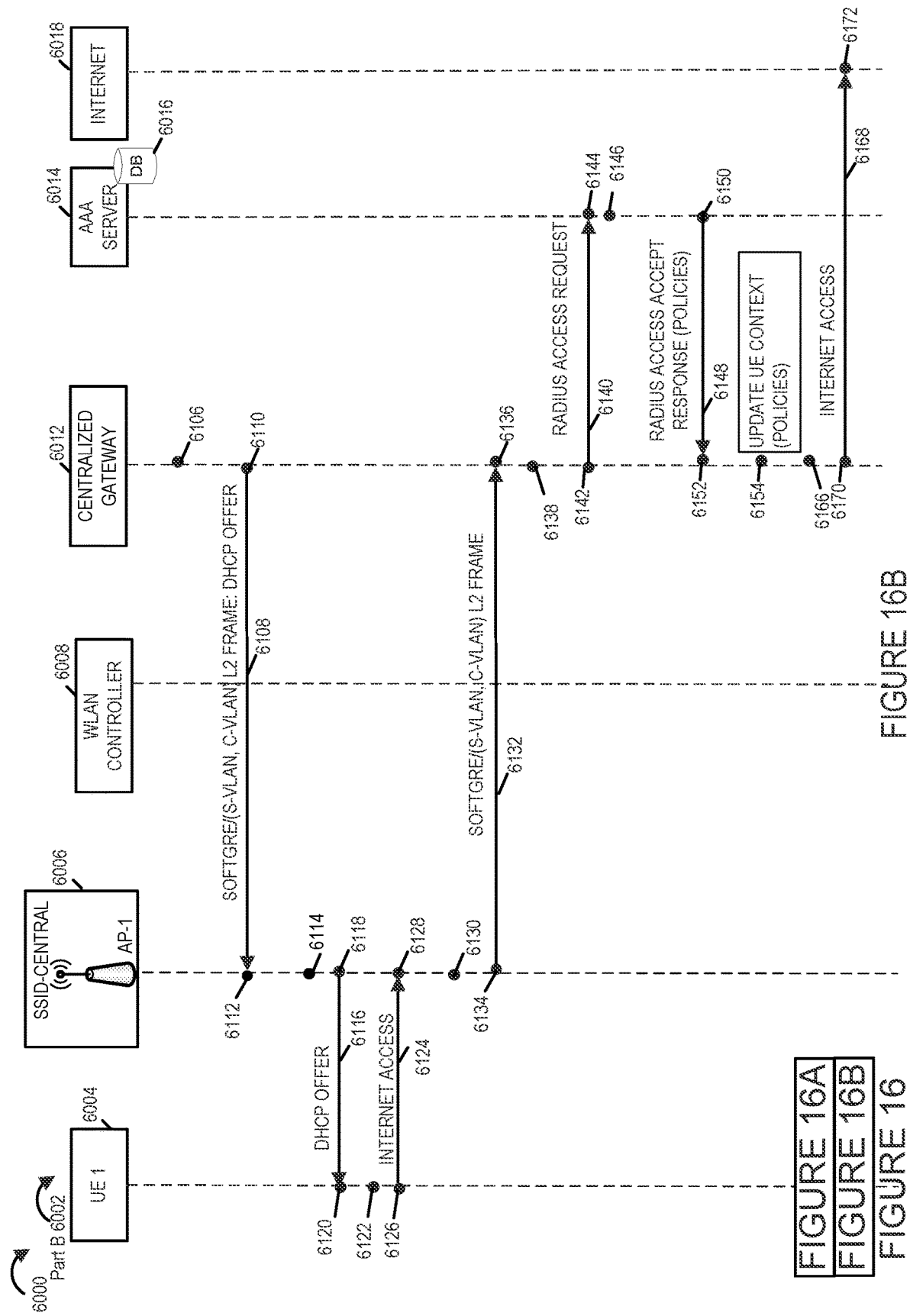
FIG. 16 illustrates the combination of FIG. 16A and FIG. 16B.
FIG. 16B is the second part of a signaling diagram which illustrates the steps and signaling of an exemplary method in accordance with an embodiment of the present invention.

FIG. 16 comprises FIG. 16A and FIG. 16B. FIG. 16A is the first part (Part A 6001) of a signaling diagram which illustrates the steps and signaling of an exemplary method 6000 in accordance with an embodiment of the present invention. FIG. 16B is the second part (Part B 6002) of a signaling diagram which illustrates the steps and signaling of an exemplary method 6000 in accordance with an embodiment of the present invention. The method 6000 illustrates the steps for implementing a VLAN stacking for a user equipment (UE) association WPA2-Entrpirse/802.1X Authentication. While it will be readily understood that additional steps and signaling are performed in connection with communicating information, messages, and packets between devices, the method 6000 focuses on and discusses the steps and signaling for understanding the invention. Elements or steps with the same reference numbers used in different figures are the same or similar and those elements or steps will not be described in detail again. The signaling diagram/method 6000 is implemented by a system coupled to the Internet 6018. The system including a first UE 1 6004, an Access Point 6006, a WLAN controller 6008, a centralized gateway 6012, an AAA server 6014, and a database 6016 with the elements of the system coupled via communications links that allow for the exchange of information, signals and data between the elements. The UE 1 6004 is a wireless device, e.g., a mobile device such as by way of example a mobile phone, smart phone, laptop, tablet. In various embodiments, the UE 1 6004 is implemented in accordance with UE 500 shown in FIG. 5. The Access Point 6006 may be implemented in accordance with the Access Point shown in FIG. 4. The WLAN controller 6008 may be, and in some embodiments is implemented in accordance with network device 600 shown in FIG. 6. The centralized gateway 6012 may be, and in some embodiments is, implemented in accordance with network equipment device 600 shown in FIG. 6. The AAA server 6014 is an Authentication, Authorization and Accounting server which may be implemented in accordance with the network equipment device 600 shown in FIG. 6. The AAA server 6014 is coupled to database 6016 which includes user authentication credentials, policies and accounting information. In some embodiments, the database 6016 is incorporated into and is part of the AAA server 6014.

The signaling diagram/method 6000 may be, and in some embodiments is, implemented using exemplary system 200 of FIG. 2. In such embodiments, the UE 1 6004 is UE 1 204 of system 200 before it moves along path 234. The Access Point 1 (AP-1) 6006 is Access Point 1 210 of system 200. The WLAN controller 6008 is WLAN controller 216 of system 200. The centralized gateway 6012 is centralized gateway 220 of system 200. The AAA server 6014 is AAA server 222 of system 200. The database 6016 is database 223 of system 200. However, it should be understood that the method 6000 is not limited to the exemplary system 200 and may be, and is used, on other systems and system configurations. The signaling diagram/method 6000 illustrates the signaling and steps for using VLAN stacking in a high density system to provide wireless services for a user equipment device. The same steps can be used for other user equipment devices. The implementation of VLAN stacking allows for system scaling of user equipment devices which are supported above 4095 user equipment devices.

The signaling diagram and method 6000 illustrate an exemplary call flow for UE 1 6004 association to SSID in home zone using VLAN stacking in accordance with an embodiment of the present invention. In some embodiments, the AAA server 6014 is pre-provisioned with Access Point location inventory for the entire site being served by the site being served by the wireless network. In various embodiments, the AAA server 6014 includes memory in which a data structure, e.g., a table or linked list, includes a mapping of the location of each AP in the system and its location within the network site, e.g., campus. In this example, the site is deployed with secured WLAN services (WPA2-Enterprise/802.1X authentication). 802.1X authentication is a network authentication protocol that opens ports (e.g., physical or virtual ports) for network access when an organization authenticates a user's identity and authorizes them for access to the network. The user's identity is determined based on their credentials or certificate, which is confirmed by the RADIUS server. In this example the AAA server 6014 authenticates user devices. In various embodiments, the credentials or certificate information are contained in the database 6016. The AP location mapping information also includes the details about end users home service area. Home Service Area (HSA) is the area where an end user device is able to associate with the home wireless network and is reachable to the private area network.

The AP-1 6006 is configured with site wide common WLAN supporting per user 802.1X authentication.

The user equipment device 1 (UE 1 6004) is a mobile device pre-provisioned with the required credentials to connect to the system SSID (SSID-Central in the example) and use Internet Access.

UE 1 6004 is in the coverage area of AP-1 6006 HSA serving SSID: <Site Wide Common SSID>.

UE 1 6004 performs the conventional 802.11 open system authentication with AP 1 6006.

Once the UE 1 6004 receives a response to its Association request to AP 1 6006 and receives an association ID, then network authentication using WPA2-Enterprise/802.1X begins. The AAA server 6014 assigns VLAN stacking information to the UE 1 6004 after the successful completion of the 802.1X/EAP exchange/access challenge authentication as discussed below. The AAA server 6014 then transmits the assignment information to the Access Point 6006 which uses it when performing bridging operations for communications exchanged with UE 1 6004.

A description of the steps and signaling of method 6000 will now be described. The method begins in step start step 6020 Part A 6001 of method 6000 shown on FIG. 16A. Operation proceeds from start step 6020 to step 6021. In step 6021, UE 1 6004 is pre-provisioned with credentials for connecting to wireless network SSID-Central and obtaining internet access, is initialized and begins operating. In step 6022, Access Point-1 (AP-1) 6006 is provisioned, initialized and begins operating. The AP-1 6006 is configured with site wide common WLAN supporting WPA2-Enterprise 802.1X authentication. This includes the AP-1 6006 broadcasting the SSID name. In step 6024, WLAN controller 6008 is initialized and begins operating. In step 6028, the AAA server 6014 is pre-provisioned, initialized and begins operating. In step 6026, the centralized gateway 6012 is initialized and begins operating. The AAA server 6014 is pre-provisioned to include information on each of the Access Points in the network including the location of all Access Points in the wireless network as well as with authentication information (e.g., credential information) for subscribers including user 1 which is operating the UE 1 6004. The AAA server 6014 is pre-provisioned with policies to be implemented in connection with each of the subscribers (e.g., location based policies regarding access such as ability to access home service area network and reachability to private area network. In some embodiments, the credential information and policy information is stored in database 6016.

In step 6031, the UE 1 6004 is in the coverage area of AP-1 6006 in its Home Service Area and receives the broadcast SSID name and performs open system authentication. This includes an exchange of messages with AP-1 6006. Operation proceeds from step 6031 to step 6032.

In step 6032, the UE 1 6004 associates with AP-1 6006. This includes exchanging association messages with AP-1 6006. The UE 1 6004 receives an Association Id from the AP 6006. The UE 1 6004 is now in an authenticated and associated state pending security mechanisms (e.g., 802.1X Extensible Authentication Protocol (EAP) authentication). The UE 1 6006 can communicate with AP 6006 but is blocked access to the network and internet. Operation proceeds from step 6032 to step 6036.

In step 6036, UE 1 6004 generates and transmits message 6034 to AP-1 6006. The message 6034 is an authentication message including credentials for UE-1 6004 as well as the user equipment device identifier such as for example MAC address for UE 1 6004. Operation proceeds from step 6036 to step 6038.

In step 6038, AP-1 6006 receives the message 6034. Operation proceeds from step 6038 to step 6040. In step 6040, the AP-1 6006 processes the message 6034 and generates authentication message 6042. Authentication message 6042 is based on message 6034 and includes the authentication information received from UE 1 6004. Authentication message 6042 also includes location information for AP-1 6006. In some embodiments, message 6042 is an Access Request message (e.g., RADIUS Access Request). Operation proceeds from step 6040 to step 6044.

In step 6044, the AP-1 6006 transmits the authentication message 6042 to WLAN controller 6008. Operation proceeds from step 6044 to step 6046.

In step 6046, WLAN controller 6008 receives and processes authentication message 6042. Operation proceeds from step 6046 to step 6048.

In step 6048, WLAN controller 6008 generates message 6050 based on message 6042 and transmits the message 6050 to AAA server 6014. The message 6050 includes the authentication information received from UE 1 6004 and the AP location information from AP-1 6006. In some embodiments, the WLAN controller 6008 in step 6048 forwards received message 6042 to the AAA server 6014 instead of generating message 6050 based on message 6042. Operation proceeds from step 6048 to step 6052.

In step 6052, the AAA server 3014 receives message 3050 from WLAN controller 3008. Operation proceeds from step 3052 to step 3053.

In step 6053, the AAA server 6014 processes the received message 6050. Processing the received message including using the authentication information for the user equipment device 1 to initiate EAP authentication procedures to authentic UE 1 6004. Operation proceeds from step 6053 to steps 6056 and 6058 wherein 802.1X EAP exchange of EAP Access Authentication Challenge and Access Authentication Response messages 6054 are exchanged. Information included in the EAP Access Authentication Response message from the UE 1 6004 response is compared to information included in or derived from information about the UE 1 6004 subscriber in the AAA server 6014 or database 6016 to successfully authenticate the user equipment device 1 6004. The path the exchange of messages travels is AAA server 6014 to WLAN controller 6008 to AP-1 6006 to UE 1 6004 and from UE 1 6004 to AP-1 6006 to WLAN controller 6008 to AAA server 6014.

Operation proceeds from step 6056 to 6059. In step 6059, the AAA server 6014 after successfully authenticating UE 1 6004 based on the response to the EAP challenge dynamically assigns VLAN stacking information to the UE 1 6004. In this example an outer VLAN ID (also referred to a S-VLAN ID (Service Provider VLAN ID)) and inner VLAN ID (also referred to as a C-VLAN ID (Customer VLAN ID)) is assigned to the UE 1 6004. The AAA server 6014 also pre-compiles the policies (e.g., access and bandwidth policies) based on: (i) the AP-1 location information included in the message 6050 and (ii) operator pre-provisioned details and/or information such as policies for the user equipment 1 6004 of allowed access and amount of bandwidth for UE 1 6004 based on UE 1 6004 location (e.g., whether in a home service area or in a visitor service area). The dynamically assigned stacked VLAN information may, and in some embodiments does, include policy information such as for example Quality of Service policy information including access and/or bandwidth policy information.

The AAA server 6014 also generates a UE context or record that includes UE 1 6006 identifying information (e.g., UE 1 6004 MAC address), the the policies to be applied (e.g., access and bandwidth policies, QoS policies) and stores this information at the AAA server 3014 and/or in the database 6016. In some embodiments, this UE context information is also communicated to the centralized gateway 6012. In some embodiments, the various operations discussed in connection with step 6059 are performed as sub-steps or separate independent steps. While in this example, UE 1 6004 was successfully authenticated by the AAA server 3014, when the AAA server 3014 is not able to authenticate a user equipment device no dynamic VLAN assignment is made but instead a response including an authentication rejection or access denial message is generated and sent to the UE 1 6004. Operation proceeds from step 6059 to step 6061.

In step 6061, the AAA server 6014 generates authentication response message 6060 which includes an indication that the authentication was successful and the dynamically assigned stacked VLAN information (e.g., S-VLAN ID, C-VLAN ID and in some embodiments policy information). In some embodiments, the authentication response message is an Access-Accept message (e.g., a RADIUS ACCESS ACCEPT message). In this example the network security mechanism used for securing the network is 802.1X EAP authentication and the authentication response message 6060 is a RADIUS 802.1X EAP authentication response message in the form of RADIUS ACCESS ACCEPT message. Operation proceeds from step 6061 to step 6062.

In step 6062, the AAA server 6014 transmits the generated ACCESS ACCEPT authentication response message 6060 to the WLAN controller 6008. Operation proceeds from step 6062 to step 6063.

In step 6063, the WLAN controller 6008 receives the authentication response message 6060. Operation proceeds from step 6063 to step 6064. In step 6064, the WLAN controller 6008 generates RADIUS ACCESS ACCEPT authentication response message 6066 based on RADIUS ACCESS ACCEPT authentication response message 6060. Response message 6066 including the indication that that authentication was successful and the dynamically assigned VLAN stacking information. Operation proceeds from step 6064 to step 6068.

In step 6068, the WLAN controller 6008 transmits the response message 6066 to AP-1 6006. In some embodiments, the WLAN controller 6008 instead of generating message 6066 forwards message 6060 to the AP-1 6006. Operation proceeds from step 6068 to step 6070.

In step 6070, the AP-1 6006 receives the RADIUS ACCESS ACCEPT authentication response message 6066. Operation proceeds from step 6070 to step 6072.

In step 6072, AP-1 6006 processes the received RAIDUS ACCESS ACCEPT authentication response message 6066. This includes determining that the authentication was successful based on the information contained in the response message 6066. In response to determining that the authentication was successful, the AP-1 6006 extracts the dynamically assigned VLAN stacking information (e.g., S-VLAN ID, C-VLAN ID, policy information) included in the response message 6066. The AP 1 6006 uses this information to bridge the wireless frames (IEEE 802.11) to wired network and vice-versa and implements the VLAN stacking for L2 frames in connection with the UE 1 6004. For upstream traffic received from the UE 1 6004, AP 1 6006 encapsulates L2 frames with the dynamically assigned S-VLAN and C-VLAN information (e.g., S-VLAN ID and C-VLAN ID and optionally included policy information). The modified frames will then be encapsulated in tunneling protocols such as Soft GRE (Ethernet over GRE). S-VLAN ID and C-VLAN ID will be used by the AP-1 6006 to identify information and/or data communicated to the UE 1 6004 from the wired network. Operation proceeds from step 6072 to step 6076.

In steps 6076 and 6078, AP-1 6006 and UE 1 6004 perform a 4-way handshake procedure. AP-1 6006 initiates the 4-way handshake procedure in step 6076. During the 4-way handshake procedure 4 messages 6074 are exchanged between the AP-1 6006 (authenticator) and the UE 1 6004 client device (supplicant) to generate encryption keys which can be used to encrypt actual data sent over wireless medium also referred to as wireless connection path or wireless link between UE 1 6004 and AP-1 6006. Upon the completion of the 4-way handshake procedure implemented in steps 6076 and 6078, operation proceeds from step 6078 to step 6080. Data/messages/frames communicated between the UE 1 6004 and AP-1 6006 will now be encrypted using the encryption keys resulting from the 4-way handshake procedure.

In step 6080, UE 1 6004 generates Dynamic Host Configuration Protocol (DHCP) discovery message 6082 to obtain an IP address to utilize for IP network communications. DHCP is a network protocol that is used to configure network devices to communicate on an Internet Protocol network. A DHCP client which in this example is the UE 1 6004 uses the DHCP protocol to acquire configuration information, such as for example an IP address, a default route, and one or more Domain Name System (DNS) server addresses from a DHCP server. In this example, the centralized gateway 6012 performs the functions of a DHCP server. The DHCP discovery message 6082 includes the MAC address for UE 1 6004. Operation proceeds from step 6080 to step 6084. In step 3084, UE 1 6004 transmits the DHCP discovery message 6082 to the AP-1 6006 over the wireless communications link between UE 1 6004 and AP-1 6006. Operation proceeds from step 6084 to step 6086.

In step 6086, the DHCP discovery message 6082 is received by AP-1 6006 from UE 1 6004. Operation proceed from step 6086 to step 6088.

In step 6088, AP-1 6006 encapsulates the discovery message which is an L2 frame format using SOFT GRE and implements VLAN stacking using the dynamically assigned S-VLAN and C-VLAN information (e.g., S-VLAN ID and C-VLAN ID). In step 6088, the SOFT GRE/(S-VLAN, C-VLAN) L2 Frame: DHCP discovery message 6090 is generated in response to receiving DHCP discovery message 6082 and utilizes information from the DHCP discovery message 6082 to generate DHCP discovery message 6090. As described in further detail below FIG. 19 shows an exemplary message 9030 with an Ethernet frame including S-VLAN and C-VLAN stacking information in the form of two VLAN headers. Operation proceeds from step 6088 to step 6100. In step 6100, AP-1 6006 transmits the SOFT GRE/(S-VLAN, C-VLAN) L2 Frame: DHCP discovery to the Centralized Gateway 6012. Operation proceeds from step 6100 to step 6102.

In step 6102, the Centralized Gateway 6012 receives the DHCP discovery message 6090 from AP-1 6006. Operation proceeds from step 6102 to step 6104.

In step 6104, the Centralized Gateway 6012 assigns an Internet Protocol address (e.g., IP-1 address) to UE 1 6004 and builds a UE context with UE 1's MAC address, S-VLAN ID and C-VLAN ID. The IP address is assigned from a pool of IP address (e.g., a pool of IPv4 addresses if the UE 1 6004 is an IPV4 device or a pool of IPv6 addresses if UE 1 6004 is a IPv6 device. UE 1 6004's MAC address being included in the DHCP discovery messages 6082 and 6090. Operation proceeds from step 6104 to step 6106 of Part B 6002 of method 6000 shown on FIG. 16B.

In step 6106, the Centralized Gateway 6012 generates SOFT GRE/S-VLAN ID, C-VLAN ID) L2 frame: DHCP offer message 6108 which includes the stacked VLAN information (the S-VLAN ID and C-VLAN ID) and a DHCP offer including the assigned IP address. Operation proceeds from step 6106 to step 6110.

In step 6110, the Centralized Gateway 6012 transmits the DHCP offer message 6108 to the AP-1 6006 in response to DHCP discovery message 6090. Operation proceeds from step 6110 to step 6112.

In step 6112, the AP-1 6006 receives the DHCP discovery message 6108 from the Centralized Gateway 6012. Operation proceeds from step 6112 to step 6114.

In step 6114, AP-1 6006 de-capsulates the SOFT GRE (S-VLAN, C-VLAN) L2 FRAME: DHCP offer 6108 and determines from the S-VLAN ID and C-VLAN ID that the DHCP offer 6108 is directed to UE 1 6004 based on the stacked VLAN information (i.e., the S-VLAN ID and C-VLAN ID) which uniquely identifies the UE 1 6004. Operation proceeds from step 6114 to step 6118.

In step 6118, AP-1 6006 generates DCHP offer message 6116 and transmits it to the UE 1 6004 over the wireless communications link connecting AP-1 6006 and UE 1 6004. The DCHP offer message 6116 being based on the DHCP offer message 6108 and including IP address assigned by the Centralized Gateway 6012. Operation proceeds from step 6118 to step 6120.

In step 6120, UE 1 6004 receives the DHCP offer message 6116 from AP-1 6006 and processes it determining the IP address assigned by the Centralized Gateway 6012. Operation proceeds from step 6120 to step 6122.

In step 6122, UE 1 6004 generates Internet Access message/frame 6124 in which UE 1 6004 is sending packets of data to a destination device via the Internet. Operation proceeds from 6122 to step 6126.

In step 6126, the UE 1 6004 transmits the Internet Access message 6124 to AP-1 6006. Operation proceeds from step 6126 to step 6128.

In step 6128, AP-1 6006 receives the Internet Access message 6124 from UE 1 6004. Operation proceeds from step 6128 to step 6130.

In step 6130, AP-1 6006 generates SOFT GRE/(S-VLAN, C-VLAN) L2 frame message 6132 based on the received message 6124 and dynamically assigned VLAN stacking information received from the AAA server 6014 for UE 1 4004. The AP-1 6006 provides a bridging function taking the upstream message/frame 6124 received from the UE 1 6004 over the wireless link and modifying the message/frame 6124 by inserting the dynamically assigned S-VLAN ID and C-VLAN ID for UE 1 6004 into an Ethernet frame for transmission on a wired cable (Ethernet cable). The modified frame being encapsulated in the tunneling protocol Soft GRE. Operation proceeds from step 6130 to step 6134.

In step 6134, the AP-1 6006 completes the bridging operation by transmitting the SoftGRE (S-VLAN, C-VLAN) L2 message/frame 6132 to the Centralized Gateway 6012 over a wired connection. Operation proceeds from step 6134 to step 6136.

In step 6136, the Centralized Gateway 6012 receives the message/frame 6132. Operation proceeds from step 6136 to step 6138.

In step 6138, the Centralized Gateway 6012 determines that the message/frame 6132 is from UE 1 6004 based on the S-VLAN ID and C-VLAN ID included in the message/frame 6132. In some embodiments, the Centralized Gateway 6012 also utilizes the MAC address in determining that message/frame 6132 is from UE 1 6004. In step 6138, the Centralized Gateway 6012 detects the first packet in the message/frame 6132 and initiates an authentication procedure. Operation proceeds from 6138 to step 6142.

In step 6142, the Centralized Gateway 6012 generates and transmits Radius authentication request 6140 to the AAA server 6014. In some embodiments, the Radius authentication request 6140 includes the S-VLAN ID, C-VLAN ID, and in some embodiments the MAC address for UE 1 6004. Operation proceeds from step 6142 to step 6144.

In step 6144, the AAA server 6014 receives the Radius Authentication Request 6140 from the Centralized Gateway 6012. Operation proceeds from 6144 to step 6146.

In step 6146, the AAA server 6014 retrieves the user specific policies such as for example location specific access control and bandwidth policies for the UE 1 6004. In some embodiments, the AAA server 6014 retrieves these policies from the database 6016 where the policies are stored. Operation proceeds from step 6146 to step 6150.

In step 6150, the AAA server 6014 generates and transmits the retrieved policies (e.g., location specific access control policies and bandwidth polices) in message 6148 to the centralized gateway 6012. In some embodiments, the policies are obtained by the centralized gateway 6012 using an Application Programming Specific Interface. These policies are provided in response to the Radius Authentication Request 6140. Operation proceeds from step 6150 to step 6152. In step 6152, the Centralized Gateway 6012 receives the message 6148 with the policies (e.g., location specific access control policies and bandwidth policies) to be applied to communications from the UE 1 6004. Operation proceeds from step 6152 to step 6154.

In step 6154, the centralized gateway 6012 updates the UE context or record it generated or built for UE 1 6004 with the policies received from the AAA server 6014. Operation proceeds from step 6154 to step 6166.

In step 6166, the centralized gateway 6012 applies the policies received from the AAA server 6014 to the communications from the UE 1 6004 with respect to message/frame 6132. In this example, the AP 1 6006 location indicates that the UE 1 6004 is in its home service area and that the UE 1 6004 has Internet access. The Centralized Gateway 6012 generates internet access message 6168 based on message 6132 which includes data transmitted in message 6124. Operation proceeds from step 6164 to step 6170.

In step 6170, the Centralized Gateway 6012 transmits the generated message 6168 out onto Internet 6018 toward its destination. Operation proceeds from step 6170 to step 6172 where the message 6168 is communicated over the Internet 6018.

The operation of method 6000 continues with the AP-1 6006 providing services to UE 1 6004 using VLAN stacking with the dynamically assigned S-VLAN ID and C-VLAN ID provided by the AAA server 6014 to transmit and receive data packets via the Centralized Gateway 6012.

In this example, it should be noted that the when the AP-1 6006 is transmitting messages received from the UE 1 6004 onto the wired network to various network equipment and/or out onto the Internet, the messages are typically passing through network switches. The VLAN stacking information included in the messages allows for the messages to be identified by the AP-1 and the network equipment device with which it is communicating. For example, when the method 6000 is applied to system 200 the messages/frames are transmitted from AP-1 210 to other network equipment device such as WLAN Controller 216, Centralized Gateway 220 via switch 213.

While the exemplary method 6000 has been explained using WAP2 Enterprise 802.1X EAP authentication, the method 6000 is also applicable to other types of authentication.

In various embodiments, the Authentication Request messages 6042 and/or 6050 are implemented as described in Access-Request message 316 of FIG. 3. In some embodiments, the AP-1 location information is provided in the message format and field(s) as shown in FIG. 12. In various embodiments, the Authentication Response messages 6060 and/or 6066 are implemented as described in Access-Accept message 322 of FIG. 3 with the dynamically assigned S-VLAN information and C-VLAN information being included in vendor specific attributes of the Access-Accept message 322 for example as shown fields 1152 and 1154 of S-VLAN and C-VLAN using Radius Vendor Specific Attributes diagram 1150. The S-VLAN and C-VLAN information including a dynamically assigned S-VLAN ID and C-VLAN ID, the combination being uniquely assigned to UE 1 6004.

In another embodiment of the present invention instead of using RADIUS Vendor-Specific Attributes to communicate the dynamically assigned VLAN stacking tags (e.g., S-VLAN/C-VLAN information), a multi-occurrence of Tunnel attributes in a Access Accept message (e.g., RADIUS Access Accept message) is used to communicate the dynamically assigned VLAN stacking tags as described in detail below in connection with FIG. 21.

Figure 17A:
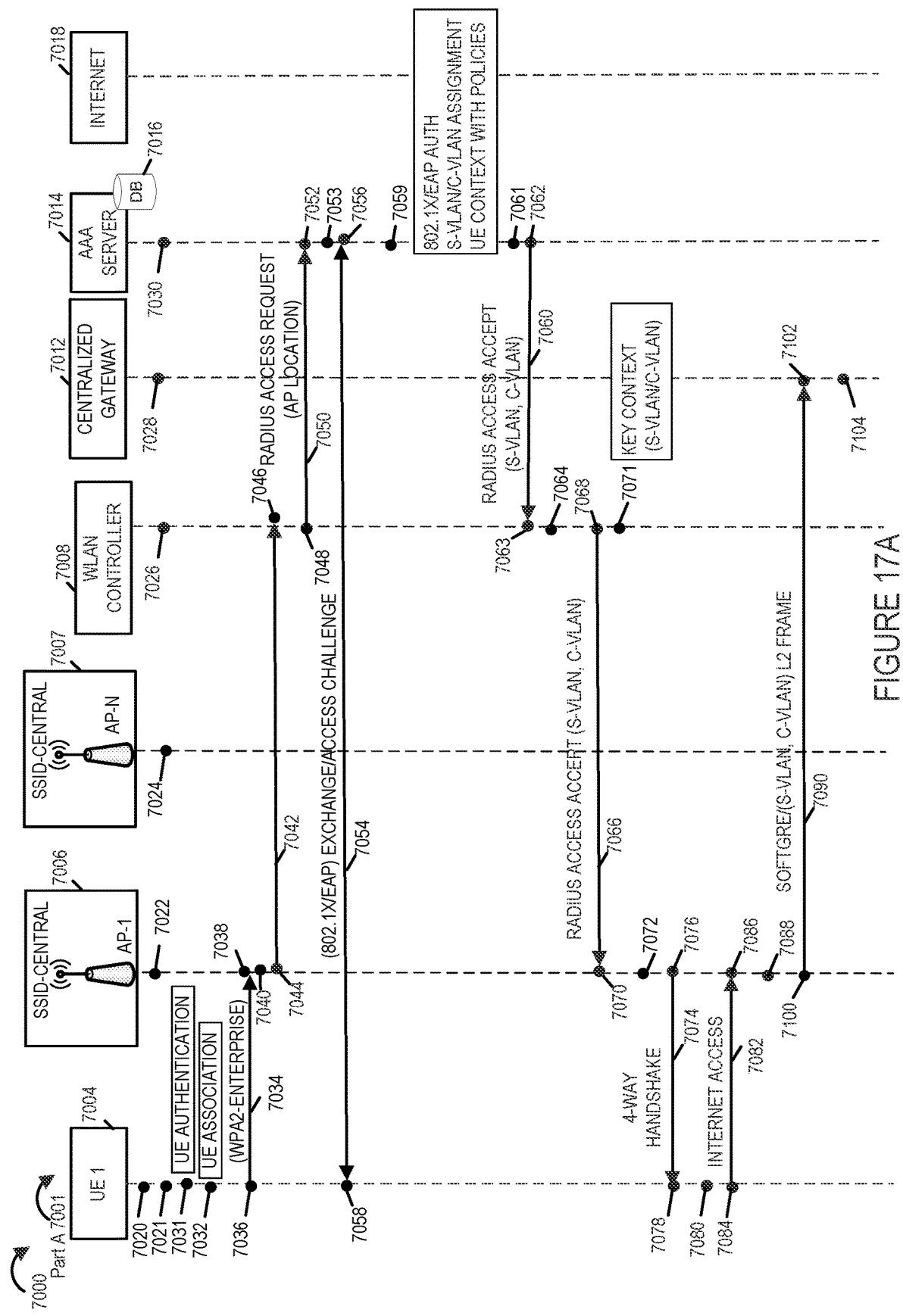
FIG. 17A is the first part of a signaling diagram which illustrates the steps and signaling of an exemplary method in accordance with an embodiment of the present invention.

FIG. 17 comprises FIG. 17A and FIG. 17B. FIG. 17A is the first part (Part A 7001) of a signaling diagram which illustrates the steps and signaling of an exemplary method 7000 in accordance with an embodiment of the present invention. FIG. 17B is the second part (Part B 7002) of a signaling diagram which illustrates the steps and signaling of an exemplary method 7000 in accordance with an embodiment of the present invention. The method 7000 illustrates the steps for implementing user equipment (UE) association WPA2-Entrpirse/802.1X Authentication with user equipment roaming with key caching with VLAN stacking. While it will be readily understood that additional steps and signaling are performed in connection with communicating information, messages, and packets between devices, the method 7000 focuses on and discusses the steps and signaling for understanding the invention. Elements or steps with the same reference numbers used in different figures are the same or similar and those elements or steps will not be described in detail again. The signaling diagram/method 7000 is implemented by a system coupled to the Internet 7018. The system includes a first UE 1 7004, an Access Point-1 7006, an Access Point-N 7007, a WLAN controller 7008, a centralized gateway 7012, an AAA server 7014, and a database 7016 with the elements of the system coupled via communications links that allow for the exchange of information, signals and data between the elements. The UE 1 7004 is a wireless device, e.g., a mobile device such as by way of example a mobile phone, smart phone, laptop, tablet. In various embodiments, the UE 1 7004 is implemented in accordance with UE 500 shown in FIG. 5. The Access Point-1 7006 and/or Access Point-N 7007 may be, and in some embodiments is, implemented in accordance with the Access Point shown in FIG. 4. The WLAN controller 7008 may be, and in some embodiments is, implemented in accordance with network device 600 shown in FIG. 6. The centralized gateway 7012 may be, and in some embodiments is, implemented in accordance with network equipment device 600 shown in FIG. 6. The AAA server 7014 is an Authentication, Authorization and Accounting server which may be implemented in accordance with the network equipment device 600 shown in FIG. 6. The AAA server 7014 is coupled to database 7016 which includes user authentication credentials, policies and accounting information. In some embodiments, the database 7016 is incorporated into and is part of the AAA server 7014.

The signaling diagram/method 7000 may be, and in some embodiments is, implemented using exemplary system 200 of FIG. 2. In such embodiments, the UE 1 7004 is UE 1 204 of system 200 before after moves along path 234. The Access Point 1 (AP-1) 7006 is Access Point 1 204 of system 200. The Access Point N (AP-N) 7007 is Access Point N 212 of system 200. The WLAN controller 7008 is WLAN controller 216 of system 200. The centralized gateway 7012 is centralized gateway 220 of system 200. The AAA server 7014 is AAA server 222 of system 200. The database 7016 is database 223 of system 200. However, it should be understood that the method 7000 is not limited to the exemplary system 200 and may be, and is used, on other systems and system configurations. The signaling diagram/method 7000 illustrates the signaling and steps for using VLAN stacking in a high density system to provide wireless services for a user equipment device and in particular illustrating roaming. The same steps can be used for other user equipment devices. The implementation of VLAN stacking allows for system scaling of user equipment devices which are supported above 4095 user equipment devices.

The signaling diagram and method 7000 illustrates an exemplary call flow for UE 1 7004 association to SSID roaming with Key Context caching using VLAN stacking in accordance with an embodiment of the present invention. In some embodiments, the AAA server 7014 is provisioned or pre-provisioned with Access Point location inventory for the entire site being served by the wireless network. In various embodiments, the AAA server 7014 includes memory in which a data structure, e.g., a table or linked list, includes a mapping of the location of each AP in the system and its location within the network site, e.g., campus. In this example, the site is deployed with secured WLAN services (WPA2-Enterprise/802.1X authentication). 802.1X authentication is a network authentication protocol that opens ports (e.g., physical or virtual ports) for network access when an organization authenticates a user's identity and authorizes them for access to the network. The user's identity is determined based on their credentials or certificate, which is confirmed by the RADIUS server. In this example the AAA server 7014 authenticates user devices. In various embodiments, the credentials or certificate information are contained in the database 7016. The AP location mapping information also includes the details about end users home service area and visitor service areas. Home Service Area (HSA) is the area where an end user device is able to associate with the home wireless network and is reachable to the private area network. Visitor service areas are areas in which the user equipment device is outside of its home service area.

The AP-1 7006 and AP-N 7007 are configured with site wide common WLAN supporting per user 802.1X EAP authentication.

The user equipment device 1 (UE 1 7004) is a mobile device provisioned or pre-provisioned with the required credentials to connect to the system SSID (SSID-Central in the example) and use Internet Access in visitor areas or zones.

UE 1 7004 is initially in the coverage area of AP-1 7006 HSA serving SSID: <Site Wide Common SSID> and later roams to the coverage are of AP-N 7007 VSA.

UE 1 7004 performs the conventional 802.11 open system authentication with AP N 7006.

Once the UE 1 7004 receives a response to its Association request to AP 1 7006 and receives an association ID, then network authentication using WPA2-Enterprise/802.1X begins. The AAA server 7014 assigns VLAN stacking information to the UE 1 7004 after the successful completion of the 802.1X/EAP exchange/access challenge authentication as discussed below. The AAA server 7014 then transmits the assignment information to the Access Point 7006 which uses it when performing bridging operations for communications exchanged with UE 1 7004. A key context with the VLAN stacking information is also stored in the WLAN controller 7008 for use in authenticating UE 1 7004 when it roams to the coverage area of AP-N 7007. In this way, the UE 1 7704 can take advantage of the fast roaming 802.1X procedures wherein AP-N can fetch the Key context for UE 1 7004 from the WLAN controller 7008 instead of having to perform a re-authentication with AAA server 7014 as described shown in FIG. 17 and discussed below.

A description of the steps and signaling of method 7000 will now be described. The method begins in step start step 7020 Part A 7001 of method 7000 shown on FIG. 17A. Operation proceeds from start step 7020 to step 7021. In step 7021, UE 1 7004 is pre-provisioned with credentials for connecting to wireless network SSID-Central and obtaining internet access, is initialized and begins operating. In step 7022, Access Point-1 (AP-1) 7006 is provisioned, initialized and begins operating. This includes the AP-1 7006 broadcasting the SSID name. In step 7024, Access Point-N 7007 is configured with site wide common WLAN supporting WPA2-Enterprise 802.1X authentication. This includes the AP-N 700N broadcasting the SSID name. In step 7026, WLAN controller 7008 is initialized and begins operating. In step 7028, the centralized gateway 7012 is initialized and begins operating. In step 7030, the AAA server 7014 is pre-provisioned, initialized and begins operating. The AAA server 7014 is provisioned or pre-provisioned to include information on each of the Access Points in the network including the location of all Access Points in the wireless network as well as with authentication information (e.g., credential information) for subscribers including user 1 which is operating the UE 1 7004. The AAA server 7014 is pre-provisioned with policies to be implemented in connection with each of the subscribers (e.g., location based policies regarding access such as ability to access home service area network and reachability to private area network). In some embodiments, the credential information and policy information is stored in database 7016.

In step 7031, the UE 1 7004 is in the coverage area of AP-1 7006 in its Home Service Area and receives the broadcast SSID name and performs open system authentication. This includes an exchange of messages with AP-1 7006. Operation proceeds from step 7031 to step 7032.

In step 7032, the UE 1 7004 associates with AP-1 7006. This includes exchanging association messages with AP-1 7006. The UE 1 7004 receives an Association Id from the AP 7006. The UE 1 7004 is now in an authenticated and associated state pending security mechanisms (e.g., 802.1X Extensible Authentication Protocol (EAP) authentication). The UE 1 7006 can communicate with AP 7006 but is blocked access to the network and internet. Operation proceeds from step 7032 to step 7036.

In step 7036, UE 1 7004 generates and transmits message 7034 to AP-1 7006. The message 7034 is an authentication message including credentials for UE-1 7004 as well as the user equipment device identifier such as for example MAC address for UE 1 7004. Operation proceeds from step 7036 to step 7038.

In step 7038, AP-1 7006 receives the message 7034. Operation proceeds from step 7038 to step 7040. In step 7040, the AP-1 7006 processes the message 7034 and generates authentication message 7042. Authentication message 7042 is based on message 7034 and includes the authentication information received from UE 1 7004. Authentication message 7042 also includes location information for AP-1 7006. In some embodiments, message 7042 is an Access Request message (e.g., RADIUS Access Request). Operation proceeds from step 7040 to step 7044.

In step 7044, the AP-1 7006 transmits the authentication message 7042 to WLAN controller 7008. Operation proceeds from step 7044 to step 7046.

In step 7046, WLAN controller 7008 receives and processes authentication message 7042. Operation proceeds from step 7046 to step 7048.

In step 7048, WLAN controller 7008 generates message 7050 based on message 7042 and transmits the message 7050 to AAA server 7014. The message 7050 includes the authentication information received from UE 1 7004 and the AP location information from AP-1 7006. In some embodiments, the WLAN controller 7008 in step 7048 forwards received message 7042 to the AAA server 7014 instead of generating message 7050 based on message 7042. Operation proceeds from step 7048 to step 7052.

In step 7052, the AAA server 7014 receives message 7050 from WLAN controller 7008. Operation proceeds from step 7052 to step 7053.

In step 7053, the AAA server 7014 processes the received message 7050. Processing the received message including using the authentication information for the user equipment device 1 to initiate EAP authentication procedures to authentic UE 1 7004. Operation proceeds from step 7053 to steps 7056 and 7058 wherein 802.1X EAP exchange of EAP Access Authentication Challenge and Access Authentication Response messages 7054 are exchanged. Information included in the EAP Access Authentication Response message from the UE 1 7004 response is compared to information included in or derived from information about the UE 1 7004 subscriber in the AAA server 7014 or database 7016 to successfully authenticate the user equipment device 1 7004. The path the exchange of messages travels is AAA server 7014 to WLAN controller 7008 to AP-1 7006 to UE 1 7004 and from UE 1 7004 to AP-1 7006 to WLAN controller 7008 to AAA server 7014.

Operation proceeds from step 7056 to 7059. In step 7059, the AAA server 7014 after successfully authenticating UE 1 7004 based on the response to the EAP challenge dynamically assigns VLAN stacking information to the UE 1 7004. In this example an outer VLAN ID (also referred to a S-VLAN ID (Service Provider VLAN ID)) and inner VLAN ID (also referred to as a C-VLAN ID (Customer VLAN ID)) is assigned to the UE 1 7004. The AAA server 7014 also pre-compiles the policies (e.g., access and bandwidth policies) based on: (i) the AP-1 location information included in the message 7050 and (ii) operator pre-provisioned details and/or information such as policies for the user equipment 1 7004 of allowed access and amount of bandwidth for UE 1 7004 based on UE 1 7004 location (e.g., whether in a home service area or in a visitor service area). The dynamically assigned stacked VLAN information may, and in some embodiments does, include policy information such as for example Quality of Service policy information including access and/or bandwidth policy information.

The AAA server 7014 also generates a UE context or record that includes UE 1 7006 identifying information (e.g., UE 1 7004 MAC address), the the policies to be applied (e.g., access and bandwidth policies, QoS policies) and stores this information at the AAA server 7014 and/or in the database 7016. In some embodiments, this UE context information is also communicated to the centralized gateway 7012. In some embodiments, the various operations discussed in connection with step 7059 are performed as sub-steps or separate independent steps. While in this example, UE 1 7004 was successfully authenticated by the AAA server 7014, when the AAA server 7014 is not able to authenticate a user equipment device no dynamic VLAN assignment is made but instead a response including an authentication rejection or access denial message is generated and sent to the UE 1 7004. Operation proceeds from step 7059 to step 7061.

In step 7061, the AAA server 7014 generates authentication response message 7060 which includes an indication that the authentication was successful and the dynamically assigned stacked VLAN information (e.g., S-VLAN ID, C-VLAN ID and in some embodiments policy information). In some embodiments, the authentication response message is an Access-Accept message (e.g., a RADIUS ACCESS ACCEPT message). In this example the network security mechanism used for securing the network is 802.1X EAP authentication and the authentication response message 7060 is a RADIUS 802.1X EAP authentication response message in the form of RADIUS ACCESS ACCEPT message. Operation proceeds from step 7061 to step 7062.

In step 7062, the AAA server 7014 transmits the generated ACCESS ACCEPT authentication response message 7060 to the WLAN controller 7008. Operation proceeds from step 7062 to step 7063.

In step 7063, the WLAN controller 7008 receives the authentication response message 7060. Operation proceeds from step 7063 to step 7064. In step 7064, the WLAN controller 7008 generates RADIUS ACCESS ACCEPT authentication response message 7066 based on RADIUS ACCESS ACCEPT authentication response message 7060. Response message 7066 including the indication that that authentication was successful and the dynamically assigned VLAN stacking information. Operation proceeds from step 7064 to step 7068 and 7071.

In step 7071, WLAN controller 7008 performs key caching with VLAN stacking. In step 7071 WLAN controller 7008 generates and stores a key context or record for UE 1 7004. The Key context includes information identifying UE 1 7004 and S-VLAN and C-VLAN information dynamically assigned by the AAA server 7014 and encryption key information provided by the AAA server 7014 after completion of successful EAP authentication (e.g., Pairwise Master Key ID (PMKID) caching). The WLAN controller 7008 controls both AP-1 7006 and AP-N 7007. The key caching allows for fast roaming. In some embodiments, the key caching follows IEEE 802.11r standard procedures except it further includes caching the S-VLAN and C-VLAN information dynamically assigned to the UE 1 7004.

In step 7068, the WLAN controller 7008 transmits the response message 7066 to AP-1 7006. In some embodiments, the WLAN controller 7008 instead of generating message 7066 forwards message 7060 to the AP-1 7006. Operation proceeds from step 7068 to step 7070.

In step 7070, the AP-1 7006 receives the RADIUS ACCESS ACCEPT authentication response message 7066. Operation proceeds from step 7070 to step 7072.

In step 7072, AP-1 7006 processes the received RAIDUS ACCESS ACCEPT authentication response message 7066. This includes determining that the authentication was successful based on the information contained in the response message 7066. In response to determining that the authentication was successful, the AP-1 7006 extracts the dynamically assigned VLAN stacking information (e.g., S-VLAN ID, C-VLAN ID, policy information) included in the response message 7066. The AP 1 7006 uses this information to bridge the wireless frames (IEEE 802.11) to wired network and vice-versa and implements the VLAN stacking for L2 frames in connection with the UE 1 7004. For upstream traffic received from the UE 1 7004, AP 1 7006 encapsulates L2 frames with the dynamically assigned S-VLAN and C-VLAN information (e.g., S-VLAN ID and C-VLAN ID and optionally included policy information). The modified frames will then be encapsulated in tunneling protocols such as Soft GRE (Ethernet over GRE). S-VLAN ID and C-VLAN ID will be used by the AP-1 7006 to identify information and/or data communicated to the UE 1 7004 from the wired network. Operation proceeds from step 7072 to step 7076.

In steps 7076 and 7078, AP-1 7006 and UE 1 7004 perform a 4-way handshake procedure. AP-1 7006 initiates the 4-way handshake procedure in step 7076. During the 4-way handshake procedure 4 messages 7074 are exchanged between the AP-1 7006 (authenticator) and the UE 1 7004 client device (supplicant) to generate encryption keys which can be used to encrypt actual data sent over wireless medium also referred to as wireless connection path or wireless link between UE 1 7004 and AP-1 7006. Upon the completion of the 4-way handshake procedure implemented in steps 7076 and 7078, operation proceeds from step 7078 to step 7080. Data/messages/frames communicated between the UE 1 7004 and AP-1 7006 will now be encrypted using the encryption keys resulting from the 4-way handshake procedure.

Following the completion of the 4-way handshake in various embodiments a DHCP discovery process is implemented in which steps similar to 6080, 6084, 6086, 6088, 6100, 6102, 6104, 6106, 6110, 6112, 6114, 6118, 6120 are implemented by UE 1 7004, AP 1 7006, and Centralized Gateway 7012 using the assigned S-VLAN and C-VLAN information and MAC address for UE 1 7004.

In step 7080, UE 1 7004 generates Internet Access message/frame 7082 in which UE 1 7004 is sending packets of data to a destination device via the Internet. Operation proceeds from 7080 to step 7084.

In step 7084, the UE 1 7004 transmits the Internet Access message 7082 to AP-1 7006. Operation proceeds from step 7084 to step 7086.

In step 7086, AP-1 7006 receives the Internet Access message 7082 from UE 1 7004. Operation proceeds from step 7086 to step 7088.

In step 7088, AP-1 7006 generates SOFT GRE/(S-VLAN, C-VLAN) L2 frame message 7090 based on the received message 7082 and dynamically assigned VLAN stacking information received from the AAA server 7014 for UE 1 7004. The AP-1 7006 provides a bridging function taking the upstream message/frame 7082 received from the UE 1 7004 over the wireless link and modifying the message/frame 7082 by inserting the dynamically assigned S-VLAN ID and C-VLAN ID for UE 1 7004 into an Ethernet frame for transmission on a wired cable (Ethernet cable). The modified frame being encapsulated in the tunneling protocol Soft GRE. Operation proceeds from step 7088 to step 7100.

In step 7100, the AP-1 7006 completes the bridging operation by transmitting the SoftGRE (S-VLAN, C-VLAN) L2 message/frame 7090 to the Centralized Gateway 7012 over a wired connection. Operation proceeds from step 7100 to step 7102.

In step 7102, the Centralized Gateway 7012 receives the message/frame 7090. Operation proceeds from step 7102 to step 7104.

In step 7104, the Centralized Gateway 7012 determines that the message/frame 7090 is from UE 1 7004 based on the S-VLAN ID and C-VLAN ID included in the message/frame 7090. In some embodiments, the Centralized Gateway 7012 also utilizes the MAC address in determining that message/frame 7090 is from UE 1 7004. In step 7104, the Centralized Gateway 7012 detects the first packet in the message/frame 7090 and initiates an authentication procedure. Operation proceeds from 7104 to step 7106 shown on FIG. 17B.

In step 7106, the Centralized Gateway 7012 generates Radius authentication Access request 7107. Operation proceeds from step 7106 to step 7108.

In step 7108, the Centralized Gateway 7012 transmits the Radius authentication Access request message 7107 to the AAA server 7014. In some embodiments, the Radius authentication Access request 7107 includes the S-VLAN ID, C-VLAN ID, and in some embodiments the MAC address for UE 1 7004. Operation proceeds from step 7108 to step 7110.

In step 7110, the AAA server 7014 receives the Radius Authentication Access Request 7107 from the Centralized Gateway 7012. Operation proceeds from 7110 to step 7112.

In step 7112, the AAA server 7014 retrieves the user specific policies such as for example location specific access control and bandwidth policies for the UE 1 7004. In some embodiments, the AAA server 7014 retrieves these policies from the database 7016 where the policies are stored. Operation proceeds from step 7112 to step 7114.

In step 7114, the AAA server 7014 generates and transmits the retrieved policies (e.g., location specific access control policies and bandwidth polices) in Radius Access Accept message 7116 to the centralized gateway 7012. In some embodiments, the policies are obtained by the centralized gateway 7012 using an Application Programming Specific Interface. These policies are provided in response to the Radius Authentication Access Request 7107. Operation proceeds from step 7114 to step 7118. In step 7118, the Centralized Gateway 7012 receives the message 7116 with the policies (e.g., location specific access control policies and bandwidth policies) to be applied to communications from the UE 1 7004. Operation proceeds from step 7118 to step 7120.

In step 7119, the centralized gateway 7012 applies the policies received from the AAA server 7014 to the communications from the UE 1 7004 with respect to message/frame 7090. In this example, the AP 1 7006 location indicates that the UE 1 7004 is in its home service area and that the UE 1 7004 has Internet access. The Centralized Gateway 7012 generates internet access message 7124 based on message 7090 which includes data transmitted in message 7082. Operation proceeds from step 7119 to step 7120.

In step 7120, the Centralized Gateway 7012 transmits the generated message 7124 out onto Internet 7018 toward its destination. Operation proceeds from step 7120 to step 3126 where the message 3124 is communicated over the Internet 7018.

Operation proceeds from step 7126 to step 7128. In step 7128 UE 1 7004 roams to the coverage area of AP-N 7007.

Operation proceeds from step 7128 to step 7129. In step 7129, UE 1 7004 generates UE association (WPA2-Enterprise) message 7132. AP-1 7006, AP-N 7007 and WLAN controller 7008 are configured for implementing fast roaming procedures (e.g., IEEE 802.11r procedures) with the addition of VLAN stacking procedures. Operation proceeds from step 7129 to step 7130.

In step 7130, UE 1 7004 transmits the UE association (WPA2-Enterprise) request message 7132 to AP-N 7007. Operation proceeds from step 7130 to step 7134.

In step 7134, the AP-N 7007 receives the UE association (WPA2-Enterprise) 7132 from UE 1 7004. Operation proceeds from step 7134 to step 7136. In step 7136, AP-N 7007 generates Fetch Key context with S-VLAN and C-VLAN information for UE 1 7004. The message includes UE 1 7004 identification information received in message 7132 (e.g., MAC information) and in some embodiments location based information for the location of AP-N 7007. Operation proceeds from step 7136 to step 7140.

In step 7140, AP-N 7007 transmits the fetch key context S-VLAN, C-VLAN message 7138 to WLAN controller 7008. Operation proceeds from step 7140 to step 7142.

In step 7142, the WLAN controller 7008 receives the message 7138. Operation proceeds from step 7142 to step 7150.

In step 7150, the WLAN controller 7008 retrieves the UE 1 key context with S-VLAN and C-VLAN information generated and cached in step 7071 based on information contained in the message 7138 (e.g., UE 1 7004 identification information and/or subscriber credential information). Operation proceeds from step 7150 to step 7154.

In step 7154, the WLAN controller 7008 generates and transmits UE 1 7004 key context and S-VLAN and C-VLAN information message 7152 to AP-N 7007 in response to the fetch key context and S-VLAN, C-VLAN information message 7138. The message 7152 including the key encryption information for UE 1 7004 and stacked VLAN information (e.g., S-VLAN ID, C-VLAN ID) dynamically assigned to UE 1 7004 by the AAA server 7014. In some embodiments, the WLAN controller 7012 also extracts location information for AP-N 7007 from the message 7138 and transmits this information along with the assigned VLAN information and user equipment identification information for UE 1 to the AAA server 7014 so that the AAA server 7104 can update its policies with respect to UE 1 7004 based on the new location of UE 1 7004 which is now accessing the network via AP-N 7007 instead of AP-1 7006. AAA server 7014 updates it records for UE 1 7004 based on the received information that UE 1 7004 is now connected via AP-N 7007. Operation proceeds from step 7154 to step 7156.

In step 7156, AP-N 7007 receives and processes the message 7152. Operation proceeds from step 7156 to steps 7160 and 7162. In steps 7160 and 7162 UE 1 7004 and AP-N 7007 implementing fast roaming (e.g., IEEE 802.11r) procedures including generating and exchanging messages 7158 utilizing the key information included in message 7152. In some embodiments, the fast roaming procedures commence after step 7134 and prior to step 7156. When the fast roaming procedures have been completed operation proceeds from step 7162 to step 7164.

In step 7164, UE 1 7004 generates Internet Access message/frame 7166 in which UE 1 7004 is sending packets of data to a destination device via the Internet. Operation proceeds from 7164 to step 7168.

In step 7168, the UE 1 7004 transmits the Internet Access message 7166 to AP-N 7007. Operation proceeds from step 7168 to step 7170.

In step 7170, AP-N 7007 receives the Internet Access message 7166 from UE 1 7004. Operation proceeds from step 7170 to step 7172.

In step 7172, AP-N 7007 generates SOFT GRE/(S-VLAN, C-VLAN) L2 frame message 7174 based on the received message 7166 and dynamically assigned VLAN stacking information which had been received in step 7156 in message 7152 from key context with S-VLAN and C-VLAN. The AP-N 7007 provides a bridging function taking the upstream message/frame 7166 received from the UE 1 7004 over the wireless link and modifying the message/frame 7166 by inserting the dynamically assigned S-VLAN ID and C-VLAN ID for UE 1 7004 into an Ethernet frame for transmission on a wired cable (Ethernet cable). The modified frame being encapsulated in the tunneling protocol Soft GRE. Operation proceeds from step 7172 to step 7176.

In step 7176, the AP-N 7007 completes the bridging operation by transmitting the SoftGRE (S-VLAN, C-VLAN) L2 message/frame 7174 to the Centralized Gateway 7012 over a wired connection. Operation proceeds from step 7176 to step 7178.

In step 7178, the Centralized Gateway 7012 receives the message/frame 7174. Operation proceeds from step 7178 to step 7180.

In step 7180, the Centralized Gateway 7012 determines that the message/frame 7174 is from UE 1 7004 based on the S-VLAN ID and C-VLAN ID included in the message/frame 7174. In some embodiments, the Centralized Gateway 7012 also utilizes the MAC address in determining that message/frame 7174 is from UE 1 7004. In step 7180, the Centralized Gateway 7012 detects the first packet in the message/frame 7180 and initiates an authentication procedure as previously described in connection with steps 7106, 7108, 7110, 7112, 7114, and 7118 based on information contained in message 7174. Upon successful authentication and retrieval of policies to be applied to the message 7174, operation proceeds from steps 7180 to step 7181.

In step 7181, the centralized gateway 7012 applies the policies received from the AAA server 7014 to the communications from the UE 1 7004 with respect to message/frame 7174 and generates internet access message 7182 based on message 7174 which includes data transmitted in message 7166. Operation proceeds from step 7181 to step 7184.

In step 7184, the Centralized Gateway 7012 transmits the generated message 7182 out onto Internet 7018 toward its destination. Operation proceeds from step 7184 to step 7186 where the message 7182 is communicated over the Internet 7018.

While the exemplary method 7000 has been explained how VLAN stacking can be implemented using WAP2 Enterprise 802.1X EAP authentication with fast roaming 802.11r, the method 7000 is also applicable to other types of authentication and fast roaming procedures that allow a client device to roam quickly in environments implementing the WPA2 Enterprise security, by ensuring that the client device does not need to re-authenticate to the RADIUS server or obtain new VLAN stacking information every time it roams from one access point to another.

In various embodiments, the messages 6042 and/or 7050 are implemented as described in Access-Request message 316 of FIG. 3. In some embodiments, the AP-1 location information is provided in the message format and field(s) as shown in FIG. 12. In various embodiments, the messages 7060 and/or 7066 are implemented as described in Access-Accept message 322 of FIG. 3 with the dynamically assigned S-VLAN information and C-VLAN information being included in vendor specific attributes of the Access-Accept message 322 for example as shown fields 1152 and 1154 of S-VLAN and C-VLAN using Radius Vendor Specific Attributes diagram 1150. The S-VLAN and C-VLAN information including a dynamically assigned S-VLAN ID and C-VLAN ID, the combination being uniquely assigned to UE 1 7004.

In another embodiment of the present invention instead of using RADIUS Vendor-Specific Attributes to communicate the dynamically assigned VLAN stacking tags (e.g., S-VLAN/C-VLAN information), a multi-occurrence of Tunnel attributes in an Access Accept message (e.g., RADIUS Access Accept message) is used to communicate the dynamically assigned VLAN stacking tags as described in detail below in connection with FIG. 21.

While the methods 3000, 4000, 5000, 6000, and 7000 illustrated in FIGS. 13, 14, 15, 16 and 17 have been explained with respect to a single UE device and one or more Access Points, the method may be, and typically are, implemented for a plurality of UE devices, e.g., mobile devices and/or stationary devices, which are pre-provisioned, e.g., at time of purchase or initialization with credential information and a plurality of Access Points located throughout the network area (e.g., customer premise, campus or venue). The methods 3000, 4000, 5000, 6000, and 7000 may be, and in some embodiments, are used in conjunction for the same or different user equipment devices. It is to be noted that in signaling diagrams shown in FIGS. 13, 14, 15, 16 and 17 the various switches along the paths between network elements have not been described but it is to be understood that the network paths include various switches such as shown and described in connection with system 200. The VLAN stacking is partially required so that the tunnels can be created through the network switches using the dynamically assigned stacked VLAN information. The policies that associated with a user equipment device and/or user include location specific access control and bandwidth policies. Such as when a user equipment device is in HSA the user equipment device has internet access and a first amount bandwidth while when in a VSA the same user equipment device may have internet access but a second amount bandwidth which is less than the first amount of bandwidth. Another user may not have internet access at all when in a VSA area.

Figure 18:
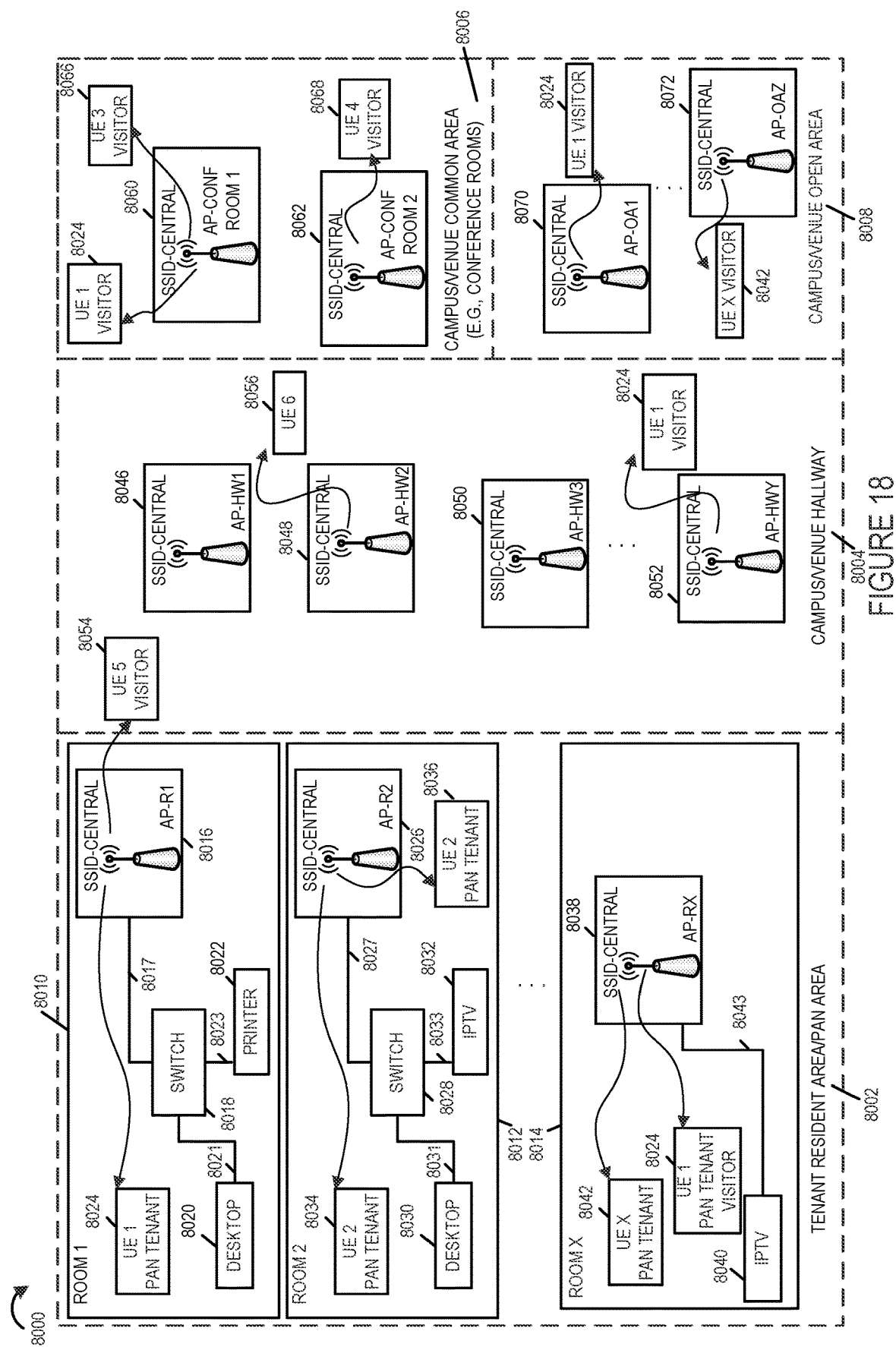
FIG. 18 illustrates exemplary system in accordance with an embodiment of the present invention.

FIG. 18 illustrates locations of Access Points and user equipment devices in an exemplary system 8000 in a high density network (e.g., a customer premise, campus or venue). While FIG. 18 does not show the orchestrator, WLAN controller, Centralized Gateway which is a data plane gateway), or AAA server of system 8000 these system elements are implemented and connected/coupled together and to the Access Points the same as shown in the system 200 illustrated in FIG. 2. In system 8000, the orchestrator or orchestration server also keeps track of UE mobility and provides dynamic Access Control rules and bandwidth policy rules. In some embodiments, the system 8000 is implemented as system 200 with the Access Points and user equipment devices of system 800 replacing and/or being added in addition to the Access Points and user equipment devices of system 200.

The exemplary system 8000 is deployed over a network area, customer premises or campus site or venue including a tenant resident area/Personal Area Network (PAN) area 8002 which is adjacent to a campus/venue hallway 8004 that in turn is adjacent to campus/venue common area 8006 and campus/venue open area 8008.

The tenant resident area/PAN area 8002 includes a plurality of rooms (Room 1 8010, Room 2 8012, . . . , Room X 8014. Each of the rooms having a Person Area Network.

In the example each of the rooms is associated with or assigned to a different tenant. In the example, Room 1 8010 has been assigned to and is being used by a tenant 1 which is user 1. Room 1 8010 comes equipped with an Access Point-Room 1 (AP-R1) 8016, a desktop computer 8020, a printer 8022 and switch 8018. AP-R1 8016 is coupled to orchestrator, WLAN controller, Centralized Gateway via a switch similar to how AP-1 210 in system is coupled to these system elements in system 200. AP-R1 8016 is also coupled/connected to switch 8018 via a wired connection 8017, e.g., an Ethernet cable. Switch 8018 is coupled/connected to desktop computer 8020 via wire 8021 (e.g., a cable). Switch 8018 is also coupled/connected to printer 8022 via wire 8023 (e.g., a cable). The Personal Area Network for tenant 1 which is user 1 includes desktop computer 8020, printer 8022, switch 8018 and network wires 8017, 8021 and 8023. The AP-R1 8016 coupling/connecting the Personal Area Network for tenant 1 to the WLAN having an SSID-Central. PAN Tenant 1 which is user 1 also has User Equipment device 1 (UE 1) 8024 which is provisioned to include credentials for the WLAN of system 8000. UE 1 8024 is illustrated as being wirelessly connected to AP-R1 8016 and is able to access the equipment of the PAN Tenant 1 via the WLAN in Room 1 8010 which is also the Home Service Area of the UE 1 8024. UE 1 8024 home service area is in this example restricted to connections made through AP-R1 when a connection is made to any of the other Access Points the orchestrator knows based on the AP location information included in the network authentication request (e.g., P-PSK access request or 802.1X EAP access request) that UE 1 8024 is in a designated visitor service area for UE 1 8024.

Room 2 8012 has been assigned to and is being used by a tenant 2 which is user 2. Room 2 8012 comes equipped with an Access Point-Room 1 (AP-R2) 8026, a desktop computer 8030, an IPTV 8032 and switch 8028. AP-R2 8026 is coupled to orchestrator, WLAN controller, Centralized Gateway via a switch similar to how AP-1 210 in system is coupled to these system elements in system 200. AP-R2 8026 is also coupled/connected to switch 8028 via a wired connection 8027, e.g., an Ethernet cable. Switch 8028 is coupled/connected to desktop computer 8030 via wire 8031 (e.g., a cable). Switch 8028 is also coupled/connected to IPTV 8032 via wire 8033 (e.g., a cable). The Personal Area Network for tenant 2 which is user 2 includes desktop computer 8030, IPTV 8032, switch 8028 and network wires 8027, 8031 and 8033. The AP-R2 8026 coupling/connecting the Personal Area Network for tenant 2 to the WLAN having an SSID-Central. PAN Tenant 2 which is user 2 also has User Equipment device 2 (UE 2) 8034 which is provisioned to include credentials for the WLAN of system 8000. UE 2 8034 is illustrated as being wirelessly connected to AP-R2 8026 and is able to access the equipment of the PAN Tenant 2 via the WLAN in Room 2 8012 which is also the Home Service Area of the UE 2 8034. UE 2 8034 home service area is in this example restricted to connections made through AP-R2 8026 when a connection is made to any of the other Access Points in the system the orchestrator knows based on the AP location information included in the network authentication request (e.g., P-PSK access request or 802.1X EAP access request) that UE 2 8034 is in a designated visitor service area for UE 2 8034.

Room X 8014 has been assigned to and is being used by a tenant X which is user X. Room 2 8014 comes equipped with an Access Point-Room X (AP-RX) 8038 and an IPTV 8040. AP-RX 8038 is coupled to orchestrator, WLAN controller, Centralized Gateway via a switch similar to how AP-1 210 in system is coupled to these system elements in system 200. AP-RX 8038 is coupled/connected to IPTV 8040 via wire 8043 (e.g., a cable). The Personal Area Network for tenant X which is user X includes IPTV 8040 and network wire 8043. The AP-RX 8038 coupling/connecting the Personal Area Network for tenant X to the WLAN having an SSID-Central. PAN Tenant X which is user X also has User Equipment device X (UE X) 8042 which is provisioned to include credentials for the WLAN of system 8000. UE X 8042 is illustrated as being wirelessly connected to AP-RX 8026 and is able to access the equipment of the PAN Tenant X via the WLAN in Room X 8014 which is also the Home Service Area of UE X 8042. UE X 8042 home service area is in this example restricted to connections made through AP-RX 8038 when a connection is made to any of the other Access Points in the system the orchestrator knows based on the AP location information included in the network authentication request (e.g., P-PSK access request or 802.1X EAP access request) that UE X 8042 is in a designated visitor service area for UE X 8042. UE 1 8024 is also shown as being wireless connected to the AP-RX 8038 while in Room X 8014. It is to be understood that UE 1 8024 roamed to Room X 8010 from Room 1 8024. While UE 1 8024 is PAN tenant for room 1 it is not a PAN tenant for Room X and hence is determined to be in a visitor service area by the orchestrator of system 8000 when it performs network authentication via AP-RX 8038. The orchestrator determining that UE 1 8024 is in a visitor service area based on the AP-RX location information provided in the authentication access-request message (e.g., P-PSK access request message) sent to the orchestrator. UE 1 8024 will have location based policies applied to the wireless services obtained via AP-RX 8038 which in this case is that UE 1 8024 is not able access the IPTV 8040 or the Internet via AP-RX 8038.

The campus/venue hallway area 8004 includes a plurality of Access Points (i.e., Access Point Hallway 1 (AP-HW1) 8046, AP-HW2 8048, AP-HW3 8050, . . . , AP-HWY (Y being an integer greater than 3) which broadcast the campus/venue wide SSID name (SSID-CENTRAL) and provide wireless service to user equipment devices in the campus/venue hallway area. UE 5 8054 is shown in the hallway 8004 and being connected to the AP-R1 in room 1 8010. UE 5 8054 is in a visitor service area for user 5 which not the tenant of Room 1 and based on location based policies is restricted from accessing the PAN but is able to access Internet via WLAN via AP-R1 8016 as UE 5 8054 visitor policies allow Internet access. UE 6 8056 is illustrated as being in the campus/venue hallway 8004 and being wirelessly connected to AP-HW2 8048. UE 6 8056 is not a tenant but is a subscriber of the SSID-Central WLAN and has been pre-provisioned with credentials to connect and operate on the WLAN of system 8000. In this example, UE 6 8058 receives wireless services via AP-HW2 8048. The policies applied to the service being determined by the orchestrator based on location information provided by the AP-HW2 8048 when UE 6 8056 requested network authentication after associating with AP-HW2. In this example, while UE 1 8024 was previously discussed as being shown in room 1, UE 1 8024 is now shown as being in the hallway. It is to be understood that UE 1 8024 has roamed out into the hallway from room 1 8010 is now receiving wireless services from AP-HWY 8052. However, UE 1 8024 is now shown as a visitor to illustrate that UE 1 8024 is now in Visitor Service Area and as Visitor Service Area policies applied to the wireless services it is receiving from AP-HWY.

The campus/venue common area 8006 includes a plurality of conference rooms with an Access Point located in each conference room to provide wireless services for users of the conference rooms. AP-Conf Room 1 located in conference room 1 and AP-Conf Room 2 located in conference room 2. UE 1 8024 and UE 3 8066 are shown as receiving wireless services via AP-Conf Room 1 8060 and both are shown as being determined to be visitors that is conference room 1 is a visitor service area for both UE 1 8024 and UE 3 8066. It should be understood that UE 1 8024 roamed from room 1 8010 to the conference room 1. UE 4 8068 is shown as receiving wireless services from AP-Conf Room 2 and is also shown as having visitor status that is being determined to be in visitor service area for UE 4 8068 in which visitor location based policies will be applied.

The campus/venue open area 8008 also includes a plurality of Access Points (Access Point-Open Area A (AP-OA1) 8070, . . . , AP-OAZ 8072, Z being an integer greater than 1). The open area 8008 may be, and in some embodiments, is outside space such as courtyard and/or parking lot in which the AP-AO1 8070 to AP-AOZ 8072 provide wireless services.

UE 1 8024 is illustrated as receiving wireless services from AP-OA1 8070. UE 1 8024 is identified as a visitor as UE 1 8024 is determined to be in a visitor service area based on the location of AP-OA 1 8070. As such visitor policies based on the location of AP-OA 1 8070 are applied to the wireless services provided to UE 1 8024 via AP-OA 1 8070. It is to be understood that UE 1 8024 roamed to this location from room 1 8010.

UE X 8024 is illustrated as receiving wireless services from AP-OAZ 8072. UE X 8042 is identified as a visitor as UE X 8042 is determined to be in a visitor service area based on the location of AP-OAZ 8072. As such visitor policies based on the location of AP-OAZ 8072 are applied to the wireless services provided to UE X 8042 via AP-OAZ 8072. It is to be understood that UE X 8042 roamed to this location from room X 8014.

In this example, the orchestrator which is tracking the movement of the UE devices about the campus/venue and thus is able to apply specific policy based rules based on the AP (e.g., Access Point provided location information) from which the UE device is receiving wireless services. For example, UE 1 8024 may, and in some embodiments does, receive higher bandwidth and PAN capabilities when connected to AP-R1 8015 in its home service area than when roaming outside its home service area. For example, UE 1 8024 when roaming and connected to an AP-HWY 8052 in the campus/venue hallway 8004 may be, and in some embodiments does, have lower bandwidth policies and restricted access policies applied to it. Similarly, when UE 1 8024 roams to conference room, e.g., conference room, and connects to AP-Conf Room 1 8060 or when UE 1 8024 roams to campus/venue open area 8008 and connects to AP-OA1 8070. The orchestrator may update the rules and policies depending operator provisioned details based on location specific traffic shaping and policies. The use of the stacked VLAN for each of the user equipment devices allows for different policies to be applied to each of the user equipment devices with respect to each of the Access Points in the system.

Figure 4:
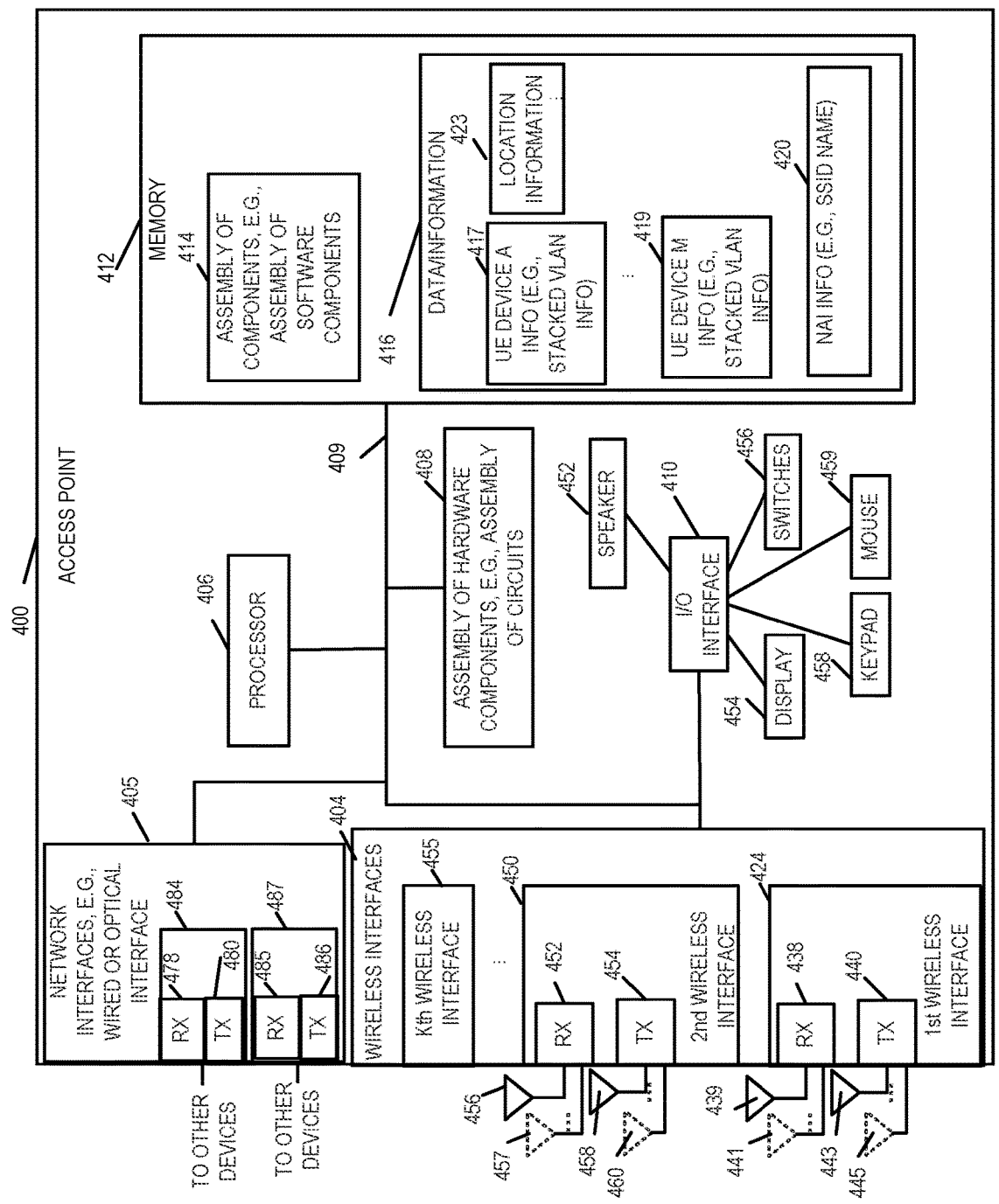
FIG. 4 illustrates details of an exemplary Access Point in accordance with one embodiment of the present invention.

FIG. 4 is a drawing of an exemplary Access Point (AP) 400 in accordance with an exemplary embodiment. The Access Point 400 supports the RADIUS protocol and IEEE 802.1X standard requirements and operations. Exemplary Access Point 400 includes wireless interfaces 404, a network interfaces 405, e.g., a wired or optical interfaces, a processor 406, e.g., a CPU, an assembly of hardware components 408, e.g., an assembly of circuits, and I/O interface 410 and memory 412 coupled together via a bus 409 over which the various elements may interchange data and information. Access Point 400 further includes an optional speaker 452, an optional display 454, optional switches 456, an optional keypad 458 and an optional mouse 459 coupled to I/O interface 410, via which the various I/O devices (452, 454, 456, 458, 459) may communicate with other elements (404, 405, 406, 408, 412) of the Access Point 400. Network interfaces 405 includes a first interface 484 and a second interface 487. The first interface 484 includes a first receiver 478 and a first transmitter 480. In some embodiments, receiver 478 and transmitter 480 are part of a transceiver. The second network interface 487 includes a second receiver 485 and a second transmitter 486. In some embodiments, receiver 485 and transmitter 486 are part of a transceiver. While only two network interfaces have been illustrated the Access Point in some embodiments has J network interfaces. J being an integer greater than 2. In some embodiments, some of the network interfaces include physical ports to which end user device or client devices (e.g., desk top computer, IPTV, printer, projector, etc.) can be connected via cables, e.g., ethernet cables. In some embodiments, the I/O interface 410 includes additional interfaces to which end user device or client devices can be connected. One or more of the network interfaces 405 are used to connect the AP 400 to another network device such as for example a network switch, WLAN controller, RADIUS server. Wireless interfaces 404 include a plurality of wireless interfaces including first wireless interface 424, second wireless interface 450, . . . , Kth wireless interface 455. The wireless interfaces are used to communicate with the other wireless devices, e.g., user equipment devices such as mobile devices, mobile phones, smartphones, tablets, laptops. The first wireless interface 424 is used for example to communicate with a user equipment device 1 204 using Wi-Fi. The second wireless interface can be used to communicate with wireless devices such as user equipment devices using a second wireless communications protocol, e.g., 5G NR or cellular. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which Access Point 400 can receive wireless signals from other wireless communications devices such as user equipment devices. Wireless transmitter 440 is coupled to a plurality of wireless transmit antennas (transmit antenna 1 443, . . . , transmit antenna N 445) via which the Access Point 400 can transmit signals to other wireless communications devices including a second wireless communications device, e.g., user equipment device 1.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which Access Point 400 can receive wireless signals from other wireless communications devices including a second wireless communications device, e.g., user equipment device 1, using a different wireless protocol than the first wireless interface. Wireless transmitter 454 is coupled to one or more wireless transmit antennas (transmit antenna 1 458, . . . , transmit antenna N 460) via which the Access Point 400 can transmit signals to other wireless communications devices including a second wireless communications device. One or more of the network interfaces 405 may be coupled to switches, RADIUS server, orchestration server, AAA server, centralized gateway, WLAN controller, computers, network equipment and/or other networks, e.g., internet, or other Access Points. Wireless interfaces 424, 450, . . . , 455 are in various embodiments the different radios used for communicating using different Radio Access Technology. In some embodiments, the first wireless interface 424 is a 2.4 GHz radio while the second wireless interface is a 5 GHz radio. In some embodiments, two or more of the wireless interfaces utilize the same wireless protocol, e.g., Wi-Fi protocol.

Memory 412 includes an assembly of components 414, e.g., an assembly of software components, and data/information 416. Data/information 416 includes UE device information corresponding to a plurality of user equipment devices (UE device A information 417, . . . , UE device M information 419 where A to M are the UE devices being serviced by the Access Point such as for example UE 1 204 and UE 206 of system 200 illustrated in FIG. 2 or UE 302 of the system illustrated in FIG. 3. UE Device A information 417 includes information about the UE Device A such as for example, Association ID, VLAN stacking information (e.g., S-VLAN and C-VLAN assigned to the UE Device A), encryption information for communicating with the UE device, physical or virtual port to which device is connected). UE Device M information 419 includes information about the UE Device M such as for example, Association ID, VLAN stacking information (e.g., S-VLAN and C-VLAN assigned to the UE Device M), encryption information for communicating with the UE device, physical or virtual port to which UE device M is connected). Location information 423 is the location information for the Access Point 400. This information is communicated to the RADIUS server (e.g., orchestration server or AAA server) during network authentication of user device as described in connection with FIG. 12. Network Address Identifier information 420 (e.g., SSID name to be broadcast by the Access Point (e.g., SSID-Central).

While the details of the first and second wireless interfaces are shown, the other wireless interfaces of the Access Point 400, e.g., wireless interface K where K is an integer greater than 2 also include multiple receivers and transmitters so that the Access Point 400 can provide wireless services to for example hundreds or thousands of user equipment devices. In some embodiments, one or more of the Access Points discussed and/or shown in the Figures and/or in connection with the methods discussed herein including Access Point 210, 211, . . . , 212 of system 200, AP/WLAN 304 of system 300, AP 3006, AP 4006, AP 5006, AP 6006, AP 7006, AP 7007 and the Access Points illustrated in FIG. 18 are implemented in accordance with the Access Point 400.

Figure 5:
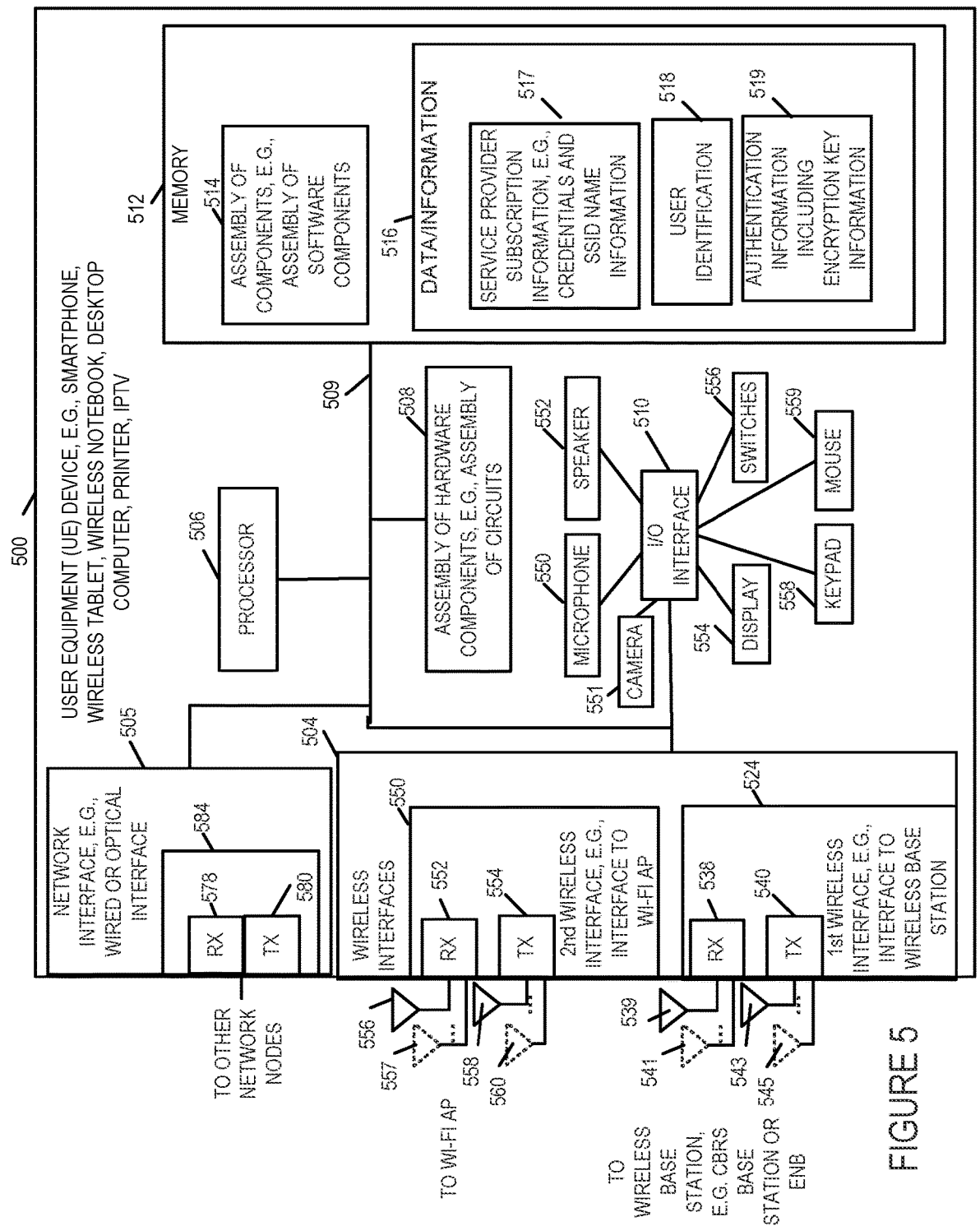
FIG. 5 illustrates details of an exemplary User Equipment (UE) device, e.g., a mobile device, cell phone, smartphone, wireless tablet, laptop, wireless notebook, in accordance with one embodiment of the present invention.

FIG. 5 is a drawing of an exemplary user equipment (UE) device 500 in accordance with an exemplary embodiment. UE device 500 is, e.g., a mobile device, a cell phone, a smart phone, wireless tablet, wireless notebook, WiFi device, desktop computer, or an IPTV. UE device 500 includes WiFi device capabilities and/or wired capabilities (e.g., physical Ethernet port by the UE device can be connected to a switch and/or an Access Point. In some embodiments, UE device 500 in addition to having Wi-Fi device capabilities is also enabled to communicate using at least one other wireless protocol, e.g., 5G wireless protocol, CBRS wireless protocol or cellular wireless protocol. The UE device 500 in some embodiments is a user equipment device operating at the 4G, 5G, and in the 2.4 GHz band and/or 5 GHz band which also has Wi-Fi capabilities and can be operated to work in dual mode operation. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to a switch, a physical port on an Access Point or a router within a customer premises, e.g., a campus site, or to wired (e.g., cable) or optical (e.g., fiber-optic) networks. In some embodiments, receiver 578 and transmitter 580 are part of a transceiver 584. In some embodiments network interface 505 is a USB interface for connecting to a computer. In some embodiments the network interface is a network interface 505 is an Ethernet interface for connecting to network switches or Access Points. In some embodiments, the UE 500 includes a plurality of network interfaces with the plurality of network interfaces including different types of network interfaces (e.g., USB, Ethernet, etc.)

Wireless interfaces 504 include a plurality of wireless interfaces including first wireless interface 524 and a second wireless interface 550. The first wireless interface 524 is used to communicate with a wireless base station, e.g., a cellular base station. The second wireless interface is used to communicate with a Wi-Fi Access Point, e.g., Access Point 1 210, Access Point 2 211, . . . , Access Point N 212 of system 200. The first wireless interface 524 includes wireless receiver 538 and a wireless transmitter 540. In some embodiments, receiver 538 and transmitter 540) are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station. Wireless transmitter 540 is coupled to a plurality of wireless transmit antennas (transmit antenna 1 543 . . . , transmit antenna N 545) via which the user equipment device 500 can transmit signals to other wireless communications devices including a second wireless communications device, e.g., wireless base station. The antennas 539, . . . 541 and 543, 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556 . . . , receive antenna M 557), via which user device 500 can receive wireless signals from other wireless communications devices including a second wireless communications device, e.g., a Wi-Fi Access Point using Wi-Fi protocol. Wireless transmitter 554 is coupled to one or more wireless transmit antennas (transmit antenna 1 558, . . . , transmit antenna N 560) via which the user equipment device 500 can transmit signals to other wireless communications devices including a second wireless communications device. The user equipment device network interface 505 may be coupled to LAN or WAN networks, switches, Access Points and/or routers so that the user equipment device can also obtain services via a hardwired connection in addition to through the wireless interfaces or when there are no wireless interfaces on the user equipment device. In the exemplary embodiment the second wireless interface is a Wi-Fi wireless interface.

Memory 512 includes an assembly of components 514, e.g., an assembly of software components, and data/information 516. Service Provider subscription information 517, e.g., credential information and NAI information (e.g., user1@serviceprovider.com), included when the user equipment device 500 is provisioned or pre-provisioning. Data/information 516 also includes user identification information 518 which can be used to identify the user and/or user equipment device in some embodiments. In some embodiments, when once the UE is associated with an Access Point the Association identifier assigned to the UE is stored in data/information 516 of memory 512. In the data/information 516 of memory 512 authentication information including encryption key information 519 is also stored.

In some embodiments, one or more of the user equipment devices shown in the figures or discussed herein for example in connection with the methods described including for example UE devices UE 1 204, UE 2 206, . . . , UE N 208, desktop computer 226, IPTV 228 of system 200 and UE 1 302, UE 3004, UE 4004, UE 5004, UE 6004, UE 7004 are implemented in accordance with exemplary user equipment device 500. While the UE device 500 has been illustrated as a dual mode device that has two wireless interfaces 550 and 524, the UE device 500 may, and in some embodiments, only has a single wireless interface, e.g., Wi-Fi interface. In some embodiments, the user equipment device may have no wireless interfaces and only have a wired interface. The first wireless interface 524 may be, and in some embodiments is used to communication with a wireless base station using a first wireless protocol, e.g., a 5G protocol, 4G protocol, LTE protocol or CBRS wireless protocol and the second wireless interface 550 which is a Wi-Fi interface is enabled to communicate with a Wi-Fi Access Point. User equipment device 500 is enabled to communicate using the 802.11 protocol suite and to perform network authentication procedures (e.g., P-PSK authentication and 802.1X authentication).

Figure 6:
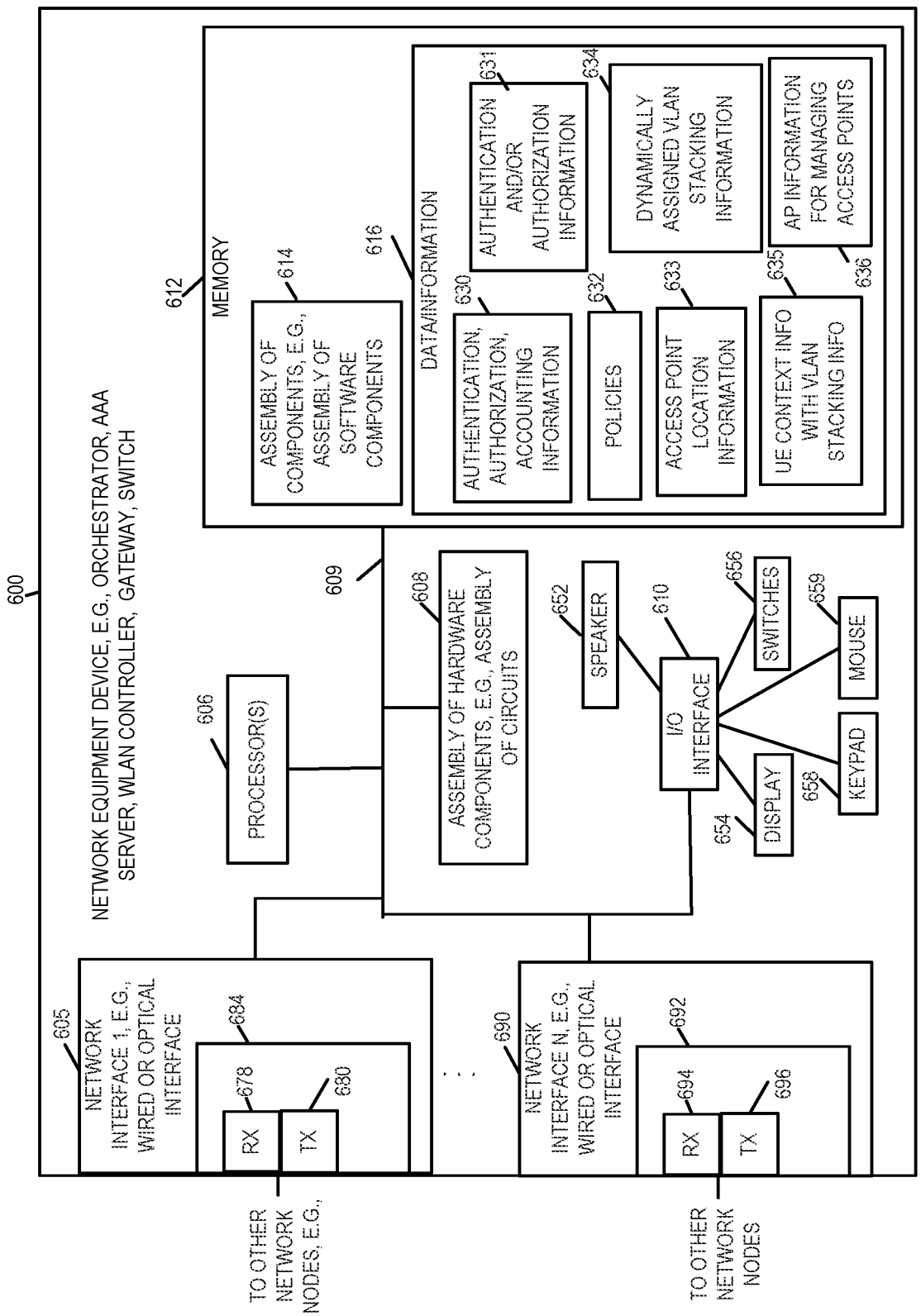
FIG. 6 illustrates details of an exemplary network equipment device, e.g., orchestration server, Authentication, Authorization, and Accounting (AAA) server system, a WLAN controller, a centralized gateway, in accordance with one embodiment of the present invention.

FIG. 6 is a drawing of an exemplary network equipment device (e.g., RADIUS server, switch, orchestrator or orchestration server, AAA server, Gateway (e.g., centralized gateway), WLAN controller, database server) in accordance with an exemplary embodiment. The network device 600 includes a plurality of network interfaces 605, ..., 690, e.g., wired or optical interfaces, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The network equipment device 600 further includes a speaker 652, a display 654, switches 656, keypad 658 and mouse 659 coupled to I/O interface 610, via which the various I/O devices (652, 654, 656, 658, 659) may communicate with other elements (605, ..., 690, 606, 608, 612) of the network equipment device 600. Network interface 605 includes a receiver 678 and a transmitter 680. Network interface 690 includes a receiver 694 and a transmitter 696. The network interfaces 605, ... 690 are typically used to communicate with other devices, e.g., switches, Access Points, orchestration server, AAA Server, database system, WLAN controller, Centralized Gateway, or other devices in the network or to connect to other network(s), e.g., the Internet. In some embodiments, receiver 678 and transmitter 680 are part of a transceiver 684. In some embodiments, receiver 694 and transmitter 696 are part of a transceiver 692. Memory 612 includes an assembly of component 614, e.g., an assembly of software components, and data/information 616. Data/information 616 includes Authentication, Authorization and Accounting Information 630 when the network equipment device 600 is an AAA server. Authentication and Authorization information 631 when the network equipment device 600 is a RADIUS server, an ochestrator, an orchestration server, an AAA server. Policies 632 such as for example, subscriber and user equipment device policies including user and/or user device location based policies, quality of service policies, class of service policies, and bandwidth policies, home service area policies, visitor service area policies. Access Point location information 633 for each of the Access Points for network or campus site. Dynamically assigned VLAN stacking information 634 for users/user equipment devices. UE context information 635 with VLAN stacking information, policies, e.g., location based policies, to be applied, UE location information (HSA or VSA), UE identification information, UE MAC address, UE IP assignment information, updated policies. AP configuration and management information 635 for configuring and managing the Access Points in the network. The specific information included in the network equipment device data/information 616 will be dependent on what device is implemented as not all network devices will have all of the information, e.g., WLAN controller will not need accounting information but may need UE context information and encryption information if it fast roaming 802.11r services are being provided by WLAN as discussed in connection with method 7000. In some embodiments, network equipment devices disclosed in the figures and/or discussed in connection with the various embodiments of the invention are implemented in accordance with network equipment device 600. For example, switch 213, switch 214, orchestrator 218, WLAN controller 216, centralized gateway 220, AAA server 222, database 223 of system 200 of FIG. 2, RADIUS server 306, WLAN controller 3008, orchestration server 3010, centralized gateway 3012, AAA server 3014, Database 3016, WLAN controller 4008, orchestration server 4010, centralized gateway 4012, AAA server 4014, Database 4016, WLAN controller 5008, orchestration server 5010, centralized gateway 5012, AAA server 53014, Database 5016, WLAN controller 6008, centralized gateway 6012, AAA server 6014, Database 6016, WLAN controller 7008, centralized gateway 7012, AAA server 7014, and Database 7016 are implemented in accordance with network equipment device 600.

Figure 7:
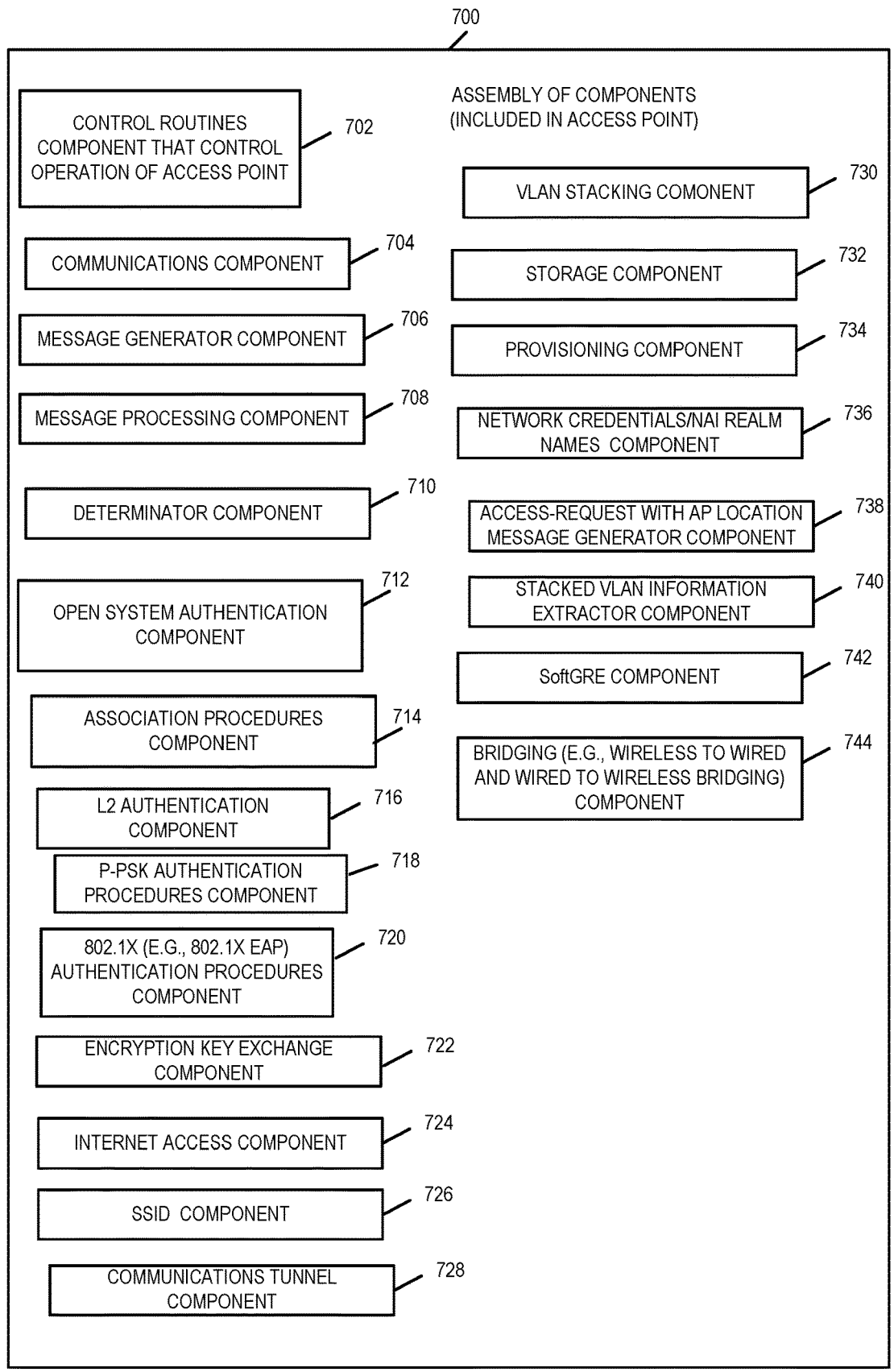
FIG. 7 illustrates an exemplary assembly of components for an Access Point (e.g., Access Point) in accordance with an embodiment of the present invention.

FIG. 7 is a drawing of an exemplary assembly of components 700 which may be included in an exemplary Access Point (e.g., exemplary Access Point 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the Access Point 400, with the components controlling operation of Access Point 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a determinator component 710, an open system authentication component 712, an association procedures component 714, an L2 authentication component 716, a P-PSK authentication procedures component 718, an 802.1X (e.g., IEEE 802.1X EAP) authentication procedures component 720, an encryption key exchange component 722, an internet access component 724, an SSID component 726, a communications tunnel component 728, a VLAN stacking component, a storage component 732, a provisioning component 734, a network credentials/NAI Realm names component 736, an ACCESS-REQUEST with Access Point location message generator component 738, a stacked VLAN information extractor component 740, a SoftGRE component 742, a bridging (e.g., wireless signal to wired signal bridging and wired signal to wireless signal bridging) component 744.

The control routines component 702 is configured to control operation of the Access Point. The communication component 704 is configured to handle communications, e.g., transmission and reception of messages, and protocol signaling for the Access Point. The message generator component 706 is configured to generate messages for transmission to other devices, e.g., authentication request messages, Access-Request message, RADIUS Authentication request messages, RADIUS Access-Request messages, authentication success messages, Soft GRE messages, Association response messages, and reception and in some embodiments processing of messages. The message processing component 708 is configured to process messages received from other devices, e.g., messages from user equipment devices, messages from WLAN controller, messages from the AAA server, Wireless Access Gateway, Orchestration Servers.

The determinator component 710 is configured to make determinations and decisions for the Access Point including for example: determine for a user equipment device or client device dynamically assigned stacked VLAN information included in an authentication response message or Access-Accept message, determine a S-VLAN ID from received stacked VLAN information for a user equipment device or client device, determine a C-VLAN ID from received stacked VLAN information for a user, determine location information to be included an authentication request message or an Access Request message, determine an Association Identifier to be used for a user equipment device, determine a port (virtual or physical) on which messages are received or to be transmitted.

The open system authentication component 712 performs open system authentication operations.

The association procedures component 714 performs operations for associating a UE with a network and/or the network Access Point.

The Layer 2 (L2) Authentication component 716 performs operations and/or procedures for implementing Layer 2 Authentication for a user equipment device. In various embodiments these operations and/or procedures include receiving authentication requests from user equipment devices and generating and transmitting authentication request messages and/or access-request messages to a WLAN controller, an orchestration system or an AAA server based on the received authentications. The L2 authentication component 714 also in various embodiments receives authentication responses and forwards and/or generates messages based on the responses and communicates the authentication response to the user equipment device. The L2 Authentication component 716 also extracts stacked VLAN information from the Authentication and/or Access-Accept messages.

The Personal or Per User PSK Authentication procedures component 718 performs operations for implementing Personal or Per User PSK Authentication procedures. In some embodiments, P-PSK Authentication procedures component 718 is a sub-component of the L2 Authentication component 716.

The 802.1X Authentication procedures component 718 performs operations for implementing 802.1X Authentication procedures, e.g., 802.1X EAP authentication procedures. In some embodiments 802.1X Authentication procedures component 718 is a sub-component of the L2 Authentication component 716.

The encryption key exchange component 722 performs encryption key exchange procedures with an user equipment device, e.g., mobile device. In some embodiments the encryption key exchange component 722 performs the 4-way handshake procedures used for encryption key generation and/or exchange.

The Internet access component 728, performs operations to provide Internet access to a UE including generating messages to send to gateways with VLAN information (S-VLAN ID and C-VLAN ID) dynamically assigned to the user equipment device requesting internet access.

The SSID component 726 is configured to implement all aspects related to generation and broadcasting of SSID name information and responding to SSID queries. In some embodiments, SSID component 726 is a sub-component of communications component 704 and/or message generator component 706.

The communications tunnel component 728 establishes and utilizes tunnels for communicating frames/messages between the Access Point and other devices such as, for example, the centralized gateway. In some embodiments, the communications tunnel component is a sub-component of the communications component 704.

The VLAN stacking component 730 implements VLAN stacking procedures with respect to messages sent and received from user equipment devices including mapping dynamically assigned stacked VLAN information (e.g., VLAN headers) to user equipment devices, adding stacked VLAN information (e.g., VLAN headers) to messages from a user equipment device and removing VLAN headers from messages sent to a user equipment device.

The storage component 732 performs storage and retrieval operations in connection with on-board and external memory including record creation, updating and deletion, e.g., records containing stacked VLAN information and identification of corresponding user equipment device, and communications ports being used for communicating messages, network subscriber credential and NAI realm information, SSID names. The storage component 732 is also configured to manage the storage, and retrieval of data and/or instructions to/and from memory, databases and/or storage device coupled and/or connected to the Access Point.

The provisioning component 734 implements provisioning operations when network subscriber and credential information is provisioned and/or included on the Access Point, e.g., during initialization and or update procedures. The provisioning operations in some embodiments include storage and security operations and/or procedures for securing the subscriber and credential information, SSID names, NAI realm names, PLMN information.

The network credentials/NAI Realm names component 736 stores and maintains network credential information with corresponding NAI realm names and SSID names as well as processes requests, e.g., SSID query requests, relating to network credentials/NAI Realm names.

The Access-Request with Access Point location message generator component 738 generates Access Request that includes the Access Point's location (e.g., as shown in FIG. 12). In some embodiments, the Access-Request with Access Point location message generator component 738 is a sub-component of the communications component 704 or the message generator component 706.

The stacked VLAN information extractor component 740 extracts stacked VLAN information from messages including for example from vendor specific attribute fields of Access Accept messages and multi-occurrence tunnel attributes of Access-Accept messages. In some embodiments, the stacked VLAN information extractor component 740 is a sub-component of the VLAN stacking component 730 and/or the communications component 704 and/or the message processing component 708.

The SoftGRE component 742 implements procedures for establishing and utilizing Soft GRE tunnels to communicate data and information. In some embodiments SoftGRE component 742 is a sub-component of the communications component 704 and/or the communications tunnel component 728.

The bridging component 744 performs bridging operations including bridging wireless signals/messages received from user equipment devices to signals/messages on a wired cables (e.g., Ethernet cables) and signal/messages received on wired cables to wireless signals/messages. In some embodiments, the bridging component 744 is a sub-component of the communications component 704.

Figure 8:
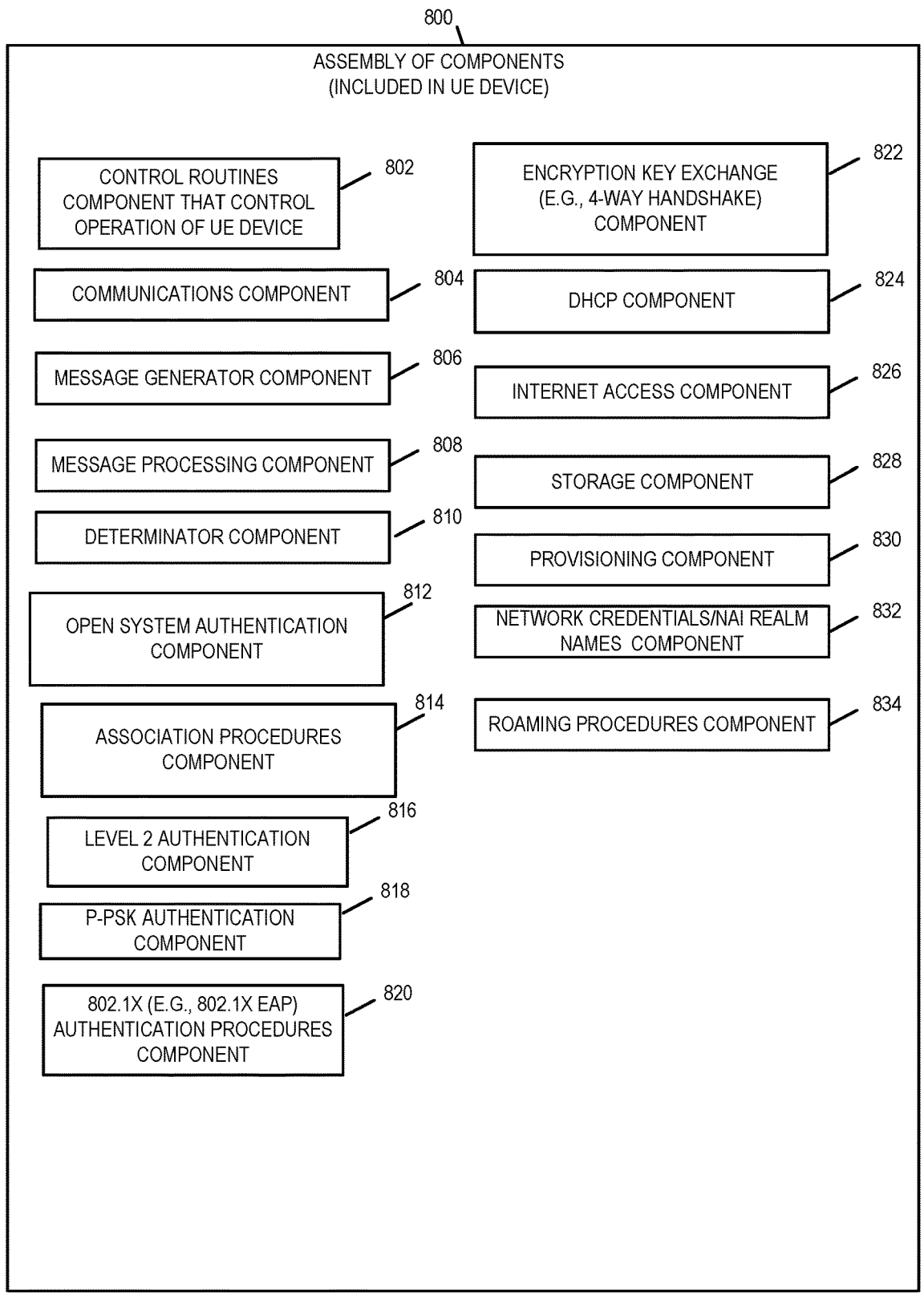
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a determinator component 810, an open system authentication component 812, an association procedures component 814, an L2 authentication component 816, a P-PSK Authentication component 818, an 802.1X authentication procedures component 820, an encryption key exchange component 822, a DHCP component 824, an Internet Access component 826, a storage component 828, a provisioning component 830, a network credentials/NAI real names component 832, and a roaming procedures component 834.

The control routines component 802 is configured to control operation of the UE. The communication component 804 is configured to handle communications, e.g., receipt and transmission of signals and provide protocol signal processing for one or more protocols for the UE. The message generator component 806 is configured to generate messages for transmission to other devices, such as the network edge device (e.g., Access Point, wireless router) with which the UE is communicating. Messages include data messages, encrypted data messages, Authentication messages (Authentication requests, EAP Authentication messages), Key Exchange messages, Association messages (e.g., Association request messages). In some embodiments, the message generator component 806 is a sub-component of the communications component 804.

The message processing component 808 processes received messages, e.g., messages from Access Points including association response messages, authentication response messages, DHCP offer messages, data messages. In some embodiments, the message processing component is a sub-component of the communications component 804.

The determinator component 810, makes determinations for the user equipment device including for example determining what network to select for association and L2 authentication.

The open system authentication component 812 performs open system authentication operations.

The association procedures component 814 performs operations for associating a UE with a network and/or the network Access Point.

The Layer 2 (L2) Authentication component 816 performs operations and/or procedures for implementing Layer 2 Authentication for a user equipment device. In various embodiments these operations and/or procedures include generating L2 authentication requests and transmitting them to network edge devices, e.g., Access Points. The L2 authentication component 814 also in various embodiments receives and processes L2 authentication response messages.

The Personal or Per User PSK Authentication procedures component 818 performs operations for implementing Personal or Per User PSK Authentication procedures. In some embodiments, P-PSK Authentication procedures component 818 is a sub-component of the L2 Authentication component 816.

The 802.1X Authentication procedures component 820 performs operations for implementing 802.1X Authentication procedures, e.g., 802.1X EAP authentication procedures. In some embodiments 802.1X Authentication procedures component 820 is a sub-component of the L2 Authentication component 816.

The encryption key exchange component 822 performs encryption key exchange procedures with a network edge device, e.g., Access Point. In some embodiments the encryption key exchange component 822 performs the 4-way handshake procedures used for encryption key generation and/or exchange.

The DHCP component implements dynamic host configuration protocol procedures for the user equipment device, e.g., generating and transmitting DHCP discovery messages. In some embodiments, the DHCP component is a sub-component of the communications component 804.

The Internet access component 826 performs operations to request Internet access and to send data packets to devices via the Internet or with Internet destination addresses.

The storage component 828 performs storage and retrieval operations in connection with on-board and external memory including record creation, updating and deletion, e.g., records containing association identifier, authentication information, encryption information, network subscriber credential and NAI realm information.

The provisioning component 830 implements provisioning operations when L2 authentication information (e.g., network subscriber and credential information) is provisioned on the user equipment device. The provisioning operations in some embodiments include storage and security operations and/or procedures for securing the subscriber and credential information.

The network credentials/NAI Realm names component 832 stores and maintains network credential information with corresponding NAI realm names and in some embodiments SSID names as well as generates and processes messages utilizing network credential information/NAI Realm name information, e.g., SSID query requests, SSID query responses, etc.

The roaming procedures component 834 implements procedures for roaming (e.g., 802.11r procedures) and re-associating and performing L2 authentications during roaming.

Figure 9:
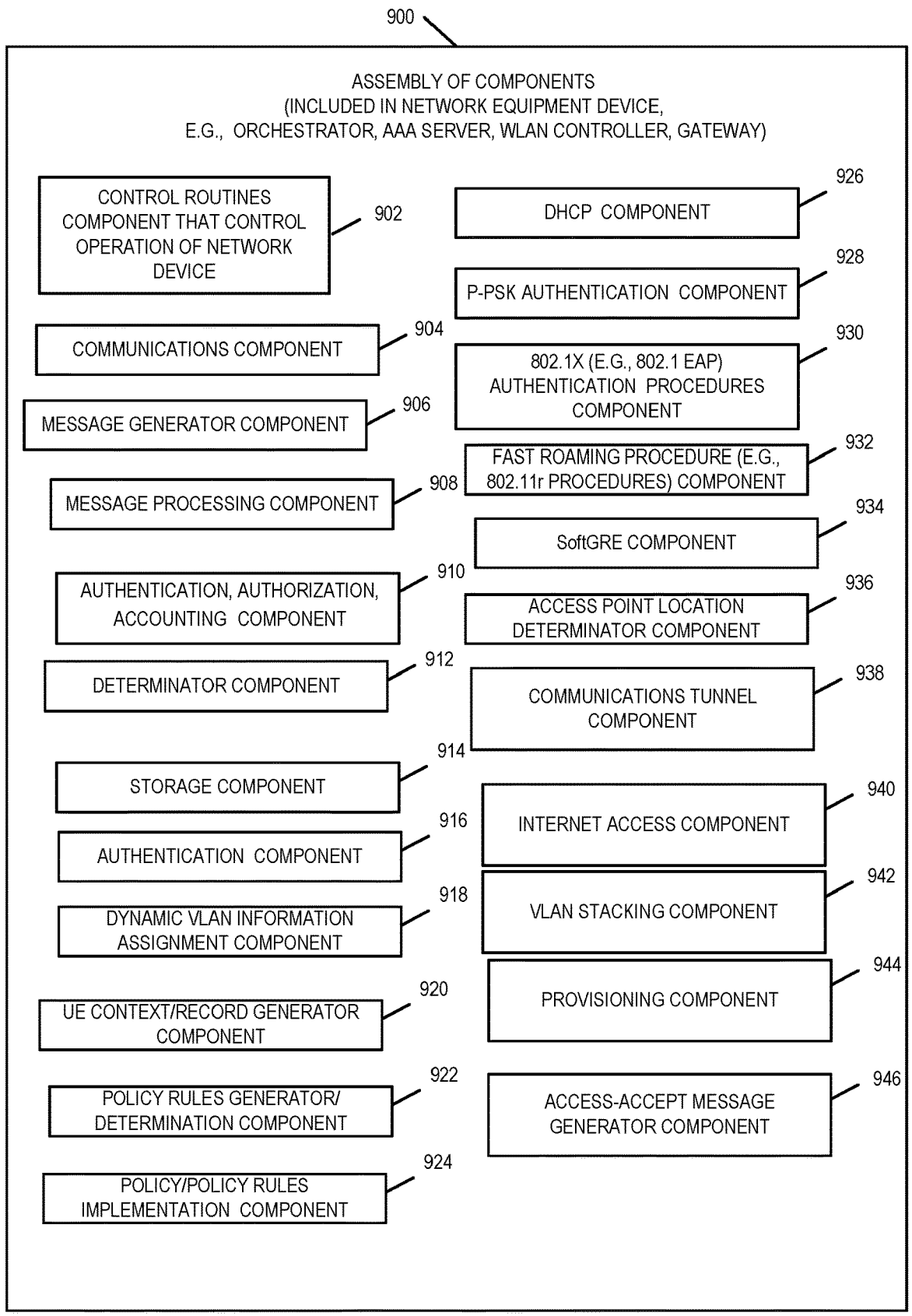
FIG. 9 illustrates an exemplary assembly of components for a network equipment device in accordance with an embodiment of the present invention.
Figure 10A:
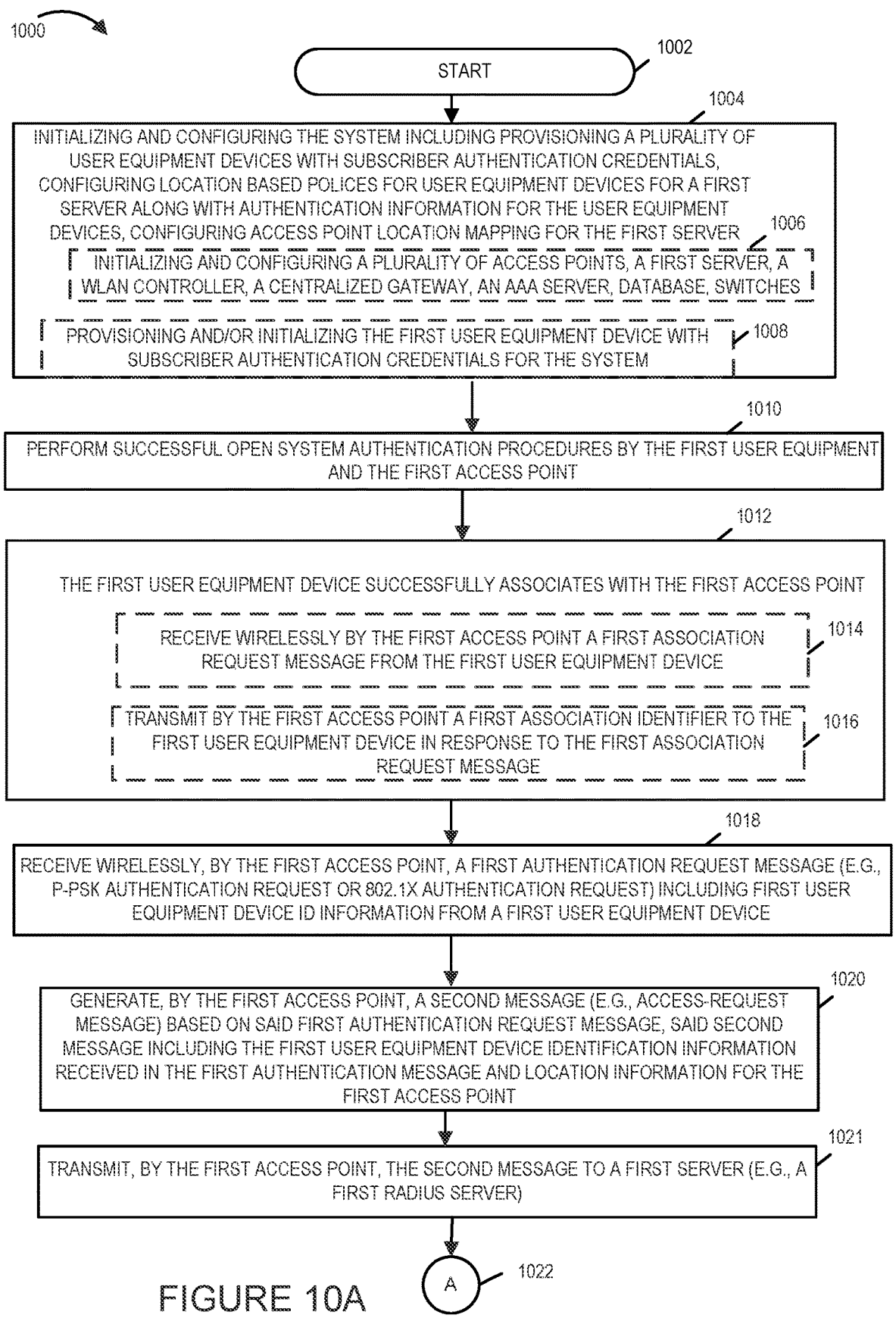
FIG. 10A illustrates the steps of the first part of an exemplary method in accordance with an embodiment of the present invention.
Figure 10B:
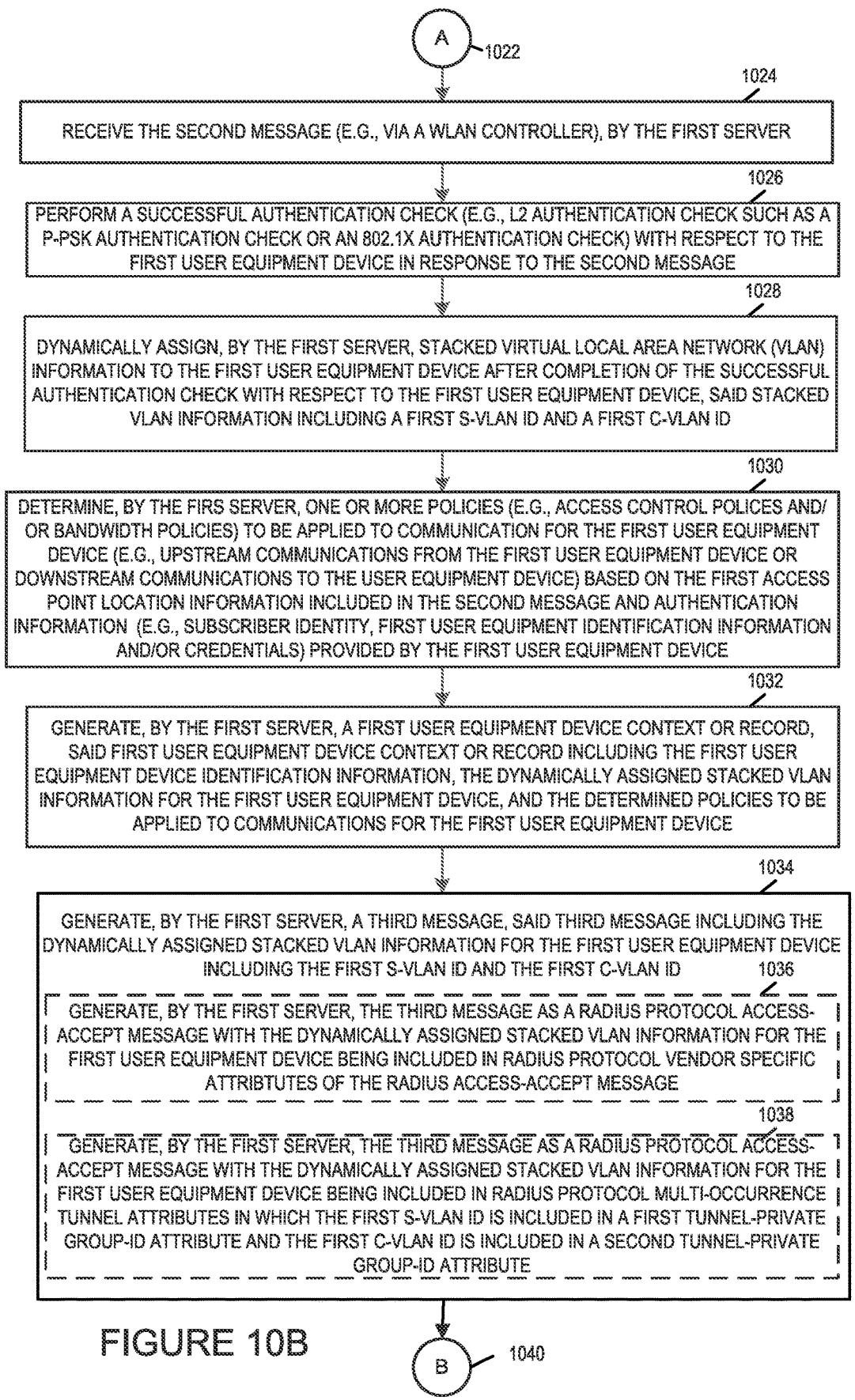
FIG. 10B illustrates the steps of the second part of an exemplary method in accordance with an embodiment of the present invention.
Figure 10C:
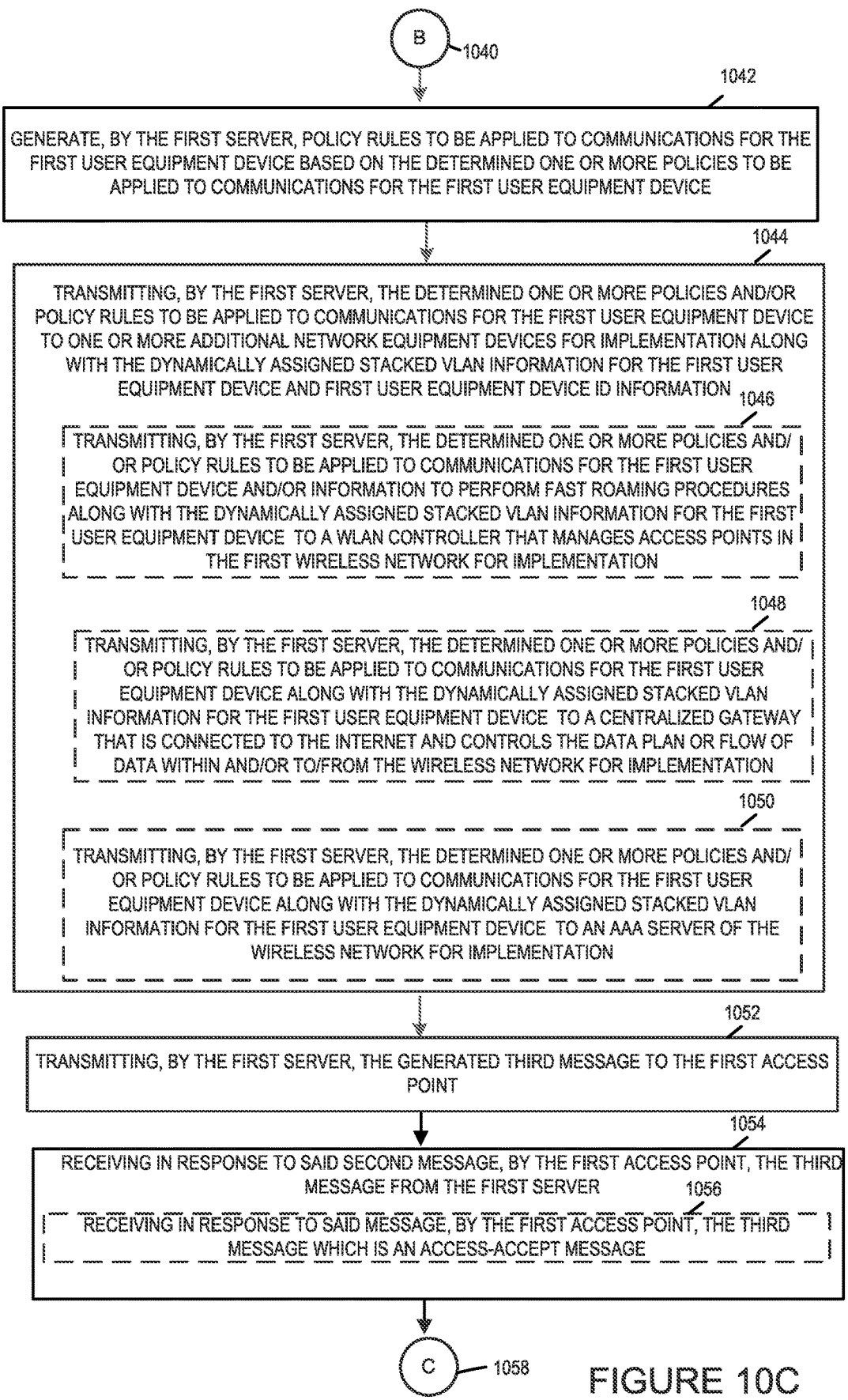
FIG. 10C illustrates the steps of the third part of an exemplary method in accordance with an embodiment of the present invention.
Figure 10D:
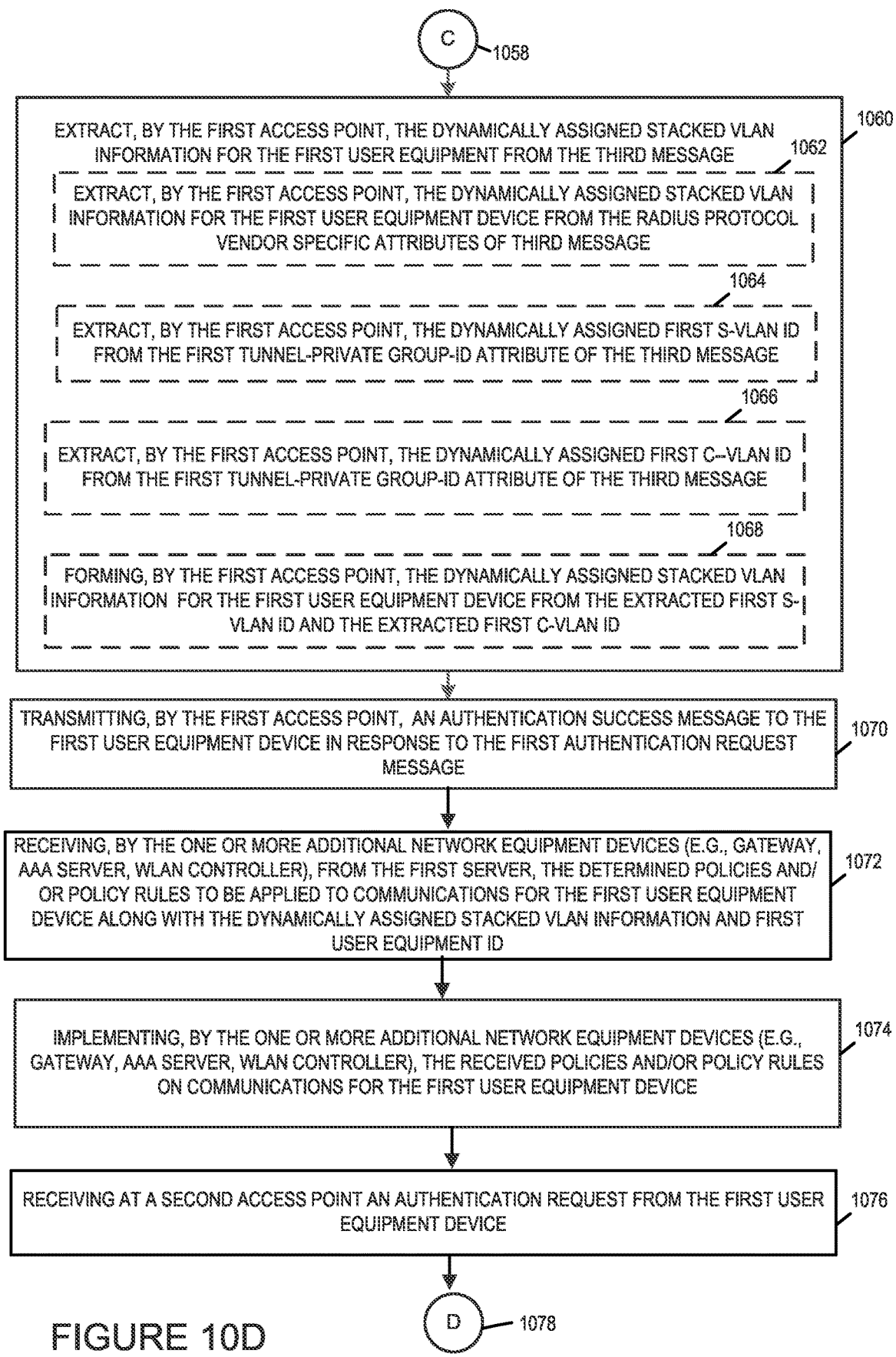
FIG. 10D illustrates the steps of the fourth part of an exemplary method in accordance with an embodiment of the present invention.

FIG. 9 is a drawing of an exemplary assembly of components 900 which may be included in a network equipment device, e.g., network equipment device 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the cable modem termination system 600, with the components controlling operation of the cable modem termination system 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the cable modem termination system 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, an authentication, authorization, accounting component 910, a determinator component 912, a storage component 914, an authentication component 916, a dynamic VLAN information assignment component 918, a UE context/record generator component 920, policy rules generator/determinator component 922, a policy and policy rules implementation component 924, a DHCP component 926, a P-PSK authentication component 928, an 802.1X authentication procedures component 930, a fast roaming procedures (e.g., 802.11r procedures) component 932, a SoftGRE component 934, an network edge device (e.g., Access Point) location determinator component 936, a communications tunnel component 938, an Internet access component 940, a VLAN stacking component 942, a provisioning component 944, and an Access-Accept message generator component 946.

Not all components are included in or utilized with each network equipment device. For example, when the network equipment device implemented is an AAA server it will include an utilize authentication, authorization, accounting component 910 but this component is typically not included or not utilized when the network device that is implemented is a WLAN controller. Similarly, the fast roaming procedures component 932 is a component utilized when the network device is a WLAN controller. Similarly, when the network device is an AAA server or a orchestration server the dynamic VLAN information assignment component 920 is typically implemented but this component is not utilized by a WLAN controller or gateway.

The control routines component 902 is configured to control operation of the network equipment device. The communication component 904 is configured to handle communications, e.g., transmission and reception of messages, and protocol signaling for the network equipment device. The message generator component 906 is configured to generate messages for transmission to other devices. The message processing component 908 is configured to process messages received from other devices, e.g., messages from orchestration server, Access Point, WLAN controller, centralized Gateway, AAA server, messages from core network, and messages from Internet.

The authentication, authorization, accounting component 910 performs processing for authentication, authorization and accounting procedures.

The determinator component 912 is configured to make determinations and decisions for the network equipment device including for example: determining whether to accept an authentication request received from a user equipment device, determining whether an authentication request from a user equipment device has been successfully completed, determining what Access Point location is a user equipment device authenticating from based on received Access Request message, determining what location based policies are to be applied to user equipment device, determining whether to permit Internet access to a user equipment device, determining whether to permit a user equipment device to access equipment on a private area network, determining whether a user equipment device is in a home service area or a visited service area, determining the stacked VLAN information to dynamically assign to a successfully authenticated user equipment device, determining whether a user equipment device has already been assigned stacked VLAN information, determining what policy and/or policy rules are to be implemented for communications for a user equipment device depending on the stacked VLAN information included in the communications messages, determining per user policies and policy rules to be applied to communications from a user equipment device based location information.

The storage component 914 is configured to manage the storage, and retrieval of data and/or instructions to/and from memory, buffers in memory, hardware buffers and/or storage device, e.g., databases, coupled and/or connected to the network equipment device.

The authentication component 916 is configured to perform authentication operations including L2 authentication operations.

The dynamic VLAN information assignment component 918 dynamically assigns VLAN information (e.g., stacked VLAN information including S-VLAN ID and C-VLAN ID) to user equipment devices as well as determining whether a user equipment device has already been assigned VLAN information.

The UE context/record generator component 920 generates user equipment device context and/or records.

The policy rules generator/determination component 922 generates and/or determines policy rules to be implemented for a user equipment device (e.g., access control policy rules, bandwidth usage policy rules, quality of service policy rules). The policy rules may be, and in some embodiments, are location based policy rules based on the location of the Access Point through which the user equipment device has been authenticated.

The policy and policy rules implementation component 924 implements policies and policy rules to be applied to communications for a user equipment device.

The DHCP component 926 implements Dynamic Host Protocol Configuration Protocol operations including for example assigning IP address and responding to DHCP discovery requests.

The Personal or Per User PSK Authentication procedures component 818 performs operations for implementing Personal or Per User PSK Authentication procedures. In some embodiments, P-PSK Authentication procedures component 928 is a sub-component of the Authentication, Authorization, Accounting component 910 and/or the Authentication component 916.

The 802.1X Authentication procedures component 930 performs operations for implementing 802.1X Authentication procedures, e.g., 802.1X EAP authentication procedures. In some embodiments 802.1X Authentication procedures component 820 is a sub-component the Authentication, Authorization, Accounting component 910 and/or the Authentication component 916.

The roaming procedures component 932 implements procedures for fast roaming procedures (e.g., 802.11r procedures) and re-associating and performing L2 authentications during roaming.

The SoftGRE component 934 implements procedures for establishing and utilizing Soft GRE tunnels to communicate data and information. In some embodiments SoftGRE component 934 is a sub-component of the communications component 904 and/or the communications tunnel component 938.

The Access Point location determinator component 936 determines the location of network edge devices, e.g., Access Points, for example from information included in messages such as authentication request and Access Request messages and from network edge device location mapping information stored for the site or network coverage area.

The communications tunnel component 938 establishes and utilizes tunnels for communicating frames/messages between the Access Point and other devices such as, for example, the centralized gateway. In some embodiments, the communications tunnel component is a sub-component of the communications component 704.

The Internet access component 940 performs operations to provide Internet access and to send and receive data packets to devices via the Internet or with Internet destination addresses.

The VLAN stacking component 942 implements VLAN stacking procedures with respect to messages sent and received from network edge devices, e.g., Access Points.

The provisioning component 944 implements provisioning operations when during initialization and or update procedures. The provisioning operations in some embodiments include storage and security operations and/or procedures for storing records with user equipment device and/or user subscriber credentials for authentication, location based policies for one or more of the users based on network edge device (Access Point) locations, site wide/network wide network edge device (e.g., Access Points) location mappings information.

The Access-Accept message generator component 946 which generates Access-Accept response messages and authentication request response messages that include stacked VLAN information (e.g., S-VLAN ID and C-VLAN assigned to a user equipment device) (e.g., as shown in FIG. 11). In some embodiments, the Access-Accept message generator component 846 is a sub-component of the communications component 904 or the message generator component 906.

Diagram 9000 of FIG. 9 illustrates three exemplary Ethernet II frames 9002, 9020 and 9030.

Messages 9002, 9020 and 9030 illustrate the structure and fields of messages including Ethernet II frames with EtherType field. Message 9002 is a simple Ethernet II frame without an 802.1Q VLAN header. Message 9020 is an Ethernet II frame including a 802.1q VLAN header added to it. The 802.1Q VLAN header is sometime referred to as a VLAN tag. The message 9030 is an Ethernet II frame with a second 802.1Q VLAN header added to it in accordance with the IEEE 802.1 ad standard. The use of two or more VLAN headers in a frame is referred to VLAN stacking. And the combination of the multiple VLAN headers is referred to as stacked VLAN, a VLAN stack or a tag stack.

The fields of the messages 9002, 9020 and 9030 will now be described. The preamble field 9004 is 7 bytes long and includes preamble information. The SFD field 9006 is start of frame delineator and is 1 byte long and indicates the start of the Ethernet frame. The destination MAC field 9008 is 6 bytes long and includes the Medium Access Control address to which the frame is being sent. The source MAC address field 9010 is 6 bytes long and is the Medium Access Control address of the device (e.g., user equipment device) from which the frame was sent. The Ethernet Type/Size field 9012 is a two-octet field which is used to indicate which protocol is encapsulated in the payload of the frame and is also used to indicate the size of some Ethernet frame. The payload field 9014 includes the data included in the message 9002. N=46 to 1500 bytes in size for field 9014. The payload field 9028 includes the data included in message 9020. N=42 to 1500 bytes in size for field 9024. The payload filed 9038 includes the data included in message 9030. N=38 to 1500 bytes in size for field 9034. The CRC/FCS filed 9016 is 4 bytes long and contains the Cyclic Redundancy Check/Frame Check Sequence information. Interframe Gap 9018 is 12 bytes long and introduces a gap between frames.

In the message 9020, the VLAN header field 9022 is a 4 byte VLAN header field which has been inserted into the message 9002 between the source MAC address field 9010 and the EtherType field 9012 to form the message 9020. The message 9020 includes a single VLAN header which is 4 bytes in size also referred to as single VLAN tag. The VLAN header field 9022 includes a Tag Protocol ID (TPID) sub-field 9024 which is 2 bytes and a Tag Control Information (TCI) sub-field 9026 which is 12 bytes and includes a Priority Code Point (PCP) sub-field 1 byte in size, a Drop Eligible Indicator (DEI) sub-field 1 bit in size and a VLAN Identifier (VID) sub-field 12 bits in size. As message 9020 includes a single VLAN header, the TCI field includes 0x8100 in hexadecimal to indicate it is a single VLAN header frame as per the IEEE 802.1Q protocol.

The message 9030 includes stacked VLAN header 9022 and 9032. In message 9030, the VLAN header field 9032 is inserted between the source MAC address field 9010 and the VLAN header field 9022 of message 9020. The VLAN header 9032 is 4 bytes in size. The VLAN header 9032 includes a Tag Protocol ID (TPID) sub-field 9034 which is 2 bytes and a Tag Control Information (TCI) sub-field 9036 which is 12 bytes and includes a Priority Code Point (PCP) sub-field 1 byte in size, a Drop Eligible Indicator (DEI) sub-field 1 bit in size and a VLAN Identifier (VID) sub-field 12 bits in size. As message 9030 includes multiple VLAN headers in this case two VLAN headers, the VLAN header 9032 has its TCI field set to 0x88A8 in hexadecimal to indicate it is a multiple VLAN header frame as per the IEEE 802.1ad standard. The first VLAN header 9022 which is the closes to the Ethernet Type/Size field of the frame is referred to as the inner VLAN header or tag also known as the Customer-VLAN header (C-VLAN header) and the second VLAN header 9032 is referred to as the outer VLAN header or tag also known as the Service-VLAN header (S-VLAN header).

When a third or subsequent VLAN header is used it is inserted in front of the other VLAN headers inserted so that it the closest VLAN header to the to the Ethernet Type/Size header with the frame's original Ethernet Type field information always being located after all the VLAN headers and adjacent to the payload field.

Figures 20, 21:
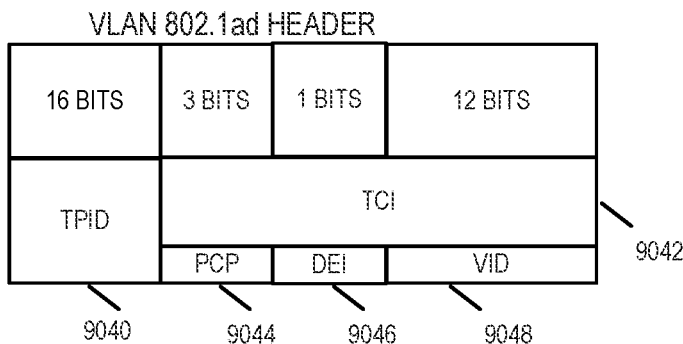
FIG. 20 illustrates the format of a VLAN header in accordance with an embodiment of the present invention.
FIG. 21 illustrates the exemplary use of multi-occurrence of Tunnel attributes in a RADIUS Access-Accept message to provide dynamically assigned S-VLAN and C-VLAN stacking information in accordance with an embodiment of the present invention.

The VLAN header fields 9022 and 9032 are structured as shown in further detail in FIG. 20 diagram 2000 which illustrates a VLAN header that complies with the IEEE 802.1Q and IEEE 802.1ad standard. The VLAN header as previously discussed is often referred to as a VLAN tag. As shown in FIG. 20 VLAN header 2000 includes a Tag protocol identifier (TPID) field 9040 which is 2 bytes or 16 bits long. The TPID field is set to a value of 0X8100 in order to identify the frame as an 802.1Q-tagged frame in single VLAN header frames or when the VLAN header is the first VLAN header asserted as discussed in above. The TPID field is set to a value of 0X88A8 when it is the second or subsequent VLAN header inserted into the frame. The TPID field is located at the same position as the EtherType field in untagged frames. During processing, it is used to distinguish the frame from untagged frames.

The Tag Control Information (TCI) field 9042 is 16 bits in size and includes the following sub-fields: Priority Code Point (PCP) sub-field 9044, a Drop Eligible Indicator (DEI) sub-field 9046, and a VLAN Identifier (VID) sub-field 9048.

The Priority Code Point (PCP) sub-field 9044 is 3 bits in size. The information in the PCP sub-field 9044 refers to the IEEE 802.1p Class of Service (CoS) and identifies a frame priority level for the frame. This frame priority level may be, and typically is, used in prioritizing different classes of traffic.

The Drop Eligible Indicator (DEI) sub-filed 9046 is a bit field (formerly referred to CFI) and is used to indicate if the frame is eligible to be dropped in the presence of congestion.

The VLAN identifier (VID) sub-field 9048 is a 12 bit field that specifies the VLAN to which the frame belongs. The values of 0 and 4095 (0x000 and 0xFFF) are reserved. All other values may be used as VLAN identifiers which allows up to 4,094 VLANs. The reserved VLAN identifier value 0x000 indicates that the frame doesn't include a VLAN identifier but only includes PCP and DEI fields related to priority. The reserved VLAN identifier value of 0xFFF is reserved for implementation use.

Diagram 2100 of FIG. 21 illustrates the exemplary use of multi-occurrence of Tunnel attributes in a RADIUS ACCESS-ACCEPT message to provide dynamically assigned S-VLAN and C-VLAN stacking information (e.g., S-VLAN ID and C-VLAN ID). RFC 3580 IEEE 802.1X Remote Authentication Dial In User Service (RADIUS) Usage Guidelines explains how to map RADIUS attributes corresponding 802.1x protocol fields. It further describes how RADIUS servers can use tunnel attributes to provide VLAN tags with ACCESS ACCEPT messages where the VLAN ID is an integer between 1 and 4094.

The RADIUS ACCESS-ACCEPT message allows for multiple occurrences of the tunnel attributes to appear in the RADIUS ACCESS-ACCEPT message. In the present invention, the multiple occurrences of tunnel attributes are used to provide stacked VLAN information with each of the stacked VLAN IDs (e.g., S-VLAN ID and C-VLAN ID) being included in a different occurrence of tunnel attributes. In this example shown in diagram 2100 two sets of tunnel attributes are used to convey the S-VLAN ID and C-VLAN ID. The first set of tunnel attributes is Tunnel-Type=VLAN (13), Tunnel-Medium-Type=802, Tunnel-Private-Group-ID=VLAN ID in which the S-VLAN ID dynamically assigned to the user equipment device is placed. The second set of tunnel attributes is Tunnel-Type=VLAN (13), Tunnel-Medium-Type=802, Tunnel-Private-Group-ID=VLAN ID in which the C-VLAN ID dynamically assigned to the user equipment device is placed. The Access Point on receiving this message in response to an Access Request message it sent on behalf of a user equipment device extracts the first tunnel VLAN ID from the first tunnel attributes of the RADIUS ACCESS-ACCEPT message and determines it is the dynamically assigned S-VLAN ID for the user equipment device. The Access Point extracts the second tunnel VLAN ID from the second tunnel attributes of the RADIUS ACCESS-ACCEPT message and determines it is the dynamically assigned C-VLAN ID for the user equipment. The Access Point then combines the S-VLAN ID and C-VLAN ID to form the stacked VLAN information dynamically assigned to the user equipment device by the RADIUS server performing the authentication (e.g., the orchestration server or the AAA server). The RADIUS ACCESS ACCEPT message may be, and in some embodiments, is sent when performing 802.1x authentication or P-PSK authentication.

FIG. 10 illustrates the steps of a flowchart of a method 1000 which illustrates another exemplary method embodiment for implementing VLAN stacking in a high density wireless network with in excess of 4095 user equipment devices, e.g., a Wi-Fi network, in accordance with the present invention. FIG. 10 illustrates the combination of FIGS. 10A, 10B, 10C, 10D, and 10E. FIG. 10A illustrates the steps of the first part of an exemplary method 1000 in accordance with an embodiment of the present invention. FIG. 10B illustrates the steps of the second part of an exemplary method 1000 in accordance with one embodiment of the present invention. FIG. 10C illustrates the steps of the third part of an exemplary method 1000 in accordance with an embodiment of the present invention. FIG. 10D illustrates the steps of the fourth part of an exemplary method 1000 in accordance with an embodiment of the present invention. FIG. 10E illustrates the steps of the fifth part of an exemplary method 1000 in accordance with an embodiment of the present invention.

For explanatory purposes the exemplary method 1000 will be explained in connection with the exemplary communications system 200 illustrated in FIG. 2. However, it should be understood that the method may be implemented using other systems as well as other system configurations then those illustrated in FIG. 2. While it will be readily understood that additional steps and signaling are performed in connection with communicating information, messages, and packets between devices, the method 1000 focuses on and discusses the steps and signaling for understanding the invention.

The method 1000 shown in FIG. 10 will now be discussed in detail. The method starts in start step 1002 shown on FIG. 10A. Operation proceeds from start step 1002 to step 1004.

In step 1004, the system is initialized and configured. This includes provisioning a plurality of user equipment devices (e.g., greater than 4095 mobile user equipment devices) with subscriber authentication credentials, configuring location based policies for user equipment devices for a first server along with authentication credentials for the user equipment device to which the location based policies are to be applied, configuring site/network wide Access Point location mapping for the first server for each of the Access Points of the wireless network. In some embodiments, step 1004 includes one or more sub-steps 1006 and 1008.

In sub-step 1006, a plurality of Access Points (e.g., AP-1, AP-2, . . . , AP-N of system 200) are initialized and configured, a first server is initialized and configured, a WLAN controller is initialized and configured, a centralized gateway is initialized and configured, an AAA server is initialized and configured, a database including authentication information for subscribers/user equipment devices is initialized and populated with subscriber information, authentication information, and associated policies, switches are initialized and configured for operation.

In sub-step 1008, the first user equipment device is provisioned and/or initialized with subscriber authentication credentials for access the wireless network/system.

In some embodiments, user equipment records are generated for the user equipment devices of system. FIG. 22 illustrates an example user equipment device record 2200 for a UE 1. As explained in detail below fields 2202, 2206, 2208 are typically populated at time of the system configuration and/or initialization for user equipment devices that are to be serviced by the system. Operation proceeds from step 1004 to step 1010.

In step 1010, the first user equipment device (e.g., UE 1 204 of system 200) and first Access Point (e.g., AP-1 210 of system 200) perform successful open system authentication procedures. Operation proceeds from step 1010 to step 1012.

In step 1012, the first user equipment device successfully associates with the first Access Point. Step 1012 in some embodiments includes one or more sub-steps 1014 and 1016. In sub-step 1014, the first Access Point receives wirelessly from the first user equipment device a first association request message (e.g., 802.11 association request message). In sub-step 1016, the first Access Point transmits a first Association Identifier (AID) to the first user equipment device for use in communicating with the first Access Point. Operation proceeds from step 1012 to step 1018.

In step 1018, the first Access Point receives wirelessly a first authentication request message (e.g., a L2 authentication request such as for example a P-PSK authentication request or an 802.1X authentication request) including first user equipment device identification information from a first user equipment device. In some embodiments, the first authentication request message includes authentication information for the first user equipment device and/or the first user of the first user equipment device such as for example subscriber authentication credentials (e.g., subscriber credentials stored in a SIM card of the first user equipment device). Operation proceeds from step 1018 to step 1020.

In step 1020, the first Access Point generates a second message (e.g., a RADIUS Access-Request message) based on said first authentication request message, said second message including the first user equipment identification information (e.g., UE ID or a MAC address of the first user equipment device) received in the first authentication message and location information for the first Access Point. The location information may be, and in some embodiments are the civic location details/information as shown in FIG. 11. Operation proceeds from step 1020 to step 1021.

In step 1021, the first Access Point transmits the second message to a first server (e.g., a first RADIUS server). In some embodiments, the first server is orchestrator 218 of system 200. In some embodiments, the first server is the AAA server 222 of system 200. Operation proceeds from step 1021 via connection node A 1022 to step 1024 shown on FIG. 10B.

In step 1024, the first server receives the second message. Operation proceeds from step 1024 to step 1026.

In step 1026, the first server performs a successful authentication check (e.g., an L2 authentication check such as a P-PSK authentication check or an 802.1X authentication check) with respect to the first user equipment device in response to the second message. Operation proceeds from step 1026 to step 1028.

In step 1028, the first server, dynamically assigns stacked Virtual Local Area Network (VLAN) information to the first user equipment device after completion of the successful authentication check with respect to the first user equipment device, said stacked VLAN information including a first S-VLAN ID and a first C-VLAN ID. Operation proceeds from step 1028 to step 1030.

In step 1030, the first server determines one or more policies (e.g., access control policies and/or bandwidth polices) to be applied to communications for the first user equipment device (e.g., upstream communications from the user equipment device and/or downstream communications to the first user equipment device) based on the first Access Point location information included in the second message and authentication information (e.g., subscriber identity, first user equipment identification information and/or credentials) provided by the first user equipment device. In various embodiments, the first server is provisioned or configured with location information for each of the Access Points in the system as well as location based policies for each wireless network subscriber/user equipment device. In at least some of these embodiments, the first server performs a look up for the first user equipment device based on authentication information and the location of the Access Point to determine the policies to be applied. Different policies can be included for each of the different Access Points in the wireless network. FIG. 22 illustrates an exemplary record 2200 including such information for a first user equipment device (UE 1). The exemplary record 2200 includes: (1) a UE 1 record identifier field 2202 which includes information to identify the record in storage, (2) a UE 1 identification information field 2204 which includes identification information for the UE 1. (3) a UE 1 location based policies field 2208 which includes UE 1 location based polices for location AP 1, UE 1 location based policies for location AP 2, . . . , UE 1 location based policies for location AP N where N is integer greater than 2 and in various embodiments equal to the number of Access Points in the wireless network, (4) UE 1 dynamically assigned VLAN information field 2210 which includes the dynamically assigned VLAN information including the S-VLAN ID and C-VLAN ID assigned to the UE 1, (5) UE 1 location based policies and/or location based policy rules to be applied based on location of AP from which authentication request was received field 2212 which includes the determined and/or generated UE 1 location based policies and/or location based policy rules to be applied to communications for UE 1 based on the location of the Access Point from which the authentication request for UE 1 was received. In various embodiments, one or more of the fields of record 2200 (e.g., fields 2202, 2206, and 2208) are inputted or configured for the first server prior to operation or at least prior to services are to be provided for the subscriber or user equipment device 1 to which the UE 1 record. In some embodiments, some of the fields of the record are populated or updated during system operation such as for example fields 2204, 2210 and 2212 are populated, e.g., by the first server, during system operation. In some embodiments, some fields are updated during operation of the system such as field 2208 when different traffic policies are to be implemented for UE 1.

The operation proceeds from step 1030 to step 1032.

In step 1032, the first server generates a first user equipment device context or record, said first user equipment device context or record including the first user equipment device identification information, the dynamically assigned stacked VLAN information for the first user equipment device, and the determined policies to be applied to communications for the first user equipment device. In some embodiments, the context or record is stored in the first server or in a storage device attached to the first server. Operation proceeds step 1032 to step 1034.

In step 1034, the first server generates a third message. The third message includes the dynamically assigned stacked VLAN information for the first user equipment device including the first VLAN ID and the first C-VLAN ID. In some embodiments, step 1034 includes one or more sub-steps 1036 and 1038.

In sub-step 1036, the first server generates the third message as a RADIUS protocol Access-Accept message with the dynamically assigned stacked VLAN information for the first user equipment device being included in RADIUS protocol vendor specific attributes of the RADIUS Access-Accept message. Diagram 1150 of FIG. 11 illustrates an example of the use of RADIUS protocol vendor specific attributes for conveying stacked VLAN information.

In sub-step 1038, the first server generates the third message as a RADIUS protocol Access-Accept message with the dynamically assigned stacked VLAN information for the first user equipment device being included in RADIUS protocol multi-occurrence tunnel attributes of the RADIUS protocol Access-Accept message in which the first S-VLAN ID is included in a first tunnel-private-group-ID attribute and the first C-VLAN ID is included in a second tunnel-private-group-ID attribute of the RADIUS protocol Access-Accept message. Diagram 2100 of FIG. 21 illustrates an example of the use of a multi-occurrence of tunnel attributes in an Access-Accept message to provide stacked VLAN assignment information. Operation proceeds from step 1038 via connection node B 1040 to step 1042 shown on FIG. 10C.

In step 1042, the first server generates policy rules (e.g., instructions for implementing the policies) to be applied to communications for the first user equipment device based on the determined one or more policies to be applied to communications for the first user equipment device. Operation proceeds from step 1042 to step 1044.

In step 1044, the first server transmits the determined one or more policies and/or policy rules be applied to communications for the first user equipment device to one or more additional network equipment devices for implementation along with the dynamically assigned stacked VLAN information for the first user equipment device and first user equipment device identification information. In some embodiments, step 1044 includes one or more sub-steps 1046, 1048, and 1050.

In sub-step 1046, the first server transmits the determined one or more policies and/or policy rules to be applied to communications for the first user equipment device and/or information to perform fast roaming procedures along with the dynamically assigned stacked VLAN information for the first user equipment device to a WLAN controller (e.g., WLAN controller 216 of system 200) that manages the Access Points in the first wireless network for implementation of the policies and/or policy rules and/or for performing fast roaming procedures for the first user equipment device.

In sub-step 1048, the first server transmits the determined one or more policies and/or policy rules to be applied to communications for the first user equipment device along with the dynamically assigned stacked VLAN information for the first user equipment device to a centralized gateway (e.g., centralized gateway 220 of system 200) that is connected to the Internet and controls the data plane or low of data within and/or to/from the wireless network for implementation.

In sub-step 1050, the first server transmits the determined one or more policies and/or policy rules to be applied to the first user equipment device along with the dynamically assigned stacked VLAN information for the first user equipment device to an AAA server (e.g., AAA server 222 of system 200) of the wireless network for implementation. Operation proceeds from step 1044 to step 1052.

In step 1052, the first server transmits the generated third message to the first Access Point in response to the second message. Operation proceeds from step 1052 to step 1054.

In step 1054, the first Access Point receives, in response to the second message, the third message from the first server. In some embodiments, the step 1054 includes sub-step 1056. In sub-step 1056, the first Access Point receives a third message from the first server, the third message being an Access-Accept response message. The second message having been an Access-Request message. Operation proceeds from step 1054 via connection node C 1058 to step 1060 shown on FIG. 10D.

In step 1060, the first Access Point extracts the dynamically assigned stacked VLAN information for the first user equipment device from the third message. In some embodiments, step 1060 includes one or more sub-steps 1062, 1064, 1066, and 1068.

In sub-step 1062, the first Access Point extracts the dynamically assigned stacked VLAN information for the first user equipment device from the RADIUS protocol vendor specific attributes of the third message.

In sub-step 1064, the first Access Point extracts the dynamically assigned first S-VLAN ID from the first tunnel-private group-ID attribute of the third message.

In sub-step 1066, the first Access Point extracts the dynamically assigned first C-VLAN ID from the second tunnel-private group-ID attribute of the third message.

In sub-step 1068, the first Access Point forms the dynamically assigned stacked VLAN information for the first user equipment device from the extracted first S-VLAN ID and the extracted C-VLAN ID. Operation proceeds from step 1060 to step 1070.

In step 1070, the first Access Point transmits wirelessly to the first user equipment device an authentication success message in response to the first authentication request message Operation proceeds from step 1070 to step 1072.

In step 1072, the one or more additional network equipment devices (e.g., gateway, AAA server, WLAN controller) receive from the first server, the determined policies and/or policy rules to be applied to communication for the first user equipment device along with the dynamically assigned stacked VLAN information and the first user equipment identification information. Operation proceeds from step 1072 to step 1074.

In step 1074, the one or more additional network equipment devices (e.g., gateway, AAA server, WLAN controller) implement the received policies and/or policy rules on communications for the first user equipment device. Operation proceeds from step 1074 to step 1076.

In step 1076, a second Access Point of the wireless network receives an authentication request from the first user equipment device. Operation proceeds from step 1076 via connection node D 1078 to step 1080 shown on FIG. 10E.

In step 1080, in response to receiving the authentication request from the first user equipment device at the second Access Point, the second Access Point generates a fetch key context/S-VLAN, C-VLAN information for the first user equipment device request including user identification information for the first user equipment device and transmits this request message to the WLAN controller. This request message includes location information for the second Access Point. Operation proceeds from step 1080 to step 1082.

In step 1082, the WLAN controller in response to receiving the fetch Key context/S-VLAN, VLAN information request message, retrieves the previously assigned S-VLAN, C-VLAN information (including the first S-VLAN ID and the first C-VLAN ID) and the key information for the first user equipment and transmits the requested information to the second Access Point. The key information is encryption key information used for fast roaming procedures. Operation proceeds from 1082 to step 1084.

In step 1084, the WLAN controller notifies the first server that the first user equipment device is connecting to the second Access Point (i.e., change in location of first user equipment device from perspective of first user equipment device's connection to the wireless network. Operation proceeds from 1084 to step 1086.

In step 1086, the first server updates the location based policies and policy rules to be applied to the communications for the first user equipment device based on the location of the second Access Point and distributes/communicates the updated policies and/or policy rules to the one or more additional network devices (e.g., AAA server, centralized gateway, WLAN controller). Operation proceeds from step 1086 to step 1088.

In step 1088, the second Access Point receives the transmitted key context/S-VLAN and C-VLAN information for the first user equipment device and utilizes it to implement fast roaming procedures (e.g., IEEE 802.11r fast roaming procedures) for the first user equipment device. Operation proceeds from step 1088 to step 1090.

In step 1090, the updated policies are received and implemented by the one or more additional network equipment devices. Operation proceeds from step 1090 to step 1092.

In step 1092, the process continues as the first user equipment device roams throughout the network.

While the method 1000 has been explained with respect to only a first user equipment device, it should be understood that the method is implemented for thousands of concurrent users (e.g., in excess of 4095 user equipment devices). Once the VLAN stacking information (e.g., S-VLAN ID, and C-VLAN ID) has been dynamically assigned to a user equipment device, the Access Point to which the first user equipment device is connected generates stacked VLAN headers using the assigned information and inserts the stacked VLAN headers into messages sent from the first user equipment device as shown in FIG. 19 message 9030. This information along with the first user equipment device identification information (e.g., MAC address) is used identify the message with the first user equipment device and determine what policies and policy rules should be applied to the message. This is done in various embodiments by the gateway which controls the network data plane and connects the network to the Internet. In some embodiments, the gateway implements the policies and/or rules in conjunction with AAA server.

The method 1000 illustrates, among other things, how a wireless system (e.g., a Wi-Fi system) with a large number of concurrent user equipment devices can implement per user location based policies while providing seamless roaming.

In some embodiments, the first server is an orchestration server that receives the authentication request message (e.g., Access-Request message) from the first Access Point and sends the authentication request message or the authentication information for a first user equipment device included in the authentication request message to an AAA server which authenticates the first user equipment device based on the authentication information (e.g., subscriber authentication information included in the first authentication request message). The AAA server sends an authentication success response message to the orchestration server which in response to receiving the authentication success message dynamically assigns stacked VLAN information (e.g., first S-VLAN ID, and second S-VLAN ID) to the first user equipment device and transmits this information to the first Access Point in authentication response message (e.g., Access-Accept message). In some such embodiments, the first authentication message also includes the location of the first Access Point which the orchestration server utilizes to determine policies and/or policy rules (e.g., location based policies and/or policies rules for controlling access to network equipment and/or bandwidth usage).

Upon determining the policies and/or policy rules the orchestration server communicates these policies and/or rules to one or more entities in the network (e.g., centralized gateway which is a data gateway, AAA server, WLAN controller). The one or more entities upon receiving the policies and/or rules apply them to communications for the first user equipment device. In some embodiments, the orchestration server provides the first Access Point location information to the AAA server along with the authentication information and the AAA server determines the policies and/or policy rules to be applied to communications for the first user equipment device based on the authentication information and the location of the first Access Point. In some embodiments, the AAA server then provides the orchestration server the determined policies and policy rules and the orchestration server distributes them to network entities to be applied. In some embodiments, the AAA server applies the policies and policy rules it determined and provides them to the centralized gateway for application, e.g., upon request such as when the centralized gateway needs to determine if communications for the first user equipment device can be transmitted out to the Internet.

In some embodiments, while the orchestration server performs the dynamic assignment of the stacked VLAN information to the first user equipment device in response to an authentication request message, the orchestration server obtains the details of the stacked VLAN assignment from the AAA server or a separate database which holds the VLAN assignment details (e.g., S-VLAN ID and C-VLAN ID) which are available for assignment. In some embodiments, the dynamically assigned VLAN information includes N VLAN headers, where N is an integer greater than 2. In such cases more than 2 VLAN IDs are assigned, N VLAN ID are assigned. This allows for even greater scalability.

Various exemplary embodiments illustrating different features of the present invention will now be discussed.

LIST OF A FIRST SET OF EXEMPLARY NUMBERED METHOD EMBODIMENTS

Method Embodiment 1: A communications method comprising: receiving wirelessly, by a first network edge device (e.g., a first Access Point or a first Wireless Router) of a wireless network, a first message (e.g., a first L2 authentication request message such as a P-PSK authentication request or 802.1X authentication request message) including first user equipment device identification information (e.g., MAC address for the first user equipment device) from a first user equipment device: generating, by the first network edge device, a second message (e.g., an Access-Request) based on said first message, said second message including the first user equipment device identification information received in the first message and location information for the first network edge device: transmitting, by the first network edge device, the second message to a first server (e.g., a first Remote Authentication Dial-In User Service (RADIUS) server), and receiving in response to said second message, by the first network edge device, a third message (e.g., an Access Accept Response), said third message including dynamically assigned stacked Virtual Local Area Network (VLAN) information including a first Service-VLAN Identifier (S-VLAN ID) and a first Customer-VLAN Identifier (C-VLAN ID) dynamically assigned to the first user equipment device.

Method Embodiment 2. The communications method of Method Embodiment 1, wherein the first network edge device is a first Access Point; wherein the first server is a first Remote Authentication Dial-In User Service (RADIUS) server: wherein said first message includes first authentication information (e.g., user or subscriber credentials included in a subscriber identification module (SIM) or e-SIM (electronic-subscriber identification module)); and wherein said second message includes the first authentication information received in the first message.

Method Embodiment 2A. The communications method of Method Embodiment 2, further comprising: determining, by the first RADIUS server, whether to grant network access to the first user equipment device based on information contained in the second message; and wherein said first RADIUS server is an orchestration server or an Authentication, Authorization, and Accounting (AAA) server.

Method Embodiment 2B. The communications method of Method Embodiment 2A, wherein said determining, by the first RADIUS server, whether to grant network access to the first user equipment device based on the first authentication information contained in the second message includes: performing a first authentication check using the first authentication information; and when the first authentication check is successful determining to grant network access to the first user equipment device.

Method Embodiment 2C. The communications method of Method Embodiment 2B, further comprising: when the first authentication check fails determining not to grant network access to the first user equipment device; and refraining from generating stacked VLAN information for the first user equipment device: generating an authentication failed (e.g., ACCESS DENIED) message; and transmitting the authentication failed message to the first user equipment device via the first Access Point.

Method Embodiment 2D. The communications method of Method Embodiment 2, wherein said first RADIUS server is an orchestration server or an Authentication, Authorization, and Accounting (AAA) server; and wherein said first RADIUS server dynamically assigned said stacked Virtual Local Area Network (VLAN) information including the first Service-VLAN Identifier (S-VLAN ID) and the first Customer-VLAN Identifier (C-VLAN ID) assigned to the first user equipment device.

Method Embodiment 3. The communications method of Method Embodiment 2, wherein the wireless network is a Wi-Fi network: wherein the Wi-Fi network includes a plurality of user equipment devices, said plurality of user equipment devices including more than 4095 mobile user equipment devices, said first user equipment device being one of said plurality of user equipment devices; and wherein each of said plurality of user equipment devices are dynamically assigned different stacked VLAN information including a S-VLAN ID and a C-VLAN ID.

Method Embodiment 3A. The communications method of Method Embodiment 3, wherein said plurality of user equipment devices include one or more devices connected to one or more physical ports on the first Access Point (e.g., via Ethernet cable(s) and/or switch(es)); wherein said one or more devices (e.g., desktop computer, IPTV, printer) connected to said one or more physical ports on the first Access Point (e.g., via Ethernet cable(s) and/or switch(es)) are part of a first Personal Area Network.

Method Embodiment 3A1. The communications method of Method Embodiment 3A, further comprising: receiving by the first Access Point from the first RADIUS server different dynamically assigned stacked VLAN information for each of the one or more devices connected to the one or more physical ports on the first Access Point.

Method Embodiment 3A2. The communications method of Method Embodiment 3A1, wherein the different dynamically assigned stacked VLAN information for each of the one or more devices connected to the one or more physical ports on the first Access Point includes a S-VLAN ID and C-VLAN ID, the dynamically assigned C-VLAN ID being the same for each of the one or more devices connected to the one or more physical ports on the first Access Point.

Method Embodiment 3A3. The communications method of Method Embodiment 3A2 further comprising: restricting access to the one or more devices which are part of the first Personal Area Network using dynamically assigned stacked VLAN information assigned to different user equipment devices: wherein the dynamically assigned stacked VLAN information for the first user equipment device includes a C-VLAN ID the same as the C-VLAN ID assigned to the one or more devices connected to the one or more physical ports on the first Access Point, said first user equipment device being granted access to the one or more devices which are part of the first Personal Area Network.

Method Embodiment 3A4. The communications method of Method Embodiment 3A2 further comprising: restricting access to the one or more devices which are part of the first Personal Area Network using dynamically assigned stacked VLAN information assigned to the plurality of user equipment devices.

Method Embodiment 3A5. The communications method of Method Embodiment 3A4, wherein said restricting access to the one or more devices which are part of the first Personal Area Network using the dynamically assigned stacked VLAN information assigned to the plurality of user equipment devices includes: allowing the first user equipment device to access the one or more devices which are part of the first Personal Area Network based on the dynamically assigned stacked VLAN information assigned to the first user equipment device, said first Personal Area Network having been established by or for the first user of the first user equipment device; and not allowing other user equipment devices different from the first user equipment device to access the one or more devices which are part of the first Personal Area Network based on the dynamically assigned stacked VLAN information assigned to the other user equipment devices.

Method Embodiment 3A6. The communications method of Method Embodiment 3A3 or 3A4, wherein said operation of restricting access to the one or more devices which are part of the first Personal Area Network using dynamically assigned stacked VLAN information assigned to the plurality of user equipment devices is performed by a centralized gateway.

Method Embodiment 3A7. The communications method of Method Embodiment 3A6, wherein said centralized gateway controls the data plane of a core system of the wireless network, said core system including: a plurality of network edge devices (e.g., Access Points or Routers), said plurality of network edge devices including a first plurality of Wi-Fi Access Points, said first Access Point being one of said plurality of Wi-Fi Access Points: the first server which is configured, provisioned, or pre-provisioned with wireless network site wide location information for each of the network edge devices and location based policies for each of the subscribers, subscriber devices and/or user equipment devices of the first wireless network (e.g., location based policies associated with each subscriber's authentication credentials): a WLAN controller that manages wireless network equipment devices including the plurality of Wi-Fi Access Points.

Method Embodiment 4. The communications method of Method Embodiment 2, wherein the wireless network is a Wi-Fi network: wherein the first message is a first authentication message including Private-Pre-Shared Key (P-PSK) information for the first user equipment device; and wherein the third message is an authentication response message indicating the first user equipment device was successfully authenticated.

Method Embodiment 5. The communications method of Method Embodiment 1 further comprising: prior to receiving said first message by said first network edge device (e.g., first Access Point), receiving wirelessly by the first network edge device (e.g., first Access Point) a first association request message from the first user equipment device: transmitting, by the first network edge device (e.g., first Access Point), a first Association Identifier (AID) to the first user equipment device in response to the first association request message from the first user equipment device; wherein said first server is an orchestration server; and wherein said first orchestration server dynamically assigned said stacked Virtual Local Area Network (VLAN) information including the first Service-VLAN Identifier (S-VLAN ID) and the first Customer-VLAN Identifier (C-VLAN ID) assigned to the first user equipment device.

Method Embodiment 5A. The communications method of Method Embodiment 1 further comprising: prior to receiving said first message by said first network edge device (e.g., first Access Point), receiving wirelessly by the first network edge device (e.g., first Access Point) a first association request message from the first user equipment device: transmitting, by the first network edge device (e.g., first Access Point), a first Association Identifier (AID) to the first user equipment device in response to the first association request from the first user equipment device: wherein said first server is an AAA server; and wherein said AAA server dynamically assigned said stacked Virtual Local Area Network (VLAN) information including the first Service-VLAN Identifier (S-VLAN ID) and the first Customer-VLAN Identifier (C-VLAN ID) assigned to the first user equipment device.

Method Embodiment 5B. The communications method of Method Embodiment 1, further comprising: prior to receiving said first message by said first network edge device (e.g., first Access Point), successfully completing by the first user equipment device and first network edge device open system authentication procedures; and successfully completing by the first user equipment device and the first network edge device association procedures (802.11 association procedures).

Method Embodiment 5C. The communications method of Method Embodiment 5B further comprising: restricting or blocking, by the first network edge device, the first user equipment device from accessing network services until completing a level 2 (data link layer level) authentication (e.g., network authentication) subsequent to successfully completing association procedures; and wherein the first message is a level 2 authentication request (e.g., P-PSK authentication request or a 802.1X authentication request).

Method Embodiment 6. The communications method of Method Embodiment 1, wherein said first server is a first Remote Authentication Dial-In User Service (RADIUS) server: wherein the second message is a Remote Authentication Dial-In User Service (RADIUS) protocol Access-Request message; and wherein the third message is a Remote Authentication Dial-In User Service (RADIUS) protocol Access-Accept message, said dynamically assigned stacked VLAN information being included in RADIUS protocol vendor specific attributes of said RADIUS Access-Accept message.

Method Embodiment 7. The communications method of Method Embodiment 1, wherein said first server is a first Remote Authentication Dial-In User Service (RADIUS) server: wherein the second message is a Remote Authentication Dial-In User Service (RADIUS) protocol Access-Request message; and wherein the third message is a Remote Authentication Dial-In User Service (RADIUS) protocol Access-Accept message, said dynamically assigned stacked VLAN information being included in RADIUS protocol multi-occurrence tunnel attributes in which the first S-VLAN ID is included in a first Tunnel-Private-Group-ID attribute and the first C-VLAN ID is included in a second Tunnel-Private-Group-ID attribute.

Method Embodiment 8. The communications method of Method Embodiment 7, further comprising: extracting, by the first network edge device (e.g., first Access Point), the first S-VLAN ID from the first Tunnel-Private-Group-ID attribute of the third message: extracting, by the first network edge device (e.g., first Access Point), the first C-VLAN ID from the second Tunnel-Private-Group-ID attribute of the third message; and forming, by the first network edge device (e.g., first Access Point), the dynamically assigned stacked VLAN information for the first user equipment device from the extracted first S-VLAN ID and the extracted first C-VLAN ID.

Method Embodiment 9. The communications method of Method Embodiment 1, further comprising: subsequent to receiving said third message including said stacked VLAN information for the first user equipment device, receiving wirelessly by the first network edge device (e.g., first Access Point) from the first user equipment device a fourth message (e.g., first internet access message) including one or more data packets for transmission to an Internet destination (e.g., a device connected to the Internet); and generating, by the first network edge device (e.g., first Access Point), a fifth message based on said fourth message, said fifth message including: said one or more data packets included in said fourth message, said stacked VLAN information for the first user equipment device, and a Media Access Control (MAC) address for the first user equipment device; and transmitting, by the first network edge device (e.g., first Access Point), via a wired network path the fifth message to a gateway for transmission to the Internet destination, said gateway being connected to the Internet.

Method Embodiment 9A. The communications method of Method Embodiment 8 or 9, further comprising: establishing, by the first network edge device, a Soft-GRE tunnel between the first network edge device and the gateway for transmitting the fifth message to the gateway; and utilizing, by the first network edge device, the established Soft-GRE tunnel to transmit the fifth message to the gateway.

Method Embodiment 10. The communications method of Method Embodiment 9, further comprising: determining, by the first server (e.g., first RADIUS server), location based access and bandwidth policies for the first user equipment device based on the location information for the first network edge device (e.g., first Access Point) included in the second message; and communicating, by the first server (e.g., first RADIUS server), the determined location based access and bandwidth policies for the first user equipment device to the gateway: applying, by the gateway, the determined location based access and bandwidth policies to the fifth message.

Method Embodiment 11. The communications method of Method Embodiment 2, further comprising: receiving wirelessly, by a second Access Point of the wireless network, a fourth message including authentication information from the first user equipment device, said second Access Point being located in a visitor service area for the first user equipment device: generating, by the second Access Point, a fifth message based on said fourth message, said fifth message including authentication information received in the fourth message and location information for the second Access Point: transmitting, by the second Access Point, the fifth message to the first RADIUS server, said first RADIUS server being an orchestration server or an Authentication, Authorization, and Accounting (AAA) server; and receiving in response to said fifth message, by the second Access Point, a sixth message including the previously dynamically assigned stacked Virtual Local Area Network (VLAN) information including the first Service-VLAN Identifier (S-VLAN ID) and the first Customer-VLAN Identifier (C-VLAN ID) previously assigned to the first user equipment device.

Method Embodiment 12. The communications method of Method Embodiment 11, further comprising: determining, by the first RADIUS server, updated location based access and bandwidth policies for the first user equipment device based on the location information for the second Access Point included in the fifth message; and communicating, by the first RADIUS server), the updated location based access and bandwidth policies for the first user equipment device to the gateway; applying, by the gateway, the updated location based access and bandwidth policies to subsequent messages received from the first user equipment device.

Method Embodiment 13. The communications method of Method Embodiment 1 further comprising: prior to receiving the third message by the first network edge device performing by the first server the following operations: performing a successful authentication check (e.g., L2 authentication check such as P-PSK authentication check or an 802.1X authentication check) with respect to the first user equipment device in response to the second message: dynamically assigning said dynamically assigned stacked VLAN information to the first user equipment device after completion of the successful authentication check with respect to the first user equipment device: determining one or more policies to be applied to communications for the first user equipment device (e.g., to or from the first user equipment device) based on the first network edge device location information included in the second message and authentication information (e.g., subscriber identity, first user equipment identification information and/or credentials) provided by the first user equipment device: generating a first user equipment device context or record, said first user equipment device context or record including the first user equipment device identification information, the dynamically assigned stacked VLAN information for the first user equipment device, and the determined policies to be applied to communications for the first user equipment device: generating the third message; and transmitting the third message to the first network edge device.

Method Embodiment 13A. The communications method of Method Embodiment 13, wherein said policies to be applied to communications for the first user equipment device include one or more of the following: (i) location based access policies to be applied to communications from the first user equipment device based on the first network edge device location information included in the second message and authentication information (e.g., subscriber identity and/or credentials) provided by the first user equipment device (e.g., different access policies for home service area vs visitor service area(s) can have different access policies to be applied to the first user equipment device for the location of each network edge device in the network/system): (ii) location based bandwidth policies to be applied to communications for the first user equipment device based on the first network edge device location information included in the second message and authentication information (e.g., subscriber identity and/or credentials) provided by the first user equipment device (e.g., different bandwidth policies for home service area vs visitor service area(s) can have different bandwidth policies to be applied to the first user equipment device for the location of each network edge device in the network/system); and (iii) location based quality of service (QOS) polices (priority or PCP codes in stacked VLAN information (stacked VLAN header) can be different based on first network edge device location information.

Method Embodiment 13B. The communications method of Method Embodiment 13 further comprising: generating, by the first server, policy rules to be applied to communications for the first user equipment device (e.g., upstream communications from the first user equipment device or downstream communications to the first user equipment device), said policy rules being based on the determined one or more policies to be applied to communications for the first user equipment device; and communicating the generated policy rules to be applied to communications for the first user equipment device to one or more additional network equipment devices for implementation along with the dynamically assigned stacked VLAN information for the first user equipment device.

Method Embodiment 13C. The communications method of Method Embodiment 13B, wherein the one or more additional network equipment devices include one or more of the following: a centralized gateway connected to the Internet that controls the data plane of the network (Ethernet LAN) to which the first network edge device is connected: an AAA server that provides Authentication, Authorization and Accounting services; and a WLAN controller that manages Access Points in the first wireless network.

Method Embodiment 13D. The communications method of Method Embodiment 13C, further comprising: implementing, by the WLAN controller, fast roaming procedures (e.g., 802.11r fast roaming procedures) in response to receiving an authentication (or an access) request from the first user equipment device via a second network edge device after receiving the generated policy rules to be applied to communications for the first user equipment device along with the dynamically assigned stacked VLAN information for the first user equipment device from the first server, said implementing fast roaming procedures in response to an authentication request received from first user equipment device including generating a authentication success message to send to the second network edge device (e.g., second Access Point), said generated authentication success message including the stacked VLAN information received from the first server.

Method Embodiment 13F. The communications method of Method Embodiment 13C, further comprising: receiving, by the centralized gateway from the first server, the generated policy rules to be applied to communications for the first user equipment device along with the dynamically assigned stacking VLAN information for the first user equipment device: receiving, by the centralized gateway, communications (e.g., messages with Ethernet frames including the stacked VLAN information (S-VLAN ID and C-VLAN ID) included in the Ethernet frame VLAN headers) from the first user equipment device, said communications including the dynamically assigned stacked VLAN information for the first user equipment device; determining, by the centralized gateway, what policy rules (e.g., access and/or bandwidth policies) to apply to communications received from the first user equipment device based on VLAN stacking information extracted from the communications and the VLAN stacking and policy rules received from the first server for the first user equipment device: applying the determined policy rules to the communications received from the first user equipment device (e.g., limiting bandwidth and/or restricting access such as for example to devices on the network (e.g., printers, computers, media servers), the Internet, and/or personal area networks).

Method Embodiment 13G. The communications method of Method Embodiment 13C, further comprising: receiving, by the AAA server from the first server, the generated policy rules to be applied to communications for the first user equipment device along with the dynamically assigned stacked VLAN information for the first user equipment device: receiving, by the AAA server, an Access Request on behalf of the first user equipment device including the stacked VLAN information for the first user equipment device from a centralized gateway: determining, by the AAA server, what policy rules (e.g., access and/or bandwidth policies) to apply to communications received from the first user equipment device based on stacked VLAN information extracted from the Access Request received on behalf of the first user equipment from the centralized gateway and the stacked VLAN information and policy rules received from the first server for the first user equipment device: generating, by the AAA server, a response message to the Access Request received from the centralized gateway including the determined policy rules to be applied: transmitting the response message to the centralized gateway: applying received policy rules by the centralized gateway to communications received from or for the first user equipment device; and wherein the first server is an orchestration server.

Method Embodiment 14. The communications method of Method Embodiment 1, further comprising: receiving, by a WLAN controller of the wireless network, from the first server information for implementing fast roaming procedures for the first user equipment device, said information for implementing fast roaming procedures for the first user equipment device including the dynamically assigned stacked VLAN information for the first user equipment device; and implementing, by the WLAN controller, fast roaming procedures (e.g., 802.11r fast roaming procedures) in response to receiving an authentication request from the first user equipment device via a second network edge device (e.g., second Access Point), said implementing fast roaming procedures in response to an authentication request received from first user equipment device including generating an authentication success message to send to the second network edge device, said generated authentication success message including the stacked VLAN information for the first user equipment device received from the first server.

Method Embodiment 15. A communications method comprising: receiving wirelessly, by a first Access Point of a wireless network, a first message including first authentication information from a first user equipment device; generating, by the first Access Point, a second message based on said first message, said second message including the first authentication information received in the first message and location information for the first Access Point: transmitting, by the first Access Point, the second message to a first Remote Authentication Dial-In User Service (RADIUS) server, and receiving in response to said second message, by the first Access Point, a third message including dynamically assigned stacked Virtual Local Area Network (VLAN) information including a first Service-VLAN Identifier (S-VLAN ID) and a first Customer-VLAN Identifier (C-VLAN ID) assigned to the first user equipment device.

LIST OF A FIRST SET OF EXEMPLARY
NUMBERED SYSTEM EMBODIMENTS

System Embodiment 1. A communications system comprising: a first network equipment device (e.g., an Access Point or Router), said first network equipment device belong to a wireless network, said first network edge device including: a memory; and a first processor that controls the first network edge device to perform the following operations: receiving wirelessly, by a first network edge device (e.g., a first Access Point or a first Wireless Router) of a wireless network, a first message (e.g., a first L2 authentication request message such as a P-PSK authentication request or 802.1X authentication request message) including first user equipment device identification information (e.g., MAC address for the first user equipment device) from a first user equipment device: generating, by the first network edge device, a second message (e.g., an Access-Request) based on said first message, said second message including the first user equipment device identification information received in the first message and location information for the first network edge device: transmitting, by the first network edge device, the second message to a first server (e.g., a first Remote Authentication Dial-In User Service (RADIUS) server), and receiving in response to said second message, by the first network edge device, a third message (e.g., an Access Accept Response), said third message including dynamically assigned stacked Virtual Local Area Network (VLAN) information including a first Service-VLAN Identifier (S-VLAN ID) and a first Customer-VLAN Identifier (C-VLAN ID) dynamically assigned to the first user equipment device.

System Embodiment 2. The communications system of System Embodiment 1, wherein the first network edge device is a first Access Point; wherein the first server is a first Remote Authentication Dial-In User Service (RADIUS) server: wherein said first message includes first authentication information (e.g., user or subscriber credentials included in a subscriber identification module (SIM) or e-SIM (electronic-subscriber identification module)); and wherein said second message includes the first authentication information received in the first message.

System Embodiment 2A. The communications system of System Embodiment 2, wherein said first RADIUS server includes memory and a second processor, said second processor controller the first RADIUS server to perform the following operation: determining whether to grant network access to the first user equipment device based on information contained in the second message; and wherein said first RADIUS server is an orchestration server or an Authentication, Authorization, and Accounting (AAA) server.

System Embodiment 2B. The communications system of System Embodiment 2A, wherein said determining, by the first RADIUS server, whether to grant network access to the first user equipment device based on the first authentication information contained in the second message includes: performing a first authentication check using the first authentication information; and when the first authentication check is successful determining to grant network access to the first user equipment device.

System Embodiment 2C. The communications system of System Embodiment 2B, wherein the second processor further controls the first RADIUS Server to perform the following operations when the first authentication check fails: determining not to grant network access to the first user equipment device; and refraining from generating stacked VLAN information for the first user equipment device: generating an authentication failed (e.g., ACCESS DENIED) message; and transmitting the authentication failed message to the first user equipment device via the first Access Point.

System Embodiment 2D. The communications system of System Embodiment 2, wherein said first RADIUS server is an orchestration server or an Authentication, Authorization, and Accounting (AAA) server; and wherein said first RADIUS server dynamically assigned said stacked Virtual Local Area Network (VLAN) information including the first Service-VLAN Identifier (S-VLAN ID) and the first Customer-VLAN Identifier (C-VLAN ID) assigned to the first user equipment device.

System Embodiment 3. The communications system of System Embodiment 2, wherein the wireless network is a Wi-Fi network: wherein the Wi-Fi network includes a plurality of user equipment devices, said plurality of user equipment devices including more than 4095 mobile user equipment devices, said first user equipment device being one of said plurality of user equipment devices; and wherein each of said plurality of user equipment devices are dynamically assigned different stacked VLAN information including a S-VLAN ID and a C-VLAN ID.

System Embodiment 3A. The communications system of System Embodiment 3, wherein said plurality of user equipment devices include one or more devices connected to one or more physical ports on the first Access Point (e.g., via Ethernet cable(s) and/or switch(es)); and wherein said one or more devices (e.g., desktop computer, IPTV, printer) connected to said one or more physical ports on the first Access Point (e.g., via Ethernet cable(s) and/or switch(es)) are part of a first Personal Area Network.

System Embodiment 3A1. The communications system of System Embodiment 3A, wherein the first processor further controls the first Access Point to perform the following operations: receiving by the first Access Point from the first RADIUS server different dynamically assigned stacked VLAN information for each of the one or more devices connected to the one or more physical ports on the first Access Point.

System Embodiment 3A2. The communications system of System Embodiment 3A1, wherein the different dynamically assigned stacked VLAN information for each of the one or more devices connected to the one or more physical ports on the first Access Point includes a S-VLAN ID and C-VLAN ID, the dynamically assigned C-VLAN ID being the same for each of the one or more devices connected to the one or more physical ports on the first Access Point.

System Embodiment 3A3. The communications system of System Embodiment 3A2, wherein the communications system is operated to restrict access to the one or more devices which are part of the first Personal Area Network using dynamically assigned stacked VLAN information assigned to different user equipment devices; and wherein the dynamically assigned stacked VLAN information for the first user equipment device includes a C-VLAN ID the same as the C-VLAN ID assigned to the one or more devices connected to the one or more physical ports on the first Access Point, said first user equipment device being granted access to the one or more devices which are part of the first Personal Area Network.

System Embodiment 3A4. The communications system of System Embodiment 3A2 wherein the first server generates instructions or rules to restrict access to the one or more devices which are part of the first Personal Area Network using dynamically assigned stacked VLAN information assigned by the first server to the plurality of user equipment devices.

System Embodiment 3A5. The communications system of System Embodiment 3A4, wherein said restricting access to the one or more devices which are part of the first Personal Area Network using the dynamically assigned stacked VLAN information assigned to the plurality of user equipment devices includes: allowing the first user equipment device to access the one or more devices which are part of the first Personal Area Network based on the dynamically assigned stacked VLAN information assigned to the first user equipment device, said first Personal Area Network having been established by or for the first user of the first user equipment device; and not allowing other user equipment devices different from the first user equipment device to access the one or more devices which are part of the first Personal Area Network based on the dynamically assigned stacked VLAN information assigned to the other user equipment devices.

System Embodiment 3A6. The communications system of System Embodiment 3A3 or 3A4, further comprising: a centralized gateway including memory and a third processor, said third processor controlling the centralized gateway to perform the operation of restricting access to the one or more devices which are part of the first Personal Area Network using dynamically assigned stacked VLAN information assigned to the plurality of user equipment devices.

System Embodiment 3A7. The communications system of System Embodiment 3A6, further comprising: a core system of the wireless network, said core system of the wireless network including: a plurality of network edge devices (e.g., Access Points or Routers), said plurality of network edge devices including a first plurality of Wi-Fi Access Points, said first Access Point being one of said plurality of Wi-Fi Access Points: the first server which is configured, provisioned, or pre-provisioned with wireless network site wide location information for each of the network edge devices and location based policies for each of the subscribers, subscriber devices and/or user equipment devices of the WLAN network (e.g., location based policies associated with each subscriber's authentication credentials); a WLAN controller that manages wireless network equipment devices including the plurality of Wi-Fi Access Points, and the centralized gateway which controls the data plane of the core system of the wireless network.

System Embodiment 4. The communications system of System Embodiment 2, wherein the wireless network is a Wi-Fi network: wherein the first message is a first authentication message including Private-Pre-Shared Key (P-PSK) information for the first user equipment device; and wherein the third message is an authentication response message indicating the first user equipment device was successfully authenticated.

System Embodiment 5. The communications system of System Embodiment 1, wherein the first processor further controls the first network edge device (e.g., first Access Point) to perform the following operations prior to receiving said first message by said first network edge device (e.g., first Access Point), receiving wirelessly by the first network edge device (e.g., first Access Point) a first association request message from the first user equipment device: transmitting, by the first network edge device (e.g., first Access Point), a first Association Identifier (AID) to the first user equipment device in response to the first association request message from the first user equipment device: wherein said first server is an orchestration server; and wherein said first orchestration server dynamically assigned said stacked Virtual Local Area Network (VLAN) information including the first Service-VLAN Identifier (S-VLAN ID) and the first Customer-VLAN Identifier (C-VLAN ID) assigned to the first user equipment device.

System Embodiment 5A. The communications system of System Embodiment 1, wherein the first processor further controls the first network edge device to perform the following operations prior to receiving said first message by said first network edge device (e.g., first Access Point), receiving wirelessly by the first network edge device (e.g., first Access Point) a first association request message from the first user equipment device: transmitting, by the first network edge device (e.g., first Access Point), a first Association Identifier (AID) to the first user equipment device in response to the first association request from the first user equipment device: wherein said first server is an AAA server; and wherein said AAA server dynamically assigned said stacked Virtual Local Area Network (VLAN) information including the first Service-VLAN Identifier (S-VLAN ID) and the first Customer-VLAN Identifier (C-VLAN ID) assigned to the first user equipment device.

System Embodiment 5B. The communications system of System Embodiment 1, wherein the first processor further controls the first network edge device to perform the following operations prior to receiving said first message by said first network edge device (e.g., first Access Point), open system authentication procedures to successfully authenticate the first user equipment device; and association procedures to associate the first user equipment device with the first network edge device.

System Embodiment 5C. The communications system of System Embodiment 5B, wherein the first processor further controls the first network edge device to perform the following operations: restricting or blocking the first user equipment device from accessing network services until completing a level 2 (data link layer level) authentication (e.g., network authentication) subsequent to successfully completing association procedures; and wherein the first message is a level 2 authentication request (e.g., P-PSK authentication request or a 802.1X authentication request).

System Embodiment 6. The communications system of System Embodiment 1, wherein said first server is a first Remote Authentication Dial-In User Service (RADIUS) server: wherein the second message is a Remote Authentication Dial-In User Service (RADIUS) protocol Access-Request message; and wherein the third message is a Remote Authentication Dial-In User Service (RADIUS) protocol Access-Accept message, said dynamically assigned stacked VLAN information being included in RADIUS protocol vendor specific attributes of said RADIUS Access-Accept message.

System Embodiment 7. The communications system of System Embodiment 1, wherein said first server is a first Remote Authentication Dial-In User Service (RADIUS) server: wherein the second message is a Remote Authentication Dial-In User Service (RADIUS) protocol Access-Request message; and wherein the third message is a Remote Authentication Dial-In User Service (RADIUS) protocol Access-Accept message, said dynamically assigned stacked VLAN information being included in RADIUS protocol multi-occurrence tunnel attributes in which the first S-VLAN ID is included in a first Tunnel-Private-Group-ID attribute and the first C-VLAN ID is included in a second Tunnel-Private-Group-ID attribute.

System Embodiment 8. The communications system of System Embodiment 7, wherein the first processor further controls the first network edge device to perform the following operations: extracting, by the first network edge device (e.g., first Access Point), the first S-VLAN ID from the first Tunnel-Private-Group-ID attribute of the third message: extracting, by the first network edge device (e.g., first Access Point), the first C-VLAN ID from the second Tunnel-Private-Group-ID attribute of the third message; and forming, by the first network edge device (e.g., first Access Point), the dynamically assigned stacked VLAN information for the first user equipment device from the extracted first S-VLAN ID and the extracted first C-VLAN ID.

System Embodiment 9. The communications system of System Embodiment 1, wherein the first processor further controls the first network edge device subsequent to receiving said third message including said stacked VLAN information for the first user equipment device to perform the following operations: receiving wirelessly by the first network edge device (e.g., first Access Point) from the first user equipment device a fourth message (e.g., first internet access message) including one or more data packets for transmission to an Internet destination (e.g., a device connected to the Internet); and generating, by the first network edge device (e.g., first Access Point), a fifth message based on said fourth message, said fifth message including: said one or more data packets included in said fourth message, said stacked VLAN information for the first user equipment device, and a Media Access Control (MAC) address for the first user equipment device; and transmitting, by the first network edge device (e.g., first Access Point), via a wired network path the fifth message to a gateway for transmission to the Internet destination, said gateway being connected to the Internet.

System Embodiment 9A. The communications system of System Embodiment 8 or 9, wherein the first processor further controls the first network edge device to perform the following operations: establishing, by the first network edge device, a Soft-GRE tunnel between the first network edge device and the gateway for transmitting the fifth message to the gateway; and utilizing, by the first network edge device, the established Soft-GRE tunnel to transmit the fifth message to the gateway.

System Embodiment 10. The communications system of System Embodiment 9, wherein a second processor included in the first server controls the first server to perform the following operations: determining, by the first server (e.g., first RADIUS server), location based access and bandwidth policies for the first user equipment device based on the location information for the first network edge device (e.g., first Access Point) included in the second message; and communicating, by the first server (e.g., first RADIUS server), the determined location based access and bandwidth policies for the first user equipment device to the gateway; and wherein a third processor included in a gateway controls the gateway to perform the following operation: applying, by the gateway, the determined location based access and bandwidth policies to the fifth message.

System Embodiment 11. The communications system of System Embodiment 2, further comprising: a second Access Point of the wireless network including memory and a second processor, said second processor controlling the second Access point to perform the following operations: receiving wirelessly a fourth message including authentication information from the first user equipment device, said second Access Point being located in a visitor service area for the first user equipment device: generating a fifth message based on said fourth message, said fifth message including authentication information received in the fourth message and location information for the second Access Point: transmitting the fifth message to the first RADIUS server, said first RADIUS server being an orchestration server or an Authentication, Authorization, and Accounting (AAA) server; and receiving in response to said fifth message a sixth message including the previously dynamically assigned stacked Virtual Local Area Network (VLAN) information including the first Service-VLAN Identifier (S-VLAN ID) and the first Customer-VLAN Identifier (C-VLAN ID) previously assigned to the first user equipment device.

System Embodiment 12. The communications system of System Embodiment 11, wherein a third processor included in the first RADIUS server controls the first RADIUS server to perform the following operations: updating location based access and bandwidth policies for the first user equipment device based on the location information for the second Access Point included in the fifth message; and communicating, by the first RADIUS server, the updated location based access and bandwidth policies for the first user equipment device to the gateway; and wherein a fourth processor included in the gateway controls the gateway to perform the following operation: applying, by the gateway, the updated location based access and bandwidth policies to subsequent messages received from the first user equipment device.

System Embodiment 13. The communications system of System Embodiment 1, wherein the first server includes memory and a second processor, said second processor controlling the first server to perform the following operations prior to the first network edge device receiving the third message: performing a successful authentication check (e.g., L2 authentication check such as P-PSK authentication check or an 802.1X authentication check) with respect to the first user equipment device in response to the second message: dynamically assigning said dynamically assigned stacked VLAN information to the first user equipment device after completion of the successful authentication check with respect to the first user equipment device: determining one or more policies to be applied to communications for the first user equipment device (e.g., to or from the first user equipment device) based on the first network edge device location information included in the second message and authentication information (e.g., subscriber identity, first user equipment identification information and/or credentials) provided by the first user equipment device: generating a first user equipment device context or record, said first user equipment device context or record including the first user equipment device identification information, the dynamically assigned stacked VLAN information for the first user equipment device, and the determined policies to be applied to communications for the first user equipment device: generating the third message; and transmitting the third message to the first network edge device.

System Embodiment 13A. The communications system of System Embodiment 13, wherein said policies to be applied to communications for the first user equipment device include one or more of the following: (i) location based access policies to be applied to communications from the first user equipment device based on the first network edge device location information included in the second message and authentication information (e.g., subscriber identity and/or credentials) provided by the first user equipment device (e.g., different access policies for home service area vs visitor service area(s) can have different access policies to be applied to the first user equipment device for the location of each network edge device in the network/system): (ii) location based bandwidth policies to be applied to communications for the first user equipment device based on the first network edge device location information included in the second message and authentication information (e.g., subscriber identity and/or credentials) provided by the first user equipment device (e.g., different bandwidth policies for home service area vs visitor service area(s) can have different bandwidth policies to be applied to the first user equipment device for the location of each network edge device in the network/system); and (iii) location based quality of service (QOS) polices (priority or PCP codes in stacked VLAN information (stacked VLAN header) can be different based on first network edge device location information.

System Embodiment 13B. The communications system of System Embodiment 13, wherein said second processor further controls the first server to perform the following operations: generating policy rules to be applied to communications for the first user equipment device (e.g., upstream communications from the first user equipment device or downstream communications to the first user equipment device), said policy rules being based on the determined one or more policies to be applied to communications for the first user equipment device; and communicating the generated policy rules to be applied to communications for the first user equipment device to one or more additional network equipment devices for implementation along with the dynamically assigned stacking VLAN information for the first user equipment device.

System Embodiment 13C. The communications system of System Embodiment 13B, wherein the one or more additional network equipment devices include one or more of the following: a centralized gateway connected to the Internet that controls the data plane of the network (Ethernet LAN) to which the first network edge device is connected: an AAA server that provides Authentication, Authorization and Accounting services; and a Wireless Local Area Network (WLAN) controller that manages Access Points in the first wireless network.

System Embodiment 13D. The communications system of System Embodiment 13C, wherein the WLAN controller of the wireless network includes a processor that controls the WLAN controller to perform the following operation: implementing, by the WLAN controller, fast roaming procedures (e.g., 802.11r fast roaming procedures) in response to receiving an authentication (or an access) request from the first user equipment device via a second network edge device after receiving the generated policy rules to be applied to communications for the first user equipment device along with the dynamically assigned stacked VLAN information for the first user equipment device from the first server, said implementing fast roaming procedures in response to an authentication request received from first user equipment device including generating a authentication success message to send to the second network edge device (e.g., second Access Point), said generated authentication success message including the stacked VLAN information received from the first server.

System Embodiment 13F. The communications system of System Embodiment 13C, wherein a processor included in the centralized gateway controls the centralized gateway to perform the following operations: receiving, by the centralized gateway from the first server, the generated policy rules to be applied to communications for the first user equipment device along with the dynamically assigned stacking VLAN information for the first user equipment device: receiving, by the centralized gateway, communications (e.g., messages with Ethernet frames including the stacked VLAN information (S-VLAN ID and C-VLAN ID) included in the Ethernet frame VLAN headers) from the first user equipment device, said communications including the dynamically assigned stacked VLAN information for the first user equipment device: determining, by the centralized gateway, what policy rules (e.g., access and/or bandwidth policies) to apply to communications received from the first user equipment device based on VLAN stacking information extracted from the communications and the VLAN stacking and policy rules received from the first server for the first user equipment device: applying the determined policy rules to the communications received from the first user equipment device (e.g., limiting bandwidth and/or restricting access such as for example to devices on the network (e.g., printers, computers, media servers), the Internet, and/or personal area networks).

System Embodiment 13G. The communications system of System Embodiment 13C, wherein the AAA server includes a processor, said processor included in the AAA server controlling the AAA server to perform the following operations: receiving, by the AAA server from the first server, the generated policy rules to be applied to communications for the first user equipment device along with the dynamically assigned stacked VLAN information for the first user equipment device; receiving, by the AAA server, an Access Request on behalf of the first user equipment device including the stacked VLAN information for the first user equipment device from a centralized gateway: determining, by the AAA server, what policy rules (e.g., access and/or bandwidth policies) to apply to communications received from the first user equipment device based on stacked VLAN information extracted from the Access Request received on behalf of the first user equipment from the centralized gateway and the stacked VLAN information and policy rules received from the first server for the first user equipment device: generating, by the AAA server, a response message to the Access Request received from the centralized gateway including the determined policy rules to be applied: transmitting the response message to the centralized gateway; and wherein a processor in the centralized gateway controls the centralized gateway to perform the following operation: applying received policy rules by the centralized gateway to communications received from or for the first user equipment device; and wherein the first server is an orchestration server.

System Embodiment 14. The communications system of System Embodiment 1, further comprising: a WLAN controller, said WLAN controller including memory and a second processor, said second processor controlling the WLAN controller to perform the following operations: receiving, by the WLAN controller of the wireless network, from the first server information for implementing fast roaming procedures for the first user equipment device, said information for implementing fast roaming procedures for the first user equipment device including the dynamically assigned stacked VLAN information for the first user equipment device; and implementing, by the WLAN controller, fast roaming procedures (e.g., 802.11r fast roaming procedures) in response to receiving an authentication request from the first user equipment device via a second network edge device (e.g., second Access Point), said implementing fast roaming procedures in response to an authentication request received from first user equipment device including generating an authentication success message to send to the second network edge device, said generated authentication success message including the stacked VLAN information for the first user equipment device received from the first server.

System Embodiment 15. A first Access Point of a wireless network comprising: memory; and a processor, said processor controlling the first Access Point to perform the following operations: receiving wirelessly, by the first Access Point of the wireless network, a first message including first authentication information from a first user equipment device: generating, by the first Access Point, a second message based on said first message, said second message including the first authentication information received in the first message and location information for the first Access Point: transmitting, by the first Access Point, the second message to a first Remote Authentication Dial-In User Service (RADIUS) server, and receiving in response to said second message, by the first Access Point, a third message including dynamically assigned stacked Virtual Local Area Network (VLAN) information including a first Service-VLAN Identifier (S-VLAN ID) and a first Customer-VLAN Identifier (C-VLAN ID) assigned to the first user equipment device.

LIST OF A SECOND SET OF EXEMPLARY NUMBERED METHOD EMBODIMENTS

Method Embodiment 1. A communications method comprising: receiving, by a first Remote Authentication Dial-In User Service (RADIUS) server, over a wired Ethernet connection a first message (e.g., a first L2 authentication request message such as an P-PSK authentication request or 802.1X authentication request message in the form of an Access Request message) from a first Access Point, said first message including first user equipment device identification information (e.g., MAC address for a first user equipment device) and location information for the first Access Point: performing, by the first RADIUS server, a successful authentication check (e.g., L2 authentication check such as P-PSK authentication check or an 802.1X EAP authentication check) with respect to the first user equipment device in response to the first authentication message: dynamically assigning, by the first RADIUS server, stacked VLAN information to the first user equipment device after completion of the successful authentication check with respect to the first user equipment device, said stacked VLAN information including a S-VLAN ID and a C-VLAN ID: determining, by the first RADIUS server, one or more policies to be applied to communications for (e.g., to or from) the first user equipment based on the first Access Point location information included in the first message and authentication information (e.g., subscriber identity, first user equipment identification information and/or credentials) provided by the first user equipment device: generating, by the first RADIUS server, a first user equipment device context or record, said first user equipment context record including first user equipment identification information, the dynamically assigned stacked VLAN information for the first user equipment device, determined policies to be applied to communications from the first user equipment device: generating an authentication response message (e.g., an Access Accept message) indicating the authentication was successful, said authentication response message including the dynamically assigned stacked VLAN information for the first user equipment device; and transmitting the generated authentication response message to the first Access Point in response to the first authentication request message.

Method Embodiment 2. The communications method of Method Embodiment 1, wherein the first RADIUS server is an orchestration server of an AAA server.

Method Embodiment 3. The communications method of Method Embodiment 2, wherein the first authentication request message is a Remote Authentication Dial-In User Service (RADIUS) protocol Access-Request message; and wherein the authentication response message is a Remote Authentication Dial-In User Service (RADIUS) protocol Access-Accept message; and wherein said generating the authentication response message includes: placing said dynamically assigned stacked VLAN information in RADIUS protocol vendor specific attributes of said RADIUS Access-Accept message.

Method Embodiment 4. The communications method of Method Embodiment 2, wherein the first authentication request message is a Remote Authentication Dial-In User Service (RADIUS) protocol Access-Request message; and wherein the authentication response message is a Remote Authentication Dial-In User Service (RADIUS) protocol Access-Accept message, said dynamically assigned stacked VLAN information being included in RADIUS protocol multi-occurrence tunnel attributes in which the first S-VLAN ID is included in a first Tunnel-Private-Group-ID attribute and wherein the first C-VLAN ID is included in a second Tunnel-Private-Group-ID attribute.

LIST OF EXEMPLARY NUMBERED APPARATUS EMBODIMENTS

Apparatus Embodiment 1. A Remote Authentication Dial-In User Service (RADIUS) server of a wireless network comprising: memory; and a processor, said processor controlling the RADIUS server of the wireless network to perform the following operations: receiving, by the RADIUS server, over a wired Ethernet connection a first authentication request message (e.g., L2 authentication request message such as an P-PSK authentication request or 802.1X authentication request message in the form of an Access Request message) from a first Access Point, said first authentication request message including first user equipment device identification information (e.g., MAC address for a first user equipment device) and location information for the first Access Point: performing, by the RADIUS server, a successful authentication check (e.g., L2 authentication check such as P-PSK authentication check or an 802.1X EAP authentication check) with respect to the first user equipment device in response to the first authentication message: dynamically assigning, by the RADIUS server, stacked VLAN information to the first user equipment device after completion of the successful authentication check with respect to the first user equipment device, said stacked VLAN information including a S-VLAN ID and a C-VLAN ID: determining, by the RADIUS server, one or more policies to be applied to communications for (e.g., to or from) the first user equipment based on the first Access Point location information included in the first authentication request message and authentication information (e.g., subscriber identity, first user equipment identification information and/or credentials) provided by the first user equipment device: generating, by the RADIUS server, a first user equipment device context or record, said first user equipment context record including first user equipment identification information, the dynamically assigned stacked VLAN information for the first user equipment device, determined policies to be applied to communications from the first user equipment device: generating an authentication response message (e.g., an Access Accept message) indicating the authentication was successful, said authentication response message including the dynamically assigned stacked VLAN information for the first user equipment device; and transmitting the generated authentication response message to the first Access Point in response to the first authentication request message.

Apparatus Embodiment 2. The RADIUS server of Apparatus Embodiment 1, wherein the RADIUS server is an orchestration server of an AAA server.

Apparatus Embodiment 3. The RADIUS server of Apparatus Embodiment 2, wherein the first authentication request message is a Remote Authentication Dial-In User Service (RADIUS) protocol Access-Request message; and wherein the authentication response message is a Remote Authentication Dial-In User Service (RADIUS) protocol Access-Accept message; and wherein said generating the authentication response message includes: placing said dynamically assigned stacked VLAN information in RADIUS protocol vendor specific attributes of said RADIUS Access-Accept message.

Apparatus Embodiment 4. The RADIUS server of Apparatus Embodiment 2, wherein the first authentication request message is a Remote Authentication Dial-In User Service (RADIUS) protocol Access-Request message; and wherein the authentication response message is a Remote Authentication Dial-In User Service (RADIUS) protocol Access-Accept message, said dynamically assigned stacked VLAN information being included in RADIUS protocol multi-occurrence tunnel attributes in which the first S-VLAN ID is included in a first Tunnel-Private-Group-ID attribute and wherein the first C-VLAN ID is included in a second Tunnel-Private-Group-ID attribute.

LIST OF EXEMPLARY NUMBERED NON-TRANSITORY COMPUTER READABLE MEDIUM EMBODIMENTS

Non-Transitory Computer Readable Medium Embodiment 1. A non-transitory computer readable medium including a first set of computer executable instructions which when executed by a processor of a first network edge device cause the first network edge device to perform the steps of: receiving wirelessly, by the first network edge device (e.g., a first Access Point or a first Wireless Router) of a wireless network, a first message (e.g., a first L2 authentication request message such as a P-PSK authentication request or 802.1X authentication request message) including first user equipment device identification information (e.g., MAC address for the first user equipment device) from a first user equipment device: generating, by the first network edge device, a second message (e.g., an Access-Request) based on said first message, said second message including the first user equipment device identification information received in the first message and location information for the first network edge device; transmitting, by the first network edge device, the second message to a first server (e.g., a first Remote Authentication Dial-In User Service (RADIUS) server), and receiving in response to said second message, by the first network edge device, a third message (e.g., an Access Accept Response), said third message including dynamically assigned stacked Virtual Local Area Network (VLAN) information including a first Service-VLAN Identifier (S-VLAN ID) and a first Customer-VLAN Identifier (C-VLAN ID) dynamically assigned to the first user equipment device.

Non-Transitory Computer Readable Medium Embodiment 2. A non-transitory computer readable medium including a first set of computer executable instructions which when executed by a processor of first cause the first Remote Authentication Dial-In User Service (RADIUS) server to perform the steps of: receiving over a wired Ethernet connection a first authentication request message (e.g., L2 authentication request message such as an P-PSK authentication request or 802.1X authentication request message in the form of an Access Request message) from a first Access Point, said first authentication request message including first user equipment device identification information (e.g., MAC address for a first user equipment device) and location information for the first Access Point: performing a successful authentication check (e.g., L2 authentication check such as P-PSK authentication check or an 802.1X EAP authentication check) with respect to the first user equipment device in response to the first authentication message: dynamically assigning stacked VLAN information to the first user equipment device after completion of the successful authentication check with respect to the first user equipment device, said stacked VLAN information including a S-VLAN ID and a C-VLAN ID: determining one or more policies to be applied to communications for (e.g., to or from) the first user equipment based on the first Access Point location information included in the first authentication request message and authentication information (e.g., subscriber identity, first user equipment identification information and/or credentials) provided by the first user equipment device: generating a first user equipment device context or record, said first user equipment context record including first user equipment identification information, the dynamically assigned stacked VLAN information for the first user equipment device, determined policies to be applied to communications from the first user equipment device: generating an authentication response message (e.g., an Access Accept message) indicating the authentication was successful, said authentication response message including the dynamically assigned stacked VLAN information for the first user equipment device; and transmitting the generated authentication response message to the first Access Point in response to the first authentication request message.

The techniques of various embodiments may be implemented using software, hardware and/or a combination of software and hardware. Various embodiments are directed to apparatus, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to methods, e.g., method of controlling and/or operating user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements described herein are implemented using one or more components to perform the steps corresponding to one or more methods, for example, provisioning user equipment devices, provisioning AP devices, provisioning AAA servers, provisioning orchestration servers, generating messages, message reception, message transmission, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, are configured to perform the steps of the methods described as being performed by the user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, with a processor which includes a component corresponding to each of the steps of the various described methods performed by the device in which the processor is included. In some but not all embodiments a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a user equipment device, wireless device, mobile device, smartphone, subscriber device, desktop computer, printer, IPTV, laptop, tablets, network edge device, Access Point, wireless router, switch, WLAN controller, orchestration server, orchestrator, Gateway, AAA server, server, node and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
receiving wirelessly, by a first network edge device of a wireless network, a first message including first user equipment device identification information from a first user equipment device;
generating, by the first network edge device, a second message based on said first message, said second message including the first user equipment device identification information received in the first message and location information for the first network edge device;
transmitting, by the first network edge device, the second message to a first server; and
receiving in response to said second message, by the first network edge device, a third message, said third message including dynamically assigned stacked Virtual Local Area Network (VLAN) information including a first Service-VLAN Identifier (S-VLAN ID) and a first Customer-VLAN Identifier (C-VLAN ID) dynamically assigned to the first user equipment device.

2. The communications method of claim 1,
wherein the first network edge device is a first Access Point;
wherein the first server is a first Remote Authentication Dial-In User Service (RADIUS) server;
wherein said first message includes first authentication information; and
wherein said second message includes the first authentication information received in the first message.

3. The communications method of claim 2,
wherein the wireless network is a Wi-Fi network;
wherein the Wi-Fi network includes a plurality of user equipment devices, said plurality of user equipment devices including more than 4095 mobile user equipment devices, said first user equipment device being one of said plurality of user equipment devices; and
wherein each of said plurality of user equipment devices are dynamically assigned different stacked VLAN information including a S-VLAN ID and a C-VLAN ID.

4. The communications method of claim 2,
wherein the wireless network is a Wi-Fi network;
wherein the first message is a first authentication request message including Private-Pre-Shared Key (P-PSK) information for the first user equipment device; and
wherein the third message is an authentication response message indicating the first user equipment device was successfully authenticated.

5. The communications method of claim 1, further comprising:
prior to receiving said first message by said first network edge device,
receiving wirelessly by the first network edge device a first association request message from the first user equipment device;
transmitting, by the first network edge device, a first Association Identifier (AID) to the first user equipment device in response to the first association request message from the first user equipment device;
wherein said first server is a first orchestration server; and
wherein said first orchestration server dynamically assigned said stacked Virtual Local Area Network (VLAN) information including the first Service-VLAN Identifier (S-VLAN ID) and the first Customer-VLAN Identifier (C-VLAN ID) assigned to the first user equipment device.

6. The communications method of claim 1,
wherein said first server is a first Remote Authentication Dial-In User Service (RADIUS) server;
wherein the second message is a Remote Authentication Dial-In User Service (RADIUS) protocol Access-Request message; and
wherein the third message is a Remote Authentication Dial-In User Service (RADIUS) protocol Access-Accept message, said dynamically assigned stacked VLAN information being included in RADIUS protocol vendor specific attributes of said RADIUS Access-Accept message.

7. The communications method of claim 1,
wherein said first server is a first Remote Authentication Dial-In User Service (RADIUS) server;
wherein the second message is a Remote Authentication Dial-In User Service (RADIUS) protocol Access-Request message; and
wherein the third message is a Remote Authentication Dial-In User Service (RADIUS) protocol Access-Accept message, said dynamically assigned stacked VLAN information being included in RADIUS protocol multi-occurrence tunnel attributes in which the first S-VLAN ID is included in a first Tunnel-Private-Group-ID attribute and the first C-VLAN ID is included in a second Tunnel-Private-Group-ID attribute.

8. The communications method of claim 7, further comprising:
extracting, by the first network edge device, the first S-VLAN ID from the first Tunnel-Private-Group-ID attribute of the third message;
extracting, by the first network edge device, the first C-VLAN ID from the second Tunnel-Private-Group-ID attribute of the third message; and
forming, by the first network edge device, the dynamically assigned stacked VLAN information for the first user equipment device from the extracted first S-VLAN ID and the extracted first C-VLAN ID.

9. The communications method of claim 1, further comprising:
subsequent to receiving said third message including said stacked VLAN information for the first user equipment device, receiving wirelessly by the first network edge device from the first user equipment device a fourth message including one or more data packets for transmission to an Internet destination; and
generating, by the first network edge device, a fifth message based on said fourth message, said fifth message including: said one or more data packets included in said fourth message, said stacked VLAN information for the first user equipment device, and a Media Access Control (MAC) address for the first user equipment device; and
transmitting, by the first network edge device, via a wired network path, the fifth message to a gateway for transmission to the Internet destination, said gateway being connected to the Internet.

10. The communications method of claim 9, further comprising:
determining, by the first server, location based access and bandwidth policies for the first user equipment device based on the location information for the first network edge device included in the second message; and
communicating, by the first server, the determined location based access and bandwidth policies for the first user equipment device to the gateway;
applying, by the gateway, the determined location based access and bandwidth policies to the fifth message.

11. The communications method of claim 2, further comprising:
receiving wirelessly, by a second Access Point of the wireless network, a fourth message including authentication information from the first user equipment device, said second Access Point being located in a visitor service area for the first user equipment device;
generating, by the second Access Point, a fifth message based on said fourth message, said fifth message including authentication information received in the fourth message and location information for the second Access Point;
transmitting, by the second Access Point, the fifth message to the first RADIUS server, said first RADIUS server being an orchestration server or an Authentication, Authorization, and Accounting (AAA) server; and
receiving in response to said fifth message, by the second Access Point, a sixth message including the previously dynamically assigned stacked Virtual Local Area Network (VLAN) information including the first Service-VLAN Identifier (S-VLAN ID) and the first Customer-VLAN Identifier (C-VLAN ID) previously assigned to the first user equipment device.

12. The communications method of claim 11, further comprising:
determining, by the first RADIUS server, updated location based access and bandwidth policies for the first user equipment device based on the location information for the second Access Point included in the fifth message; and
communicating, by the first RADIUS server, the updated location based access and bandwidth policies for the first user equipment device to a gateway;
applying, by the gateway, the updated location based access and bandwidth policies to subsequent messages received from the first user equipment device.

13. The communications method of claim 1, further comprising:
prior to receiving the third message by the first network edge device, performing, by the first server, the following operations:
performing a successful authentication check with respect to the first user equipment device in response to the second message;
dynamically assigning said dynamically assigned stacked VLAN information to the first user equipment device after completion of the successful authentication check with respect to the first user equipment device;
determining one or more policies to be applied to communications for the first user equipment device based on the first network edge device location information included in the second message and authentication information provided by the first user equipment device;
generating a first user equipment device context or record, said first user equipment device context or record including the first user equipment device identification information, the dynamically assigned stacked VLAN information for the first user equipment device, and the determined policies to be applied to communications for the first user equipment device;
generating the third message; and
transmitting the third message to the first network edge device.

14. The communications method of claim 1, further comprising:
receiving, by a Wireless Local Area Network (WLAN) controller of the wireless network, from the first server, information for implementing fast roaming procedures for the first user equipment device, said information for implementing fast roaming procedures for the first user equipment device including the dynamically assigned stacked VLAN information for the first user equipment device; and implementing, by the WLAN controller, fast roaming procedures in response to receiving an authentication request from the first user equipment device via a second network edge device, said implementing fast roaming procedures in response to an authentication request received from the first user equipment device including:

generating an authentication success message to send to the second network edge device, said generated authentication success message including the stacked VLAN information for the first user equipment device received from the first server.

15. A communications system comprising:

a first network edge device, said first network edge device belonging to a wireless network, said first network edge device including:
   a memory; and
   a first processor that controls the first network edge device to perform the following operations;
      receiving wirelessly, by the first network edge device of the wireless network, a first message including first user equipment device identification information from a first user equipment device;
      generating, by the first network edge device, a second message based on said first message, said second message including the first user equipment device identification information received in the first message and location information for the first network edge device;
      transmitting, by the first network edge device, the second message to a first server; and
      receiving in response to said second message, by the first network edge device, a third message, said third message including dynamically assigned stacked Virtual Local Area Network (VLAN) information including a first Service-VLAN Identifier (S-VLAN ID) and a first Customer-VLAN Identifier (C-VLAN ID) dynamically assigned to the first user equipment device.

16. The communications system of claim 15,
wherein the first network edge device is a first Access Point;
wherein the first server is a first Remote Authentication Dial-In User Service (RADIUS) server;
wherein said first message includes first authentication information; and
wherein said second message includes the first authentication information received in the first message.

17. The communications system of claim 16,
wherein the wireless network is a Wi-Fi network;
wherein the Wi-Fi network includes a plurality of user equipment devices, said plurality of user equipment devices including more than 4095 mobile user equipment devices, said first user equipment device being one of said plurality of user equipment devices; and
wherein each of said plurality of user equipment devices are dynamically assigned different stacked VLAN information including a S-VLAN ID and a C-VLAN ID.

18. The communications system of claim 15,
wherein said first server is a first Remote Authentication Dial-In User Service (RADIUS) server;
wherein the second message is a Remote Authentication Dial-In User Service (RADIUS) protocol Access-Request message; and
wherein the third message is a Remote Authentication Dial-In User Service (RADIUS) protocol Access-Accept message, said dynamically assigned stacked VLAN information being included in RADIUS protocol vendor specific attributes of said RADIUS Access-Accept message.

19. The communications system of claim 15,
wherein said first server is a first Remote Authentication Dial-In User Service (RADIUS) server;
wherein the second message is a Remote Authentication Dial-In User Service (RADIUS) protocol Access-Request message; and
wherein the third message is a Remote Authentication Dial-In User Service (RADIUS) protocol Access-Accept message, said dynamically assigned stacked VLAN information being included in RADIUS protocol multi-occurrence tunnel attributes in which the first S-VLAN ID is included in a first Tunnel-Private-Group-ID attribute and the first C-VLAN ID is included in a second Tunnel-Private-Group-ID attribute.

20. A non-transitory computer readable medium including a first set of computer executable instructions which when executed by a processor of a first network edge device cause the first network edge device to perform the steps of:
   receiving wirelessly, by the first network edge device of a wireless network, a first message including first user equipment device identification information from a first user equipment device;
   generating, by the first network edge device, a second message based on said first message, said second message including the first user equipment device identification information received in the first message and location information for the first network edge device;
   transmitting, by the first network edge device, the second message to a first server, and
   receiving in response to said second message, by the first network edge device, a third message, said third message including dynamically assigned stacked Virtual Local Area Network (VLAN) information including a first Service-VLAN Identifier (S-VLAN ID) and a first Customer-VLAN Identifier (C-VLAN ID) dynamically assigned to the first user equipment device.

* * * * *